(12) United States Patent
Sasaki et al.

(10) Patent No.: US 9,651,928 B2
(45) Date of Patent: May 16, 2017

(54) METHOD FOR CONTROLLING INFORMATION APPARATUS AND COMPUTER-READABLE RECORDING MEDIUM

(71) Applicant: PANASONIC INTELLECTUAL PROPERTY CORPORATION OF AMERICA, Torrance, CA (US)

(72) Inventors: Takamitsu Sasaki, Osaka (JP); Eiichi Naito, Kyoto (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 366 days.

(21) Appl. No.: 14/602,589

(22) Filed: Jan. 22, 2015

(65) Prior Publication Data
US 2015/0185725 A1    Jul. 2, 2015

Related U.S. Application Data

(63) Continuation of application No. PCT/JP2013/003432, filed on May 30, 2013.
(Continued)

(51) Int. Cl.
*G05B 11/01* (2006.01)
*G05B 15/00* (2006.01)
(Continued)

(52) U.S. Cl.
CPC ............ *G05B 15/02* (2013.01); *G08C 17/02* (2013.01); *H04L 12/2803* (2013.01);
(Continued)

(58) Field of Classification Search
None
See application file for complete search history.

(56) References Cited

U.S. PATENT DOCUMENTS 6,642,943 B1 * 11/2003 Machida ............ H04N 1/00408
358/1.15
6,756,998 B1 * 6/2004 Bilger ................. H04L 12/2803
715/734
(Continued)

FOREIGN PATENT DOCUMENTS

JP    11-069462    3/1999
JP    2000-138979    5/2000
(Continued)

OTHER PUBLICATIONS

Search report from PCT/JP2013/003432, mail date is Aug. 27, 2013.

*Primary Examiner* — Ronald Hartman, Jr.
(74) *Attorney, Agent, or Firm* — Greenblum & Bernstein, P.L.C.

(57) ABSTRACT

The present disclosure is a method for controlling an information apparatus having a third display and being used in an information management system, the method causing a computer of the information apparatus to: display a display screen representing at least one floor plan of a building on the third display; display device icons representing target devices including a first target device and a second target device on the display screen, the device icons being movable by dragging the device icons; and when it is sensed that a device icon representing the second target device is dropped on a device icon representing the first target device, output to the information management system a first control command for displaying a confirmation screen on a first display of the first target device, the confirmation screen being for confirmation of a state of the second target device.

21 Claims, 92 Drawing Sheets

Related U.S. Application Data

(60) Provisional application No. 61/806,534, filed on Mar. 29, 2013.

(51) Int. Cl.
*G06F 3/048* (2013.01)
*G05B 15/02* (2006.01)
*G08C 17/02* (2006.01)
*H04L 12/28* (2006.01)

(52) U.S. Cl.
CPC .. *G08C 2201/112* (2013.01); *G08C 2201/114* (2013.01); *G08C 2201/30* (2013.01)

(56) References Cited

U.S. PATENT DOCUMENTS

| | | | |
|---|---|---|---|
| 7,702,421 B2 * | 4/2010 | Sullivan | F24F 11/0009 236/51 |
| 7,730,223 B1 | 6/2010 | Bavor et al. | |
| 7,954,070 B2 * | 5/2011 | Plocher | G08B 25/14 700/13 |
| 7,974,854 B1 * | 7/2011 | Bradley | G06Q 30/02 705/1.1 |
| 8,579,452 B2 | 11/2013 | Diederiks et al. | |
| 9,563,182 B2 * | 2/2017 | Mezic | G05B 15/02 |
| 2005/0131991 A1 * | 6/2005 | Ogawa | H04L 12/2803 709/201 |
| 2006/0277501 A1 * | 12/2006 | Plocher | G08B 25/14 715/853 |
| 2007/0219645 A1 * | 9/2007 | Thomas | G05B 15/02 700/29 |
| 2008/0316730 A1 | 12/2008 | Diederiks et al. | |
| 2009/0057428 A1 * | 3/2009 | Geadelmann | G05B 15/02 236/51 |
| 2012/0061480 A1 * | 3/2012 | Deligiannis | F24F 11/0012 236/51 |
| 2012/0221956 A1 * | 8/2012 | Geadelmann | G05B 15/02 715/736 |
| 2012/0280827 A1 * | 11/2012 | Kashiwagi | G05B 15/02 340/691.6 |
| 2013/0086497 A1 * | 4/2013 | Ambuhl | G05B 15/02 715/762 |
| 2013/0282280 A1 * | 10/2013 | Patterson | G08B 7/062 701/533 |
| 2014/0043791 A1 | 2/2014 | Diederiks et al. | |
| 2014/0232273 A1 | 8/2014 | Sasaki et al. | |
| 2014/0236320 A1 | 8/2014 | Sasaki et al. | |
| 2014/0236325 A1 | 8/2014 | Sasaki et al. | |
| 2014/0236326 A1 | 8/2014 | Sasaki et al. | |
| 2014/0236327 A1 | 8/2014 | Sasaki et al. | |
| 2014/0236358 A1 | 8/2014 | Sasaki et al. | |
| 2014/0336824 A1 | 11/2014 | Sasaki et al. | |
| 2014/0359468 A1 | 12/2014 | Sasaki et al. | |
| 2014/0359524 A1 | 12/2014 | Sasaki et al. | |
| 2015/0005952 A1 | 1/2015 | Sasaki et al. | |
| 2015/0007038 A1 | 1/2015 | Sasaki et al. | |
| 2015/0033136 A1 | 1/2015 | Sasaki et al. | |

FOREIGN PATENT DOCUMENTS

| | | |
|---|---|---|
| JP | 2007-104567 | 4/2007 |
| JP | 5128489 | 5/2009 |
| JP | 2009-213107 | 9/2009 |
| JP | 2009-300060 | 12/2009 |
| JP | 2012-137828 | 7/2012 |
| JP | 2012-182520 | 9/2012 |

* cited by examiner

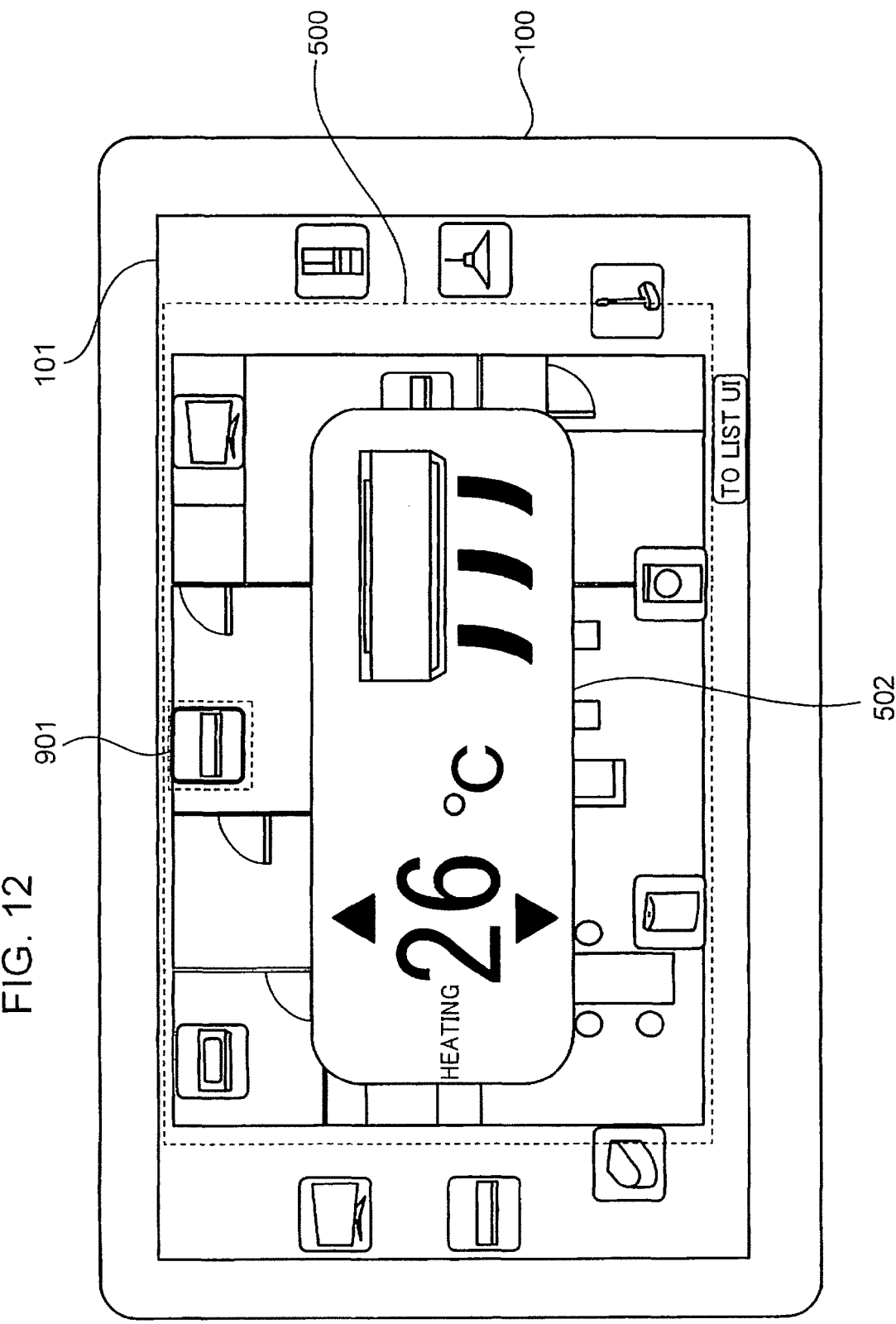

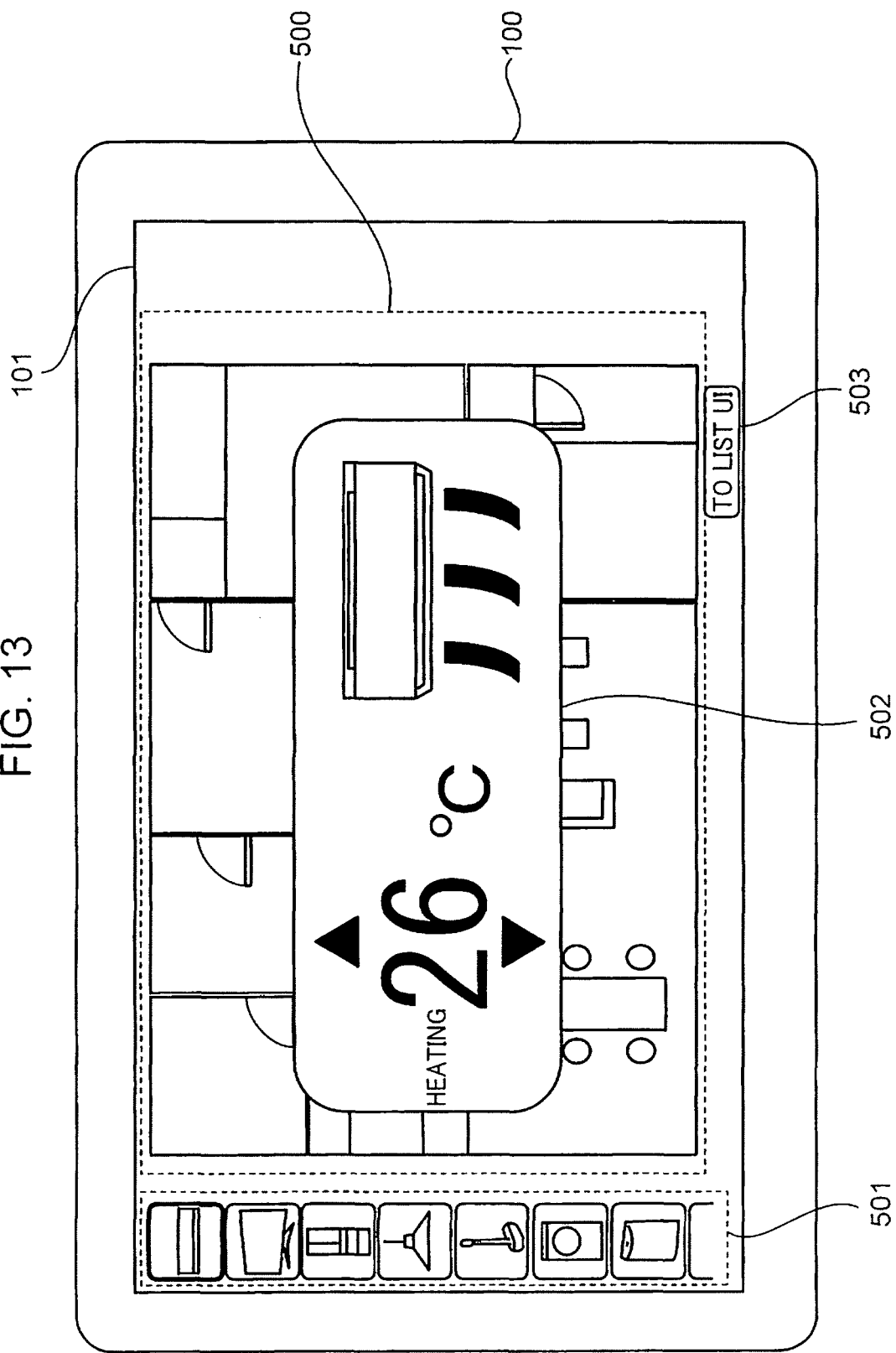

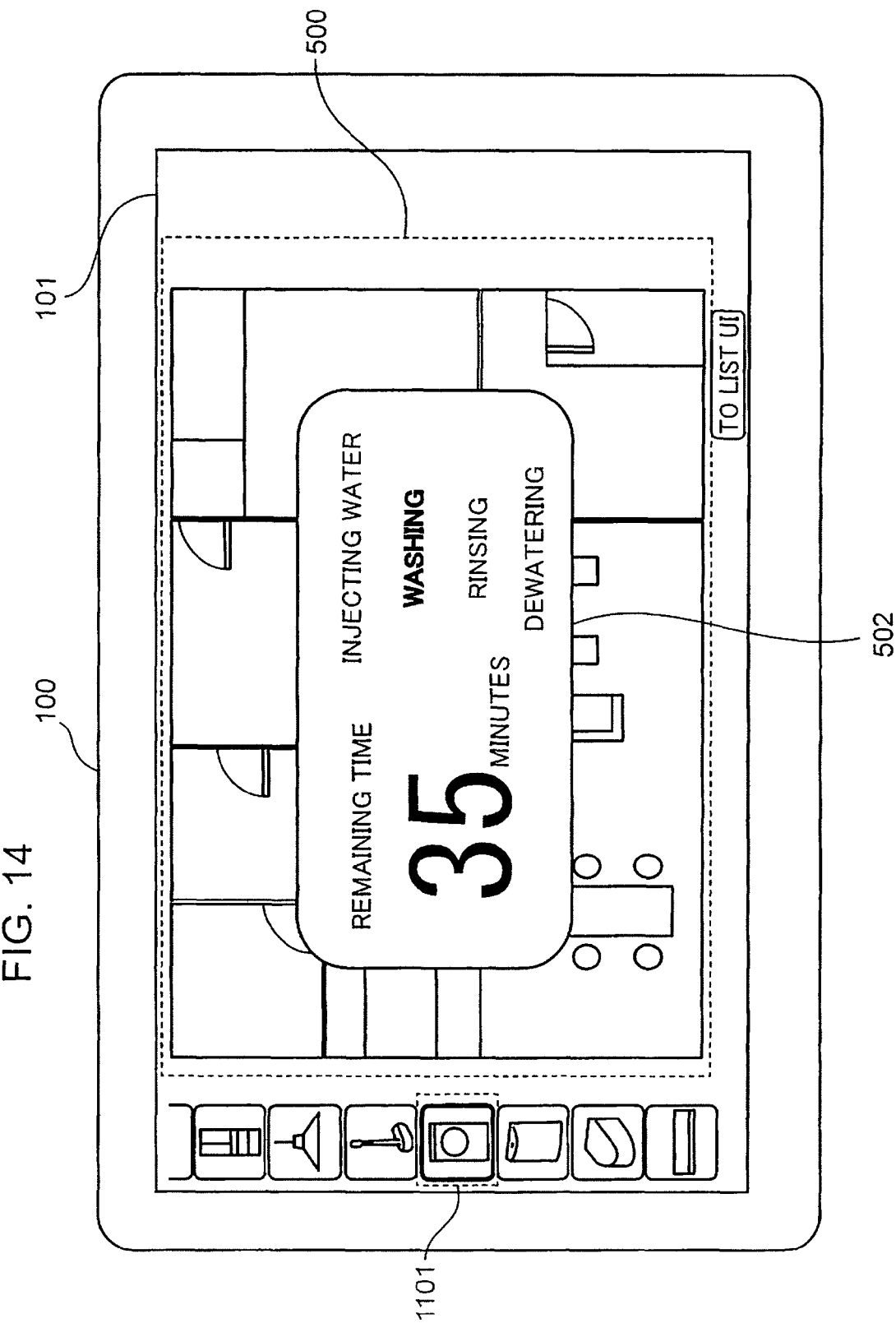

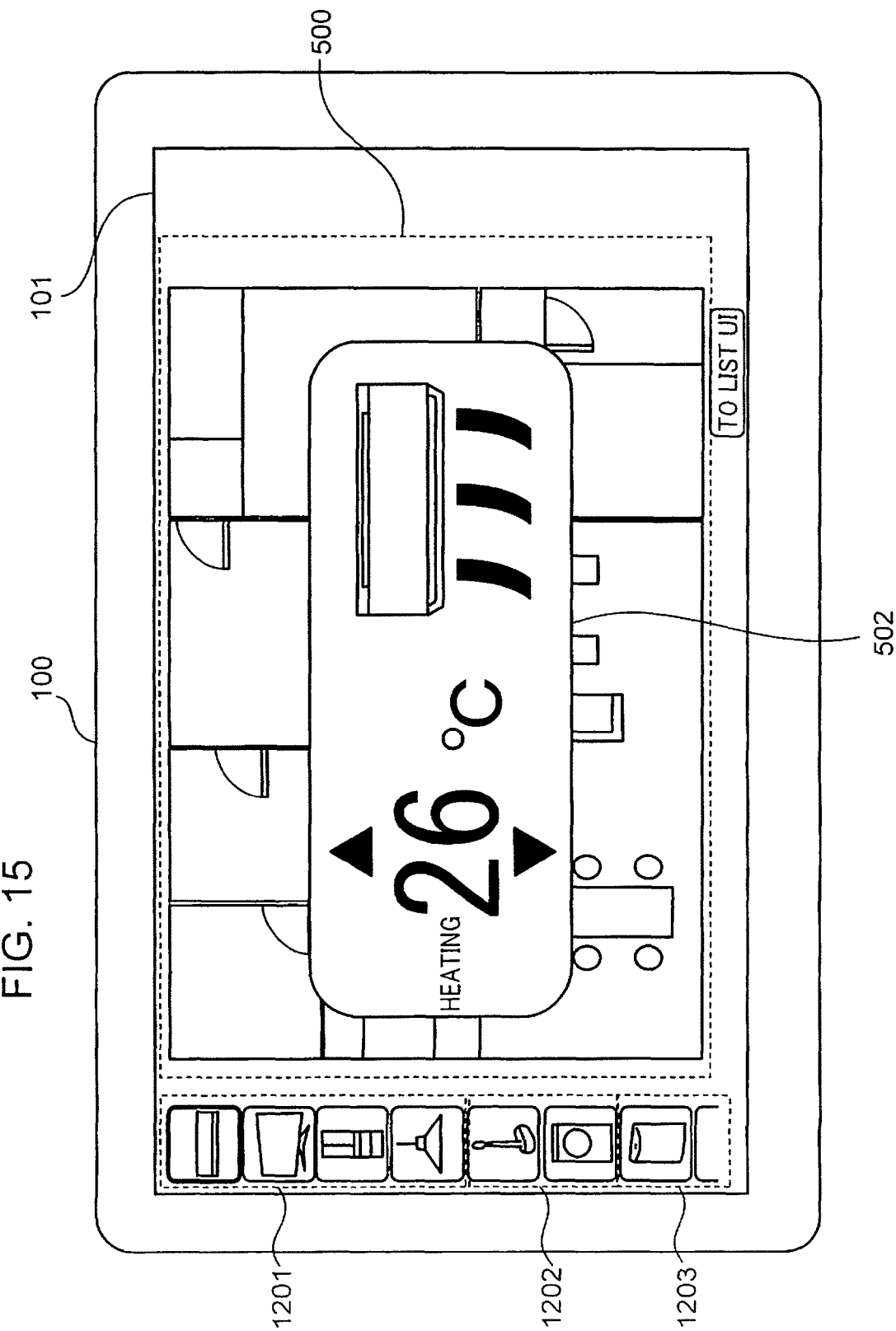

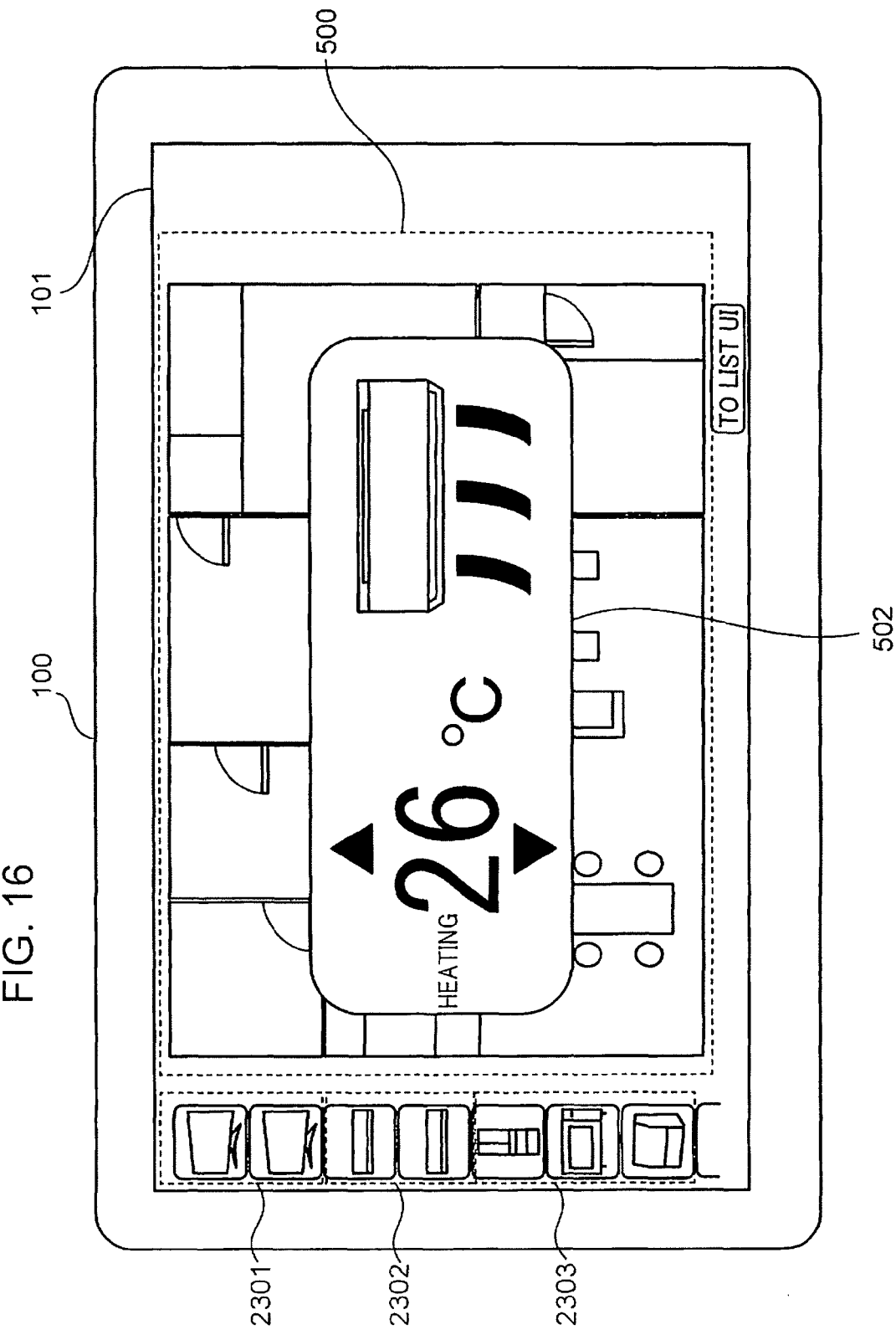

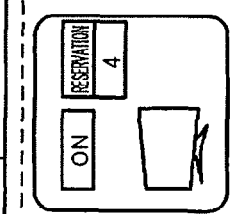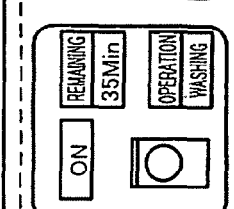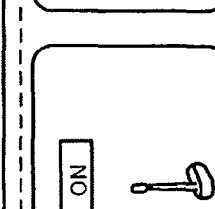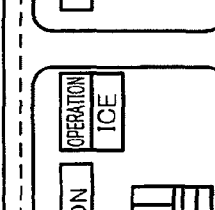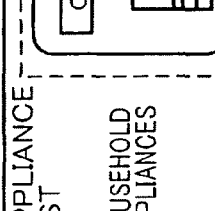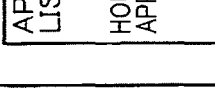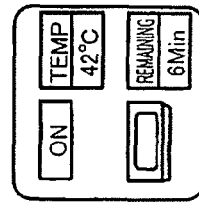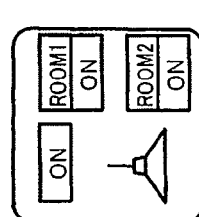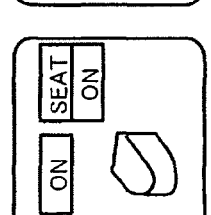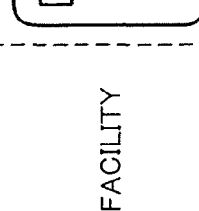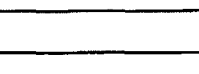
FIG.24

FIG. 32

| ROOM ID | ROOM TYPE | ROOM COORDINATE |
|---|---|---|
| A | LIVING ROOM | (F,G,H,I,L,O,N) |
| B | BEDROOM | (J,K,M,L,I) |
| C | BATH | (A,B,G,F) |
| D | STAIRCASE | (H,I,R,Q) |
| ... | | |

FIG.34

| 4700 | | | | | |
|---|---|---|---|---|---|
| DEVICE ID 4701 | DEVICE TYPE 4702 | MODEL NUMBER 4703 | ARRANGEMENT 4704 | CAPABILITY INFORMATION 4705 | CONTROL COMMAND TRANSMISSION DESTINATION 4706 |
| A | AIR CONDITIONER | CS-X403C | (X10,Y100,Z1) | TEMPERATURE CONTROL, AIR FLOW DIRECTION CONTROL, AND AIR FLOW AMOUNT CONTROL | DEVICE |
| B | ILLUMINATION | HH-LC710A | (X30,Y150,Z1) | ON/OFF CONTROL AND DIMMER CONTROL | DEVICE |
| C | REFRIGERATOR | NR-F557XV | (X50,Y200,Z1) | POWER CONSUMPTION STATE MANAGEMENT | SERVER |
| ... | | | | | |

FIG.35

| DEVICE ID 3101 | DEVICE TYPE 3102 | MODEL NUMBER 3103 | ARRANGEMENT 3104 | CAPABILITY INFORMATION 3105 | CONTROL COMMAND TRANSMISSION DESTINATION 3106 | IP ADDRESS 3107 |
|---|---|---|---|---|---|---|
| A | AIR CONDITIONER | CS-X403C | (X10,Y100,Z1) | TEMPERATURE CONTROL, AIR FLOW DIRECTION CONTROL, AND AIR FLOW AMOUNT CONTROL | DEVICE | 192.168.0.5 |
| B | ILLUMINATION | HH-LC710A | (X30,Y150,Z1) | ON/OFF CONTROL AND DIMMER CONTROL | DEVICE | 192.168.0.6 |
| C | REFRIGERATOR | NR-F557XV | (X50,Y200,Z1) | POWER CONSUMPTION STATE MANAGEMENT | SERVER | 192.168.0.7 |
| ⋮ | | | | | | |

| ROOM ID | ROOM TYPE | FLOOR LEVEL | DISPLAY POSITION |
|---|---|---|---|
| A | LIVING ROOM | FIRST FLOOR | FIRST CELL ON FIRST FLOOR |
| B | BEDROOM | SECOND FLOOR | FIRST CELL ON SECOND FLOOR |
| C | BATH | FIRST FLOOR | FOURTH CELL ON FIRST FLOOR |
| D | STAIRCASE | FIRST FLOOR<br>SECOND FLOOR | SEVENTH CELL ON FIRST FLOOR<br>SECOND CELL ON SECOND FLOOR |
| ... | | | |

FIG.70

| 4700 | | | | | |
|---|---|---|---|---|---|
| DEVICE ID 4701 | DEVICE TYPE 4702 | MODEL NUMBER 4703 | ARRANGEMENT 4704 | CAPABILITY INFORMATION 4705 | CONTROL COMMAND TRANSMISSION DESTINATION 4706 |
| A | AIR CONDITIONER | CS-X403C | LIVING ROOM | TEMPERATURE CONTROL, AIR FLOW DIRECTION CONTROL, AND AIR FLOW AMOUNT CONTROL | DEVICE |
| B | ILLUMINATION | HH-LC710A | LIVING ROOM | ON/OFF CONTROL AND DIMMER CONTROL | DEVICE |
| C | REFRIGERATOR | NR-F557XV | KITCHEN | POWER CONSUMPTION STATE MANAGEMENT | SERVER |
| ... | | | | | |

FIG.71

| DEVICE ID 3101 | DEVICE TYPE 3102 | MODEL NUMBER 3103 | ARRANGEMENT 3104 | CAPABILITY INFORMATION 3105 | CONTROL COMMAND TRANSMISSION DESTINATION 3106 | IP ADDRESS 3107 |
|---|---|---|---|---|---|---|
| A | AIR CONDITIONER | CS-X403C | LIVING ROOM | TEMPERATURE CONTROL, AIR FLOW DIRECTION CONTROL, AND AIR FLOW AMOUNT CONTROL | DEVICE | 192.168.0.5 |
| B | ILLUMINATION | HH-LC710A | LIVING ROOM | ON/OFF CONTROL AND DIMMER CONTROL | DEVICE | 192.168.0.6 |
| C | REFRIGERATOR | NR-F557XV | KITCHEN | POWER CONSUMPTION STATE MANAGEMENT | SERVER | 192.168.0.7 |
| ⋮ | | | | | | |

3100

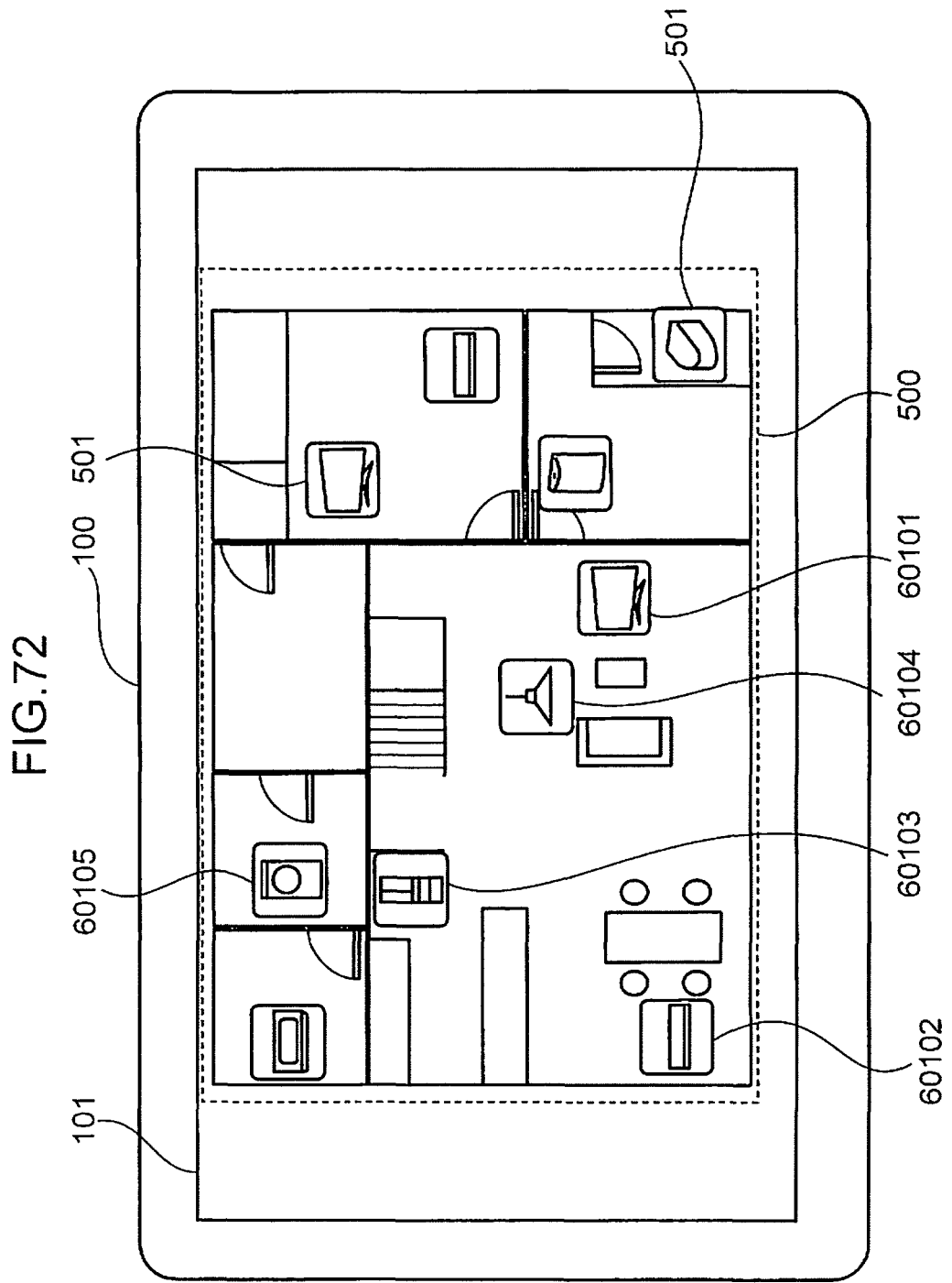

FIG. 82
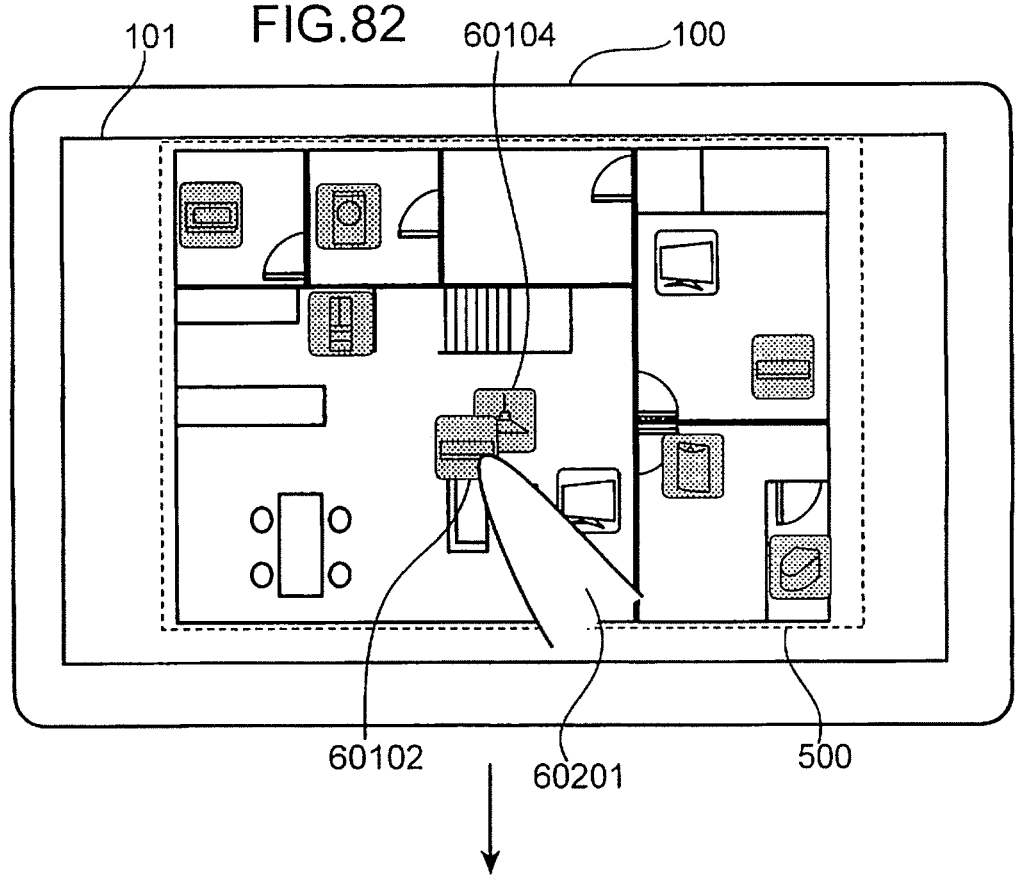
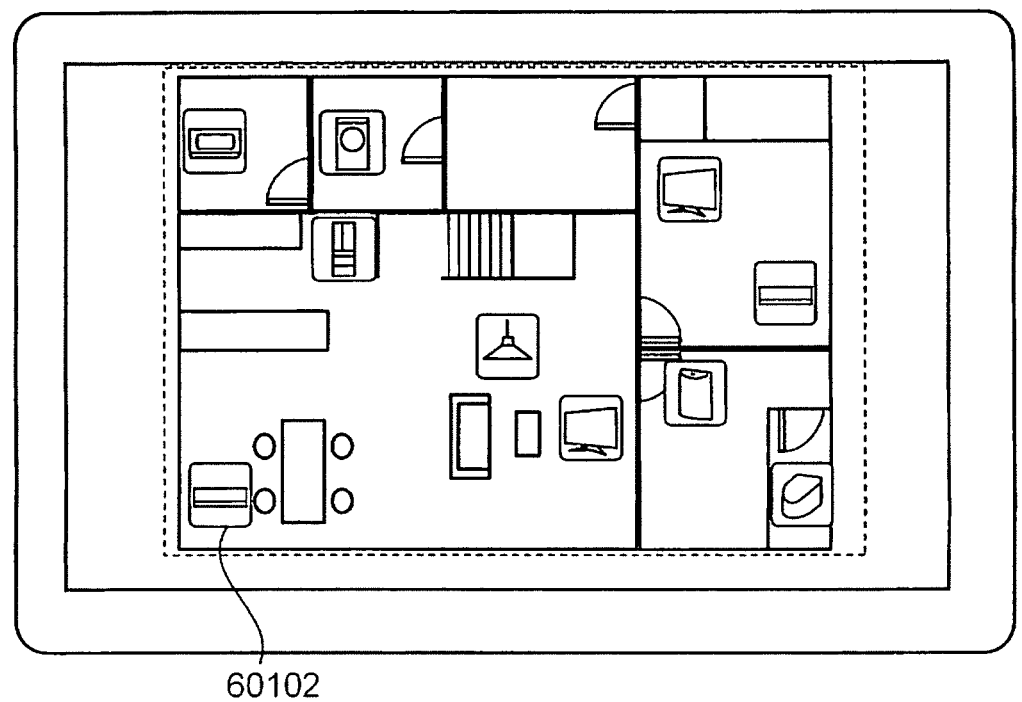

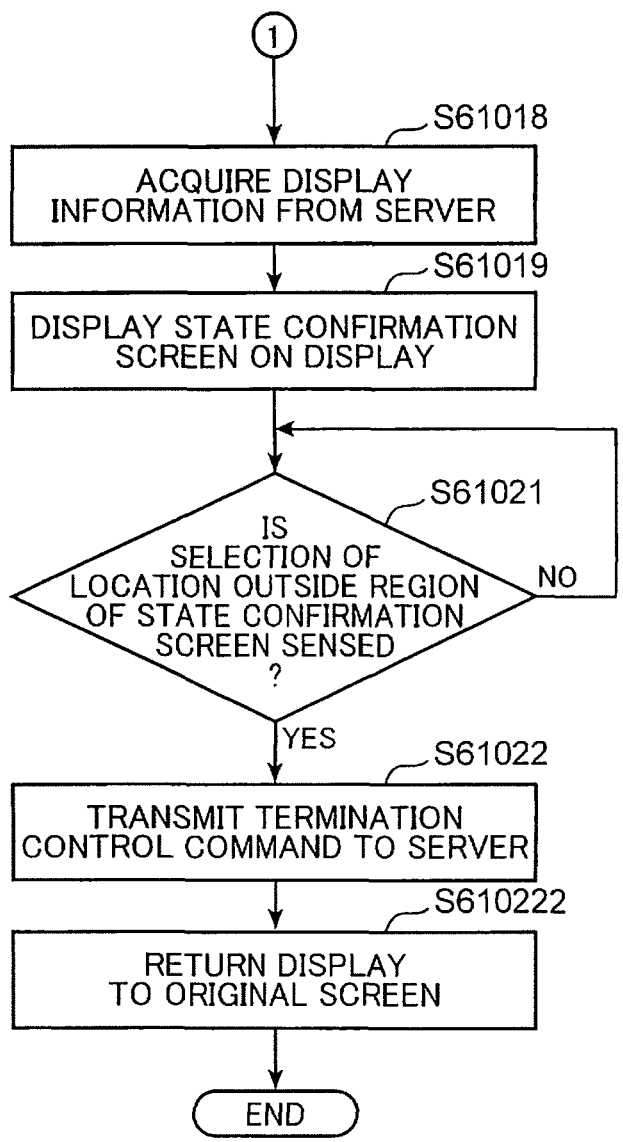

FIG.89
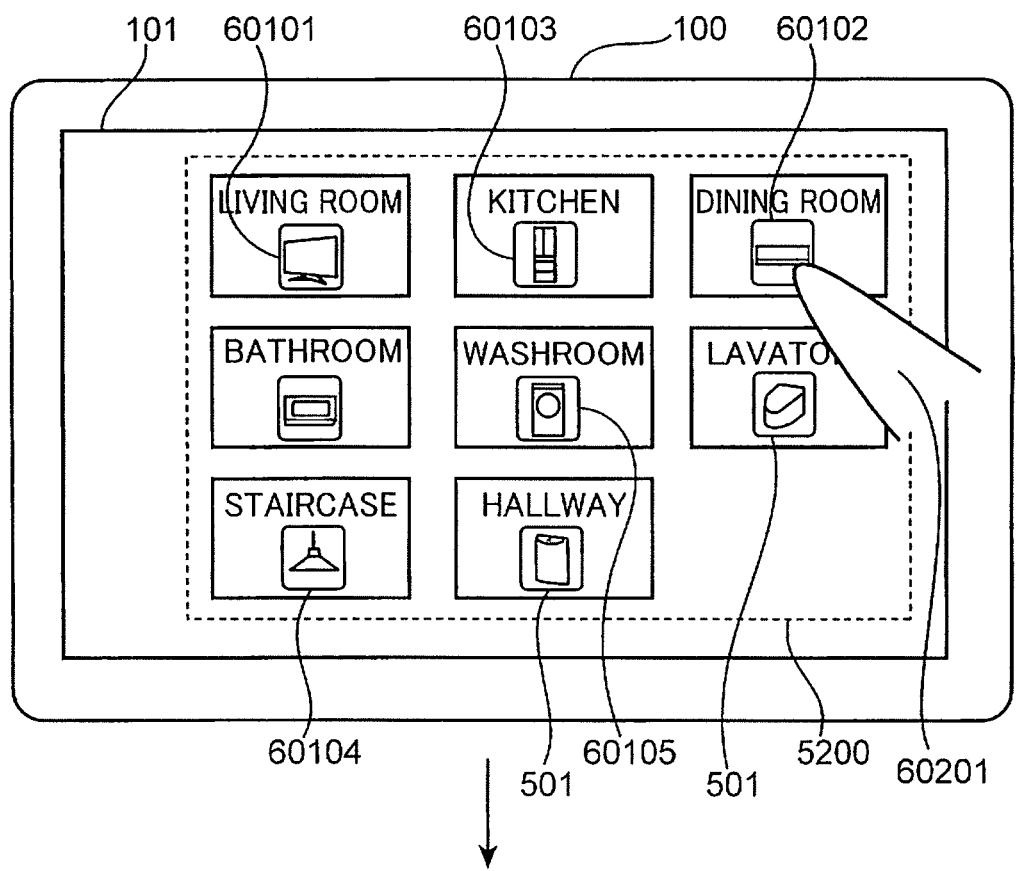
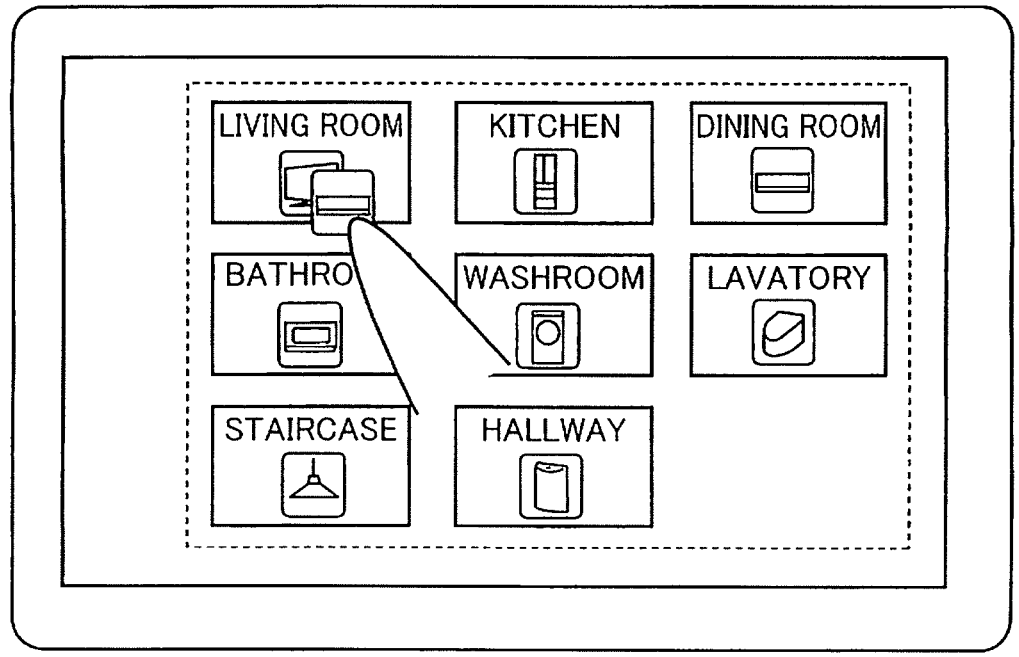

METHOD FOR CONTROLLING INFORMATION APPARATUS AND COMPUTER-READABLE RECORDING MEDIUM

RELATED APPLICATIONS

This application is a continuation application of International Application No. PCT/JP2013/003432, filed May 30, 2013, which claims the benefit of U.S. Provisional application No. 61/806,534, filed Mar. 29, 2013, the disclosures of which are incorporated by reference herein in their entireties.

TECHNICAL FIELD

The present disclosure relates to a method for controlling an information apparatus and a computer-readable recording medium.

BACKGROUND ART

Technologies for remotely monitoring or remotely controlling target devices using one remote controller are proposed.

Patent Document 1 discloses a technology for remotely operating target devices from a monitor of a television set. Specifically, icons for the target devices are displayed on the right side of a monitor screen. When a desired one of the icons is selected (i), a floor plan is displayed on the left side of the monitor screen (ii). When a pointer is moved to the location of installation of a target device desired to be operated in the floor plan (iii), an operation screen for the target device selected by moving the pointer is displayed on the monitor screen (iv) (paragraphs [0138] to [0140] and FIGS. 25A and 25B).

Patent Document 2 discloses a technology for controlling target devices using a single remote controller. Specifically, a floor plan of each room and the condition within the room are displayed on a liquid crystal monitor of the remote controller. For example, the liquid crystal monitor displays a illumination mark displayed in the case where an illumination device of a certain room is turned on, a room temperature mark that indicates the current temperature of a certain room, a lock mark in the shape of a hatched window displayed in the case where a window of a certain room is locked, a device/facility mark that indicates the status or the like of a control target object, a mark that indicates the amount of hot water in the case where the control target is a bath, and so forth (paragraphs [0037] to [0041] and FIG. 6).

Patent Document 3 relates to a technology for remotely controlling and remotely monitoring open/close operation and the state of an electric building material (such as a hallway door or a skylight). Specifically, a monitor screen of a personal computer displays floor plans for first and second floors of a property, a picture of the electric building material (such as a hallway door or a skylight) and a state display icon that indicates the open/close state of the electric building material are displayed at the corresponding position on the floor plans. When the state display icon is selected, an operation screen for the selected electric building material is displayed in another window. The operation screen includes an open operation button, a close operation button, an operation monitor screen, and a button for hiding the operation screen (paragraph [0025] and FIGS. 4, 5, and 6).

Patent Document 4 discloses a user interface including a floor plan and an icon. Examples of the icon include an icon representing a receptacle, an icon representing a digital image frame, and an icon representing an illumination device (FIGS. 7 and 8B).

Patent Document 5 discloses a user interface of an illumination system. When an icon associated with a certain light source is dragged into a target region on a screen and moved toward the center of the target region, the intensity of light from the corresponding light source is increased.

However, Patent Documents 1 to 5 described above need a further improvement.

Patent Document 1: Japanese Patent Application Laid-open No. 2007-104567
Patent Document 2: Japanese Patent Application Laid-open No. 2000-138979
Patent Document 3: Japanese Patent Application Laid-open No. 2009-213107
Patent Document 4: U.S. Pat. No. 7,730,223
Patent Document 5: Japanese Patent No. 5128489

SUMMARY OF INVENTION

In one general aspect, the techniques disclosed here feature a method for controlling an information apparatus connected to a network, a first target device and a second target device being controlled over the network, the first target device having a first display, the second target device having no display or having a second display which is smaller in display area than the first display, the information apparatus having a third display and being used in an information management system which manages information indicating a state of the second target device, the method causing a computer of the information apparatus to:

display a display screen representing at least one floor plan of a building on the third display;

display device icons representing target devices including the first target device and the second target device on the display screen representing the at least one floor plan, the device icons being movable by dragging the device icons; and when it is sensed that a device icon representing the second target device is dropped on a device icon representing the first target device, output to the information management system a first control command for displaying a confirmation screen on the first display of the first target device, the confirmation screen being for confirmation of the state of the second target device.

According to the aspect described above, it is possible to embody a further improvement. These general and specific aspects may be implemented using a system, a method, and a computer program, and any combination of systems, methods, and computer programs.

BRIEF DESCRIPTION OF THE DRAWINGS

FIG. 12 is a diagram showing a device icon arrangement example of the display state of the device control screen of the home controller according to the embodiment of the present disclosure.

FIG. 13 is a diagram showing the configuration of the display state of a device control screen of the home controller according to the embodiment of the present disclosure.

FIG. 14 is a diagram showing a device icon arrangement example of the display state of the device control screen of the home controller according to the embodiment of the present disclosure.

FIG. 15 is a diagram showing a device icon arrangement example of the display state of the device control screen of the home controller according to the embodiment of the present disclosure.

FIG. 16 is a diagram showing a device icon arrangement example of the display state of the device control screen of the home controller according to the embodiment of the present disclosure.

FIG. 24 is a diagram showing the configuration of a device icon list display screen of the home controller according to the embodiment of the present disclosure.

FIG. 32 is a diagram showing the configuration of room information according to the embodiment of the present disclosure.

FIG. 34 is a diagram showing the configuration of a device list managed by the server according to the embodiment of the present disclosure.

FIG. 35 is a diagram showing the configuration of a device list managed by the home controller according to the embodiment of the present disclosure.

FIG. 68 is a diagram showing the configuration of room information shown in FIG. 67.

FIG. 70 is a diagram showing the configuration of a device list managed by the server for a case where the floor plan shown in FIG. 52 is adopted.

FIG. 71 is a diagram showing the configuration of a device list managed by the home controller for a case where the floor plan shown in FIG. 52 is adopted.

FIG. 72 is a diagram showing an example of the basic screen displayed on the display of the home controller.

FIG. 82 is a diagram showing another display example for a case where the device corresponding to the device icon on which the device icon is dropped is not the first device.

FIG. 86A and FIG. 86B are flowcharts showing the flow of a process of the state confirmation screen display control process sub routine of FIG. 83.

FIG. 89 is a diagram showing an operation example for a device icon for a case where the floor plan described with reference to FIG. 52 is used.

Figure 1:
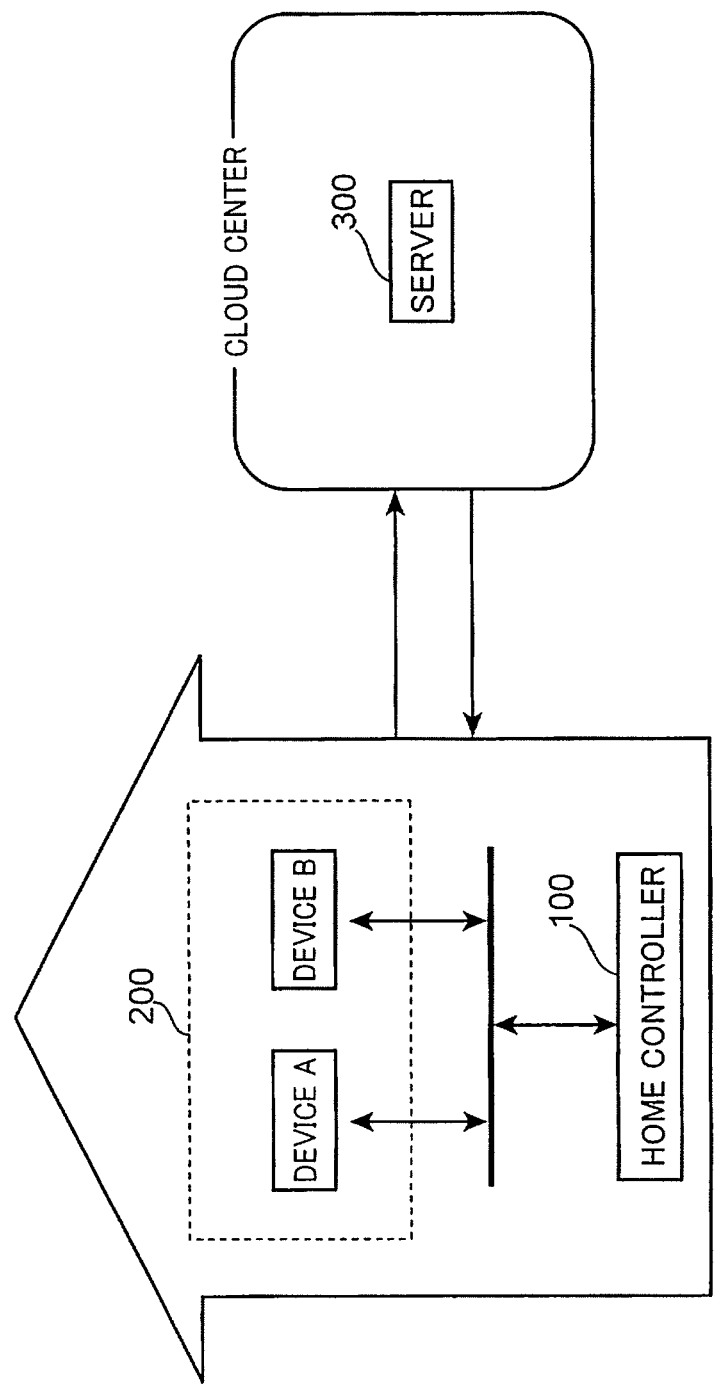
FIG. 1 is a diagram showing an overall configuration of a home control system to which a home controller according to an embodiment of the present disclosure is applied.

DETAILED DESCRIPTION (Story Before Inventing Aspect According to Present Disclosure)

First, the point of view of an aspect according to the present disclosure will be described.

In Patent Document 1 described above, icons for target devices are displayed on the right side of a monitor screen, and a floor plan is displayed on the left side of the monitor screen. That is, the icons for the target devices and the floor plan are displayed separately from each other, and the icons for the target devices are not movable. Therefore, the location of installation of a target device desired to be operated in the floor plan is designated by moving a pointer. Then, an operation screen is displayed.

In Patent Document 1 described above, because of the configuration described above, the number of operation steps to be taken to display an operation screen for a desired target device is large, from (i) to (iv) described above. Therefore, when target devices are remotely monitored or remotely controlled using one remote controller, the operation steps (i) to (iv) described above are required to operate each target device, which complicates operation. This requires a larger number of process steps to be taken by a mobile information terminal before a desired target device among the target devices is operated simply because remote controllers for the target devices are integrated into one, which requires a larger number of process operations to be performed by a user.

Patent Document 2 described above describes only displaying the state of each target device, and does not describe at all remotely controlling operation of each target device. Therefore, although the target devices can be remotely monitored using one remote controller, the one or more target devices cannot be controlled.

In Patent Document 3 described above, open/close operation and the state of an electric building material (such as a hallway door or a skylight) are remotely controlled and remotely monitored using a personal computer. However, the content of the remote control is just simple control of open/close operation.

In Patent Document 4 described above, for example, an operation screen for an illumination device, or an operation screen for a digital image frame, is merely simply displayed (FIG. 8B).

Patent Document 5 described above merely discloses that an icon is moved from the outside of a target region to the inside of the target region to control an illumination device in a room corresponding to the target region.

Based on the considerations described above, the inventors have conceived various aspects of the present disclosure to be described below.

An aspect of the present disclosure is a method for controlling an information apparatus connected to a network, a first target device and a second target device being controlled over the network, the first target device having a first display, the second target device having no display or having a second display which is smaller in display area than the first display, the information apparatus having a third display and being used in an information management system which manages information indicating a state of the second target device, the method causing a computer of the information apparatus to:

display a display screen representing at least one floor plan of a building on the third display;

display device icons representing target devices including the first target device and the second target device on the display screen representing the at least one floor plan, the device icons being movable by dragging the device icons; and when it is sensed that a device icon representing the second target device is dropped on a device icon representing the first target device, output to the information management system a first control command for displaying a confirmation screen on the first display of the first target device, the confirmation screen being for confirmation of the state of the second target device.

Consequently, the state of the second target device can be confirmed on the first display of the first target device having the first display, rather than on the third display of the information apparatus. Therefore, even in a case where the display area of the third display of the information apparatus is small, for example, the first display of the first target device with a larger display area can be utilized.

In addition, only an operation of dropping the device icon representing the second target device on the device icon representing the first target device is required, and an operation screen for utilizing the first display of the first target device with a larger display area is not separately provided. Therefore, it is possible to omit a plurality of steps to be taken to display an operation screen separately from the floor plan in order to display the confirmation screen for confirmation of the state of the second target device on the first display of the first target device with a larger display area, and to reduce the number of process steps to be performed within the information apparatus or the number of operations to be performed by the user.

As a result, it is possible to reduce both the number of processes to be performed within the information apparatus and the number of operations to be performed by the user and reduce the time before a desired confirmation screen for confirmation of the state of the second target device is displayed when remote controllers for the plurality of target devices are integrated into one.

In addition, as described above, the confirmation screen for confirmation of the state of the second target device is displayed on the first display of the first target device with a larger display area using the floor plan itself as an operation screen. Thus, by effectively exploiting the display resource being displayed already, it is possible to prevent complication of operations due to a need to display an operation screen for implementing each function since remote controllers for the plurality of target devices are integrated into one.

In the aspect described above, for example, when it is not sensed that the device icon representing the second target device is dropped on the device icon representing the first target device, and when it is sensed that the device icon representing the second target device is selected, the information indicating the state of the second target device may be received from the information management system, and the confirmation screen may be displayed on the third display as overlapped on the display screen representing the at least one floor plan.

When selection of the device icon representing the second target device is sensed, for example, the confirmation screen can be displayed not only on the first display of the first target device but also on the third display as overlapped on the display screen representing the floor plan.

In the aspect described above, for example, in a case where the second target device and the first target device cooperate with each other and the confirmation screen can be displayed on the first display of the first target device, when it is sensed that the device icon representing the second target device is selected, display of an other device icon which is other than the device icon representing the first target device and the device icon representing the second target device may be changed to display which is darker than display of the device icon representing the first target device and the device icon representing the second target device.

In a case where the second target device cooperates with the first target device, for example, display of an other device icon other than the device icon representing the first target device and the device icon representing the second target device is changed to display which is darker than display of the device icon representing the first target device and the device icon representing the second target device when selection of the device icon representing the second target device is sensed.

Consequently, it is possible to preliminarily prevent an erroneous operation by the user in which the device icon representing the second target device is erroneously dropped on the device icon other than the device icon representing the first target device.

In the aspect described above, for example, when it is sensed that the device icon representing the second target device is dropped on the other device icon, display of the device icon representing the second target device may be changed to darker display as with the display of the other device icon.

Consequently, it is possible to conveniently inform the user that the device icon representing the second target device is erroneously dropped on the device icon other than the device icon representing the first target device.

In the aspect described above, for example, in a case where the second target device and the first target device do not cooperate with each other and the confirmation screen cannot be displayed on the first display of the first target device, when it is sensed that selection of the device icon representing the second target device is continued for not less than a predetermined time, display of the device icon representing the second target device may be changed to display which is darker than display of an other device icon which is other than the device icon representing the second target device.

In a case where the second target device does not cooperate with the first target device, for example, the user can be informed, by exploiting the existing display resource, that the confirmation screen is not displayed on the first display of the first target device, even if the device icon representing the second target device is dropped on the device icon representing the first target device, before the device icon representing the second target device is dropped on the device icon representing the first target device.

Therefore, a plurality of steps can be omitted since it is not necessary to prepare a separate display screen for showing that the confirmation screen is not displayed on the first display of the first target device, and to reduce the number of process steps to be performed within the information apparatus or the number of operations to be performed by the user.

In addition, it is possible to preliminarily prevent an erroneous operation in which the device icon representing the second target device is dropped on the device icon representing the first target device in a case where the confirmation screen is not displayed on the first display of the first target device.

In the aspect described above, for example, in a case where the second target device and the first target device do not cooperate with each other and the confirmation screen cannot be displayed on the first display of the first target device, when it is judged that a time of sensing selection of the device icon representing the second target device is less than the predetermined time, the information indicating the state of the second target device may be received from the information management system, and the confirmation screen may be displayed on the third display as overlapped on the display screen representing the at least one floor plan.

In this case, in a case where the second target device and the first target device do not cooperate with each other and the confirmation screen cannot be displayed on the first display of the first target device, for example, the confirmation screen can be displayed on the third display, rather than on the first display of the first target device, in a case where it is judged that selection of the device icon representing the second target device is not performed by, what is called, long-pressing the device icon.

In the aspect described above, for example, when it is sensed that the device icon representing the second target device is dropped on a device icon, which is other than the device icon representing the first target device, the device icon representing the second target device may be retracted to a location outside a display region of the device icon representing the first target device on which the device icon representing the second target device is dropped.

The user can be informed, by exploiting the existing display resource, that the confirmation screen is not displayed on the first display of the first target device, even if the device icon representing the second target device is dropped on the device icon other than the device icon representing the first target device, for example, by retracting the device icon representing the second target device to a location outside the display region of the device icon, which is other than the device icon representing the first target device and on which the device icon representing the second target device is dropped.

Therefore, a plurality of steps can be omitted since it is not necessary to prepare a separate display screen for showing that the confirmation screen is not displayed on the first display of the first target device, and to reduce the number of process steps to be performed within the information apparatus or the number of operations to be performed by the user.

In addition, it is possible to prevent the user from repeatedly performing an erroneous operation in which the device icon representing the second target device is dropped on the device icon other than the device icon representing the first target device.

In the aspect described above, for example, when it is sensed that the device icon representing the second target device is dropped on the device icon which is other than the device icon representing the first target device, the device icon representing the second target device may be retracted to an original display position of the device icon representing the second target device.

The user can be informed, by exploiting the existing display resource, that the confirmation screen is not displayed on the first display of the first target device, even if the device icon representing the second target device is dropped on the device icon other than the device icon representing the first target device, for example, by retracting the device icon representing the second target device to the original display position.

Therefore, a plurality of steps can be omitted since it is not necessary to prepare a separate display screen for showing that the confirmation screen is not displayed on the first display of the first target device, and to reduce the number of process steps to be performed within the information apparatus or the number of operations to be performed by the user.

In addition, it is possible to prevent the user from repeatedly performing an erroneous operation in which the device icon representing the second target device is dropped on the device icon other than the device icon representing the first target device.

In the aspect described above, for example, in a case where the second target device and the first target device cooperate with each other and the confirmation screen can be displayed on the first display of the first target device, when it is sensed that selection of the device icon representing the second target device is continued for not less than a predetermined time, display of an other device icon other than the device icon representing the first target device and the device icon representing the second target device may be changed to display which is darker than display of the device icon representing the first target device and the device icon representing the second target device.

In a case where the second target device and the first target device cooperate with each other, for example, display of the device icon other than the device icon representing the first target device and the device icon representing the second target device is changed to display which is darker than display of the device icon representing the first target device and the device icon representing the second target device by, what is called, long-pressing the device icon representing the second target device.

Consequently, it is possible to preliminarily prevent an erroneous operation by the user in which the device icon representing the second target device is erroneously dropped on the device icon other than the device icon representing the first target device.

In the aspect described above, for example, in a case where the second target device and the first target device cooperate with each other and the confirmation screen can be displayed on the first display of the first target device, when it is judged that a time of sensing selection of the device icon representing the second target device is less than the predetermined time, the information indicating the state of the second target device may be received from the information management system, and the confirmation screen may be displayed on the third display as overlapped on the display screen representing the at least one floor plan.

In a case where a time of sensing selection of the device icon representing the second target device is less than the predetermined time, for example, the confirmation screen is displayed on the third display as overlapped on the display screen representing the floor plan.

Consequently, in a case where it is desired to confirm the state of the second target device, the device icon representing the second target device may be tapped on, rather than being long-pressed.

In the aspect described above, for example, in a case where the first target device is not turned on when the first control command is output to the information management system, a second control command for turning on the first target device may be output to the information management system.

In a case where it is desired to confirm the state of the second target device using the first display of the first target device, for example, a second control command for turning on the first target device is also output to the information management system in a case where the first target device is not turned on.

Consequently, an operation of dropping the device icon representing the second target device on the device icon representing the first target device also serves as an operation for turning on the first target device. Thus, there is no need to separately perform an operation for turning on the first target device.

This reduces the number of process steps to be performed within the information apparatus or the number of operations to be performed by the user.

As a result, it is possible to reduce both the number of processes to be performed within the information apparatus and the number of operations to be performed by the user, and to reduce the time before a desired confirmation screen for confirmation of the state of the second target device is displayed when remote controllers for the plurality of target devices are integrated into one.

In the aspect described above, for example, the information indicating the state of the second target device may include log information related to a use history of the second target device.

Consequently, the log information related to the use history of the second target device can be confirmed on the first display of the first target device.

In the aspect described above, for example, the information indicating the state of the second target device may include information indicating a consumed electric power amount of the second target device.

Consequently, the consumed electric power amount of the second target device can be confirmed on the first display of the first target device.

In the aspect described above, for example, in displaying the confirmation screen on the third display as overlapped on the display screen, display of the display screen may be changed to display which is darker than display of the confirmation screen.

Consequently, it is possible to prevent the floor plan from obstructing the user viewing the confirmation screen.

In the aspect described above, for example, when it is sensed that a location outside a region of the confirmation screen is selected, display of the confirmation screen may be erased, and the display screen may be changed to display with original brightness.

Consequently, the original display screen can be restored by exploiting the existing display resource.

In the aspect described above, for example, the first target device may be a television set.

In the aspect described above, for example, the second target device may include one of a refrigerator, an illumination device, an air conditioner, and a washing machine.

In the aspect described above, for example, the third display may be a touch panel display, and the device icon may be dragged when contact on the touch panel display is sensed.

In the aspect described above, for example, the device icon may be dragged by clicking a mouse pointer.

Another aspect of the present disclosure is a method for controlling an information apparatus connected to a network, a first target device and a second target device being controlled over the network, the first target device having a first display, the second target device having no display or having a second display which is smaller in display area than the first display, the information apparatus having a third display and being used in an information management system which manages information indicating a state of the second target device, the method causing a computer of the information apparatus to:

display a display screen representing at least one floor plan of a building on the third display;

display device icons representing target devices including the first target device and the second target device on the display screen representing the at least one floor plan, the device icons being movable by dragging the device icons;

judge whether a device icon representing the second target device is dropped on a device icon representing the first target device, or whether it is sensed that the device icon representing the second target device is selected;

in a case where it is judged that the device icon representing the second target device is dropped on the device icon representing the first target device, output to the information management system a first control command for displaying a confirmation screen for confirmation of the state of the second target device on the first display of the first target device; and in a case where it is not judged that the device icon representing the second target device is dropped on the device icon representing the first target device, and where it is sensed that the device icon representing the second target device is selected, receive the information indicating the state of the second target device from the information management system, and display the confirmation screen on the third display as overlapped on the display screen representing the at least one floor plan.

(Embodiment)

An embodiment of the present disclosure will be described below with reference to the drawings. In the drawings, the same symbols are used for the same constituent elements.

In the embodiment, a home controller which can singly control one or more devices will be described.

(Overall Configuration)

FIG. 1 is a diagram showing an overall configuration of a home control system to which a home controller according to the embodiment is applied. As shown in FIG. 1, the home control system includes a home controller 100, a device 200 (an example of a target device), and a server 300.

The home controller 100 and one or more devices 200 (for example, a device A 200 and a device B 200) are disposed in a house. The server 300 is disposed in a cloud center. The home controller 100, the device 200, and the server 300 communicate with each other via a wired or wireless network. For example, the device 200 and the home controller 100 are communicably connected to each other via a wireless or wired in-home network, and the home controller 100, the device 200, and the server 300 are communicably connected to each other via an external network such as the Internet.

The home controller 100 is not necessarily disposed in the house, and may be disposed outside the house. In this case, a user controls the one or more devices 200 from a location away from the home.

A mobile information terminal such as a smartphone or a tablet terminal may be adopted as the home controller 100. It should be noted, however, that the smartphone and the tablet terminal are merely exemplary, and a mobile information terminal of a button type such as a cellular phone may be adopted as the home controller 100.

Figure 2:
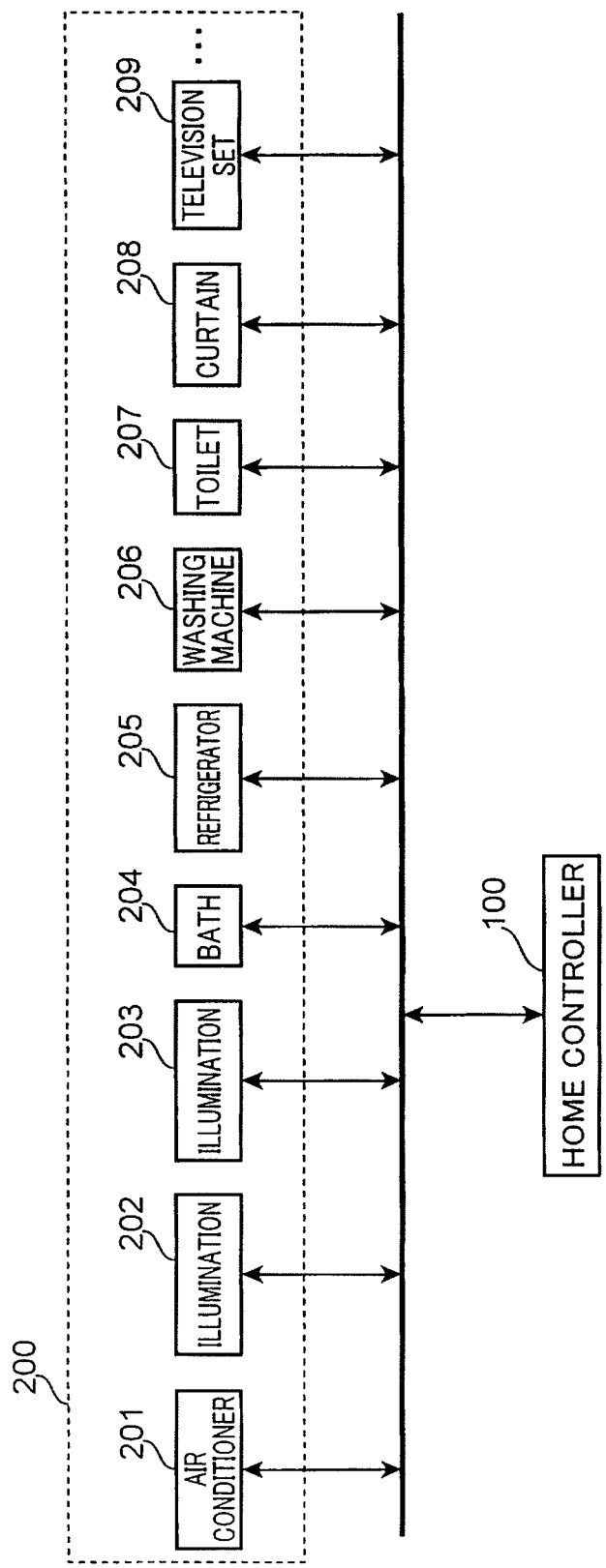
FIG. 2 is a diagram showing main devices to be controlled by the home controller according to the embodiment of the present disclosure.

FIG. 2 is a diagram showing the main devices 200 to be controlled by the home controller 100. The home controller 100 controls the devices 200 such as an air conditioning apparatus (hereinafter called "air conditioner") 201, illumination devices 202 and 203, a bath 204, a refrigerator 205, a washing machine 206, a toilet 207, a curtain 208, and television receiver (hereinafter called "television set") 209. The devices 200 to be controlled by the home controller 100 may include a plurality of devices 200 of the same type such as the illumination devices 202 and 203.

The devices 200 such as the air conditioner 201 shown in FIG. 2 are merely exemplary, and a Blu-ray recorder, an audio device, and so forth may be adopted as the devices 200. That is, any electrical device that functions to communicate with the home controller 100 may be adopted as the device 200. In FIG. 2, electrical devices for use in ordinary households are shown as the devices 200. However, the embodiment is not limited thereto, and office devices for use in offices or the like may be adopted as the devices 200. Examples of the office devices include a printer, a personal computer, a scanner, and a copy machine.

Figure 3:
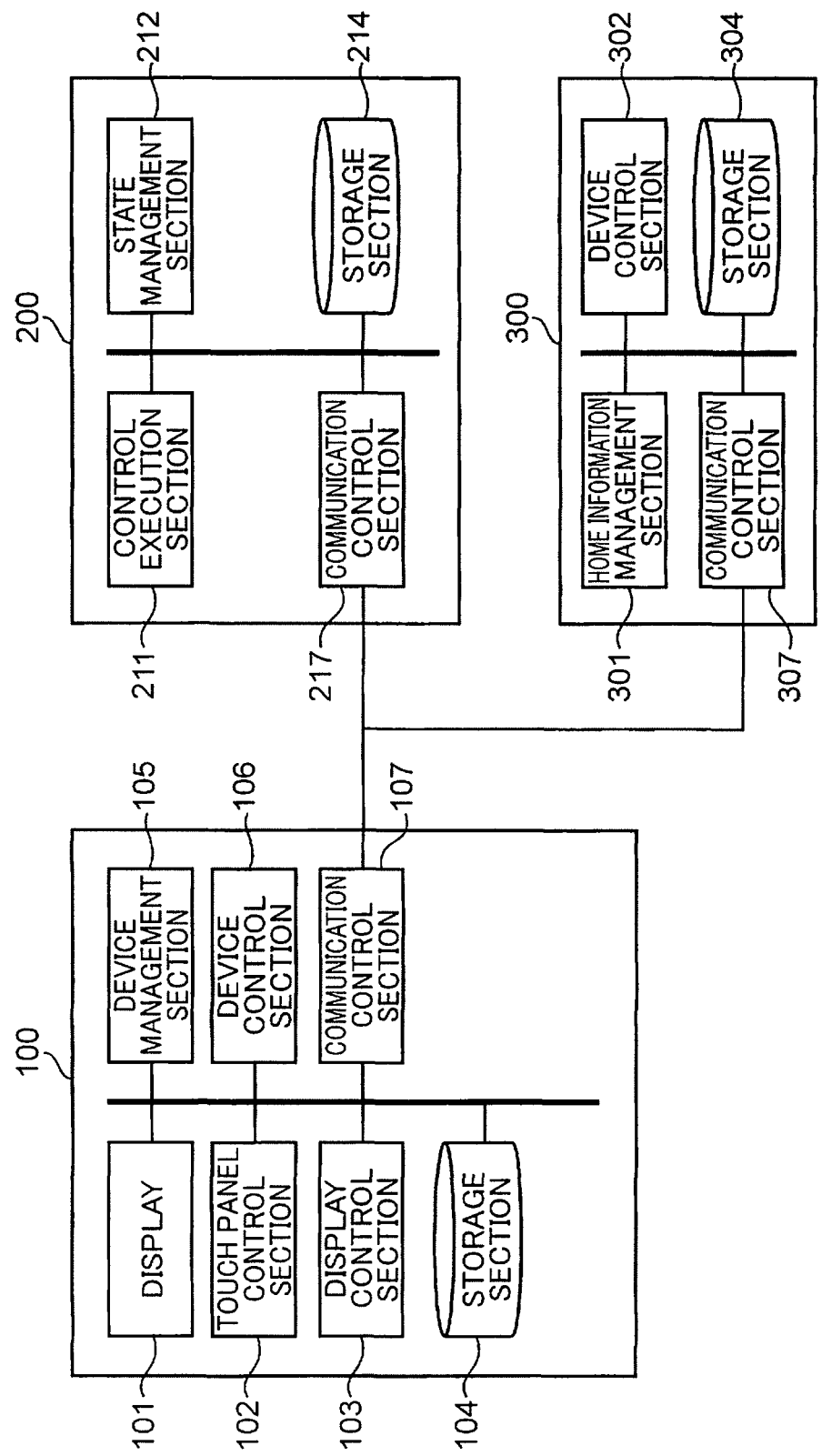
FIG. 3 is a block diagram showing the configuration of the home controller, a device. and a server according to the embodiment of the present disclosure.

FIG. 3 is a block diagram showing the configuration of the home controller 100, the device 200, and the server 300. As shown in FIG. 3, the home controller 100 includes a display 101, a touch panel control section 102, a display control section 103, a storage section 104, a device management section 105, a device control section 106, and a communication control section 107.

The display 101 is formed from a touch panel display, for example, and displays a user interface that allows the user to operate the home controller 100. The user can input various operations to the home controller 100 by contacting the display 101.

The touch panel control section 102 recognizes an operation performed on the display 101 by the user, interprets the content of the operation, and notifies the other constituent elements of the content of the operation. For example, if an object is displayed at a position on the display 101 tapped on by the user, the touch panel control section 102 determines that the object is selected by the user. A variety of GUI parts that receive a user operation such as buttons are adopted as the object.

The display control section 103 generates a GUI (Graphical User Interface) of the home controller 100, and causes the display 101 to display the GUI. The storage section 104 stores information that is necessary for operation of the home controller 100 such as a device list managed by the device management section 105.

The device management section 105 manages the control target devices 200 using the device list stored in the storage section 104. In addition, the device management section 105 detects a device 200 when the device 200 is connected to the in-home network. Further, the device management section 105 acquires home information 2700 to be discussed later from the server 300, stores the acquired home information 2700 in the storage section 104, and manages the home information 2700. The device control section 106 issues a control command for the devices 200. The communication control section 107 controls communication between the home controller 100 and the devices 200 and communication between the home controller 100 and the server 300. In addition, the communication control section 107 transmits a variety of data to the devices 200 or the server 300 upon receiving a request to transmit such data from other blocks, and receives data transmitted from the devices 200 or the server 300 to deliver the data to the relevant block.

The display 101 may be a normal display rather than a touch panel display. In this case, the user may use an external input device such as a mouse (not shown) to input an instruction to select an object by moving a pointer displayed on the display 101 and clicking on a desired object. That is, in the embodiment, a series of operations performed by the user by contacting the display 101 may be replaced with operations of moving a pointer and clicking using an external input device such as a mouse.

As shown in FIG. 3, the device 200 includes a control execution section 211, a state management section 212, a storage section 214, and a communication control section 217. The control execution section 211 receives a control command from the home controller 100 or the server 300, and controls the device 200 in accordance with the received control command. The content of control of the device 200 performed by the control execution section 211 differs in accordance with the type of the device 200. For example, if the device 200 is an illumination device, the control execution section 211 turns on and off the illumination device. In addition, the control execution section 211 transmits the result of execution of the control command and the state of the device 200 to the home controller 100 or the server 300.

The state management section 212 manages the state of the device 200. The content of management of the device 200 performed by the state management section 212 differs in accordance with the type of the device 200. For example, if the device 200 is an illumination device, the state management section 212 manages whether the illumination device is currently turned on or turned off. The storage section 214 stores information related to the state of the device 200 managed by the state management section 212. The communication control section 217 controls communication between the device 200 and the home controller 100 and communication between the device 200 and the server 300. In addition, the communication control section 217 transmits a variety of data to the home controller 100 or the server 300 upon receiving a request to transmit such data from other blocks, and receives data transmitted from the home controller 100 or the server 300 to deliver the data to the relevant block.

As shown in FIG. 3, the server 300 includes a home information management section 301, a device control section 302, a storage section 304, and a communication control section 307. The home information management section 301 manages the home information 2700 to be discussed later for each house or each user account. In addition, the home information management section 301 transmits the home information 2700 to the home controller 100 in response to a request from the home controller 100. Further, the home information management section 301 acquires log information related to the use history of the device 200 and information related to the state of the device 200 from the device 200, stores the acquired information in the storage section 304, and manages the information.

The device control section 302 transmits a control command to the device 200 in response to a request from the home controller 100. The storage section 304 stores information that is necessary for operation of the server 300 such as the home information 2700 and the information related to the state of the device 200 managed by the home information management section 301. The communication control section 307 controls communication between the server 300 and the home controller 100 and communication between the server 300 and the device 200 as with the communication control section 107. In addition, the communication control section 307 transmits a variety of data to the home controller 100 or the device 200 upon receiving a request to transmit such data from other blocks, and receives data transmitted from the home controller 100 or the device 200 to deliver the data to the relevant block.

Figure 4:
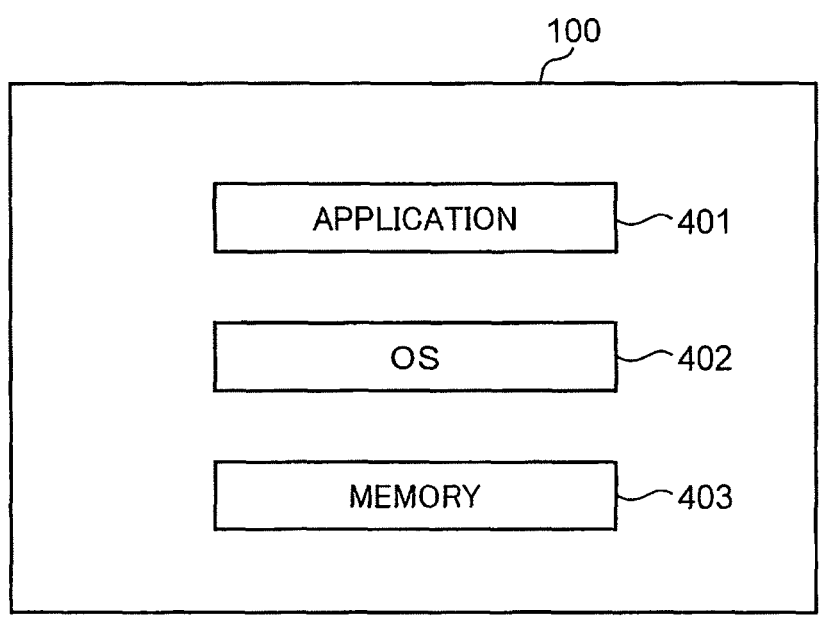
FIG. 4 is a diagram showing a configuration example of the form of implementation of the home controller according to the embodiment of the present disclosure.

FIG. 4 is a diagram showing a configuration example of the form of implementation of the home controller 100. As shown in FIG. 4, the home controller 100 includes an application 401, an OS (Operating System) 402, a memory 403, and other hardware (not shown).

The application 401 is application software for causing the mobile information terminal to function as the home controller 100, and is executed by a processor of the home controller 100. The home controller 100 may read the application 401 from a computer readable recording medium to implement the application 401, or may download the application 401 from a network to implement the application 401. The OS 402 is basic software of the mobile information terminal, and is executed by the processor of the home controller 100. The memory 403 is formed from a storage device such as a RAM and a ROM of the home controller 100, and stores a group of data included in the application 401. The processor of the home controller 100 executes the application 401 to embody the functions of the touch panel control section 102, the display control section 103, the storage section 104, the device management section 105, the device control section 106, and the communication control section 107 shown in FIG. 3. In addition, the processor of the home controller 100 executes the application 401 to cause the memory 403 to function as the storage section 104.

It should be noted, however, that in the embodiment, the home controller 100 may be implemented by the application 401 alone, may be implemented by the application 401 and the OS 402, may be implemented by the application 401, the OS 402, and the memory 403, or may be implemented by the application 401, the OS 402, the memory 403, and other hardware (not shown). In any embodiment, the home controller 100 according to the embodiment can be embodied. In the embodiment, the processor and the storage device forming the mobile information terminal, for example, form a computer. One of a CPU, an FPGA, and an ASIC or a combination of two or more of these may be adopted as the processor. One of a ROM, a RAM, and a hard disk or a combination of two or more of these may be adopted as the storage device.

Figure 5:
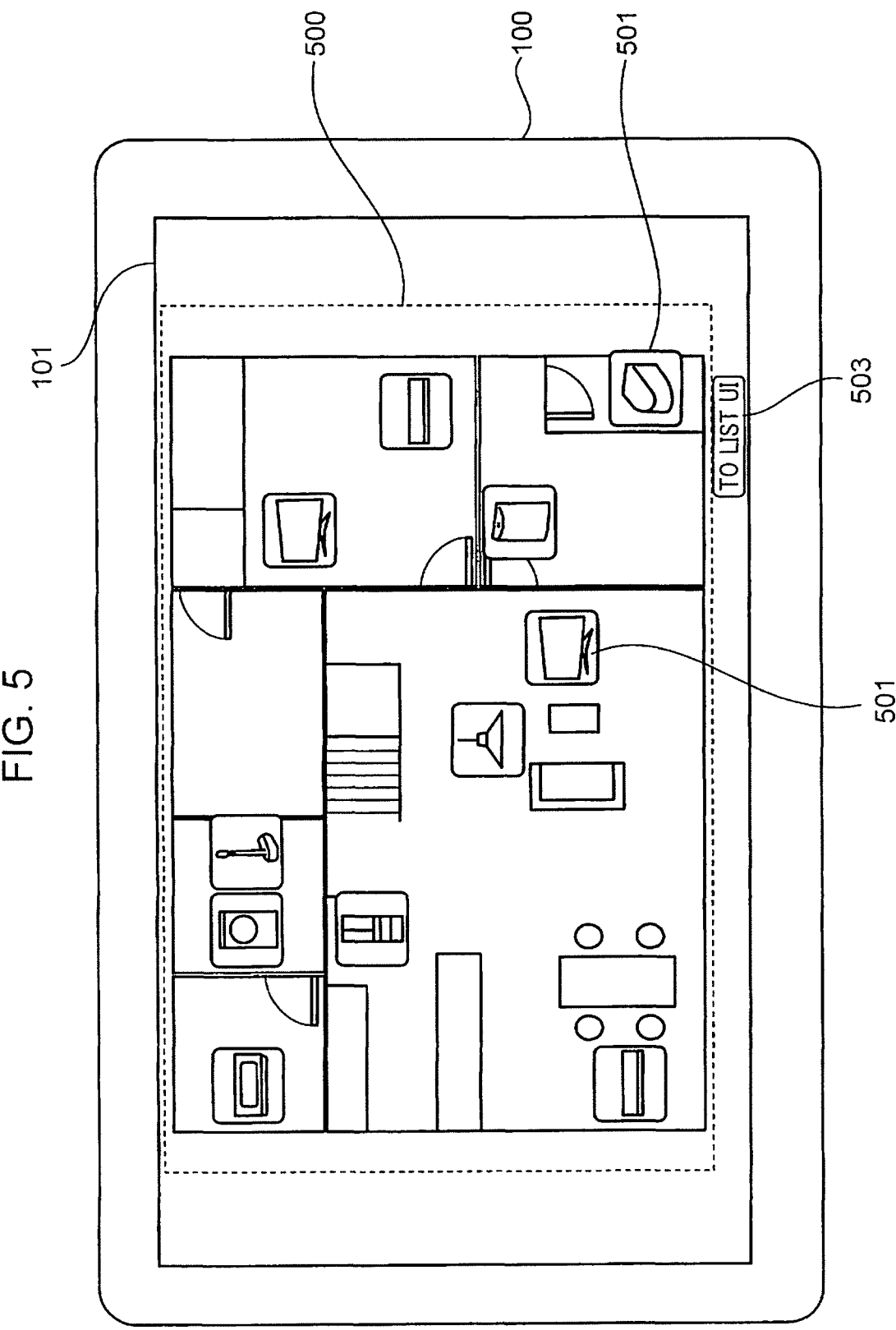
FIG. 5 is a diagram showing the configuration of a basic screen of the home controller according to the embodiment of the present disclosure.
Figure 6:
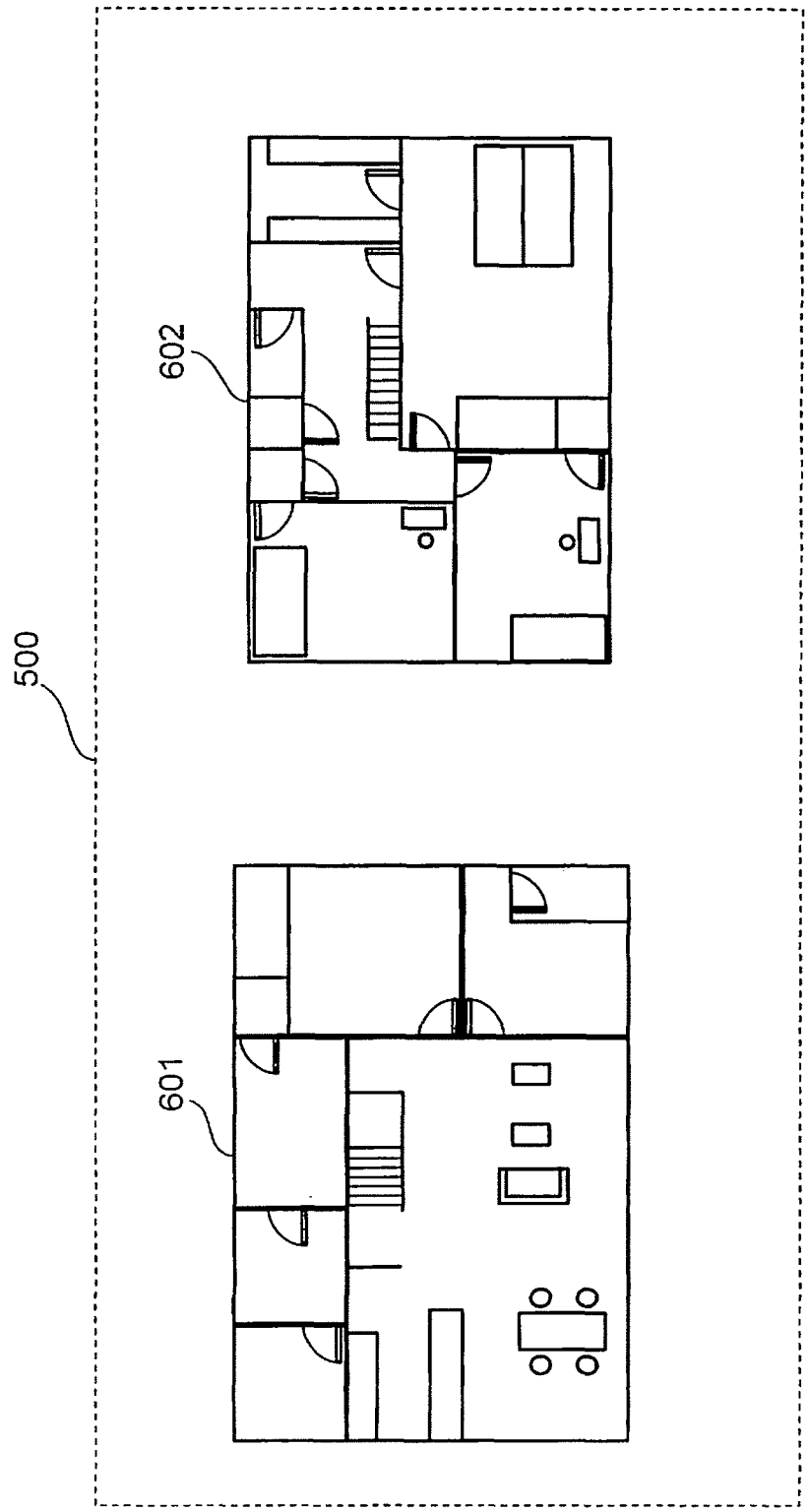
FIG. 6 is a diagram showing an example of a floor plan according to the embodiment of the present disclosure.

FIG. 5 is a diagram showing the configuration of a basic screen of the home controller 100. As shown in FIG. 5, the basic screen of the home controller 100 displayed on the display 101 include a floor plan 500, device icons 501, and a device list display change button 503. The floor plan 500 is a plan view that planarly represents the arrangement and the shape of one or more rooms forming each floor of a house. In the case where the house has one or more floors, the floor plan 500 is prepared for each floor. For example, in the case where the house has two floors, two floor plans 500, namely a floor plan 601 for the first floor and a floor plan 602 for the second floor, are displayed on the display 101 as shown in FIG. 6.

The device icon 501 is an icon displayed as overlapped on the floor plan 500 and representing the device 200. When the touch panel control section 102 senses a tap on the device icon 501 performed by the user, the display control section 103 causes the display 101 to display a device control screen 502 to be discussed later. This allows the user to control the device 200 by operating the device control screen 502.

The device icon 501 is prepared for each device 200. The display control section 103 disposes the device icon 501 on the floor plan 500 on the basis of the actual arrangement of the device 200 within the house. Information as to at what position on the floor plan 500 the device icon 501 is to be disposed is registered in an arrangement 3104 of a device list 3100 to be discussed later. Here, a position on the floor plan 500 corresponding to the actual arrangement position of the device 200 is registered in the arrangement 3104. Thus, the display control section 103 can dispose the device icon 501 at a position on the floor plan 500 corresponding to the actual arrangement position of the device 200 by disposing the device icon 501 at the position registered in the arrangement 3104 of the device list 3100.

In the floor plan 500 shown in FIG. 5, one floor is partitioned into a plurality of rooms by partition lines that indicate partitions between the rooms. This allows the user to recognize what device 200 is disposed in what room at a glance.

In the example of FIG. 5, in addition, schematic images of furniture pieces are displayed at positions on the floor plan 500 corresponding to the actual arrangement positions of the furniture pieces. An image that indicates the movable range of a door is displayed at a position on the floor plan 500 corresponding to the actual arrangement position of the door. An image of a staircase is displayed at a position on the floor plan 500 corresponding to the actual arrangement position of the staircase. This allows the user to recognize the positions of the furniture pieces disposed in each room and the positions of the staircase and the doors on the floor.

The button with a text "TO LIST UI" displayed at the lower right of the basic screen is the device list display change button 503, which is a button for switching the screen display from the basic screen to a device list display screen to be discussed later (see FIG. 24). When the touch panel control section 102 senses a tap on the device list display change button 503 performed by the user, the display control section 103 switches the screen display on the display 101 from the basic screen to the device list display screen. It should be noted, however, that the display control section 103 may hide the device list display change button 503 in the case where a registration is made in the home controller 100 in advance that the device list display screen is not utilized.

In the foregoing description, one device icon 501 is correlated with one device 200. However, the embodiment is not limited thereto, and one device icon 501 may be correlated with a plurality of devices 200 so that the one device icon 501 may be used in common to the plurality of devices 200. For example, in the case where there are two illumination devices in a living room, the two illumination devices may be represented by one device icon 501.

In this case, when the device icon 501 representing the two illumination devices is tapped on by the user, the display control section 103 causes the display 101 to display a device control screen 502 that allows simultaneous control of the two illumination devices. This allows the user to control the two illumination devices at the same time. A plurality of illumination devices are often disposed in a large room such as the living room. In the case where the user turns on or off the illumination devices in the living room, the user often turns on or off all the illumination devices disposed in the living room, rather than turning on or off some of the illumination devices. In this case, if it is possible to collectively turn on or off all the illumination devices, the number of operations to be performed by the user can be reduced. Thus, one device icon 501 may be correlated with a plurality of devices 200 that are highly likely to be operated by the user at the same time to cause one device control screen 502 to be displayed.

In the case where the device icon 501 represents a plurality of devices 200, the display control section 103 may display the device icon 501 at a position on the floor plan 500 corresponding to the actual arrangement position of one of the devices 200. Alternatively, the display control section 103 may display the device icon 501 representing the plurality of devices 200 at a predetermined location of a room in which the plurality of devices 200 are disposed.

In order to dispose the device icon 501 on the floor plan 500 on the basis of the actual arrangement of the device 200 within the house, the user moves the device icon 501 to an appropriate position on the floor plan 500. The user can move the device icon 501 to a desired position by dragging the device icon 501 while holding down the device icon 501. These operations are executed at the timing when the device icon 501 is added such as when the home controller 100 is initially utilized and when a new device 200 is purchased.

Specifically, when the touch panel control section 102 senses a drag on the device icon 501, the device management section 105 registers the position on the floor plan 500 of the device icon 501 after the movement in the arrangement 3104 of the device list 3100 to be discussed later. This allows a position on the floor plan 500 corresponding to the actual arrangement position of the device 200 to be registered in the arrangement 3104.

The initial display position of the device icon 501 may be determined in advance by the system, and may be a predetermined position outside the display region of the floor plan 500 or a predetermined position within a predetermined room on the floor plan 500, for example. The method of disposing the device icon 501 on the floor plan 500 on the basis of the actual arrangement of the device 200 within the house is not limited thereto, and the method described below may be used.

Figure 7:
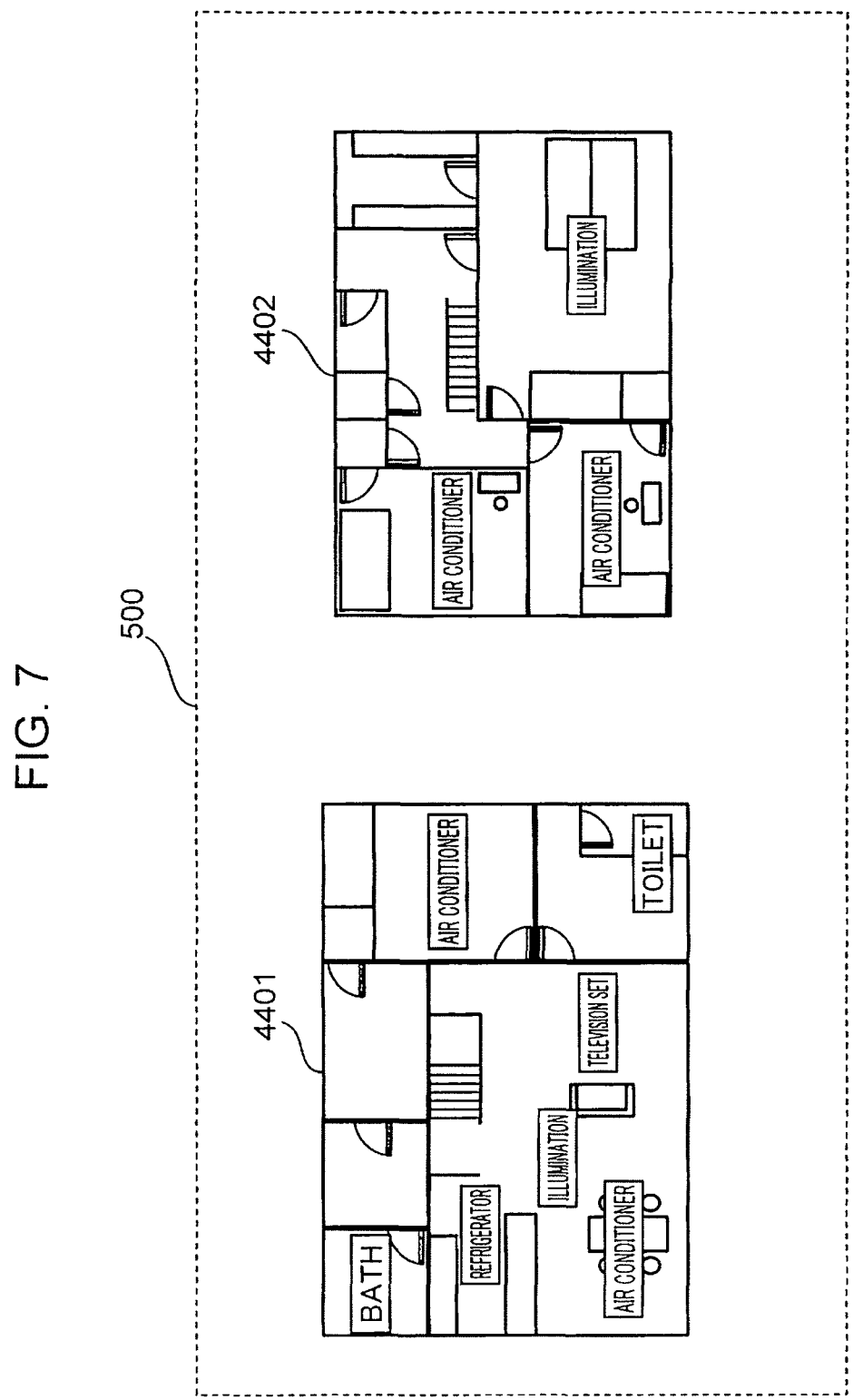
FIG. 7 is a diagram showing an example of the floor plan including arrangement information for device icons as texts according to the embodiment of the present disclosure.
Figure 8:
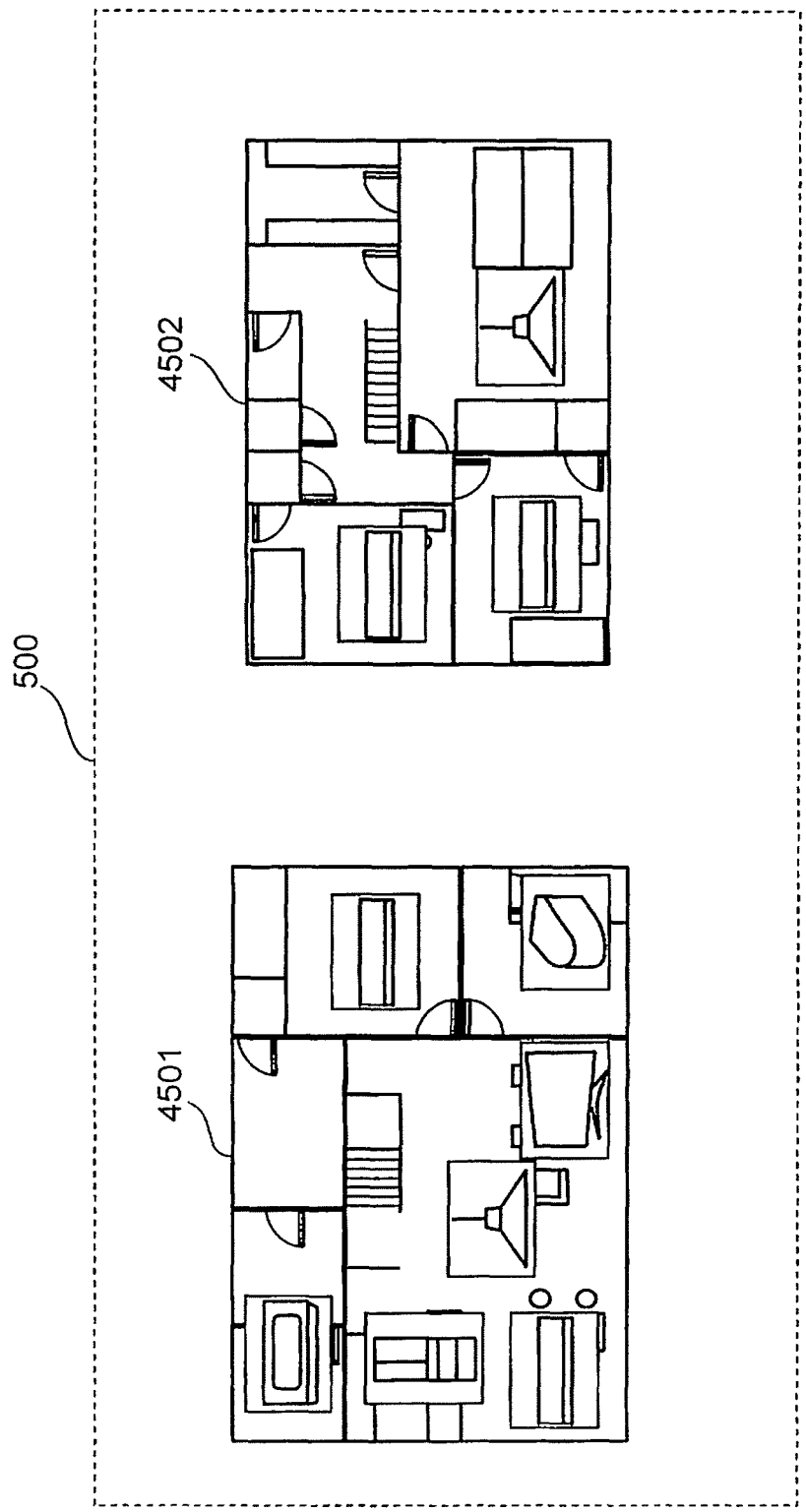
FIG. 8 is a diagram showing an example of the floor plan including arrangement information for device icons as images according to the embodiment of the present disclosure.
Figure 9:
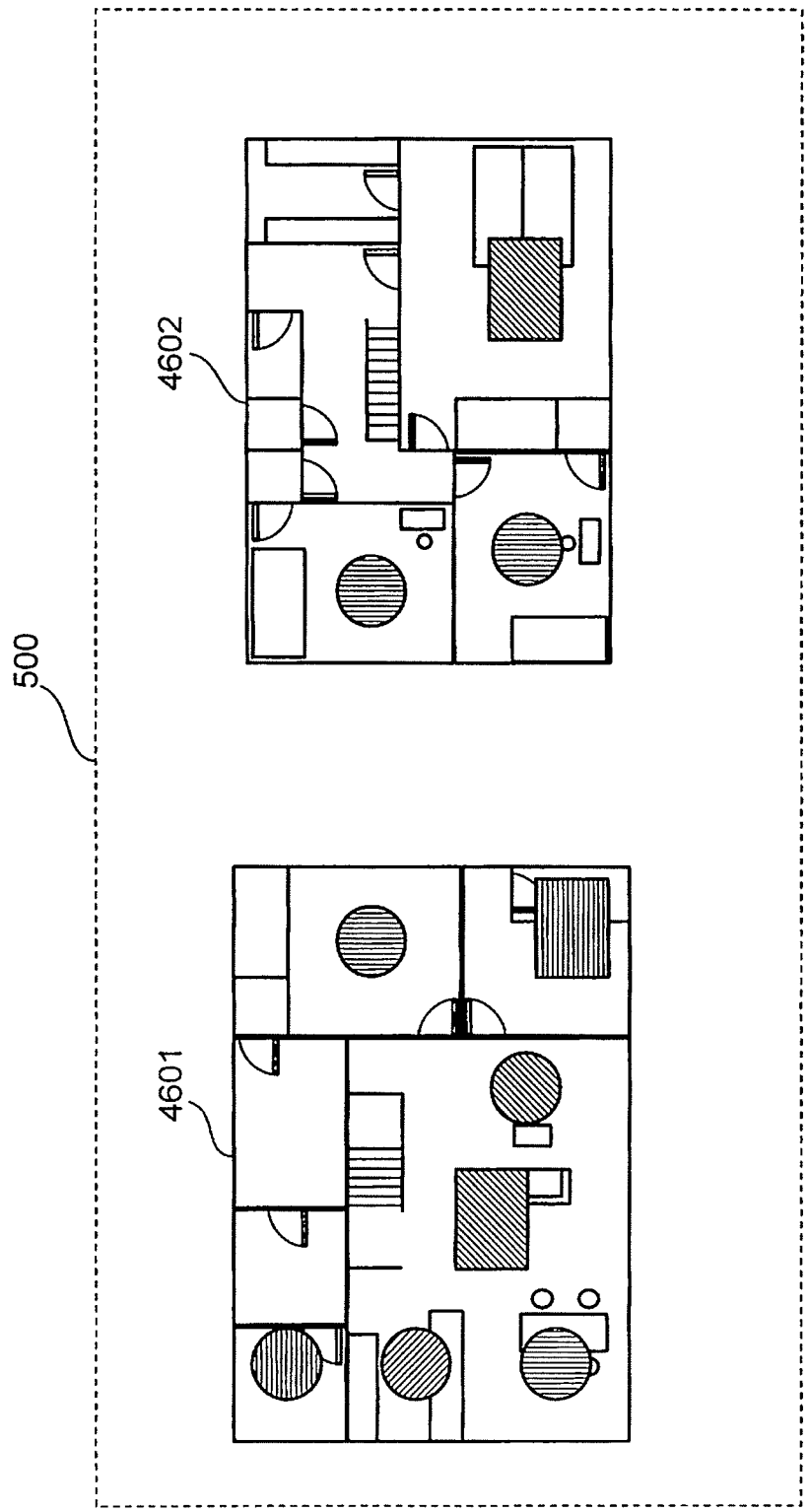
FIG. 9 is a diagram showing an example of the floor plan including arrangement information for device icons as images according to the embodiment of the present disclosure.

As shown in FIGS. 7, 8, and 9, some floor plans 500 include arrangement information for the device icons 501. For example, in the example of the floor plan 500 of FIG. 7, texts that indicate the type of the devices 200 represented by the device icons 501 to be disposed are provided at positions at which the device icons 501 are to be disposed. In the example of the floor plan 500 of FIG. 8, images that indicate the type of the devices 200 represented by the device icons 501 to be disposed are provided at positions at which the device icons 501 are to be disposed. In the example of the floor plan 500 of FIG. 9, simplified images such as circles and rectangles that indicate the type of the devices 200 represented by the device icons 501 to be disposed are provided at positions at which the device icons 501 are to be disposed.

Consequently, in the case where the floor plan 500 includes arrangement information for the device icons 501, the display control section 103 may generate the basic screen of FIG. 5 by automatically disposing the device icons 501 on the floor plan 500 on the basis of the arrangement information included in the floor plan 500. In this case, it is not necessary for the user to perform an operation of moving the device icons 501 to appropriate positions on the floor plan 500.

For example, in an exemplary floor plan 4401 for the first floor of FIG. 7, the display control section 103 detects a position provided with a text "TELEVISION SET", automatically disposes the device icon 501 for the television set at the detected position, and registers the detected position in the arrangement 3104 of the device list 3100.

In an exemplary floor plan 4501 for the first floor of FIG. 8, the display control section 103 detects a position provided with an image for the "television set", automatically disposes the device icon 501 for the television set at the detected position, and registers the detected position in the arrangement 3104 of the device list 3100. In an exemplary floor plan 4601 for the first floor of FIG. 9, the display control section 103 detects a position provided with an image in the shape of a "circle filled with oblique lines", automatically disposes the device icon 501 for the television set at the detected position, and registers the detected position in the arrangement 3104 of the device list 3100.

The display control section 103 may detect the display position of arrangement information by recognizing the arrangement information included in the floor plan 500 using a text recognition technology or an image recognition technology commonly utilized.

Figure 10:
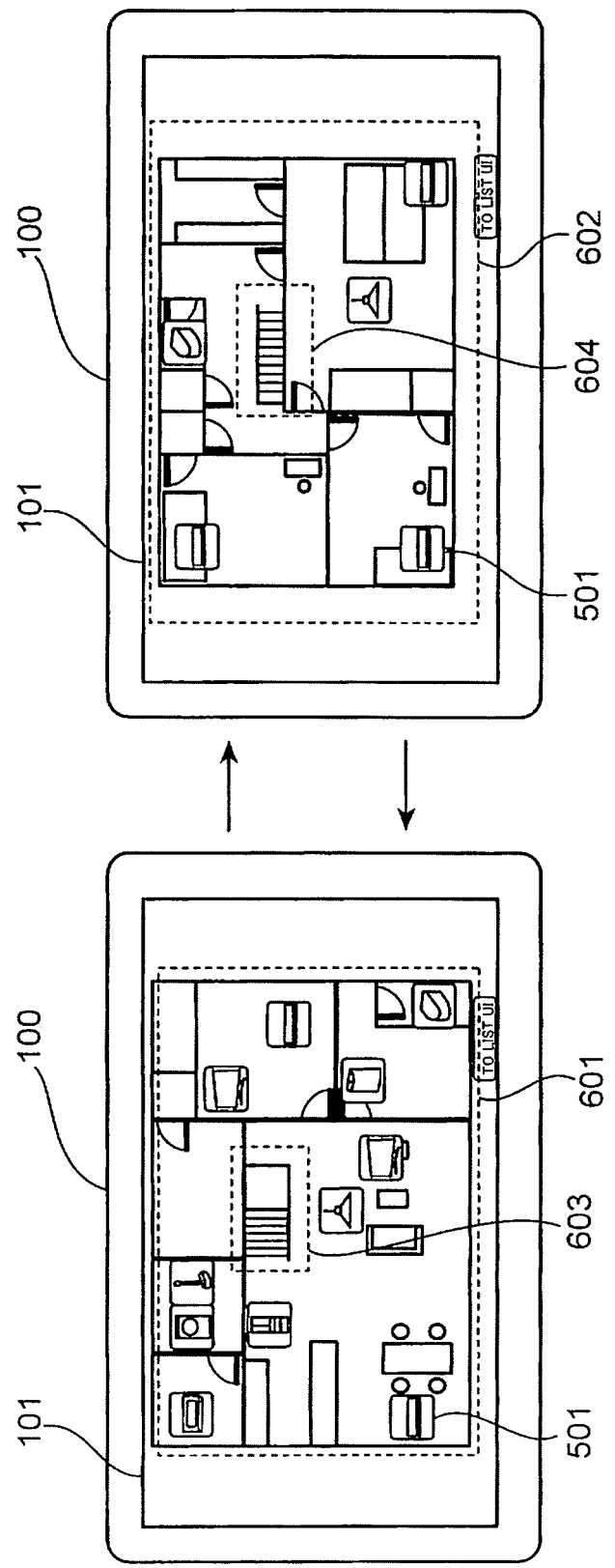
FIG. 10 is a diagram showing an example of transition between a first floor display state and a second floor display state of the basic screen of the home controller according to the embodiment of the present disclosure.

FIG. 10 is a diagram illustrating a method of switching the floor display on the basic screen of the home controller 100. FIG. 10 illustrates a case where the house has two floors, namely the first floor and the second floor. With a floor plan 601 for the first floor displayed on the basic screen of the home controller 100, the touch panel control section 102 senses a tap on a staircase region 603 on the first floor performed by the user. Then, the display control section 103 switches the floor display on the basic screen from the first floor to the second floor. Similarly, with a floor plan 602 for the second floor displayed on the basic screen of the home controller 100, the touch panel control section 102 senses a tap on a staircase region 604 on the second floor performed by the user. Then, the display control section 103 switches the floor display on the basic screen from the second floor to the first floor.

Here, the touch panel control section 102 may judge that the staircase region 603 is tapped on if the position tapped on by the user is positioned within a region surrounded by four vertexes of a staircase registered in a room type 2902 of room information 2900 (see FIG. 32).

Further, the floor display may be switched by not only tapping on the staircase region 603 but also a swipe operation on the display 101. With the floor plan 601 for the first floor displayed on the basic screen of the home controller 100, the touch panel control section 102 senses a swipe operation performed from the right to the left on the display 101 by the user. Then, the display control section 103 switches the floor display on the basic screen from the first floor to the second floor. Similarly, with the floor plan 602 for the second floor displayed on the basic screen of the home controller 100, the touch panel control section 102 senses a swipe operation performed from the left to the right on the display 101 by the user. Then, the display control section 103 switches the floor display on the basic screen from the second floor to the first floor. The floor display may be switched by a swipe operation in the vertical direction.

Figure 11:
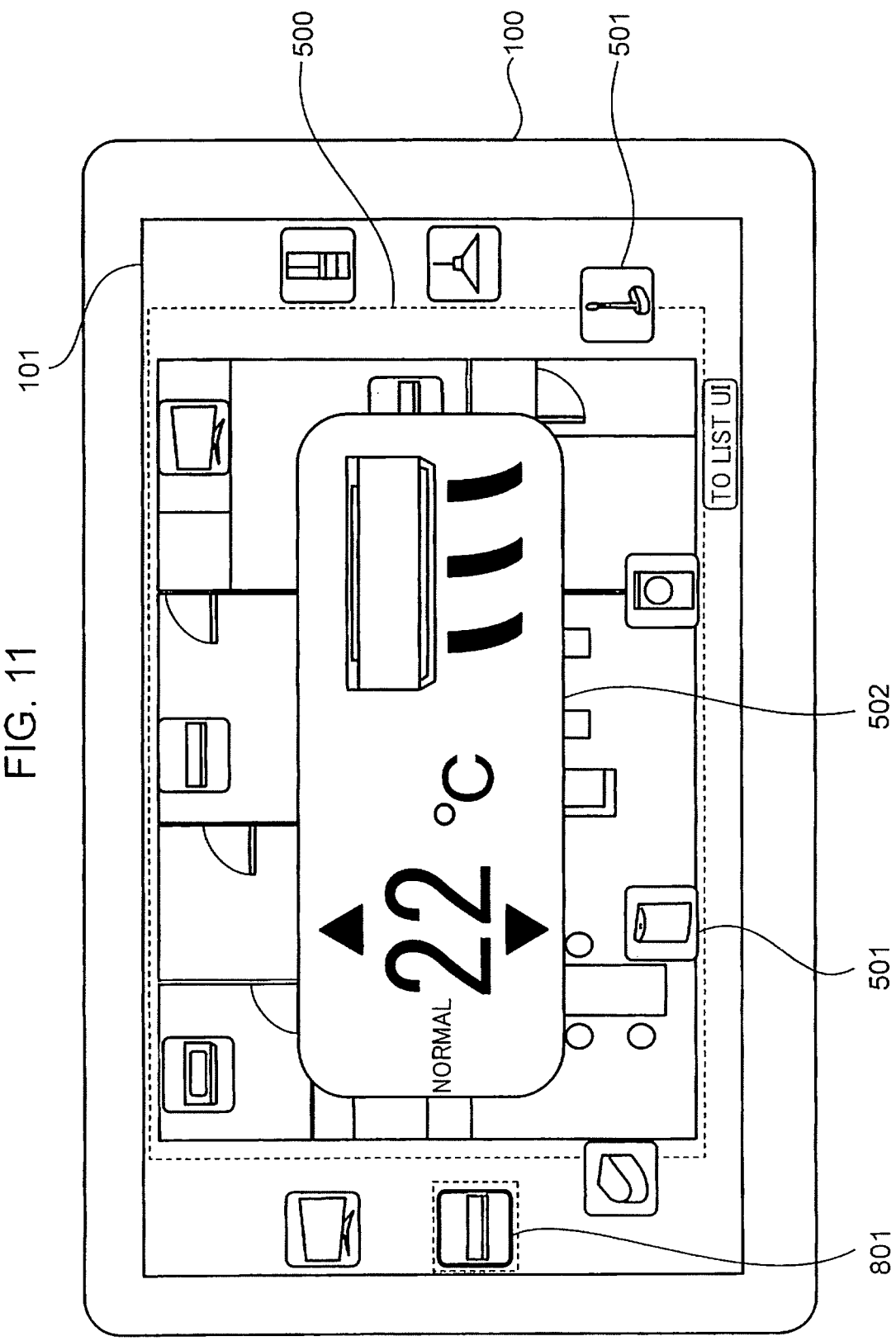
FIG. 11 is a diagram showing the configuration of the display state of a device control screen of the home controller according to the embodiment of the present disclosure.

FIG. 11 is a diagram showing the configuration of the display state of the device control screen 502 of the home controller 100. In the basic screen shown in FIG. 5, when the touch panel control section 102 senses that the user selects the device icon 501, the display control section 103 causes the display 101 to display the device control screen 502 corresponding to the selected device icon 501. The device control screen 502 is a control screen that is specific to each device 200 and that allows control or confirmation of the state of the device 200. For example, in FIG. 11, a device icon 801 for the air conditioner is selected by the user, and the temperature setting and the air flow direction are controlled using the device control screen 502 for the air conditioner.

An image of the air conditioner is displayed in the device control screen 502 to allow the user to immediately recognize that the device control screen 502 corresponds to the air conditioner. This prevents an erroneous operation. An image that indicates the air flow direction is displayed on the lower side of the image of the air conditioner to allow the user to select a desired air flow direction by repeatedly tapping on the image, for example. A numeral displayed within the device control screen 502 indicates the current set temperature of the air conditioner. A button in the shape of a triangle that points upward in the device control screen 502 is a temperature increase button. A button in the shape of a triangle that points downward is a temperature decrease button. Pressing the temperature increase button once increases the set temperature of the air conditioner by a predetermined temperature (for example, 0.5 degrees). Pressing the temperature decrease button once decreases the set temperature of the air conditioner by a predetermined temperature (for example, 0.5 degrees).

Examples of the method of disposing the device icons 501 in the display state of the device control screen 502 include the following methods.

A first method is to dispose the device icons 501 outside the display region of the device control screen 502 as shown in FIG. 11. When the touch panel control section 102 senses that a certain device icon 501 is tapped on by the user, the display control section 103 disposes all the device icons 501 at locations outside the display region of the device control screen 502 and inside the display region of the display 101 irrespective of whether or not the locations are inside the display region of the floor plan 500. In the example of FIG. 11, the device icons 501 are disposed in an elliptical arrangement so as to surround the device control screen 502. That is, when a certain device icon 501 is selected by the user and the device control screen 502 for the device 200 corresponding to the device icon 501 is displayed, the display control section 103 retracts all the device icons 501 out of the display region of the device control screen 502.

This prevents the device icons 501 from being hidden by the device control screen 502. Therefore, in the case where the device control screen 502 for a device 200 is currently displayed and the user attempts to cause the device control screen 502 for another device 200 to be displayed, it is not necessary for the user to temporarily erase the currently displayed device control screen 502 and search for the device icon 501 for the relevant device 200.

Here, the display control section 103 may decide the arrangement position of each device icon 501 on the outer periphery of an ellipse having a shape determined in advance in accordance with the size of the device control screen 502, and dispose the device icon 501 at the decided position, for example. Examples of the method of deciding the arrangement position include a method of arranging all the device icons 501 as display targets at equal intervals on the outer periphery of an ellipse, and a method of disposing the device icons 501 such that the angles formed by lines connecting between adjacent device icons 501 and the center of an ellipse are equal to each other. Alternatively, the display control section 103 may divide the outer periphery of an ellipse into four sections corresponding to the upper, lower, left, and right portions of the device control screen 502, and dispose the device icons 501 such that the number of device icons 501 in each section is the same and the device icons 501 in each section are arranged at equal intervals. The device icon 501 disposed at the closest position on the floor plan 500 may be disposed at the decided arrangement position.

In the foregoing description, the device icons 501 are arranged in an elliptical arrangement. However, the embodiment is not limited thereto, and the device icons 501 may be arranged in a circular arrangement. Also in this case, the arrangement position of the device icons 501 may be decided using the same method as in the case where the device icons 501 are arranged in an elliptical arrangement. Other examples of the shape of arrangement of the device icons 501 used when the device icons 501 are retracted out of the display region of the device control screen 502 include polygonal arrangements such as triangular, rectangular, and pentagonal arrangements.

A second method is to dispose the device icons 501 in one line outside the display region of the device control screen 502 and the floor plan 500 and inside the display region of the display 101 as shown in FIG. 13. When the touch panel control section 102 senses that a certain device icon 501 is tapped on by the user, the display control section 103 disposes all the device icons 501 in one vertical line on the left side of the display region of the floor plan 500. That is, the display control section 103 retracts all the device icons 501 to a vacant space outside the display region of the floor plan 500 and inside the display region of the display 101.

In FIG. 13, the device icons 501 are disposed on the left side of the floor plan 502. However, the embodiment is not limited thereto, and the device icons 501 may be disposed in one vertical line on the right side of the floor plan 502, or may be disposed in one horizontal line on the upper or lower side of the floor plan 500.

In the case where all the device icons 501 cannot be disposed on the left side of the floor plan 500, the display control section 103 may scroll the device icons 501 upward or downward in accordance with a swipe operation performed upward or downward on the device icons 501 disposed in one vertical line on the left side to cause the device icons 501, which have been hidden, to be displayed within the display 101.

This allows the device icons 501, which have been hidden, to be displayed within the display 101 to allow the user to select the device icons 501. In the case where the device icons 501 are displayed in one horizontal line and all the device icons 501 may not displayed, the display control section 103 may scroll the device icons 501 leftward or rightward in accordance with a swipe operation performed leftward or rightward on the device icons 501 disposed in one horizontal line to cause the device icons 501, which have been hidden, to be displayed within the display 101.

In the display state of the device control screen 502, the display control section 103 may display the device icon 501 selected by the user in a display mode that is different from that for the unselected device icons 501. This allows the user to easily recognize the selected device icon 501.

For example, as shown in FIG. 11, the display control section 103 may display the selected device icon 801 in a color that is different from that of the other unselected device icons 501. Specifically, the display control section 103 may display a background portion of the selected device icon 501 in a color that is different from that of background portions of the unselected device icons 501. It should be noted, however, that such a display mode is merely exemplary, and the display control section 103 may make the selected device icon 501 brighter than the unselected device icons 501, may make the selected device icon 501 denser than the unselected device icons 501, or may cause the selected device icon 501 to flash on and off at a constant cycle.

In the display state of the device control screen 502, the device icon 501 selected by the user may be disposed as distinguished from the unselected device icons 501. This allows the user to easily recognize the selected device icon 501.

For example, as shown in FIG. 12, the display control section 103 may dispose a selected device icon 901 at the uppermost position on the outer periphery of an ellipse. Besides, for example, the display control section 103 may dispose the selected device icon 501 at a particular position (for example, the lowermost position, the rightmost position, or the leftmost position) on the outer periphery of an ellipse. In any event, the display control section 103 may dispose the device icon 501 selected by the user at a particular location that is easily recognizable by the user.

Besides, for example, as shown in FIG. 14, the display control section 103 may scroll an array of the device icons 501 such that a selected device icon 1101 is disposed within the display region of the display 101. In the example of FIG. 14, the device icons 501 are scrolled such that the selected device icon 1101 is disposed at the center of a line of icons displayed in one vertical line on the left side of the floor plan 500. This allows the user to easily recognize the selected device icon 501. Although the device icon 1101 is disposed at the center of the line of icons in FIG. 14, the device icon 1101 may be disposed at any other conspicuous position. For example, the device icon 1101 may be disposed at the top or bottom position of the line of icons.

The order of arrangement of the device icons 501 taken when the device icons 501 are retracted of the display region of the floor plan 500 may be determined such that devices 200 that are closer in position of arrangement on the floor plan 500 to the device icon 501 selected by the user are disposed to be closer in order of arrangement to the selected device icon 501. Alternatively, the order of arrangement of the device icons 501 may be determined such that the device icons 501 for devices 200 that are more likely to be used together with the device 200 selected by the user are disposed to be closer in order of arrangement to the device icon 501 for the device 200 selected by the user. For example, the television set and the Blu-ray recorder are highly likely to be used together by the user. Therefore, when the device icon 501 for the television set is selected by the user, the device icon 501 for the Blu-ray recorder may be displayed next to the device icon 501 for the television set. In order to embody such a configuration, a table that indicates combinations of devices 200 that are highly likely to be used together may be stored in advance in the storage section 104, and the arrangement of the device icons 501 may be decided in accordance with the table.

In any of the methods of disposing the device icons 501 taken when the device control screen 502 is displayed described above, in addition, the display control section 103 may dispose the device icons 501 as grouped under particular conditions.

For example, in FIG. 15, the device icons 501 are grouped in accordance with the location at which the devices 200 are disposed. The devices 200 disposed in the living room are grouped as device icons 1201. The devices 200 disposed in a lavatory are grouped as device icons 1202. The devices 200 disposed in a bedroom are grouped as device icons 1203. Then, the display order is set to each group, and the grouped device icons 501 are disposed in one vertical line on the left side of the floor plan 500 in accordance with the display order. The display order of the groups may be determined such that groups that are positioned closer to the room in which the device 200 selected by the user is disposed are closer in display order to the group for the room in which the device 200 selected by the user is disposed.

Besides, the display control section 103 may dispose the device icons 501 as grouped in accordance with the type of the devices 200. For example, in FIG. 16, two device icons 501 for the television set are disposed on the left side of the floor plan 500 as grouped as device icons 2301, and two device icons 501 for the air conditioner are disposed on the left side of the floor plan 500 as grouped as device icons 2302 for the air conditioner. Consequently, the display control section 103 may group the device icons 501 in accordance with the device type by disposing the device icons 501 for the devices 200 of the same type to be continuous.

The display control section 103 may discriminate the type of the devices 200 in accordance with the content registered in a device type 3102 of the device list 3100 (see FIG. 35).

Although the device icons 501 for the devices 200 of the same type are grouped into one group in the foregoing description, the embodiment is not limited thereto. For example, the display control section 103 may classify the devices 200 into categories matching the device type, group the device icons 501 in accordance with the category, and dispose the device icons 501 on the left side of the floor plan 500 in groups.

For example, as shown in the lower left of FIG. 16, three device icons 501 for the refrigerator, a microwave oven, and a dish washing/drying machine are classified into a cooking device category, and therefore the three device icons are grouped as device icons 2303 for the cooking devices and disposed on the left side of the floor plan 500.

Examples of the other categories include entertainment devices and air-conditioning devices. The entertainment device category includes devices 200 such as a television set, a recorder, a player, and a home theater system. The air-conditioning device category includes devices 200 such as an air conditioner, an air purifier, a humidifier, a dehumidifier, and a home air circulation system.

For example, if the device icons 501 for the television set, the recorder, the air conditioner, and the air purifier are disposed on the floor plan 500 and the device icon 501 for the television set is selected by the user, the device icons 501 for the television set and the recorder classified into the entertainment device category are grouped into one group and disposed on the left side of the floor plan 500, and the device icons 501 for the air conditioner and the air purifier classified into the air-conditioning device category are grouped into one group and disposed on the left side of the floor plan 500.

The display control section 103 may determine the category of the devices 200 from the content registered in the device type 3102 of the device list 3100. In this case, a classification table for determining the category of the devices 200 from the content registered in the device type 3102 may be stored in advance in the storage section 104, and the display control section 103 may reference the classification table to discriminate the category of the devices 200.

A variety of manners of classifying the devices 200 according to the device type may be adopted besides that described above. For example, as shown in FIG. 24, the devices 200 may be classified into household appliance, air-conditioning, and facility categories.

The method of grouping the device icons 501 on the basis of particular conditions and disposing the device icons 501 as described above may also be applied to the display mode in which the device icons 501 are retracted so as to surround the device control screen 502 as shown in FIG. 11.

Figure 17A:
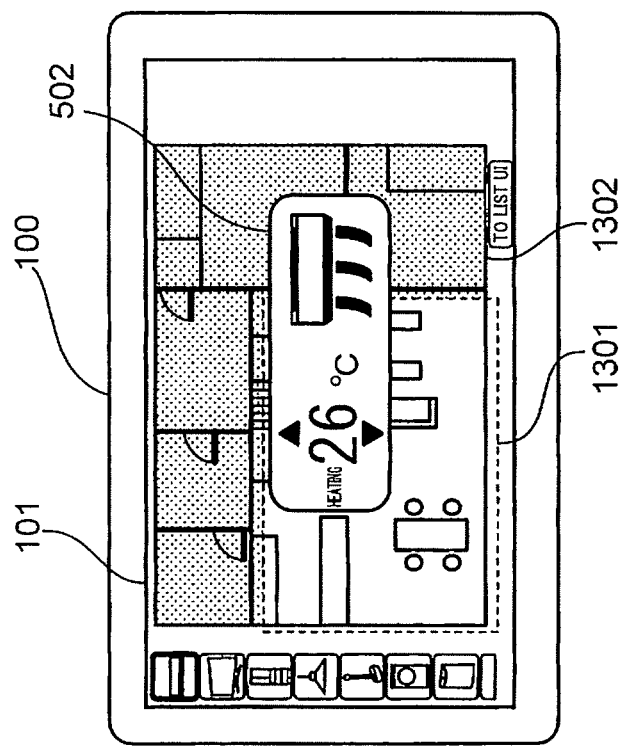
FIGS. 17A and B are diagrams showing a configuration example of the display state of the device control screen of the home controller according to the embodiment of the present disclosure.
Figure 17B:
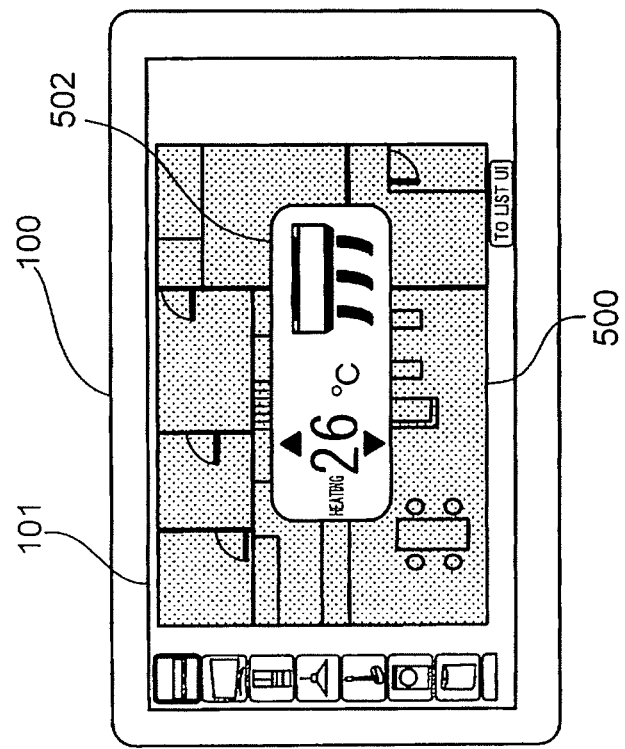

FIGS. 17A and 17B are each a diagram showing a method of displaying the floor plan 500 with the device control screen 502 displayed. As shown in FIGS. 17A and 17B, there are two types of the method of displaying the floor plan 500. In a first display method, as shown in FIG. 17A, the entire floor plan 500 is covered by a translucent gray layer (in the drawing, indicated by dots).

In this case, the background of the device control screen 502 is turned into a gray color to emphasize the device control screen 502, which allows the user to more definitely recognize the device control screen 502. In addition, the gray layer is translucent, and the floor plan 500 is not completely hidden. This allows the device control screen 502 to be operated with presence. The gray layer is image data having a color with low brightness such as gray and set to predetermined transparency.

The display control section 103 may decide the display order of the device control screen 502, the gray layer, and the floor plan 500 such that the device control screen 502 is the uppermost layer and the floor plan 500 is the lowermost layer, and synthesize these images. This prevents the device control screen 502 from being displayed as covered by the gray layer.

In a second display method, as shown in FIG. 17B, a non-control target region 1302 in the floor plan 500 is covered by a translucent gray layer (the region with dots in the drawing), and a control target region 1301 is not covered by the translucent gray layer. This allows the user to operate the device control screen 502 while being conscious of the control target region 1301, which allows operation with presence. Here, the control target region 1301 refers to a region on the floor plan 500 that corresponds to a room in which the device 200 represented by the device icon 501 selected by the user is disposed, and the non-control target region 1302 refers to a region on the floor plan 500 other than the room. For example, in the case where the control target device is the air conditioner installed in the living room, the control target region 1301 is the region on the floor plan 500 corresponding to the living room, and the non-control target region 1302 is the region on the floor plan 500 other than the living room.

For example, it is assumed that the user selects the device icon 501 for the air conditioner with a device ID 3101 of A shown in FIG. 35. In this case, the display control section 103 specifies the position (X10, Y100, Z1) of the air conditioner from the content registered in the arrangement 3104 of the air conditioner. Next, the display control section 103 references the room information 2900 to decide in which room the specified position (X10, Y100, Z1) is positioned. Here, it is assumed that the position (X10, Y100, Z1) is positioned within a region surrounded by vertexes with vertex IDs of F, G, H, I, L, O, and N. Then, the display control section 103 determines that the air conditioner is disposed in the living room with a room ID of A. Then, the display control section 103 generates a gray layer with the region of the living room defined as the control target region 1301 and with the region on the floor plan 500 other than the living room defined as the non-control target region 1302.

Next, transition between the display state of the basic screen and the display state of the device control screen 502 will be described using FIG. 18. In the basic screen shown in the left diagram of FIG. 18, the user selects the device icon 501 for the device 200 (here, the air conditioner) that is desired to be controlled, and the touch panel control section 102 senses the selection. Then, as shown in the right diagram of FIG. 18, the display control section 103 displays the device control screen 502 corresponding to the selected device icon 501 as overlapped on the floor plan 500. This results in transition from the display state of the basic screen to the display state of the device control screen 502.

Figure 18:
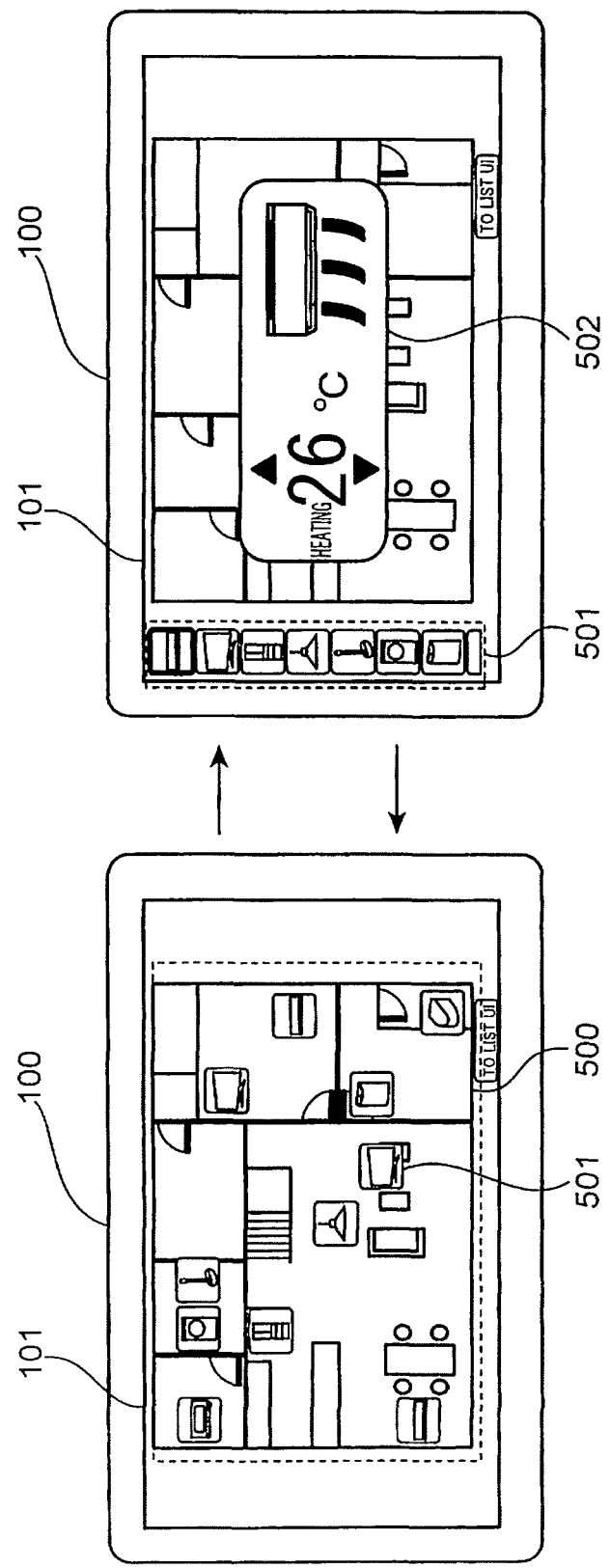
FIG. 18 is a diagram showing an example of transition between the basic screen of the home controller and the display state of the device control screen according to the embodiment of the present disclosure.

On the other hand, as shown in the right diagram of FIG. 18, in the display state of the device control screen 502, the user taps on the device icon 501 for the air conditioner corresponding to the device control screen 502 or a location outside the display region of the device control screen 502 (for example, the display region of the floor plan 500 outside the display region of the device control screen 502), and the touch panel control section 102 senses the tap. Then, as shown in the left diagram of FIG. 18, the display control section 103 erases the device control screen 502, and returns from the display state of the device control screen 502 to the display state of the basic screen. At this time, the display control section 103 returns the device icon 501 to the original arrangement position on the floor plan 500.

The operation described above is the same for the floor plan 500 for any floor displayed in the basic screen. For example, as shown in the left diagram of FIG. 19, in the case where the basic screen displays the floor plan 602 for the second floor, the user taps on the device icon 501 for the device 200 (here, the air conditioner) that is desired to be controlled, and the touch panel control section 102 senses the tap. Then, as shown in the right diagram of FIG. 19, the display control section 103 displays the device control screen 502 corresponding to the selected device icon 501 as overlapped on the floor plan 602 for the second floor.

Figure 19:
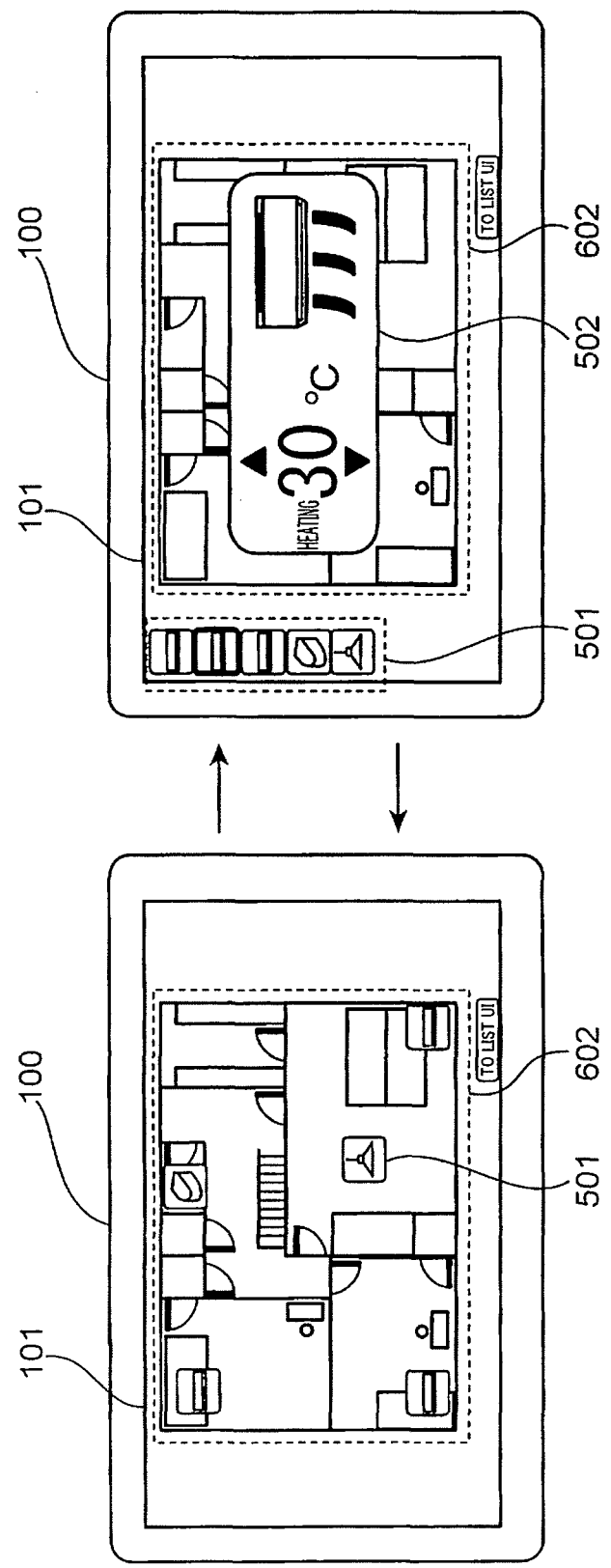
FIG. 19 is a diagram showing an example of transition between the second floor display state of the basic screen of the home controller and the display state of the device control screen for the second floor according to the embodiment of the present disclosure.

On the other hand, as shown in the right diagram of FIG. 19, in the display state of the device control screen 502 for the air conditioner, the user taps on the device icon 501 for the air conditioner corresponding to the device control screen 502 being displayed or a location outside the display region of the device control screen 502 (for example, the display region of the floor plan 500 outside the display region of the device control screen 502), and the touch panel control section 102 senses the tap. Then, as shown in the left diagram of FIG. 19, the display control section 103 erases the device control screen 502, and returns from the display state of the device control screen 502 to the display state of the basic screen in which the floor plan 602 for the second floor is displayed.

Figure 20:
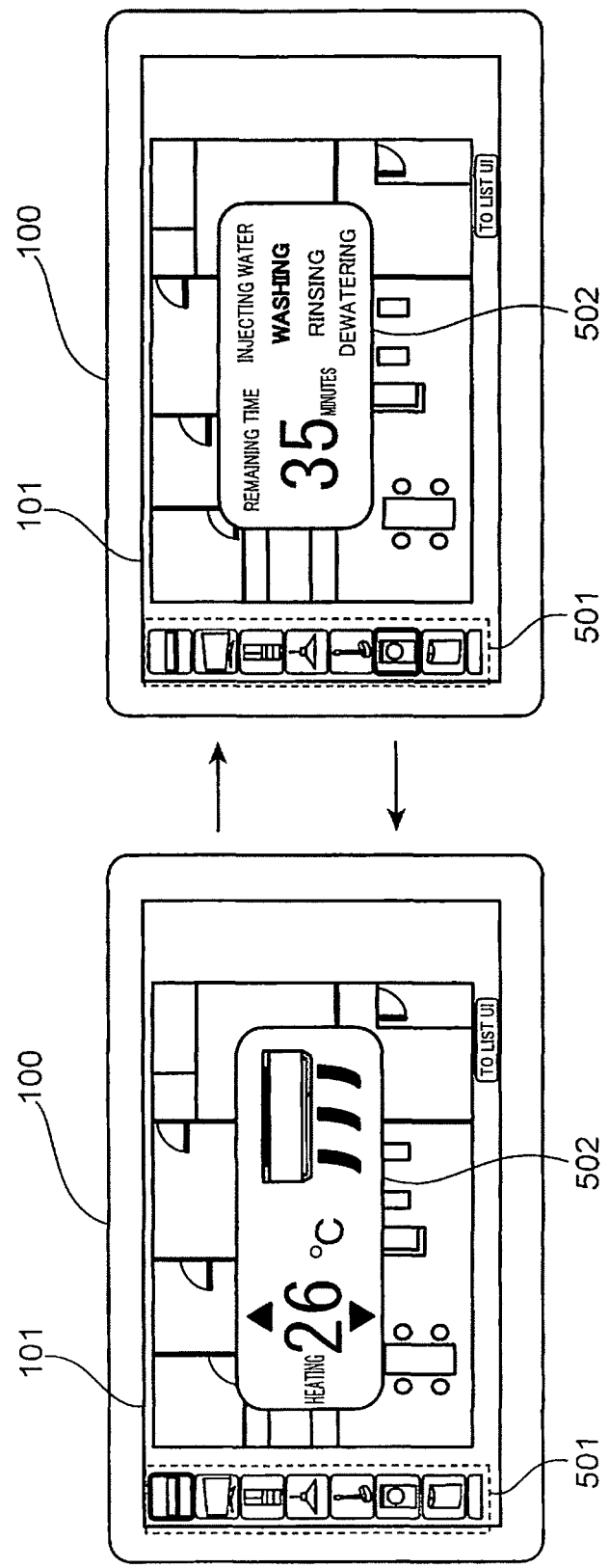
FIG. 20 is a diagram showing an example of transition from the display state of the device control screen of a certain device to the display state of the device control screen of another device according to the embodiment of the present disclosure.

Next, a method of switching from the display state of a certain device control screen 502 to the display state of another device control screen 502 will be described using FIG. 20. As shown in the left diagram of FIG. 20, in the display state of the device control screen 502 for the air conditioner, the user taps on the device icon 501 for the washing machine which is different from the device icon 501 for the air conditioner, and the touch panel control section 102 senses the tap. Then, as shown in the right diagram of FIG. 20, the display control section 103 erases the device control screen 502 which has been displayed, and displays the device control screen 502 corresponding to the device icon 501 for the washing machine as overlapped on the floor plan 500. Switching in the opposite direction is performed in the same manner.

Consequently, when the user successively selects different device icons 501, switching is successively performed between the device control screens 502, which allows the user to successively control different devices 200. That is, in causing another device control screen 502 to be displayed while a certain device control screen 502 is displayed, it is no longer necessary for the user to input an operation of erasing the certain device control screen 502, and switching can be performed between the device control screens 502 with one touch operation.

In the display state of the device control screen 502, in the case where the user taps on the device icon 501 corresponding to the device control screen 502 being displayed, the display control section 103 may only erase the device control screen 502, and may not return to the basic screen. Such screen transition is shown in FIG. 21.

Figure 21:
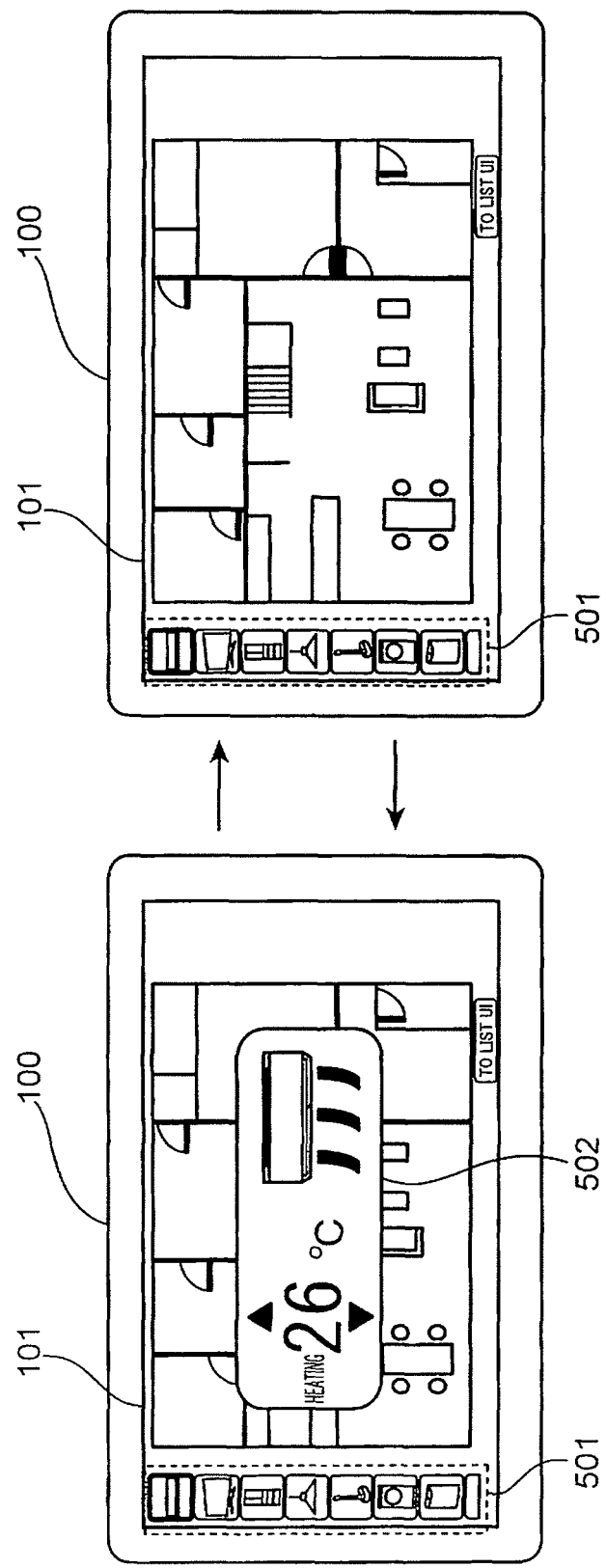
FIG. 21 is a diagram showing an example of transition between the display state and the hidden state of the device control screen of the home controller according to the embodiment of the present disclosure.

In the left diagram of FIG. 21, the device icon 501 for the air conditioner is selected by the user, and therefore the device control screen 502 for the air conditioner is displayed, and all the device icons 501 are displayed in one vertical line on the left side of the floor plan 500. In this state, the user taps on the device icon 501 for the air conditioner, and the touch panel control section 102 senses the tap. Then, as shown in the right diagram of FIG. 21, the display control section 103 erases only the device control screen 502 for the air conditioner with the device icons 501 kept displayed in one vertical line. In this case, the device icons 501 do not move onto the floor plan 500, and therefore a user's desire to cause only the floor plan 500 to be displayed may be met.

On the other hand, in the hidden state of the device control screen 502, the user selects a desired device icon 501, and the touch panel control section 102 senses the selection. Then, the display control section 103 displays the device control screen 502 corresponding to the selected device icon 501. For example, in the right diagram of FIG. 21, when the user selects the device icon 501 for the air conditioner from the device icons 501 disposed in one vertical line on the left side of the floor plan 500, the device control screen 502 for the air conditioner is displayed as shown in the left diagram of FIG. 21.

Figure 22:
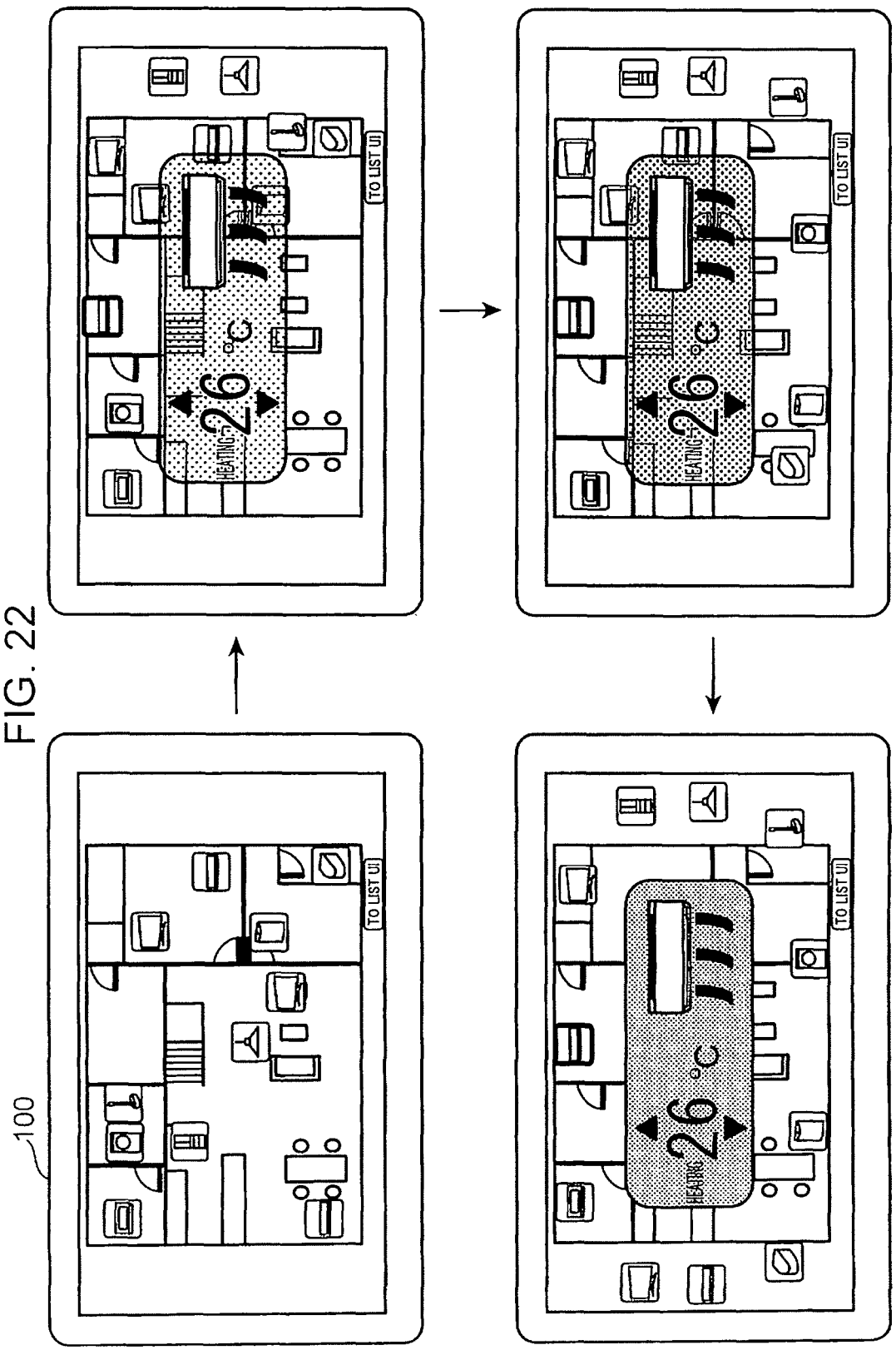
FIG. 22 is a diagram showing an example of an animation for transition from the basic screen of the home controller to the display state of the device control screen according to the embodiment of the present disclosure.

Next, transition from the display state of the basic screen to the display state of the device control screen 502 represented through an animation will be described using FIG. 22. As shown in the upper left diagram of FIG. 22, the user selects the device icon 501 for the air conditioner, for example, in the basic screen. Then, the display control section 103 gradually lowers the transparency of the device control screen 502 for the air conditioner in the order of the upper right diagram, the lower right diagram, and the lower left diagram of FIG. 22 to a final transparency of 0. At the same time, the display control section 103 moves all the device icons 501 onto the outer periphery of an ellipse that surrounds the device control screen 502.

Figure 23:
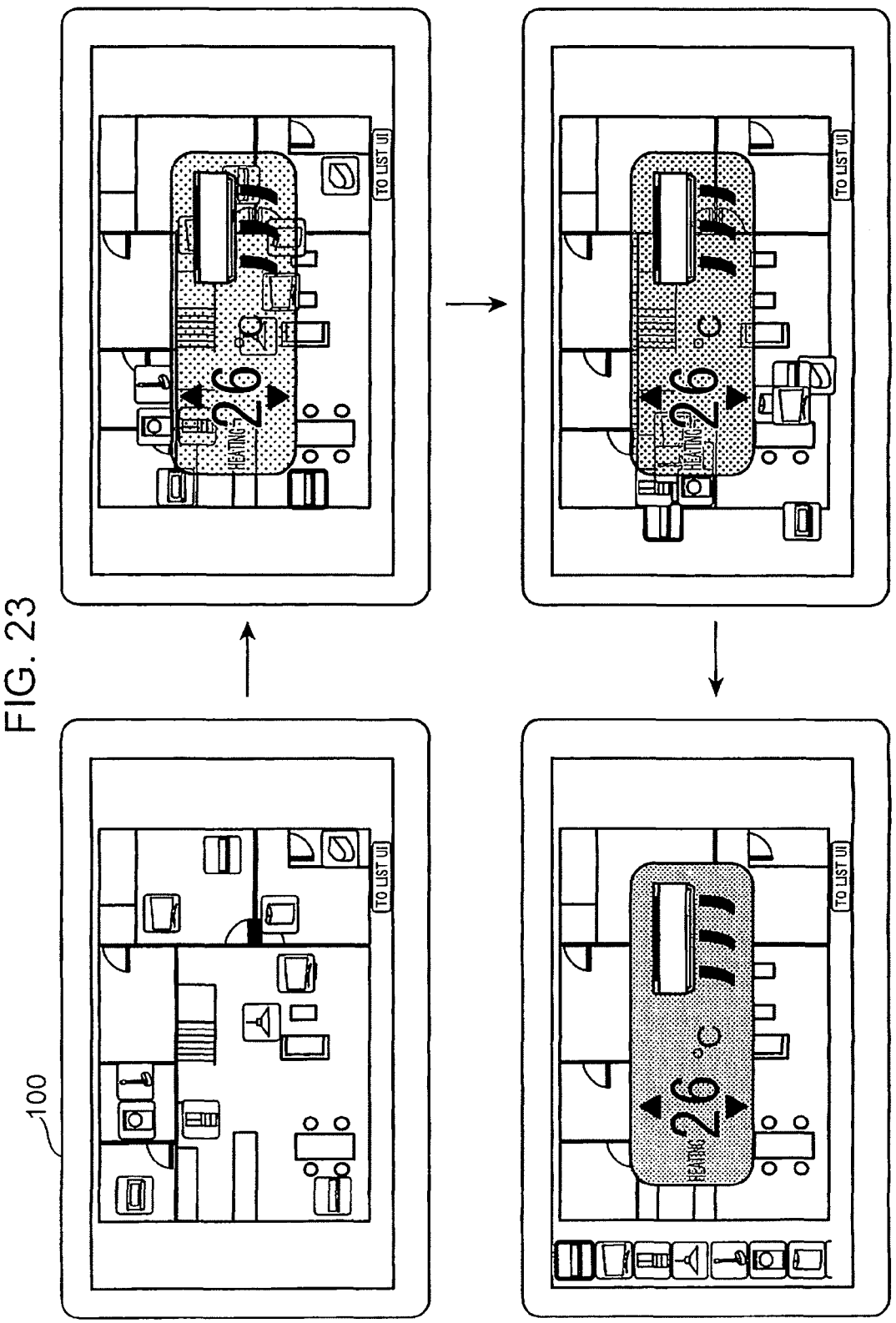
FIG. 23 is a diagram showing an example of an animation for transition from the basic screen of the home controller to the display state of the device control screen according to the embodiment of the present disclosure.

Next, transition from the display state of the basic screen to the display state of the device control screen 502 represented through an animation will be described using FIG. 23. As shown in the upper left diagram of FIG. 23, the user selects the device icon 501 for the device 200 which is the air conditioner, for example, in the basic screen. Then, the display control section 103 gradually decreases the transparency of the device control screen 502 for the air conditioner in the order of the upper right diagram, the lower right diagram, and the lower left diagram of FIG. 23 to a final transparency of 0. At the same time, the display control section 103 moves all the device icons to the left side of the floor plan 500.

Consequently, representing the screen transition through an animation can enhance the interest of the user in operating the device control screen 502 through screen rendering shown since the device icon 501 is selected until the device control screen 502 is displayed.

FIG. 24 is a diagram showing the configuration of a device list display screen. The device list display screen is displayed when the user taps on the device list display change button 503 in the basic screen shown in FIG. 5.

As shown in FIG. 24, the device list display screen includes a device list 2000, device details icons 2001, and a basic screen display button 2003.

When the user taps on the device details icon 2001 and the touch panel control section 102 senses the tap, the display control section 103 causes the device control screen 502 to be displayed as overlapped on the device list 2000. This allows the user to cause the device control screen 502 to be displayed and operate the device 200 as in the case where the device icon 501 is tapped on.

The device details icon 2001 is prepared for each device 200. The device details icon 2001 is different from the device icon 501 in representing not only an image representing the device 200 but also the on/off state and the operation state of the device 200. For example, the device details icon 2001 for the refrigerator displayed in the upper left of FIG. 24 displays not only an image of the refrigerator but also "ON", which indicates that the refrigerator is currently turned on, and "OPERATION/ICE", which indicates that the refrigerator is currently making ice.

In the device list 2000, the device details icons 2001 are displayed as classified on the basis of a classification criterion determined in advance. Examples of the classification criterion determined in advance include the type of the device 200, the room in which the device 200 is disposed, and the status of use of the device 200. In FIG. 24, the type of the device 200 is used as the classification criterion, and the device details icons 2001 are classified into three categories, namely the household appliance, air-conditioning, and facility categories.

In the example of FIG. 24, the refrigerator, an electric toothbrush, the washing machine, and the television set are classified into the household appliance category, the air conditioner and the air purifier are classified into the air-conditioning category, and the toilet, the illumination device, and the bath are classified into the facility category. In this case, a classification table that determines into which of the household appliance, air-conditioning, and facility categories each device 200 is classified on the basis of the content registered in the device type 3102 of the device list 3100 (see FIG. 35) is stored in advance in the storage section 104. Then, the display control section 103 may reference the classification table to classify each device into a category.

Returning to FIG. 24, the button with a text "TO FLOOR PLAN UI" displayed at the lower right of the device list 2000 is the basic screen display button 2003. The basic screen display button 2003 is a button for switching the screen from the device list display screen to the basic screen.

Although switching can be made between the basic screen and the device list display screen in the foregoing description, the device list display screen may be utilized as the basic screen in place of the basic screen shown in FIG. 5. In this case, the basic screen display button 2003 may be omitted.

In the foregoing description, one device details icon 2001 is correlated with one device 200. However, the embodiment is not limited thereto, and one device details icon 2001 may be correlated with a plurality of devices 200 so that the one device details icon 2001 may be used in common to the plurality of devices 200. For example, in the case where there are two illumination devices in a living room, the two illumination devices may be represented by one device details icon 2001.

In this case, when the device details icon 2001 representing the two illumination devices is tapped on by the user, the display control section 103 causes the display 101 to display a device control screen 502 that allows simultaneous control of the two illumination devices. In this case, the same effect as that obtained in the case where one device icon 501 is used in common to a plurality of devices 200 is obtained. In the case where one device details icon 2001 is used in common to a plurality of illumination devices, the device details icon 2001 may display the on/off state and the operation state of each of two illumination devices.

In the basic screen, the device details icon 2001 may be used in place of the device icon 501. In the device list display screen, the device icon 501 may be used in place of the device details icon 2001. In addition, the device control screen 502 displayed in the case where the device details icon 2001 is selected and the device control screen 502 displayed in the case where the device icon 501 is selected may be the same as or different from each other. For example, the device details icon 2001 contains more information than that of the device icon 501, and therefore the device control screen 502 displayed in the case where the device details icon 2001 is selected may include more buttons and states than those of the device control screen 502 displayed in the case where the device icon 501 is selected.

Figure 25:
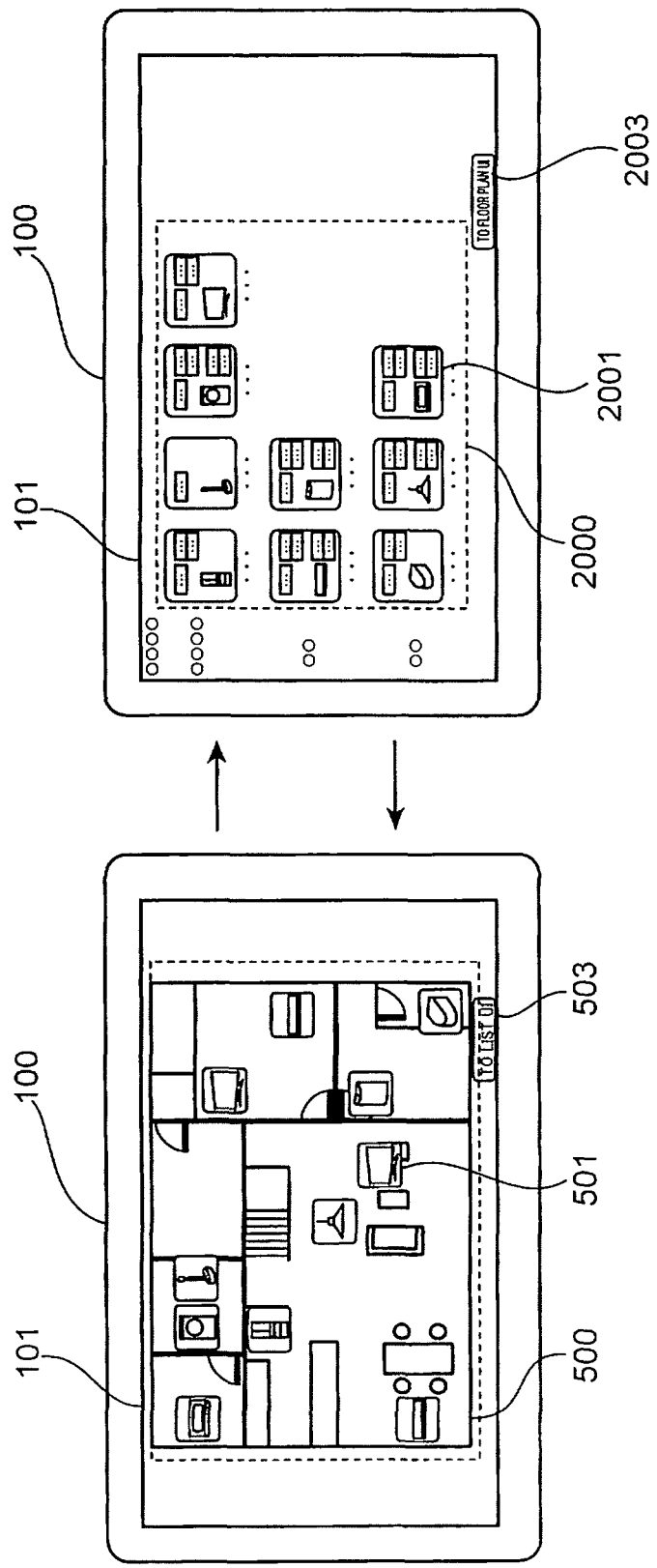
FIG. 25 is a diagram showing an example of transition between the basic screen of the home controller and the device icon list display screen according to the embodiment of the present disclosure.

FIG. 25 is a diagram showing screen transition between the basic screen and the device list display screen. In the basic screen shown in the left diagram of FIG. 25, when the device list display change button 503 is selected by the user, display on the display 101 is switched to the device list display screen shown in the right diagram of FIG. 25. On the other hand, in the device list display screen shown in the right diagram of FIG. 25, when the basic screen display button 2003 is selected by the user, display on the display 101 is switched to the basic screen shown in the left diagram of FIG. 25.

Specifically, when the touch panel control section 102 senses a tap on the basic screen display button 2003, the display control section 103 switches the display screen on the display 101 to the basic screen showing the device list display screen. On the other hand, in the display state of the basic screen, when the touch panel control section 102 senses a tap on the device list display change button 503, the display control section 103 switches the display screen on the display 101 from the basic screen to the device list display screen.

For example, in the case where the device list display screen is selected for display, and in the case where the user attempts to operate the television set located in front of the user, the device list display screen includes only one device details icon 2001 for the television set if there is only one television set in the house. This allows the user to directly select the device details icon 2001 for the television set without an erroneous operation, and to cause the device control screen 502 corresponding to the television set to be displayed.

On the other hand, in the case where the device list display screen is selected, the device list display screen focuses on the individual devices 200, and thus the relationship between the device 200 and the location at which the device 200 is disposed is unclear, although it is possible to operate or confirm the state of the individual devices 200. Therefore, for a plurality of devices 200 installed within the same building, such as the air conditioners or the illumination devices, for example, it is unclear the air conditioner or the illumination device in which room is the control target, which may incur an erroneous operation.

Thus, in the embodiment, the basic screen is provided in addition to the device list display screen to allow selection from the basic screen and the device list display screen.

Consequently, in the case where the basic screen is selected, the relationship between the device 200 and the location at which the device 200 is disposed is made definite. Therefore, also for a plurality of devices 200 of the same type installed in the same building, such as the air conditioners or illumination devices, for example, a discrimination as to the air conditioner or the illumination device in which room is the control target is facilitated. This prevents the air conditioner or the illumination device installed in a room that is different from the desired room from being erroneously operated.

Figure 26:
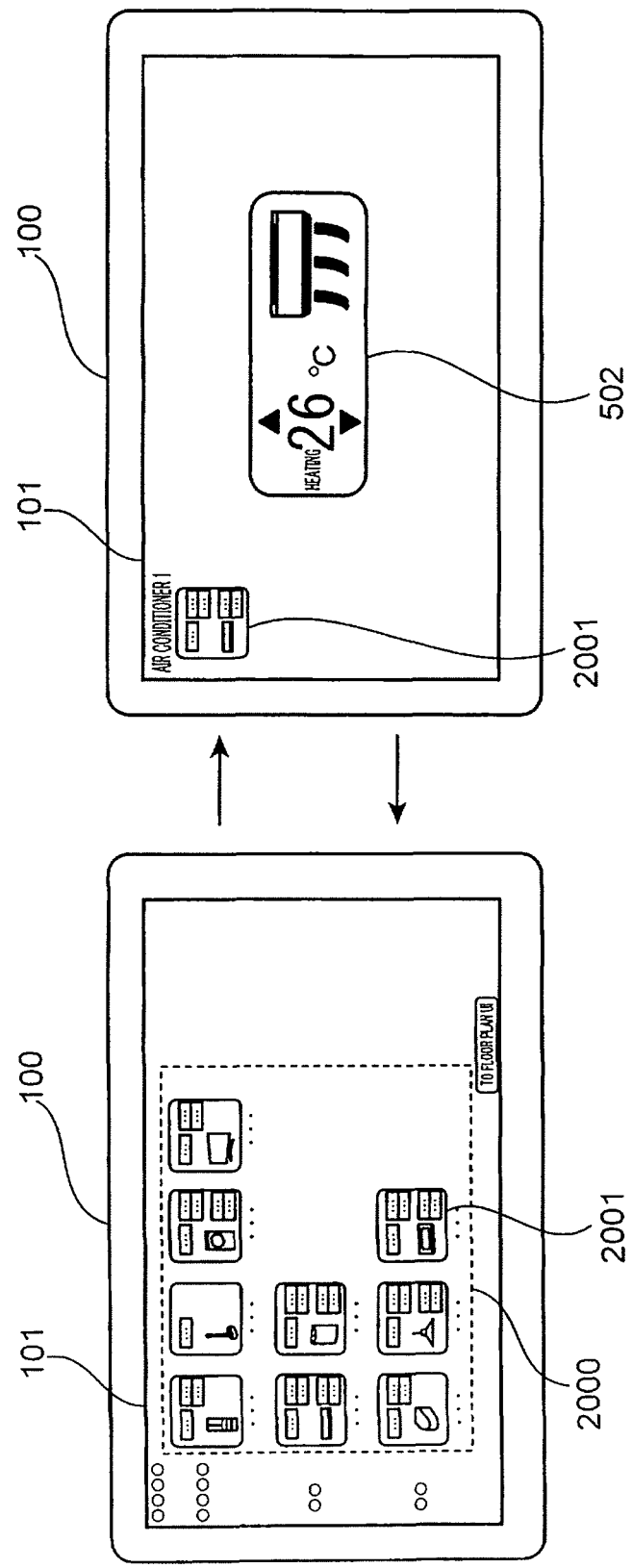
FIG. 26 is a diagram showing an example of transition between the device icon list display screen of the home controller and the display state of the device control screen according to the embodiment of the present disclosure.

FIG. 26 is a diagram showing screen transition between the display state of the device list display screen and the display state of the device control screen 502. In the device list display screen shown in the left diagram of FIG. 26, the user selects the device details icon 2001 for the device 200 (here, the air conditioner) that is desired to be controlled, and the touch panel control section 102 senses the selection. Then, as shown in the right diagram of FIG. 26, the display control section 103 displays the device control screen 502 for the air conditioner corresponding to the selected device details icon 2001 as overlapped on the device list display screen. This results in transition from the display state of the device list display screen to the display state of the device control screen 502.

In the example in the right drawing of FIG. 26, the display control section 103 hides the device details icons 2001 for devices other than the air conditioner selected by the user, and only the device details icon 2001 for the air conditioner is displayed at a position that is different from that in the device control screen 502. This allows the user to definitely recognize the device details icon 2001 that the user himself/herself selected.

On the other hand, as shown in the right diagram of FIG. 26, in the display state of the device control screen 502, the user selects the device details icon 2001 for the air conditioner, and the touch panel control section 102 senses the selection. Then, as shown in the left diagram of FIG. 26, the display control section 103 erases the device control screen 502, and returns from the display state of the device control screen 502 to the display state of the device list display screen.

Although only one device details icon 2001 is displayed in the display state of the device control screen 502 shown in the right diagram of FIG. 26, other device details icons 2001 that are not selected by the user may be displayed in the same manner as in FIG. 13. In this case, the plurality of device details icons 2001 may be displayed in one line at an end of the screen as shown in FIG. 13, or may be displayed so as to surround the device control screen 502 as shown in FIG. 12.

According to the configuration, the user can successively select the device details icons 2001 in the display state of the device control screen 502 to successively display other device control screens 502. Consequently, in causing another device control screen 502 to be displayed while a certain device control screen 502 is displayed, it is no longer necessary for the user to input an operation of erasing the certain device control screen 502, and switching can be performed between the device control screens 502 with one touch operation.

Figure 27:
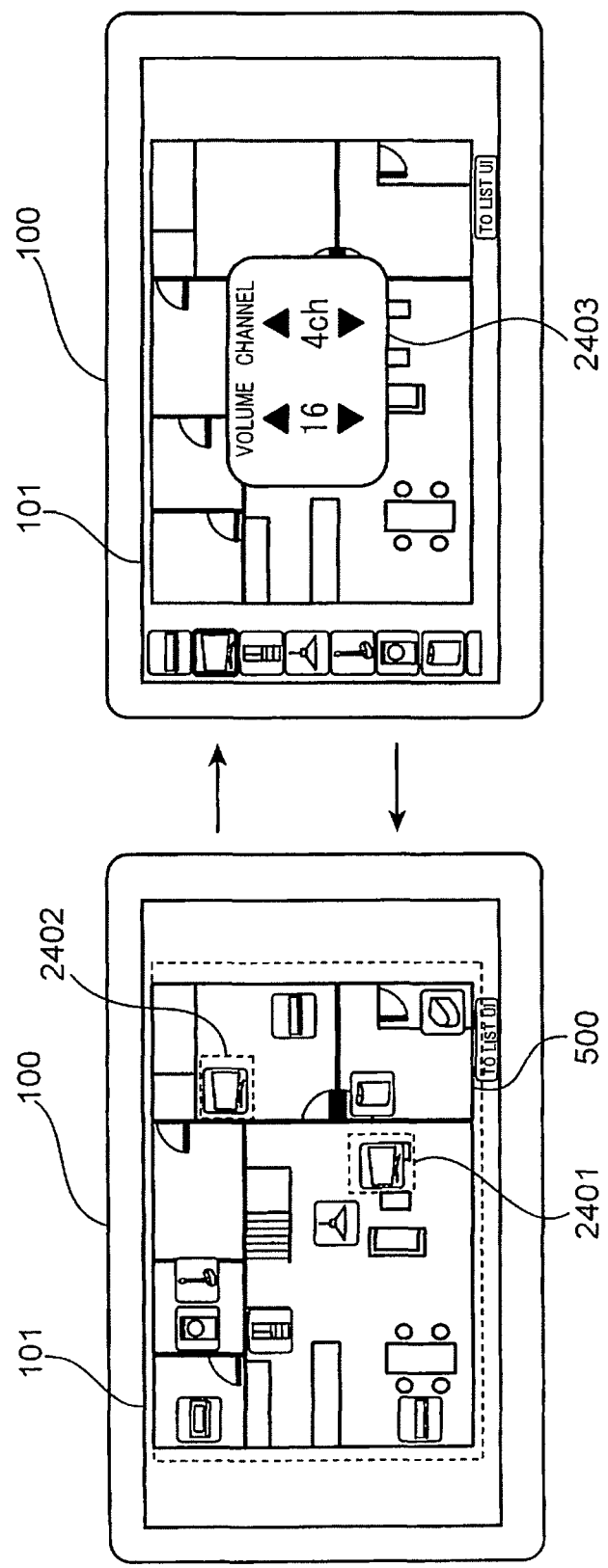
FIG. 27 is a diagram showing an example of transition between the basic screen of the home controller and the display state of the device control screen according to the embodiment of the present disclosure.

FIG. 27 is a diagram showing screen transition between the display state of the basic screen and the display state of the device control screen 502 performed in the case where the basic screen includes a plurality of device icons 501 representing the devices 200 of the same type. As shown in the left diagram of FIG. 27, the basic screen includes two device icons 501 for the television set. Here, the device icon 501 for a television set A is represented as a device icon 2401, and the device icon 501 for a television set B is represented as a device icon 2402. At this time, the user can intuitively select a television set that is desired to be controlled from the floor plan 500, and operate the television set.

For example, in the right diagram of FIG. 27, the device icon 2401 for the television set A is selected, and a device control screen 2403 for the television set A is displayed. Consequently, even if there are a plurality of device icons 501 for the devices 200 of the same type, each device icon 501 is disposed at a position on the floor plan 500 corresponding to the actual installation position. This allows the user to intuitively select the device icon 501 for a device 200 that is desired to be controlled in accordance with the display position on the floor plan 500, which prevents the device control screen 502 for another device 200 from being erroneously displayed.

Figure 28:
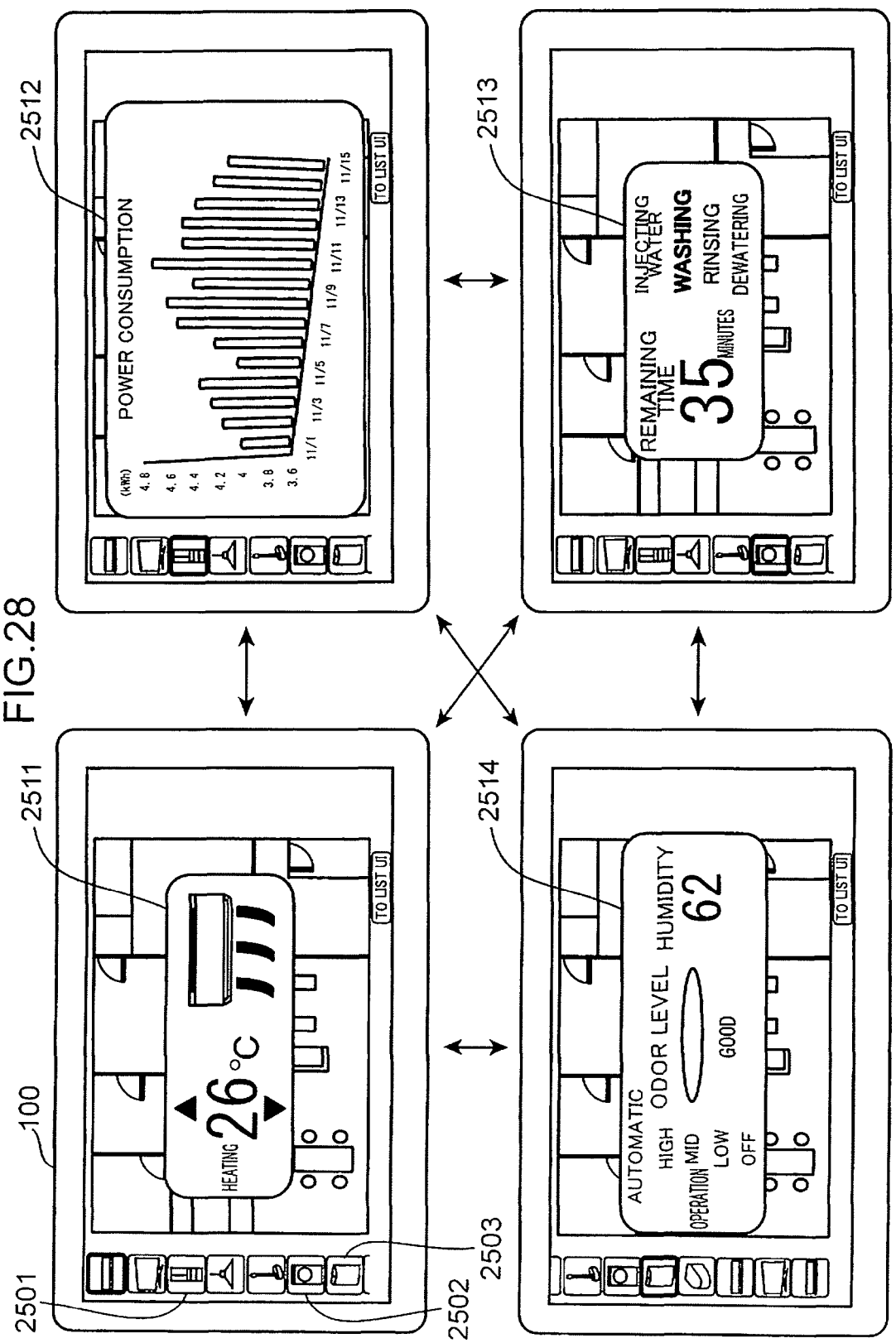
FIG. 28 is a diagram showing how the home controller successively transitions among the display states of the device control screens for different devices according to the embodiment of the present disclosure.

FIG. 28 is a diagram showing screen transition performed in the case where different device icons 501 are successively selected in the display state of the device control screen 502 to successively switch between the device control screens 502. In the upper left diagram, a device control screen 2511 for the air conditioner is displayed. When the device icon 2501 for the refrigerator is selected in this state, a device control screen 2512 for the refrigerator is displayed on the display 101 as shown in the upper right diagram. When the device icon 2502 for the washing machine is selected in the upper left diagram, a device control screen 2513 for the washing machine is displayed as shown in the lower right diagram. When the device icon 2503 for the air purifier is selected in the upper left diagram, a device control screen 2514 for the air purifier is displayed as shown in the lower left diagram. Such screen transition is performed in the same manner in the upper right diagram, the lower right diagram, and the lower left diagram.

Consequently, when the user selects the device icon 501 in the display state of the device control screen 502, the device control screen 502 corresponding to the device icon 501 can be directly displayed. Therefore, in the case where another device control screen 502 is to be displayed while a certain device control screen 502 is displayed, the other device control screen 502 can be displayed with one touch operation without inputting an operation of erasing the device control screen 502 being displayed. This allows the user to smoothly switch between the device control screens 502.

Figure 29:
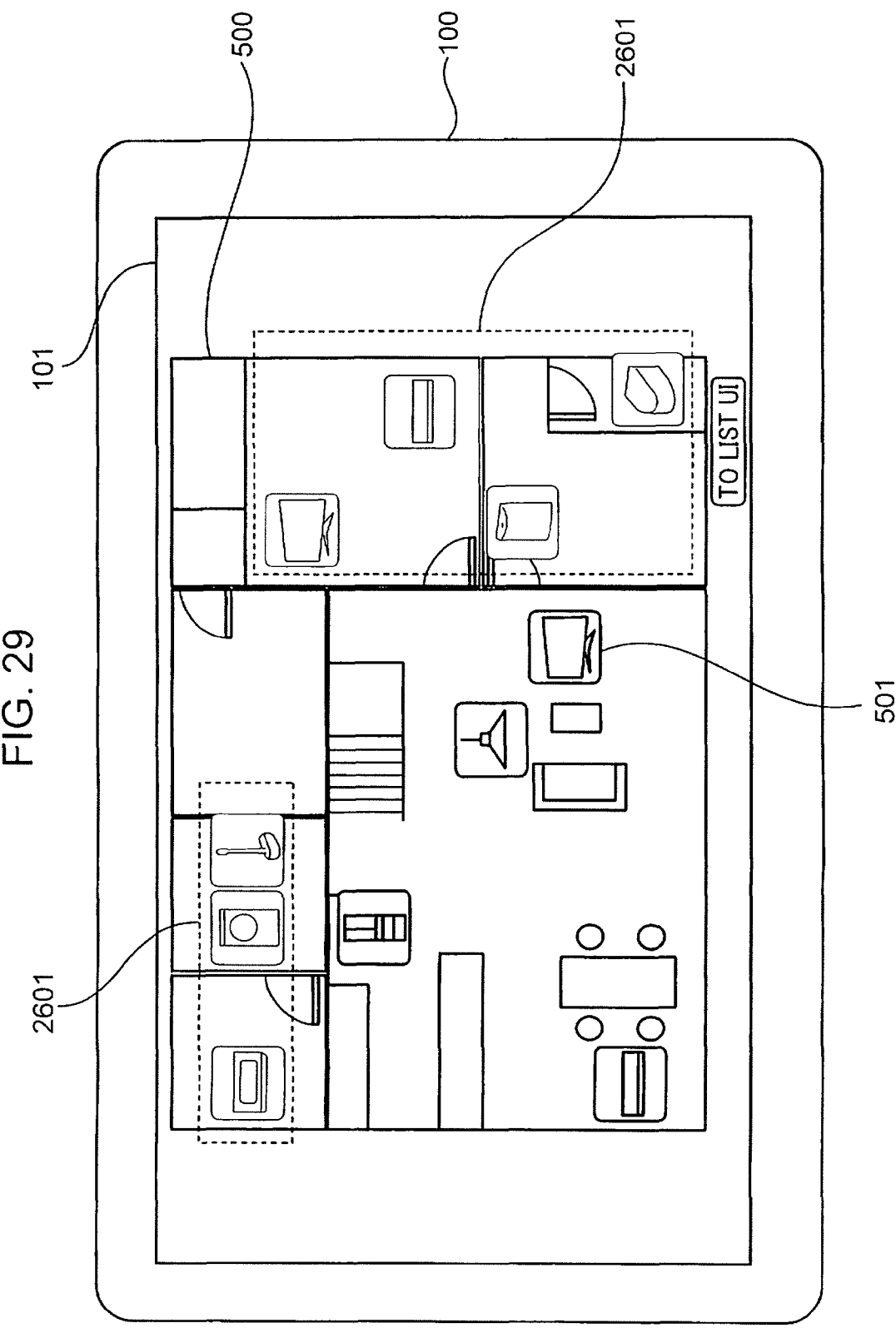
FIG. 29 is a diagram showing an example of display on the basic screen of devices that cannot be detected on a network according to the embodiment of the present disclosure.

FIG. 29 is a diagram showing an example of display on the basic screen of the device icons 501 for incommunicable devices 200 that cannot be detected on the network. The device management section 105 detects a device 200 that cannot be detected on the network and a device 200 that does not respond to a control command even though registered in the device list 3100 as incommunicable devices 200. Then, the display control section 103 displays the device icons 501 for the incommunicable devices 200 in a display mode that is different from that for the device icons 501 for communicable devices 200.

For example, in FIG. 29, the device icons 501 for the incommunicable devices 200 are represented as device icons 2601. The device icons 2601 are displayed translucently. This allows the user to immediately recognize that the devices 200 indicated by the device icons 2601 are currently out of order or cannot be controlled because of occurrence of a communication failure.

Although the device icons 2601 are displayed translucently in FIG. 29, the embodiment is not limited thereto. For example, the device icons 2601 may be displayed in a fainter color or more darkly than the other device icons 501, or provided with an annotation mark.

Figure 30:
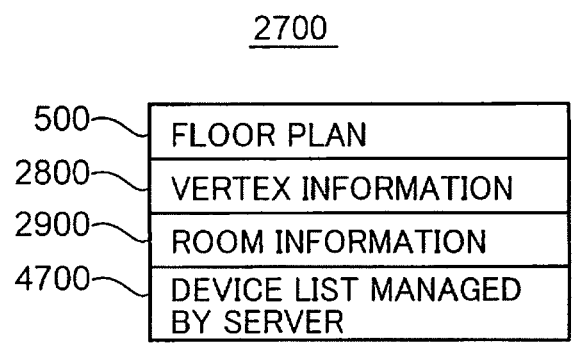
FIG. 30 is a diagram showing the configuration of home information according to the embodiment of the present disclosure.

FIG. 30 is a diagram showing the configuration of home information 2700. The home information 2700 is managed by the server 300 for each house, and the home controller 100 controls display on the basic screen, the device control screen 502, and so forth on the basis of the home information 2700. As shown in FIG. 30, the home information 2700 includes the floor plan 500, vertex information 2800, the room information 2900, and a device list 4700 managed by the server.

As shown in FIG. 6, the floor plan 500 is a plan view that is prepared for each floor of a house and that planarly represents the arrangement and the shape of one or more rooms forming the floor. In the embodiment, the floor plan 500 includes a plan view formed from image data represented in a bitmap format, for example.

The vertex information 2800 is information for adapting the floor plan 500 to a two-dimensional coordinate-axis space to allow the home controller 100 to interpret the floor plan 500. The room information 2900 is information for deciding the regions of rooms from the vertex information 2800. The vertex information 2800, the room information 2900, and the device list 4700 managed by the server will be described in detail below.

Figure 31:
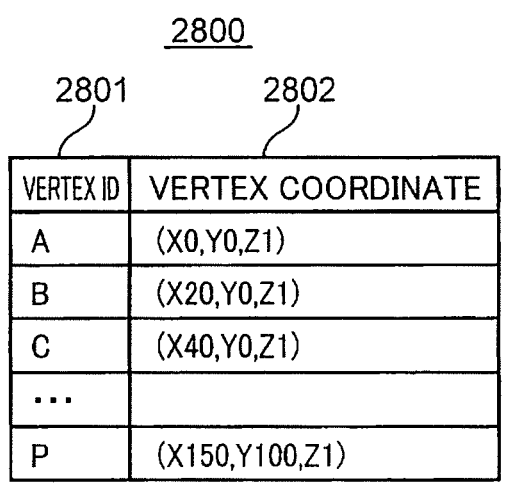
FIG. 31 is a diagram showing the configuration of vertex information according to the embodiment of the present disclosure.

FIG. 31 is a diagram showing the configuration of the vertex information 2800. As shown in FIG. 31, the vertex information 2800 includes a vertex ID 2801 and a vertex coordinate 2802. The vertex ID 2801 is an identifier that identifies a vertex on the floor plan 500. The vertex coordinate 2802 is a coordinate represented in the format of (X coordinate, Y coordinate, floor number), and indicates the position of a vertex of a partition line or the like represented on the floor plan 500. For example, the vertex with a vertex ID of B has a vertex coordinate (X20, Y0, Z1), which represents the position on the first floor (the ground floor) with an X coordinate of 20 and a Y coordinate of 0.

Figure 33:
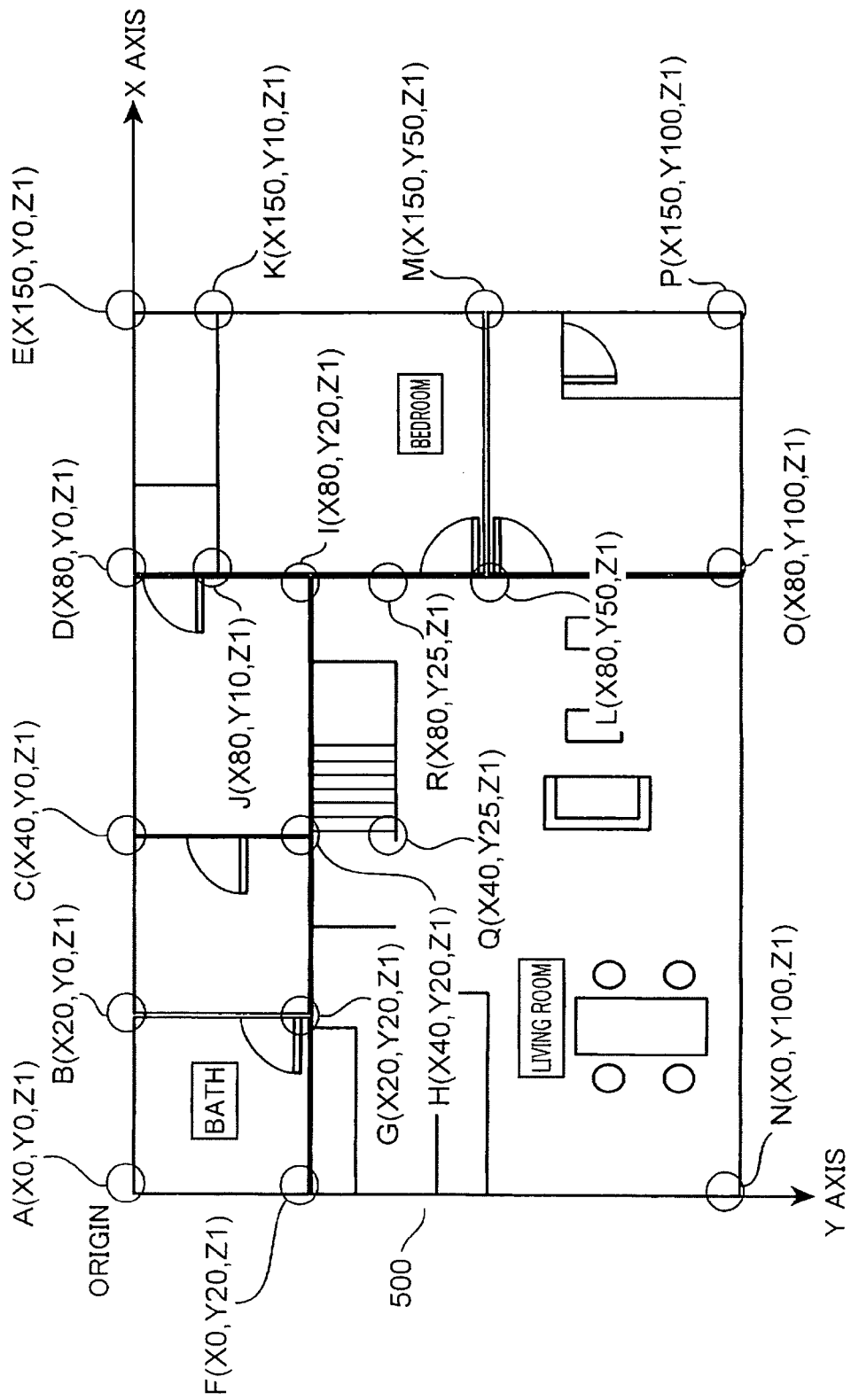
FIG. 33 is a diagram showing an example of the correspondence between the vertex information and the floor plan for the first floor according to the embodiment of the present disclosure.

FIG. 33 is a diagram showing the correlation between each vertex registered in the vertex information 2800 and the floor plan 500. It should be noted, however, that in FIG. 33, the upper left vertex of the floor plan 500 is the origin (with an X coordinate of 0 and a Y coordinate of 0). For example, the vertex with a vertex ID of A has a vertex coordinate (X0, Y0, Z1), and therefore is positioned at the origin. Meanwhile, the vertex with a vertex ID of B has a vertex coordinate (X20, Y0, Z1), and therefore is positioned at the upper right vertex of the bath.

FIG. 32 is a diagram showing the configuration of the room information 2900. As shown in FIG. 32, the room information 2900 includes a room ID 2901, the room type 2902, and a room coordinate 2903. The room ID 2901 is an identifier that identifies a room on the floor plan 500. The room type 2902 indicates the type of the room. The room coordinate 2903 is expressed by a set of the vertex IDs 2801, and decides the region of the room on the floor plan 500. For example, the room with a room ID of C is the bath, and indicates a region formed by connecting the vertexes with vertex IDs of A, B, G, and F sequentially in this order on the floor plan 500. The room information 2900 includes not only information on the rooms but also information on the staircase. The region with a room ID of D formed by connecting the vertexes with vertex IDs of H, I, R, and Q sequentially in this order represents the staircase.

Consequently, with the vertex information 2800 and the room information 2900 provided, the home controller 100 can specify the regions of the rooms represented on the floor plan 500 by plotting the vertexes indicated by the vertex information 2800 on the image data for the floor plan 500 and connecting the vertexes indicated by the room coordinate 2903, and recognize the type of the rooms from the room type 2902.

The vertex information 2800 may be generated by a system administrator by causing the floor plan 500 to be displayed on a display of a personal computer, detecting vertexes from the displayed floor plan, and inputting the vertex ID and the vertex coordinate of the detected vertexes to the personal computer. The vertex information 2900 may also be generated by the system administrator by detecting rooms from the floor plan displayed on a display, and inputting the room ID, the room type, and the room coordinate of the detected rooms to a personal computer. Alternatively, the vertex information 2800 and the room information 2900 may be generated by taking in CAD data which are the original data for the floor plan 500.

FIG. 34 is a diagram showing the configuration of the device list 4700 managed by the server 300. As shown in FIG. 34, the device list 4700 includes a device ID 4701, a device type 4702, a model number 4703, an arrangement 4704, a capability information 4705, and a control command transmission destination 4706.

The device ID 4701 is the identifier of the device 200. The device type 4702 indicates the type of the device 200. The model number 4703 indicates the model number of the device 200. The arrangement 4704 is a coordinate represented in the format of (X coordinate, Y coordinate, floor number) as with the vertex coordinate 2802, and indicates the arrangement of the device icon 501 corresponding to the device 200 on the floor plan 500.

The display control section 103 can dispose the device icon 501 on the floor plan 500 on the basis of the arrangement 4704, and display the basic screen and so forth. The capability information 4705 indicates the content for control of the device 200 and the state that can be acquired from the device 200. For example, the air conditioner with a device ID of A can be controlled for the temperature, the air flow direction, and the air flow amount. The control command transmission destination 4706 indicates the transmission destination of a control command for controlling the device 200. For example, the control command transmission destination 4706 for the air conditioner with a device ID of A is the device, and therefore a control command is directly transmitted from the home controller 100 to the device 200. Meanwhile, the control command transmission destination 4706 for the refrigerator with a device ID of C is the server, and therefore a control command is transmitted from the home controller 100 to the device 200 via the server 300. The control command is a command for operating the device 200 or confirming the state of the device 200.

The current state of the device 200 may be registered in the device list 4700. This allows the server 300 to notify the home controller 100 of the state of the relevant device 200 in the case where a request for confirmation of the state of the device 200 is made from the home controller 100.

As discussed above, in order to dispose the device icon 501 on the floor plan 500 on the basis of the actual arrangement of the device 200 within the house, the user moves the device icon 501 to an appropriate position on the floor plan 500. Thus, for the device icon 501 of which the arrangement on the floor plan 500 is not specified by the user, a value that indicates an unset arrangement such as (0, 0, 0) is set as the value of the arrangement 4704. The display control section 103 displays the device icon 501 with the arrangement 4704 unset at a position on the display 101 determined in advance.

The device list 4700 managed by the server may be omitted from the home information 2700. In this case, the home controller 100 may directly acquire from the device 200 information corresponding to the device type 4702, the model number 4703, and the capability information 4705 provided in the device list 4700 managed by the server.

FIG. 35 is a diagram showing the configuration of the device list 3100 managed by the home controller 100. The home controller 100 disposes the device icons 501 on the floor plan 500 in the basic screen and controls the devices 200 on the basis of information in the device list 3100.

The device list 3100 includes the device ID 3101, the device type 3102, a model number 3103, the arrangement 3104, capability information 3105, a control command transmission destination 3106, and an IP address 3107. The device ID 3101 to the control command transmission destination 3106 are the same in content as those with the same name in FIG. 34.

In the device list 3100, the content of the device type 3102, the model number 3103, the arrangement 3104, the capability information 3105, the control command transmission destination 3106 can be acquired by the device management section 105 by transmitting the device list 4700 from the server 300. The IP address 3107 is acquired from the device 200 by the device management section 105. It should be noted, however, that the device management section 105 may give priority to the content of the device type 3102, the model number 3103, the capability information 3105, and the control command transmission destination 3106 that can be directly acquired from the device 200 in the case where such content is available.

The control command transmission destination 3106 may be determined in advance by the home controller system, may be automatically decided on the basis of the state of the network to which the home controller 100 is connected, or may be set by the user, rather than being acquired from the server 300 or the device 200.

Next, the flow of control performed on the device 200 by the home controller 100 will be described using the drawings.

Figure 36:
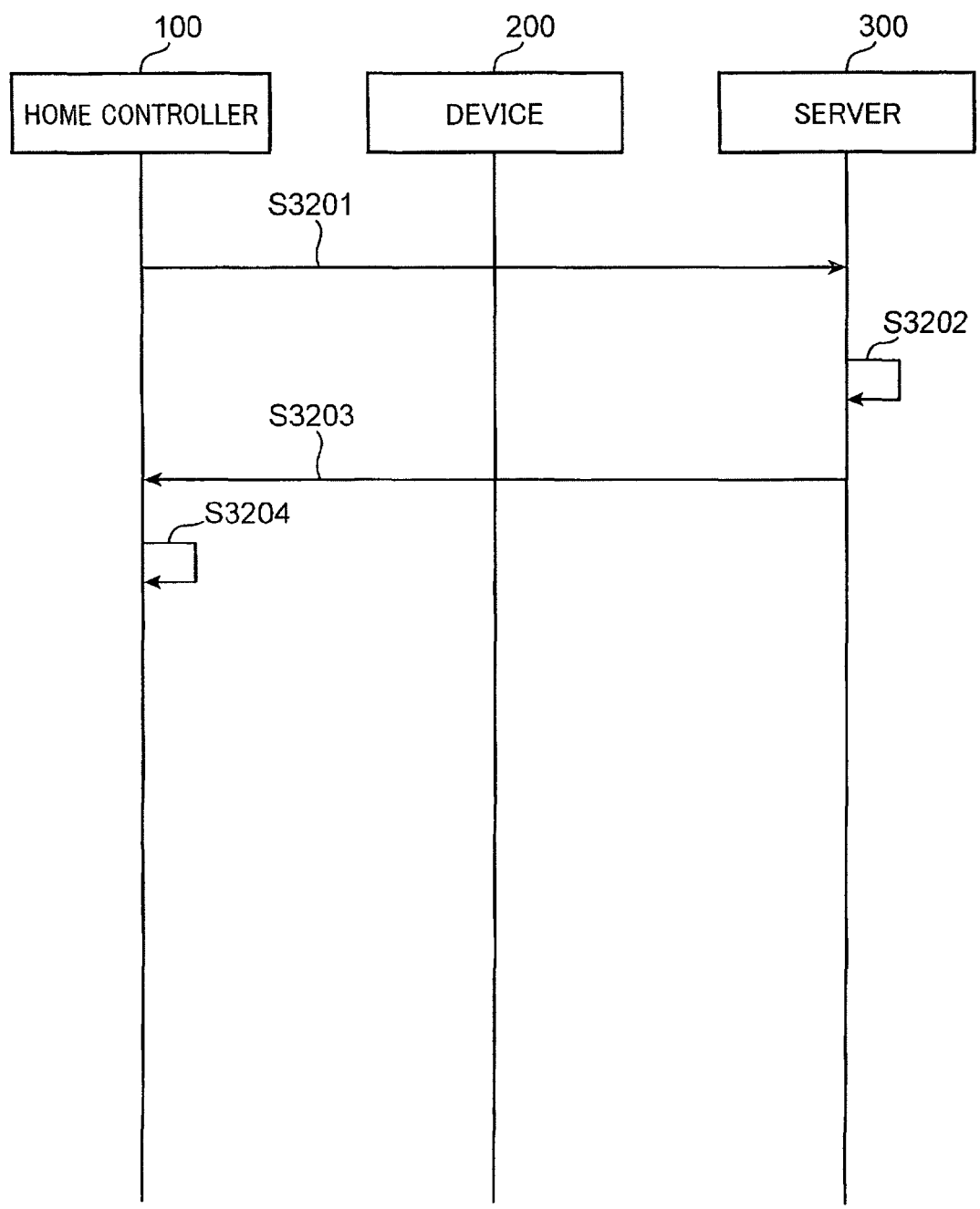
FIG. 36 is a sequence diagram showing the flow of a process for the home controller to acquire the home information from the server according to the embodiment of the present disclosure.

FIG. 36 is a sequence diagram showing the flow of a process for the home controller 100 to acquire the home information 2700 from the server 300. The home controller 100 acquires the home information 2700 from the server 300 at desired timing such as when the home controller 100 is initially utilized or started, and generates the basic screen shown in FIG. 5 on the basis of the acquired home information 2700.

First, the device management section 105 of the home controller 100 transmits a home information request to the server 300 (S3201). Here, the home information request includes at least a home controller ID that indicates a user or a home that utilizes the home controller 100. The home information management section 301 of the server 300 which receives the home information request searches the storage section 304 for the home information 2700 corresponding to the home controller ID (S3202), and transmits the home information 2700 to the home controller 100 (S3203). The device management section 105 of the home controller 100 stores the home information 2700 received from the server 300 in the storage section 104, and the display control section 103 generates a basic screen on the basis of the home information 2700, and displays the basic screen on the display 101 (S3204).

Next, the flow of a process for the home controller 100 to detect the device 200 on the network after the home controller 100 is connected to the network will be described using FIG. 37.

Figure 37:
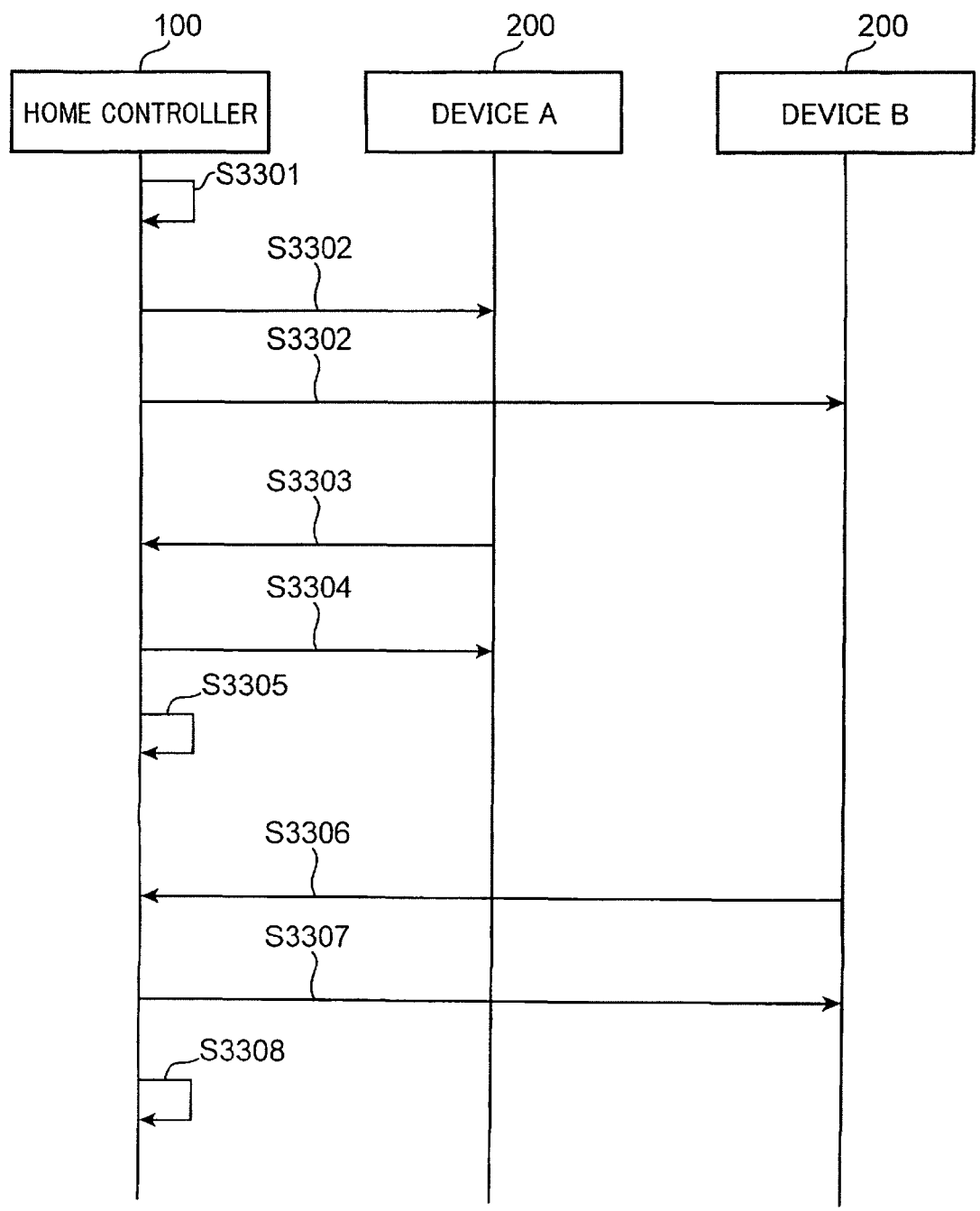
FIG. 37 is a sequence diagram showing the flow of a process for the home controller to detect a device on a network when the home controller is connected to the network according to the embodiment of the present disclosure.

In FIG. 37, a device A 200 with a device ID of A and a device B 200 of a device ID of B shown in FIG. 31 are connected to the network.

When the home controller 100 is connected to the network when the home controller 100 is initially utilized or turned on (S3301), the device management section 105 of the home controller 100 broadcasts a device search request to all the devices 200 on the network (S3302). The device A 200 which receives the device search request returns a device search response to the home controller 100 (S3303). The home controller 100 which receives the device search response acquires device information from the device A 200 (S3304), and updates the display screen (S3305).

Similarly, the device B 200 which receives the device search request returns a device search response to the home controller 100 (S3306). The home controller 100 which receives the device search response acquires device information from the device B 200 (S3307), and updates the display screen (S3308). Here, the device information is information that represents the device type, the model number, the capability information, and so forth of the device 200. The device management section 105 of the home controller 100 generates the device list 3100 (see FIG. 35) on the basis of the device information.

Figure 38:
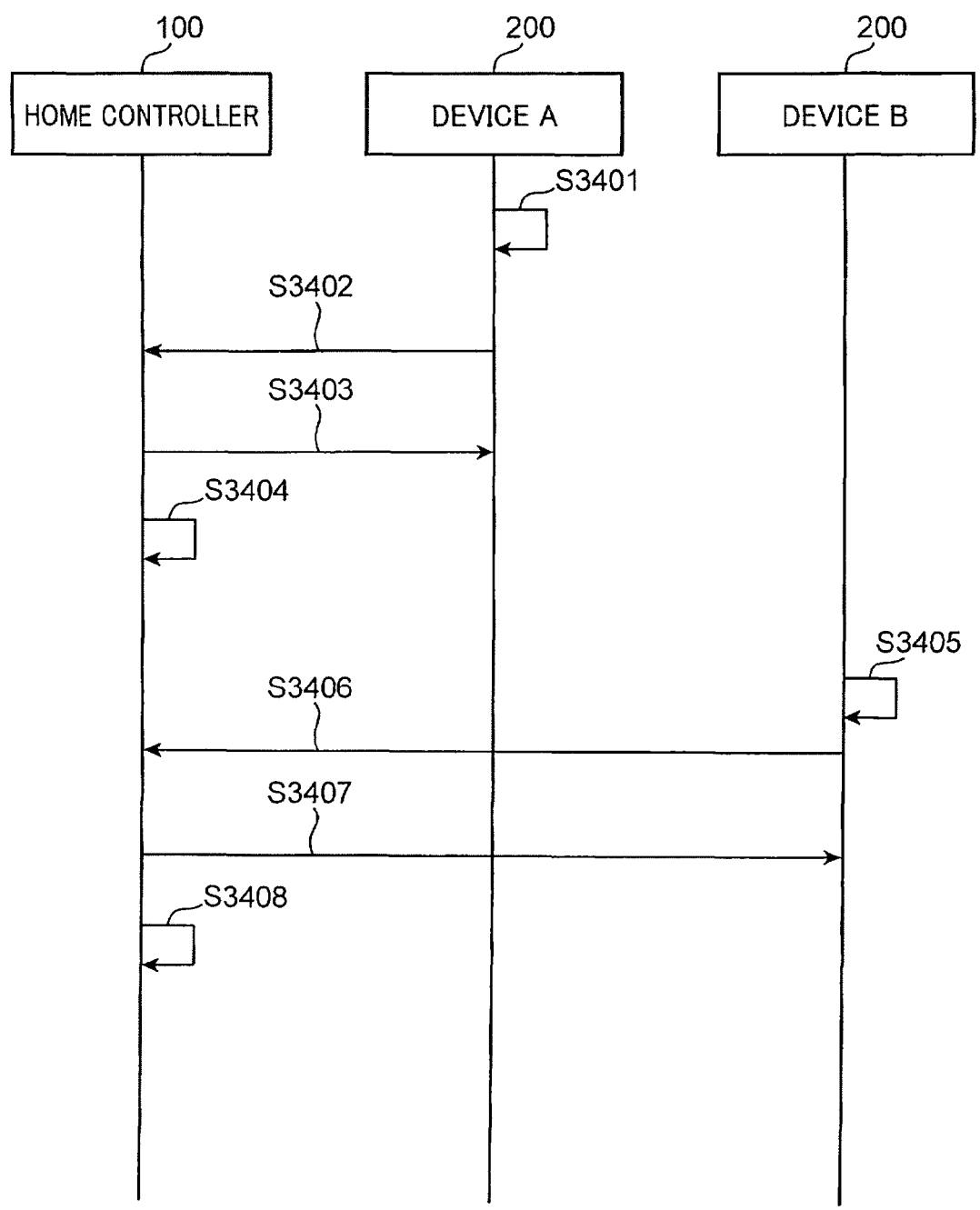
FIG. 38 is a sequence diagram showing the flow of a process for the home controller to detect a device on a network when the device is connected to the network according to the embodiment of the present disclosure.

Next, the flow of a process for the home controller 100 to detect the device 200 on the network when the device 200 is connected to the network will be described using FIG. 38. When the device A 200 is connected to the network when the device A 200 is initially utilized or turned on (S3401), a network connection notification is broadcast to all the home controllers 100 on the network (S3402). In the home controller 100 which receives the network connection notification, the device management section 105 acquires device information from the device A 200 (S3403), and the display control section 103 updates the display screen (S3404).

When the device B 200 is connected to the network, the same process as for the device A 200 is performed (S3405 to S3408).

Here, the update of the display screen of the home controller 100 in FIGS. 37 and 38 (S3305, S3308, S3404, and S3408) will be described. The home controller 100 hides the device icon 501 corresponding to the device 200 until the device search response or the network connection notification is received from the device 200, that is, until the device 200 is detected on the network. Then, the home controller 100 which receives the device search response displays the device icon 501 for the corresponding device 200 on the screen. Alternatively, the home controller 100 displays the device icon 501 for the undetected device 200 in a faint color (for example, translucently) compared to the device icon 501 for the detected device 200. Then, the home controller 100 which receives the device search response changes the color of the device icon 501 for the undetected device 200 to the same color as the color of the device icon 501 for the detected device 200.

Figure 39A:
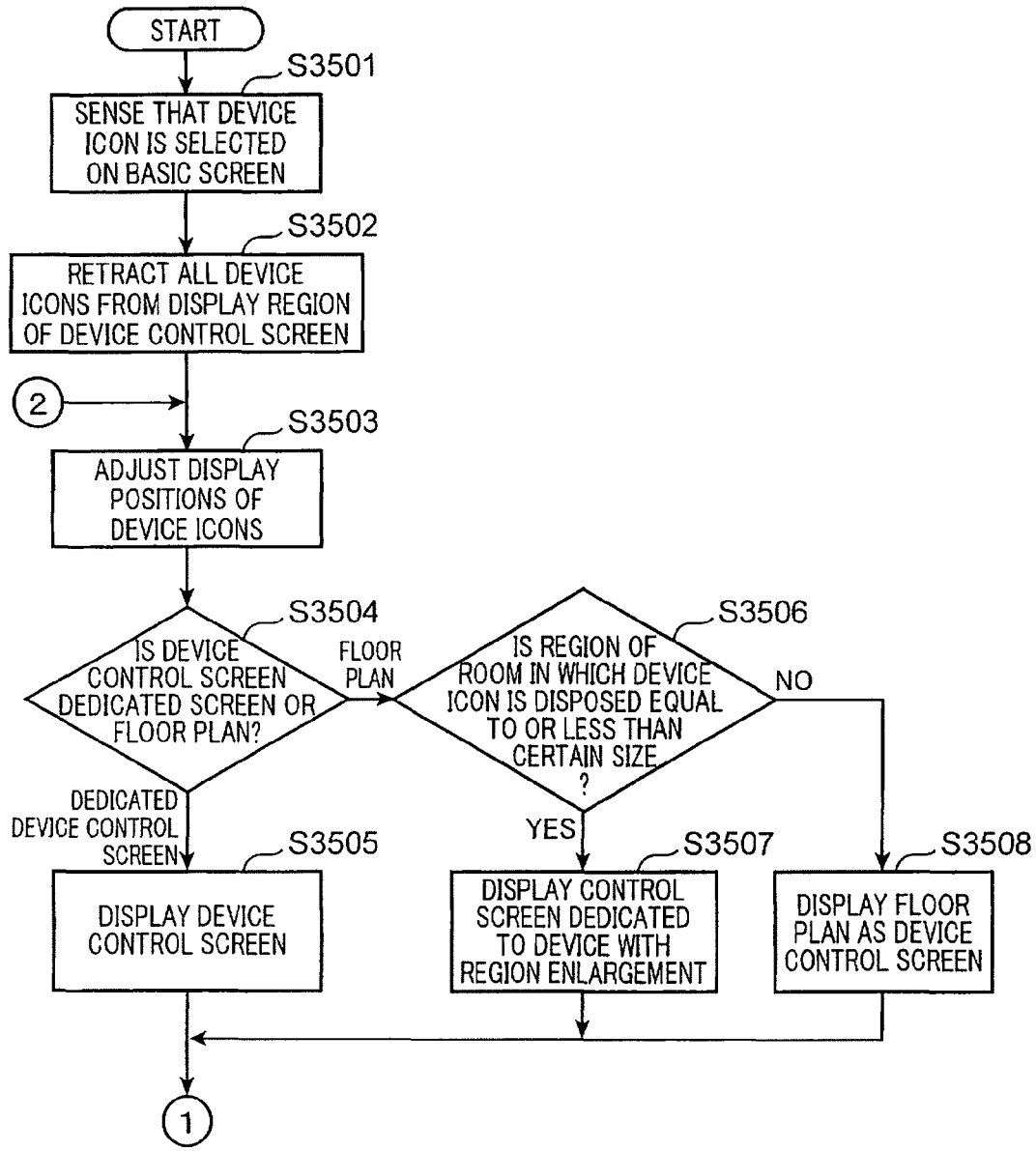
FIG. 39A is a flowchart showing the flow of a process for the home controller to control a device according to the embodiment of the present disclosure.
Figure 39B:
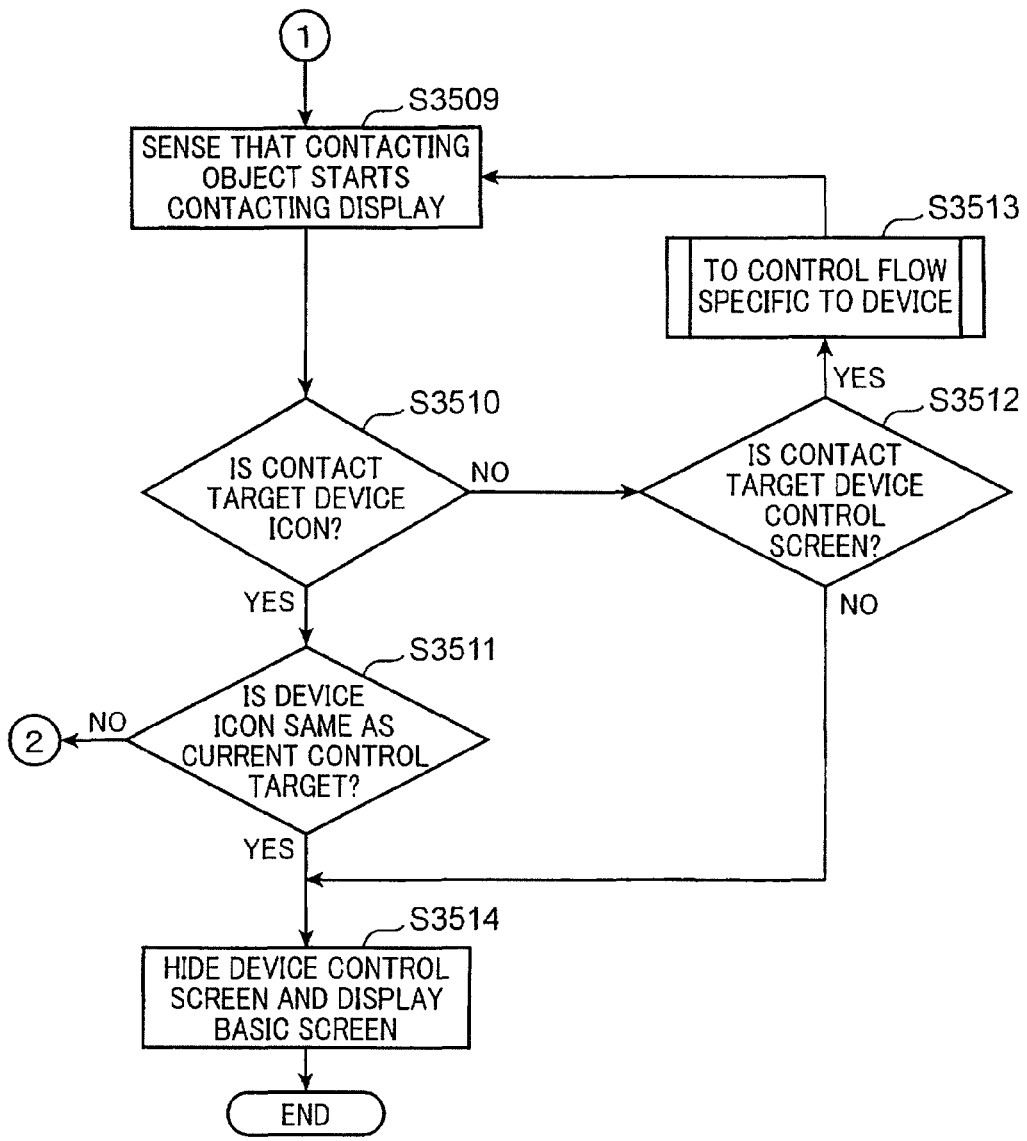
FIG. 39B is a flowchart showing the flow of a process for the home controller to control a device according to the embodiment of the present disclosure.

FIGS. 39A and 39B are each a flowchart showing the flow of a process for the home controller 100 to control the device 200 according to the present disclosure.

First, the touch panel control section 102 senses that the device icon 501 representing a certain device 200 is selected by the user on the basic screen (S3501). Next, the display control section 103 retracts all the device icons 501 out of the display region of the device control screen 502 (S3502). In this case, the device icons 501 are retracted as shown in FIGS. 11 and 13.

Next, the display control section 103 adjusts the display positions of the retracted device icons 501 (S3503). For example, the selected device icons 501 are adjusted so as to be displayed at particular positions as shown in FIGS. 12 and 14.

Next, the display control section 103 judges whether the device control screen 502 corresponding to the device icon 501 selected by the user is a dedicated screen or a floor plan (S3504).

Here, the device control screen 502 which is a dedicated screen refers to the device control screen 502 prepared separately from the floor plan and displayed as overlapped on the floor plan as shown in FIG. 13. On the other hand, the device control screen 502 which is a floor plan refers to the device control screen 502 which is the floor plan itself.

For example, if the illumination device can be turned on and off or adjusted for the brightness by the user by directly tapping on the region of a room on the floor plan in which the illumination device is disposed, the illumination device can be operated with presence. In the case where the user attempts to operate a plurality of illumination devices installed in the living room at the same time, meanwhile, the entire screen is covered by the device control screens 502 dedicated to the illumination devices if the device control screens 502 dedicated to the individual illumination devices are displayed on the floor plan at the same time, which lowers the viewability.

Thus, in the following description, it is assumed that the device control screen 502 for the illumination device is a floor plan. Specifically, when the user selects the device icon 501 for the illumination device installed in a certain room in the basic screen, all the device icons 501 are retracted out of the display region of the floor plan, and the floor plan becomes ready to receive an operation for the illumination device in the room. Then, when the user taps on the region of the room on the floor plan in which the selected illumination device is installed, one or more illumination devices within the room can be operated at the same time.

For example, when the user taps on the region of a room with the illumination devices in the room turned off, one or more illumination devices in the room are turned on at the same time. Next, when the user taps on the region, the one or more illumination devices are turned off at the same time.

In the case where the device control screen 502 is a floor plan in S3504, and if the region of the room in which the device icon 501 is disposed is equal to or less than a certain size (YES in S3506), the display control section 103 causes the device control screen 502 dedicated to the device in which the region of the room is displayed as enlarged to be displayed as overlapped on the floor plan (S3507). Here, for example, a floor plan formed by clipping the floor plan of the relevant room from the floor plan for the entire floor and enlarging the clipped floor plan is displayed as overlapped on the floor plan for the entire floor.

If the region of the room in which the device icon 501 is disposed is not equal to or less than the certain size (NO in S3506), on the other hand, the display control section 103 displays the floor plan as the device control screen 502 (S3508).

Information as to whether a dedicated screen or a floor plan is adopted as the device control screen 502 for each device 200 is stored in advance in the storage section 104. Thus, the display control section 103 may reference the information to determine whether the device control screen 502 is a dedicated screen or a floor plan.

In addition, the display control section 103 may calculate the size of the relevant room by specifying the vertexes of the relevant room from the room information 2900, specifying the coordinates of the specified vertexes from the vertex information 2800, and calculating the area of a region surrounded by the specified coordinates of the vertexes. Then, the result of determination in S3506 may be NO if the size of the room is not equal to or less than the certain size determined in advance, and the result of determination in S3506 may be YES if the size of the room is equal to or less than the certain size.

In the case where the device control screen 502 is a dedicated screen in S3504, on the other hand, the display control section 103 displays the dedicated screen as overlapped on the floor plan (S3505).

In S3509, the touch panel control section 102 senses that a contacting object (here, a finger of the user) starts contacting the display 101.

Next, the touch panel control section 102 determines whether or not the contact target is the device icon 501 (S3510).

If it is determined that the device icon 501 is contacted (YES in S3510), the touch panel control section 102 determines whether or not the contacting object contacts the same device icon 501 as the device icon 501 selected in S3501 (S3511). In the case where it is determined that the contacting object contacts the same device icon 501 as the device icon 501 selected in S3501 (YES in S3511), the display control section 103 hides the device control screen 502 being displayed to display the basic screen (S3514).

In the case where the touch panel control section 102 determines that the device icon 501 is not contacted (NO in S3510), the touch panel control section 102 further determines whether or not the contact target is the device control screen 502 (S3512). In the case where it is determined that the contact target is not the device control screen 502 (NO in S3512), the display control section 103 hides the device control screen 502 being displayed, and the basic screen is displayed (S3514).

If the touch panel control section 102 determines that the contacting object contacts a button or the like within the device control screen 502 (YES in S3512), on the other hand, the process is advanced to S3513, where a control flow that is specific to the device is executed (S3513).

Figure 40:
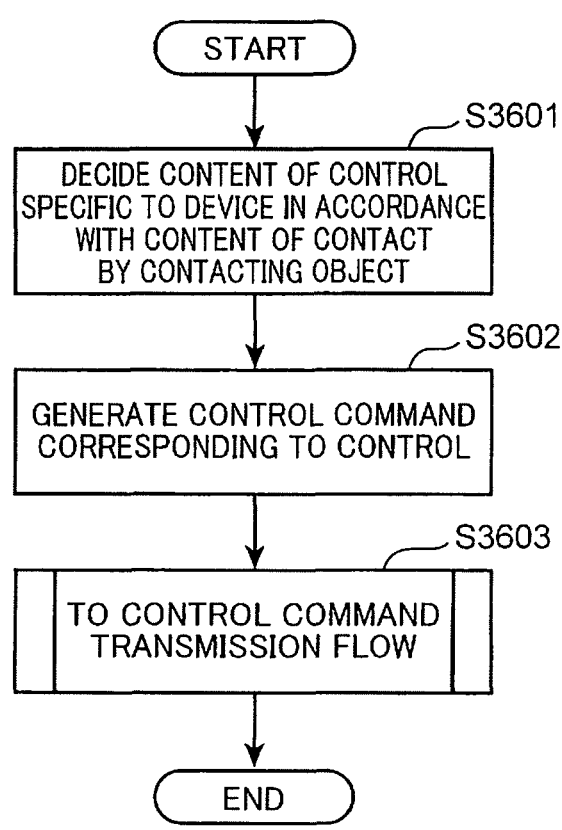
FIG. 40 is a flowchart showing the flow of a process for the home controller to generate a control command for a device in accordance with the content of a contact by a contacting object according to the embodiment of the present disclosure.

Next, the control flow that is specific to the device executed in S3513 will be described in detail using FIG. 40. First, the device control section 106 decides the content of control that is specific to the device in accordance with the content of a contact by the contacting object (S3601). Next, the device control section 106 generates a control command according to the content of control (S3602). It is assumed that the user taps on the button for raising the temperature with the device control screen 502 for the air conditioner displayed as shown in FIG. 11 and the touch panel control section 102 senses the tap. Then, the device control section 106 generates a control command for raising the temperature of the air conditioner. Next, the device control section 106 advances the process to S3603, where a control command transmission flow is executed.

Figure 41:
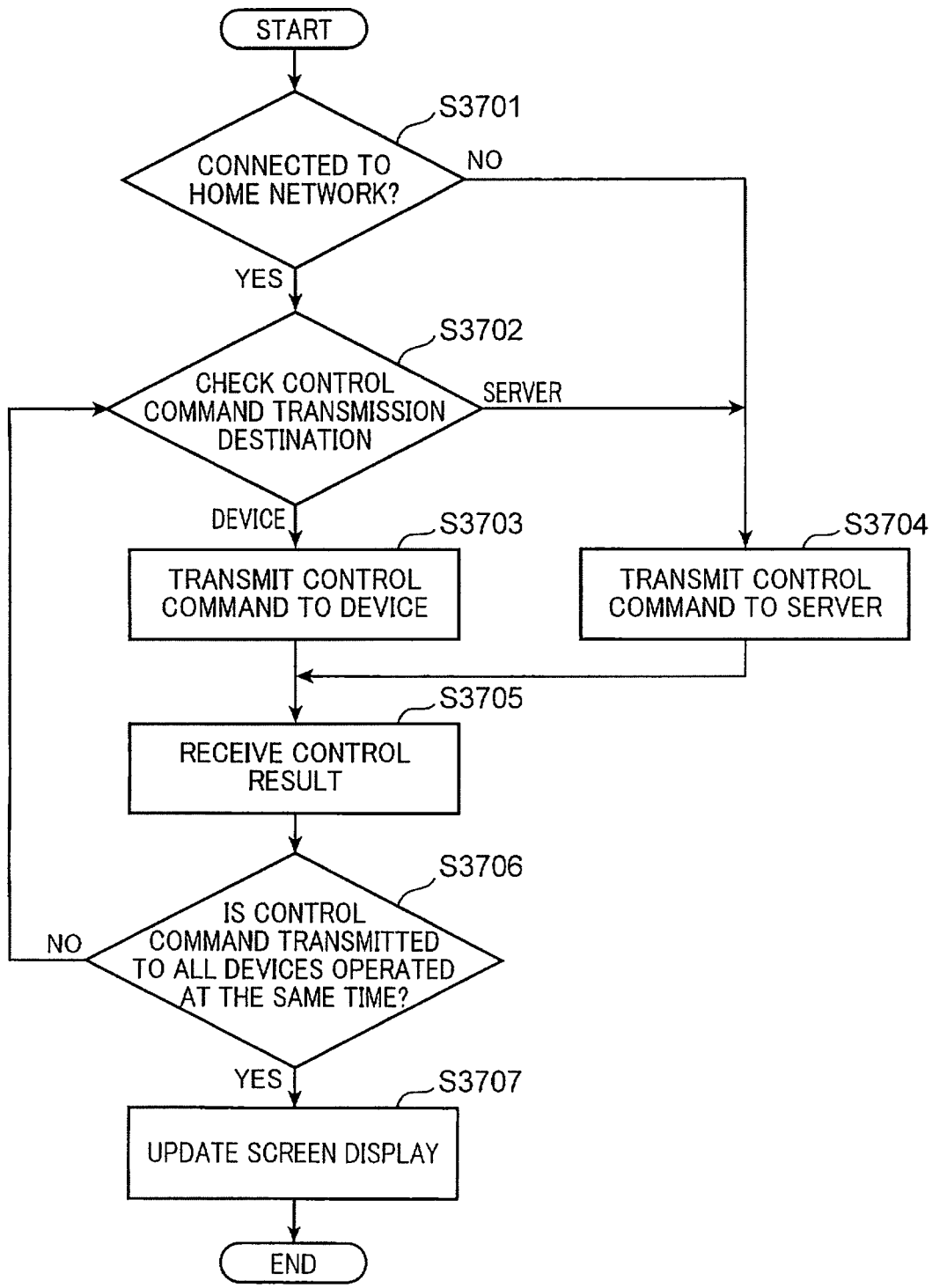
FIG. 41 is a flowchart showing the flow of a process for the home controller to transmit a control command according to the embodiment of the present disclosure.

Next, the control command transmission flow executed in S3603 will be described in detail using FIG. 41. First, the device control section 106 determines whether or not the home controller 100 is connected to the home network (S3701). If the home controller 100 is connected to the home controller (YES in S3701), the device control section 106 checks the transmission destination of a control command in accordance with the content of the control command transmission destination 3106 of the device list 3100 (S3702). Here, the home network is a network provided within the home of the user. Thus, the result of determination in S3701 is NO if the user operates the home controller 100 from a location away from the home, and the result of determination in S3701 is YES if the user operates the home controller 100 from a location within the home.

If the transmission destination of a control command is "DEVICE" in S3702, the device control section 106 transmits a control command to the relevant device 200 (S3703). If the transmission destination of a control command is "SERVER" in S3702, on the other hand, the device control section 106 transmits a control command to the server 300 (S3704).

For example, in the device list 3100, the control command transmission destination 3106 of the air conditioner is "DEVICE", and therefore the device control section 106 transmits a control command to the air conditioner. On the other hand, in the device list 3100, the control command transmission destination 3106 of the refrigerator is "SERVER", and therefore the device control section 106 transmits a control command to the server 300.

Meanwhile, in the case where it is judged in S3701 that the home controller 100 is not connected to the home network (NO in S3701), the process in S3704 is performed.

In S3705, the device control section 106 receives the control result from the device 200. Next, in the case where transmission of a control command to all the devices 200 that are operated at the same time is completed (YES in S3706), the device control section 106 advances the process to S3707. In the case where transmission of a control command to all the devices 200 that are operated at the same time is not completed (NO in S3706), on the other hand, the device control section 106 returns the process to S3702, and repeats the processes in and after S3702.

For example, in the case where two illumination devices are installed in the same room and the two illumination devices are set in advance to be operated at the same time, the device control section 106 transmits a control command to each of the two illumination devices. The result of determination in S3706 is NO for devices 200 that are not operated at the same time as other devices 200.

Next, the display control section 103 updates the screen displayed on the display 101 (S3707). For example, if the set temperature of the air conditioner is changed, the device control screen 502 is updated such that the temperature display is flashed on and off, for example, until the set temperature of the air conditioner is changed by a control command and the temperature display stops flashing when the set temperature of the air conditioner is changed by a control command. In the example of the illumination device, the screen is updated such that the region on the floor plan of a room in which the illumination device is installed becomes brighter than other regions in the case where the illumination device is turned on.

Figure 42:
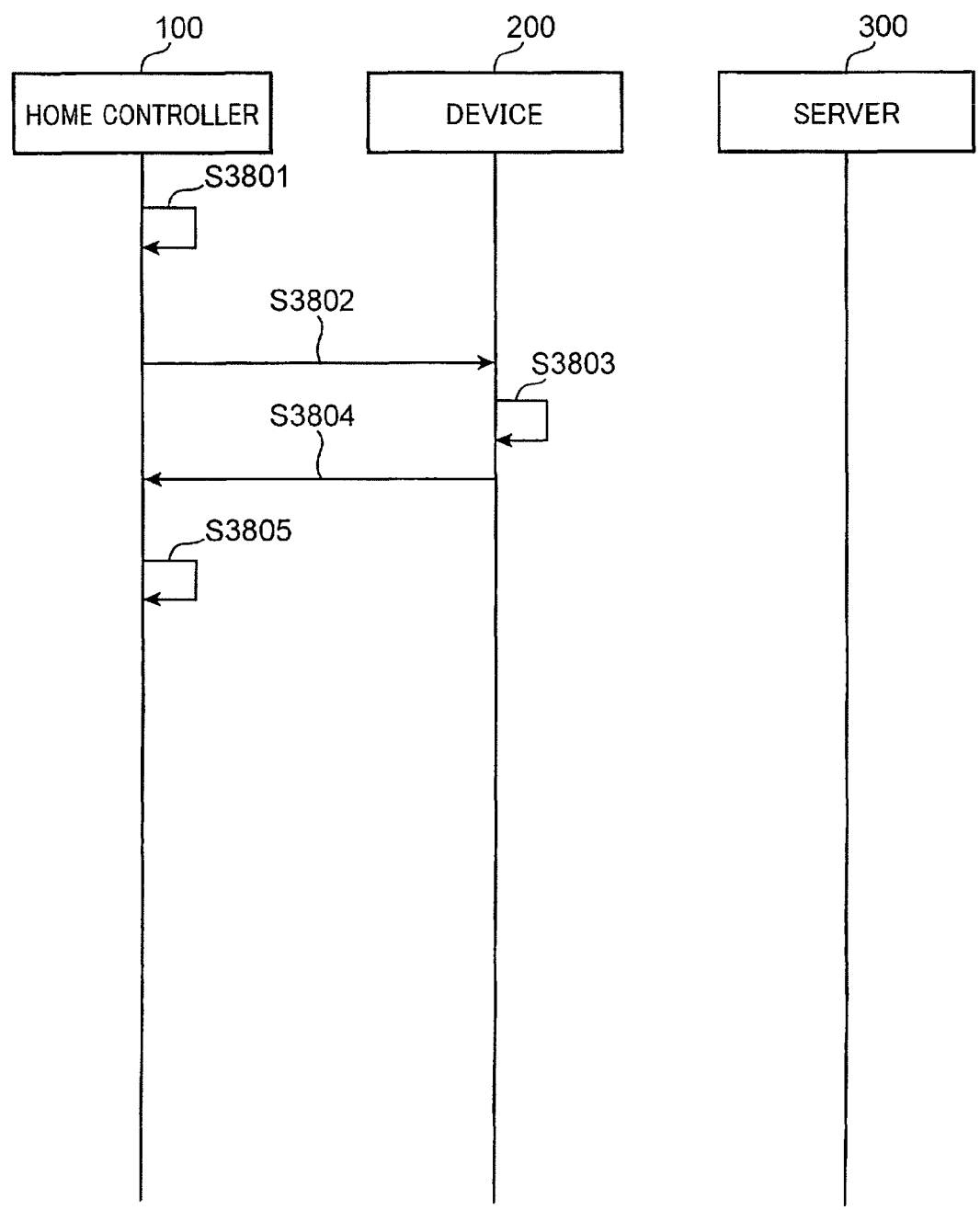
FIG. 42 is a sequence diagram showing the flow of a process for the home controller to directly control a device according to the embodiment of the present disclosure.

Next, the flow of a process for the home controller 100 to directly control the device 200 will be described using FIG. 42. First, the touch panel control section 102 of the home controller 100 senses a user operation on the device control screen 502 (S3801). Next, the device control section 106 of the home controller 100 generates a control command according to the user operation, and transmits the control command to the device 200 (S3802).

The device 200 which receives the control command executes the control command (S3803), and transmits the control result to the home controller 100 (S3804). The display control section 103 of the home controller 100 which receives the control result updates the display screen in accordance with the control result (S3805).

Figure 43:
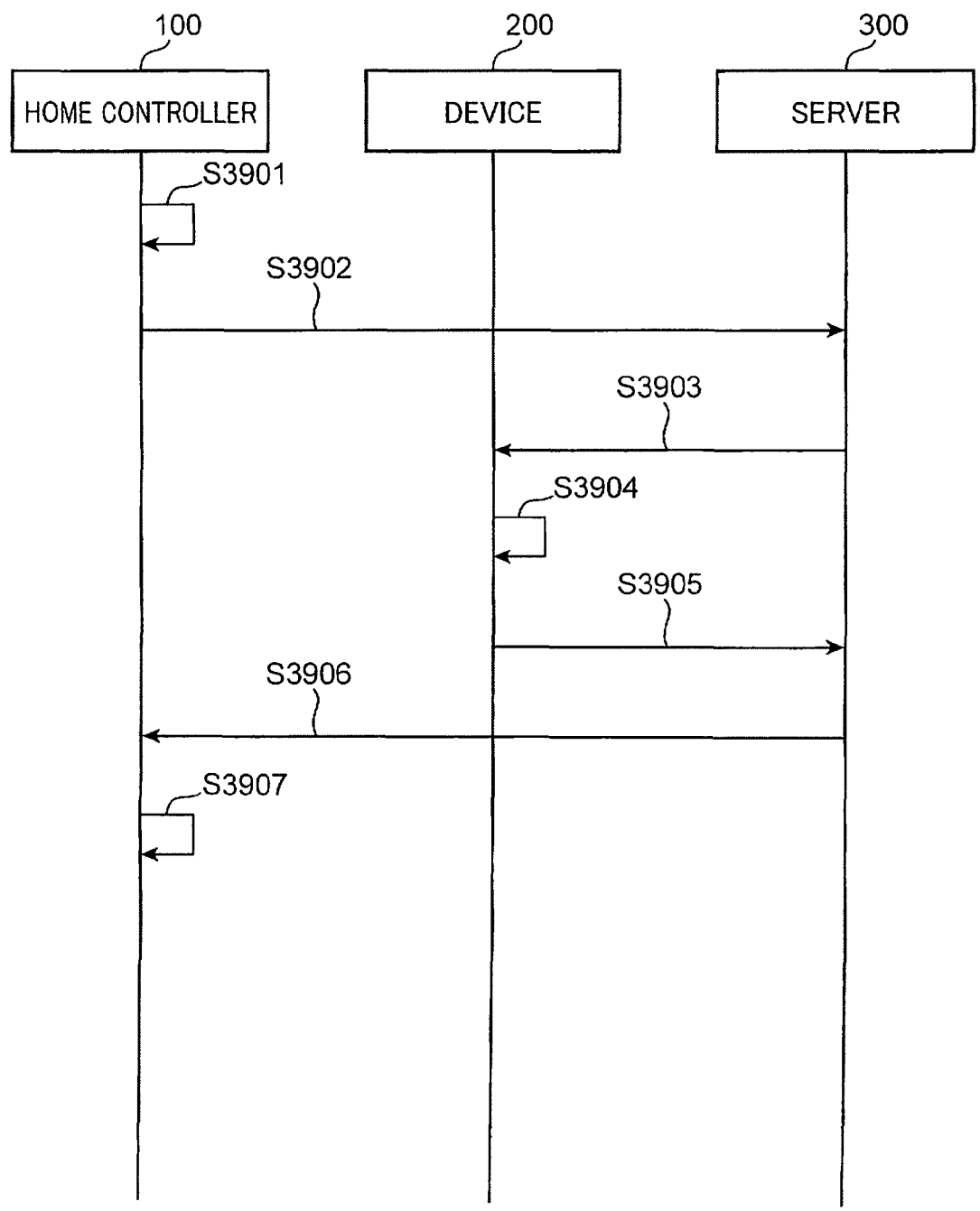
FIG. 43 is a sequence diagram showing the flow of a process for the home controller to control a device by way of the server according to the embodiment of the present disclosure.

Next, the flow of a process for the home controller 100 to control the device 200 by way of the server 300 will be described using FIG. 43. First, the touch panel control section 102 of the home controller 100 senses a user operation on the device control screen 502 (S3901). Next, the device control section 106 of the home controller 100 generates a control command according to the user operation, and transmits the control command to the server 300 (S3902).

The server 300 which receives the control command transmits the relevant control command to the device 200 (S3903). The device 200 which receives the control command executes the control command (S3904), and transmits the control result to the server 300 (S3905). The server 300 which receives the control result transmits the control result to the home controller 100 (S3906). The display control section 103 of the home controller 100 which receives the control result updates the display screen in accordance with the control result (S3907).

Figure 44:
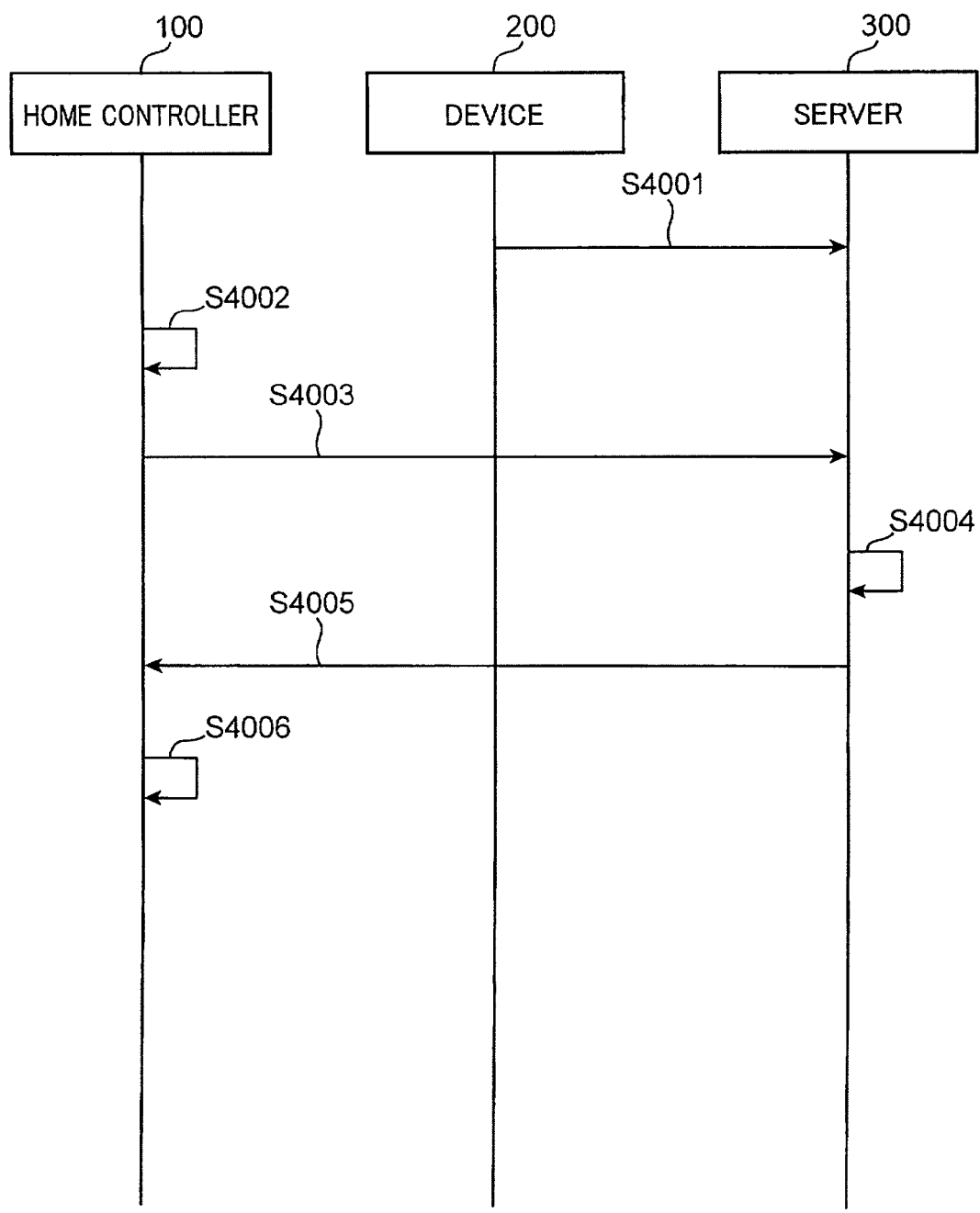
FIG. 44 is a sequence diagram showing the flow of a process for the home controller to acquire the state of a device from the server according to the embodiment of the present disclosure.

Next, the flow of a process for the home controller 100 to confirm the device state of the device 200 by way of the server 300 will be described using FIG. 44. First, the device 200 transmits the current device state to the server 300 (S4001). Here, the device 200 transmits the device state to the server 300 when the device 200 is turned on, when the device 200 is turned off, when the device state is changed, or regularly to cause the server 300 to store the device state. The process in S4001 may be executed asynchronously with the processes in S4002 to S4006.

Next, the touch panel control section 102 of the home controller 100 senses a user operation on the device control screen 502 (S4002). Next, the device control section 106 of the home controller 100 generates a control command according to the user operation, and transmits the control command to the server 300 (S4003). Here, a control command for confirming the device state of the device 200 is generated.

The server 300 which receives the control command searches for the current device state of the relevant device 200 (S4004), and transmits the device state of the relevant device 200 to the home controller 100 as the control result (S4005). The display control section 103 of the home controller 100 which receives the control result updates the display screen in accordance with the control result (S4006). For example, if the device control screen 502 for the device 200 is displayed on the display 101, the content of the device control screen 502 for the device 200 is updated in accordance with the control result.

Figure 45:
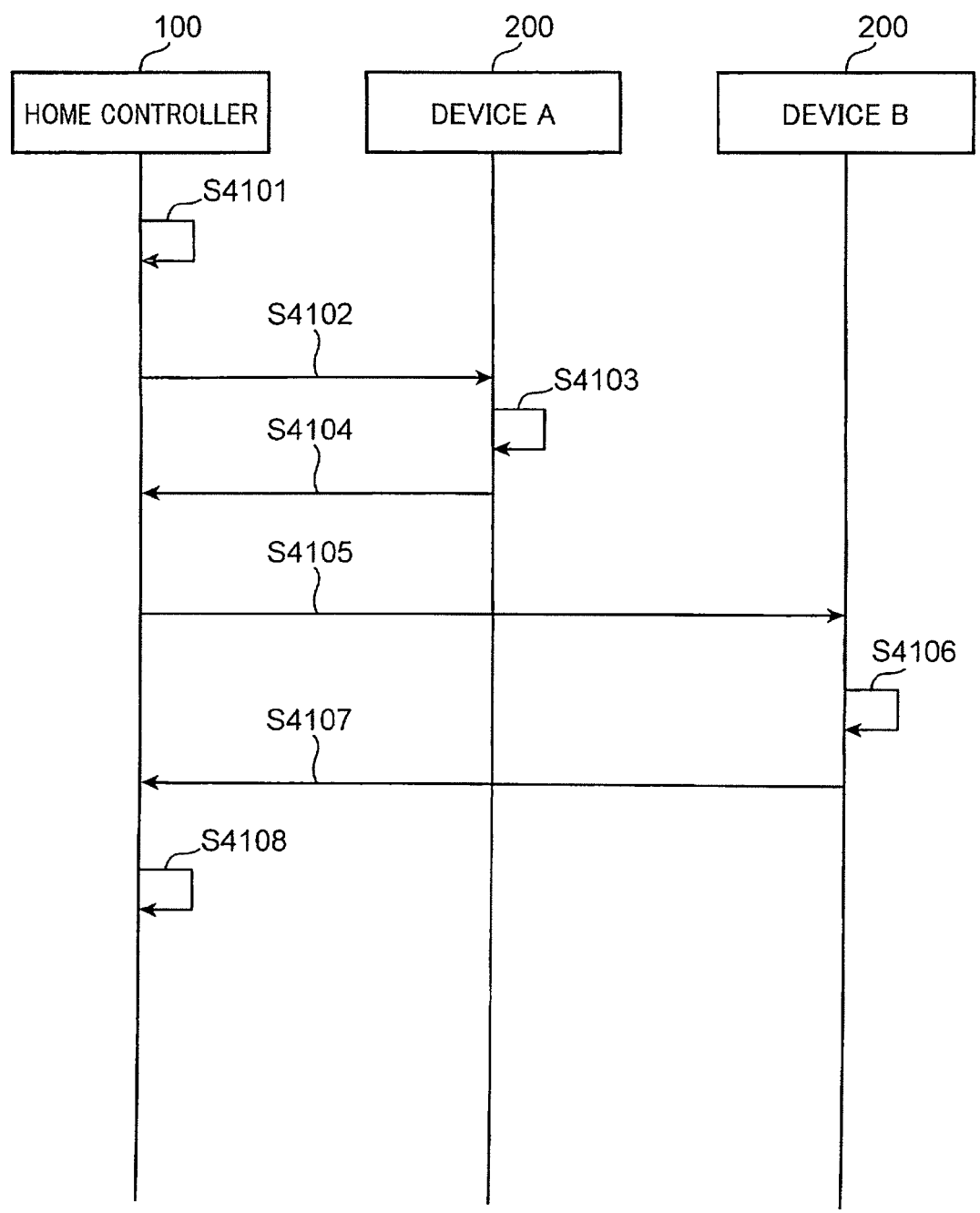
FIG. 45 is a sequence diagram showing the flow of a process for the home controller to directly control devices in the case where the home controller controls a plurality of devices with one operation according to the embodiment of the present disclosure.

Next, the flow of a process for the home controller 100 to directly control the devices 200 in the case where the home controller 100 controls a plurality of devices 200 with one operation will be described using FIG. 45. Here, a case where the home controller 100 controls the device A 200 and the device B 200 is described as an example.

First, the touch panel control section 102 of the home controller 100 senses a user operation on the device control screen 502 (S4101). Next, the device control section 106 of the home controller 100 generates a control command according to the user operation, and transmits the control command to the device A 200 (S4102).

The device A 200 which receives the control command executes the control command (S4103), and transmits the control result to the home controller 100 (S4104).

Next, the device control section 106 of the home controller 100 transmits to the device B 200 a control command that is the same as the control command transmitted to the device A 200 (S4105). The device B 200 which receives the control command executes the control command (S4106), and transmits the control result to the home controller 100 (S4107).

The display control section 103 of the home controller 100 which receives the control result updates the display screen in accordance with the control result (S4108). In this case, for example, if the device control screens 502 for the devices A 200 and B 200 are displayed on the display 101, the content of the device control screens 502 for the devices A 200 and B 200 is updated in accordance with the control result.

Figure 46:
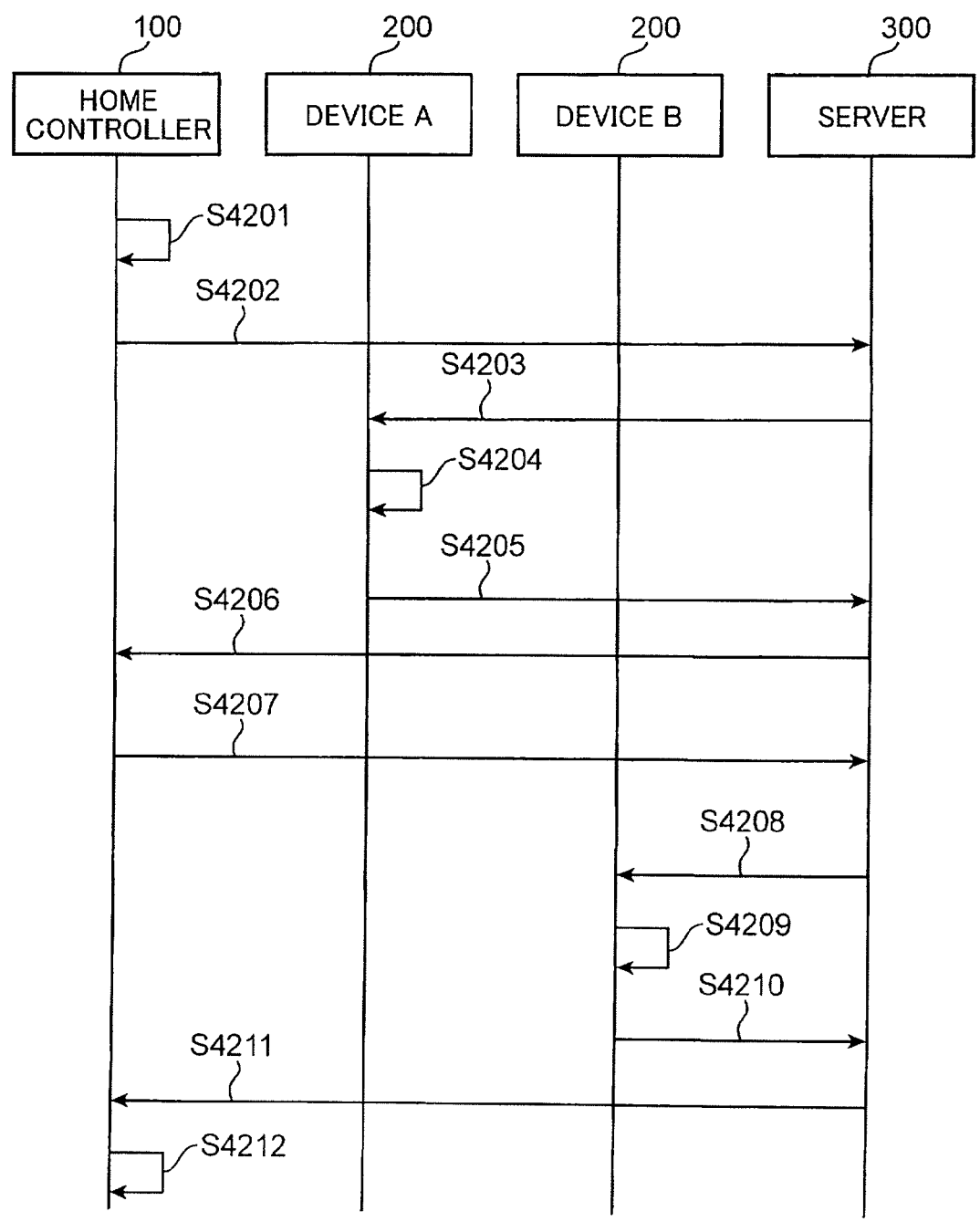
FIG. 46 is a sequence diagram showing the flow of a process for the home controller to control devices by way of the server in the case where the home controller controls a plurality of devices with one operation according to the embodiment of the present disclosure.

Next, the flow of a process for the home controller 100 to control the devices 200 by way of the server 300 in the case where the home controller 100 controls a plurality of devices 200 with one operation will be described using FIG. 46. Here, a case where the home controller 100 controls the device A 200 and the device B 200 is described as an example. In addition, it is assumed that the devices A 200 and B 200 are represented by one device icon 501, and controlled using one device control screen 502.

First, the touch panel control section 102 of the home controller 100 senses a user operation on the device control screen 502 (S4201).

Next, the device control section 106 of the home controller 100 generates a control command for the device A 200 according to the user operation, and transmits the control command to the server 300 (S4202).

The server 300 which receives the control command for the device A 200 transmits the control command to the device A 200 (S4203). The device A 200 which receives the control command executes the control command (S4204), and transmits the control result to the server 300 (S4205). The server 300 which receives the control result transmits the control result to the home controller 100 (S4206).

Similarly, the device control section 106 of the home controller 100 generates a control command for the device B 200 according to the user operation, and transmits the control command to the server 300 (S4207).

The server 300 which receives the control command transmits the control command to the device B 200 (S4208). The device B 200 which receives the control command executes the control command (S4209), and transmits the control result to the server 300 (S4210). The server 300 which receives the control result transmits the control result to the home controller 100 (S4211).

Then, the display control section 103 of the home controller 100 updates the display screen in accordance with the control result (S4212).

Figure 47:
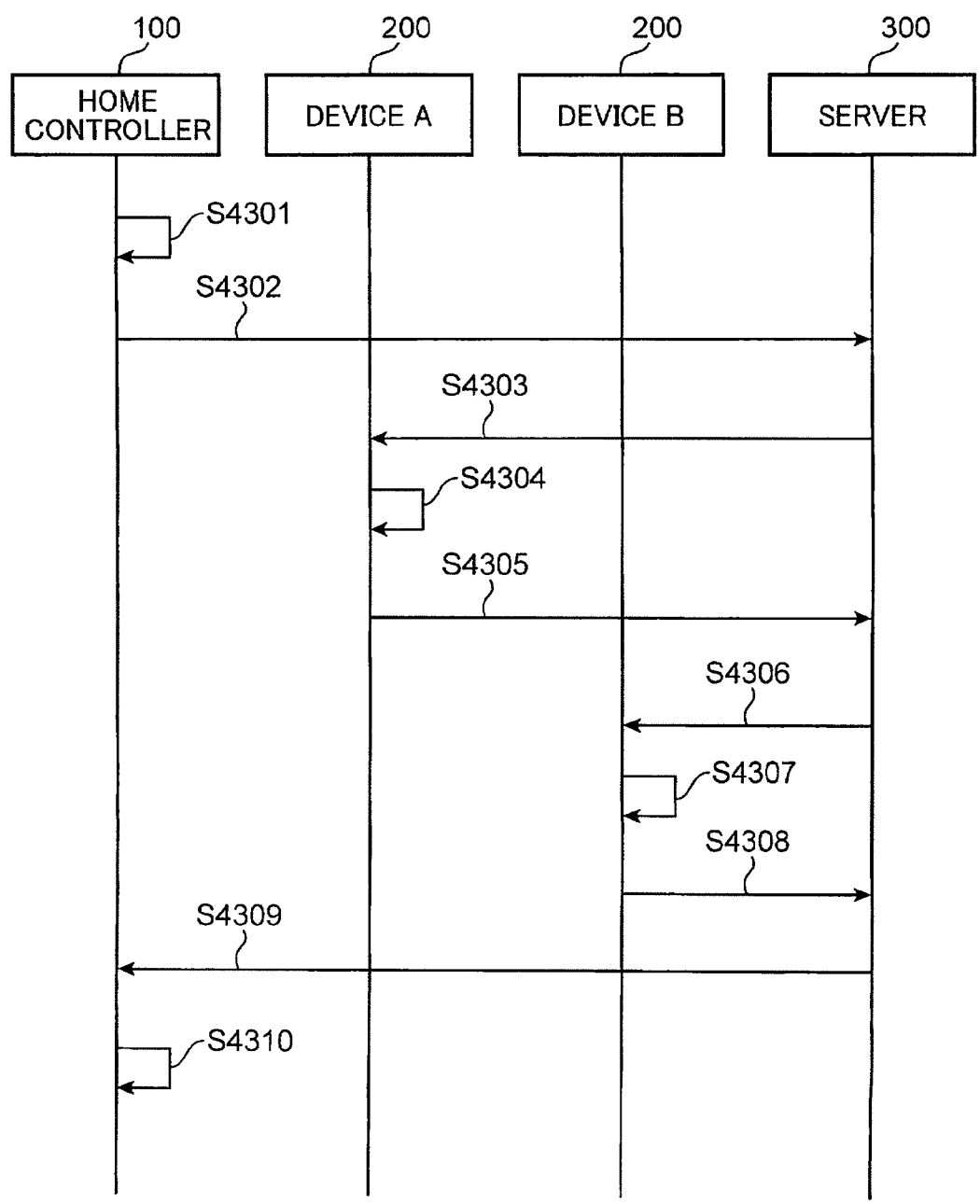
FIG. 47 is a sequence diagram showing the flow of a process for the home controller to control devices by way of the server in the case where the home controller controls a plurality of devices with one operation according to the embodiment of the present disclosure.

Next, the flow of a process for the home controller 100 to control the devices 200 by way of the server 300 in the case where the home controller 100 controls a plurality of devices 200 with one operation will be described using FIG. 47. Here, a case where the home controller 100 controls the device A 200 and the device B 200 is described as an example. In addition, it is assumed that the devices A 200 and B 200 are represented by one device icon 501, and controlled using one device control screen 502.

First, the touch panel control section 102 of the home controller 100 senses a user operation on the device control screen 502 (S4301).

Next, the device control section 106 of the home controller 100 generates a control command for the device A 200 and the device B 200 in accordance with the user operation, and transmits the control command to the server 300 (S4302).

The server 300 which receives the control command transmits the control command to the device A 200 (S4303). The device A 200 which receives the control command executes the control command (S4304), and transmits the control result to the server 300 (S4305).

Similarly, the server 300 transmits the control command to the device B 200 (S4306). The device B 200 which receives the control command executes the control command (S4307), and transmits the control result to the server 300 (S4308). The server 300 which receives the control result for the device A 200 and the device B 200 transmits the control result to the home controller 100 (S4309).

Then, the display control section 103 of the home controller 100 updates the display screen in accordance with the control result (S4310).

Figure 48:
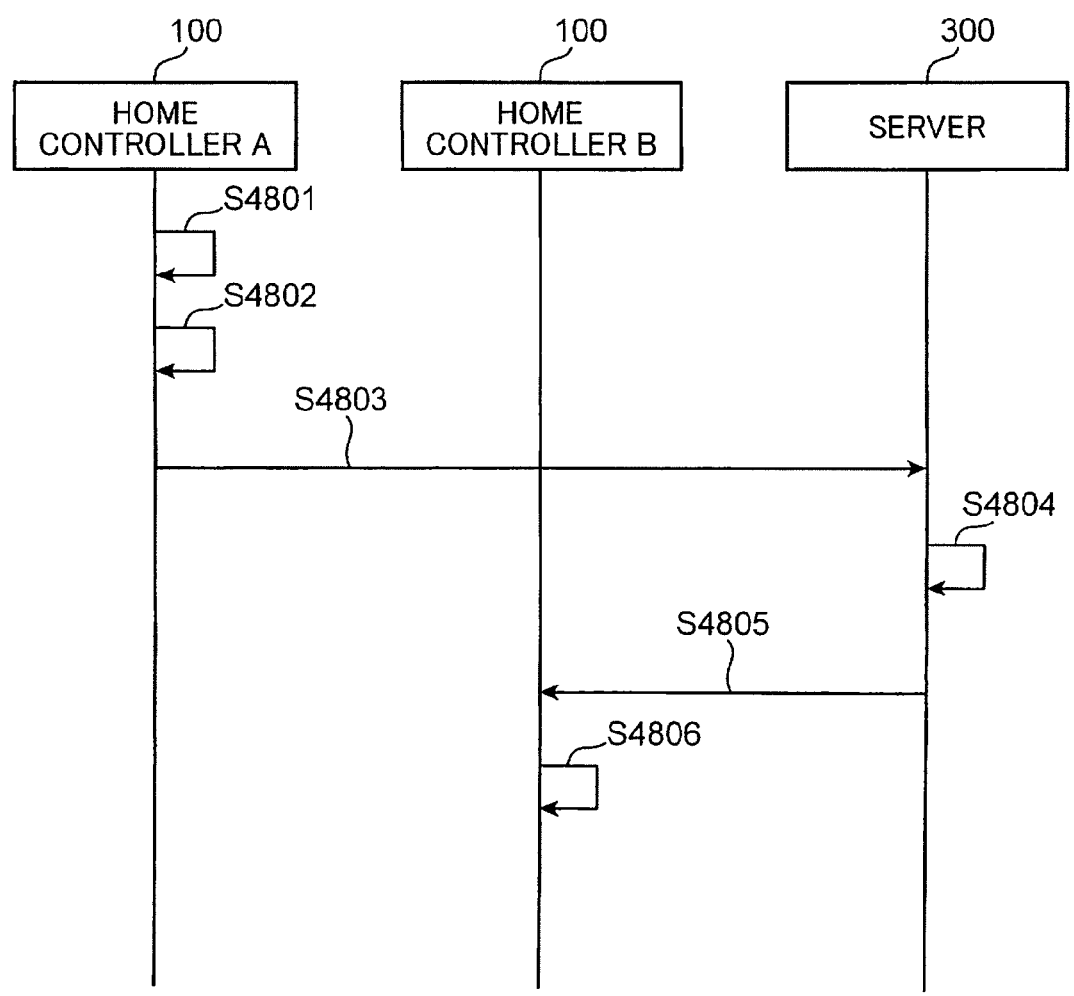
FIG. 48 is a sequence diagram showing the flow of a process for a case where a device icon is moved in the home controller according to the embodiment of the present disclosure.

Next, the flow of a process for a case where the device icon 501 is moved in the home controller 100 will be described using FIG. 48. Here, it is assumed that the user owns two home controllers A 100 and A 200.

When the touch panel control section 102 of the home controller A 100 senses movement of the device icon 501 (S4801), the display control section 103 updates the display screen (S4802). Here, the display control section 103 displays the device icon 501 moved in accordance with the amount of a drag performed on the device icon 501 by the user.

The device management section 105 of the home controller A 100 transmits to the server 300 a device list update notification including the coordinate on the floor plan 500 after the drag (S4803). Here, the device management section 105 of the home controller A 100 updates the content of the arrangement 3104 of the relevant device 200 in the device list 3100 managed by the device management section 105 itself with the coordinate after the drag.

The server 300 which receives the device list update notification updates the device list 4700 (S4804). In this case, the home information management section 301 of the server 300 updates the content of the arrangement 4704 of the relevant device 200 in the device list 4700 with the coordinate included in the device list update notification.

Subsequently, the server 300 transmits the device list update notification to the home controller B 100 (S4805). The home controller B 100 which receives the device list update notification updates the display screen (S4806). Here, the device management section 105 of the home controller B 100 updates the content of the arrangement 3104 of the relevant device 200 in the device list 3100 managed by the device management section 105 itself with the coordinate included in the device list update notification.

The device icon 501 is disposed at an appropriate position on the floor plan 500 through the process described above. Because the home controller B 100 is notified of the update of the arrangement position of the device icon 501 performed by the home controller A 100 by way of the server 300, the arrangement position of the device icon 501 after the update is shared among the home controllers A 100 and B 100 and the server 300. Therefore, it is possible to avoid trouble in which the arrangement position of the device icon 501 is different between the home controller A 100 and the home controller B 100.

Figure 49:
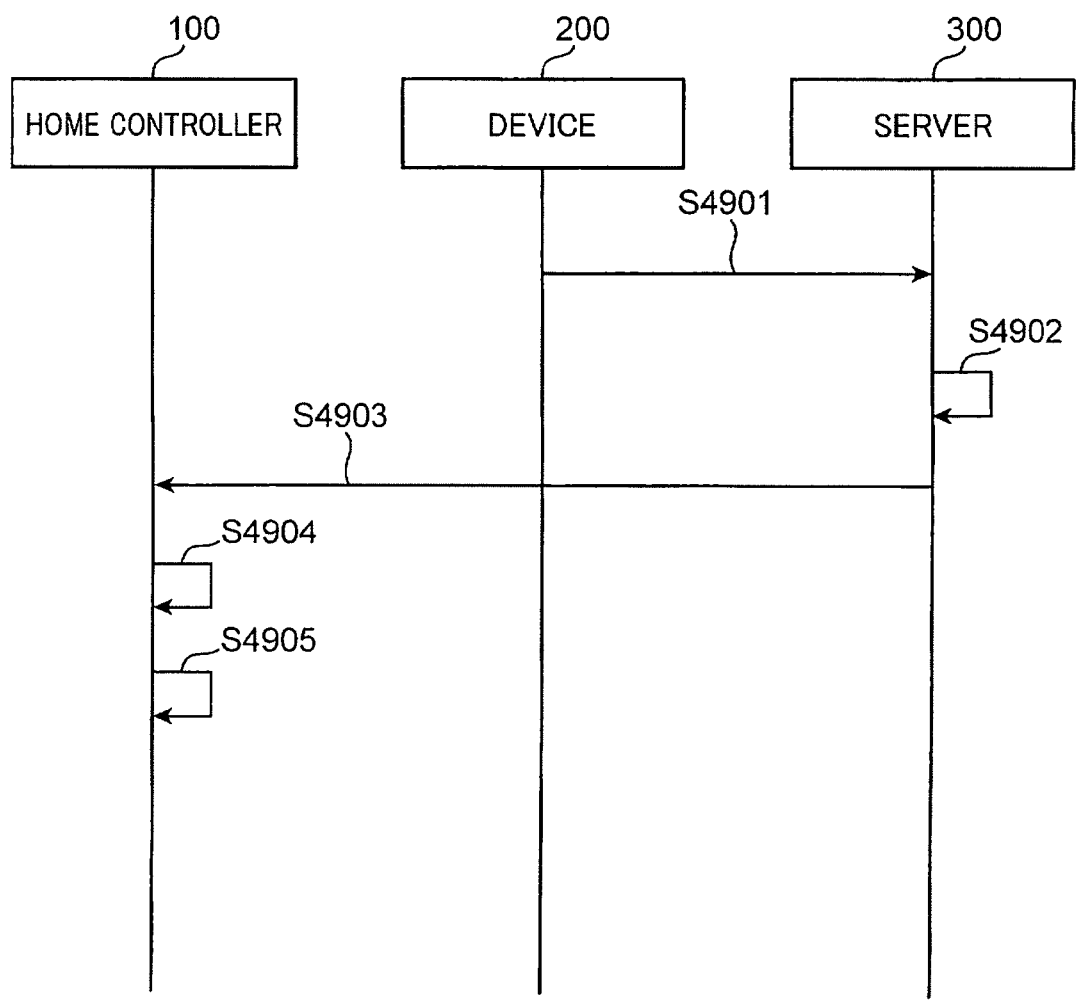
FIG. 49 is a sequence diagram showing the flow of a process for updating the device lists of the home controller and the server according to the embodiment of the present disclosure.

Next, an example of a process for updating the device lists of the home controller 100 and the server 300 will be described using FIG. 49. The device 200 transmits the device state indicating the current state of the device 200 itself to the server 300 (S4901). Here, the device 200 may regularly transmit the device state, or may transmit the device state when the state is varied. The server 300 updates the device list 4700 in accordance with the content of the received device state (S4902). Here, in the case where the device list 4700 does not contain information on the device 200, the server 300 adds information on the device 200 as a new device. Then, the server 300 transmits a device list update notification to the home controller 100 (S4903). The device management section 105 of the home controller 100 updates the device list 3100 in accordance with the content of the received device list update notification (S4904). Here, in the case where the device list 3100 does not contain information on the device 200, the device management section 105 adds information on the device 200 as a new device. Then, the display control section 103 of the home controller 100 updates the display screen (S4905).

Consequently, the server 300 is notified of variation in state of the device 200, which allows the server 300 to monitor variation in state of the device 200. The server 300 to which the device state is transmitted from the device 200 notifies the home controller 100 of variation in state of the device 200, which allows the home controller 100 to recognize the current state of the device 200. In the case where a new device 200 is connected to the home network, the server 300 and the home controller 100 can add the new device. Hence, it is possible to prevent occurrence of deviation between the actual state of the device 200 and the state of the device 200 recognized by the home controller 100.

Figure 50:
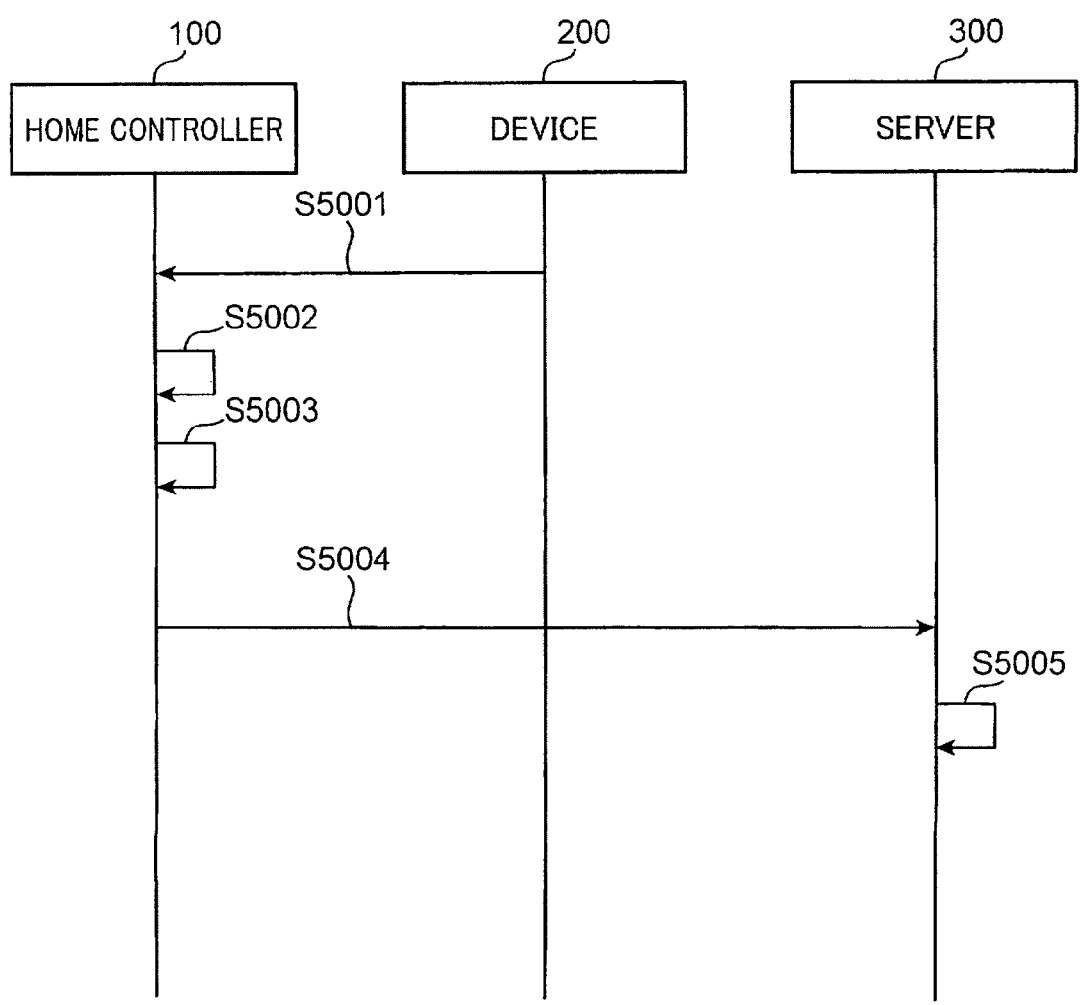
FIG. 50 is a sequence diagram showing the flow of a process for updating the device lists of the home controller and the server according to the embodiment of the present disclosure.

Next, another example of the process for updating the device lists of the home controller 100 and the server 300 will be described using FIG. 50. The device 200 transmits the device state to the home controller 100 (S5001). Here, the device 200 may regularly transmit the device state, or may transmit the device state when the state is varied.

The device management section 105 of the home controller 100 updates the device list 3100 in accordance with the content of the received device state (S5002). Here, in the case where the device list 3100 does not contain information on the device 200, the device management section 105 adds information on the device 200 as a new device. Then, the display control section 103 updates the display screen (S5003). Then, the device management section 105 of the home controller 100 transmits a device list update notification to the server 300 (S5004). The server 300 updates the device list 4700 in accordance with the received device list update notification (S5005). Here, in the case where the device list 4700 does not contain information on the device 200, the server 300 adds information on the device 200 as a new device.

Figure 51:
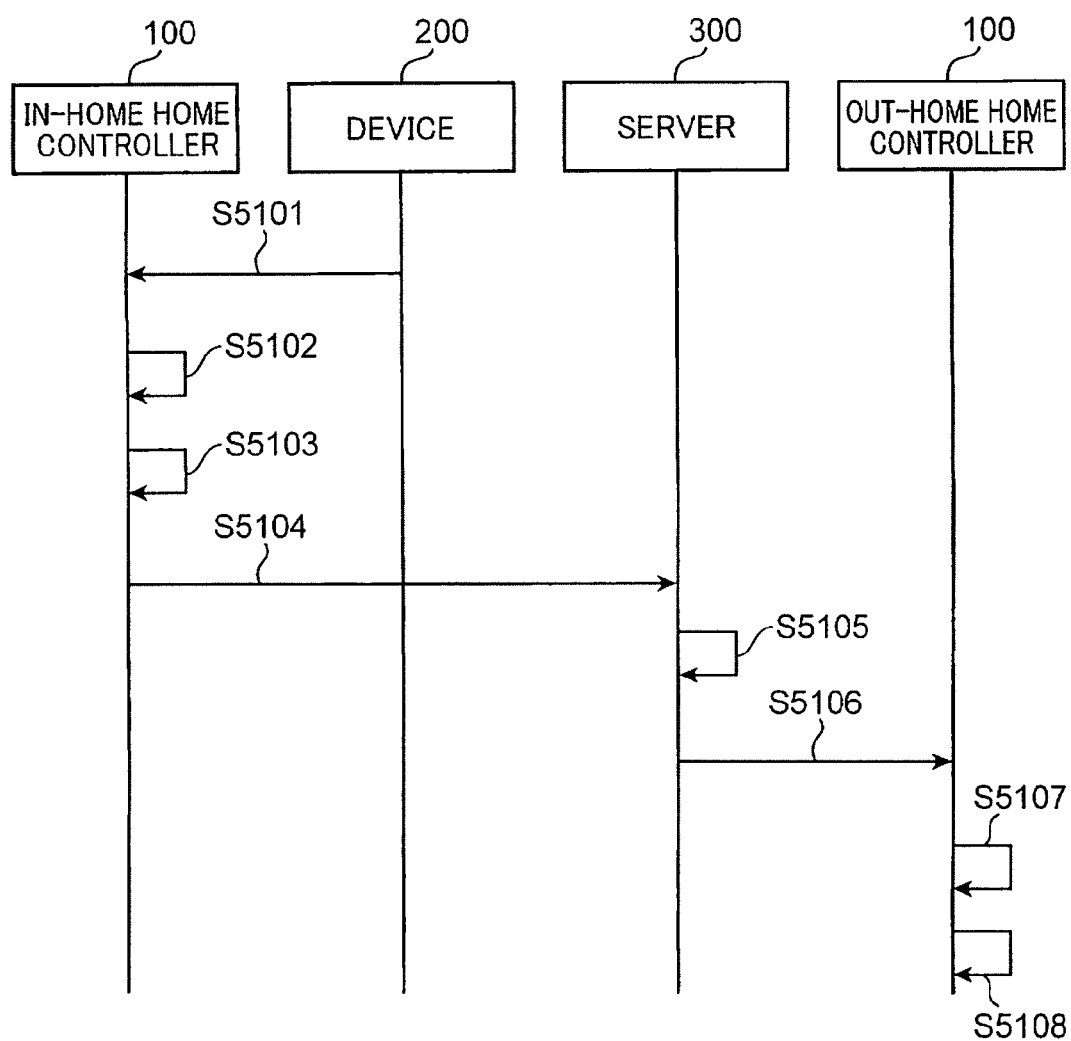
FIG. 51 is a sequence diagram showing the flow of a process for updating the device lists of the home controller and the server according to the embodiment of the present disclosure.

Next, still another example of a process in which the home controller 100 and the server 300 update the device list will be described using FIG. 51. In FIG. 51, a case where the user owns two home controllers 100, namely an in-home home controller 100 and an out-home home controller 100, is described as an example. Here, the out-home home controller 100 is a home controller 100 taken away from the home by the user, and the in-home home controller 100 is a home controller 100 kept at the home by the user.

The device 200 transmits the device state to the in-home home controller 100 (S5101). The in-home home controller 100 updates the device list 3100 in accordance with the content of the received device state (S5102). Here, in the case where the device list 3100 does not contain information on the device 200, the device management section 105 adds information on the device 200 as a new device. Then, the display screen is updated (S5103). Then, the in-home home controller 100 transmits a device list update notification to the server 300 (S5104).

The server 300 updates the device list 4700 in accordance with the content of the received device list update notification (S5105). Here, in the case where the device list 4700 does not contain information on the device 200, the server 300 adds information on the device 200 as a new device. Then, the server 300 transmits a device list update notification to the out-home home controller 100 (S5106). The out-home home controller 100 updates the device list 3100 in accordance with the content of the received device list update notification (S5107). Here, in the case where the device list 3100 does not contain information on the device 200, the device management section 105 of the out-home home controller 100 adds information on the device 200 as a new device. Then, the display screen is updated (S5108).

According to the example, even in the case where one home controller 100 is located away from the home and the other home controller 100 is located in the home, it is possible to prevent occurrence of deviation between the states of the device 200 recognized by the two home controllers 100.

The sequences and the process flows described above are merely exemplary, and the order of the steps may be changed and some of the steps may be omitted as long as the intended process may be embodied. For example, a control command may be transmitted to the device A 200 and the device B 200 asynchronously.

In the foregoing description, a plan view that planarly represents the position and the shape of rooms forming each floor is adopted as the floor plan 500. However, the embodiment is not limited thereto, and a diagram that schematically shows how many rooms of what type are located on each floor may be adopted as the floor plan.

Figure 52:
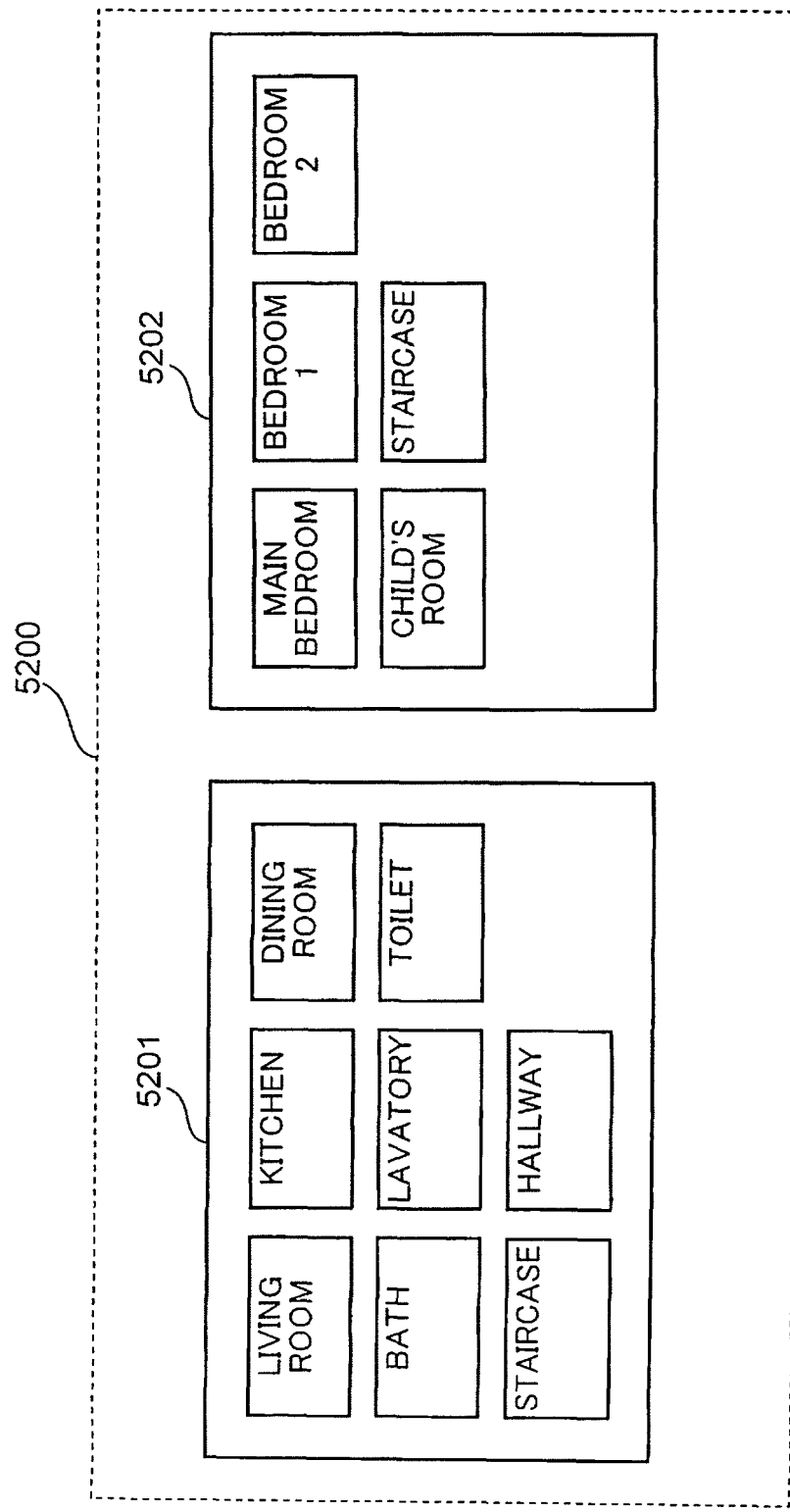
FIG. 52 is a diagram showing a floor plan in another pattern according to the embodiment of the present disclosure.

Floor plans in other patterns will be specifically described below. FIG. 52 is a diagram showing a floor plan 5200 in another pattern. In the floor plan 5200, rooms forming one floor are each represented by one rectangular block, and the rooms on the one floor are disposed in a matrix. The blocks have the same size, and are each provided with the name of the room.

In the floor plan 5200, the name and the number of the rooms forming each floor are indicated, but the relative size and the position in the floor of the rooms are not represented. In the embodiment, such a diagram is treated as the floor plan 5200. That is, in the embodiment, any diagram that represents at least what rooms are provided on each floor are treated as the floor plan.

For example, it is seen that a floor plan 5201 for the first floor includes rooms such as a living room, a kitchen, a dining room, a bath, a lavatory, a toilet, a staircase, and a hallway. Meanwhile, it is seen that a floor plan 5202 for the second floor includes rooms such as a main bedroom, a bedroom 1, a bedroom 1, a child's room, and a staircase.

The user can drag and move a desired room on the floor plan 5200 to change the position of the room on the floor plan 5200. In the case where a large number of devices 200 are disposed within a room and all the device icons 501 cannot be displayed within the room on the floor plan 5200 using a default room size, the display control section 103 may increase the size of the room such that all the device icons 501 can be accommodated within the room.

Figure 53:
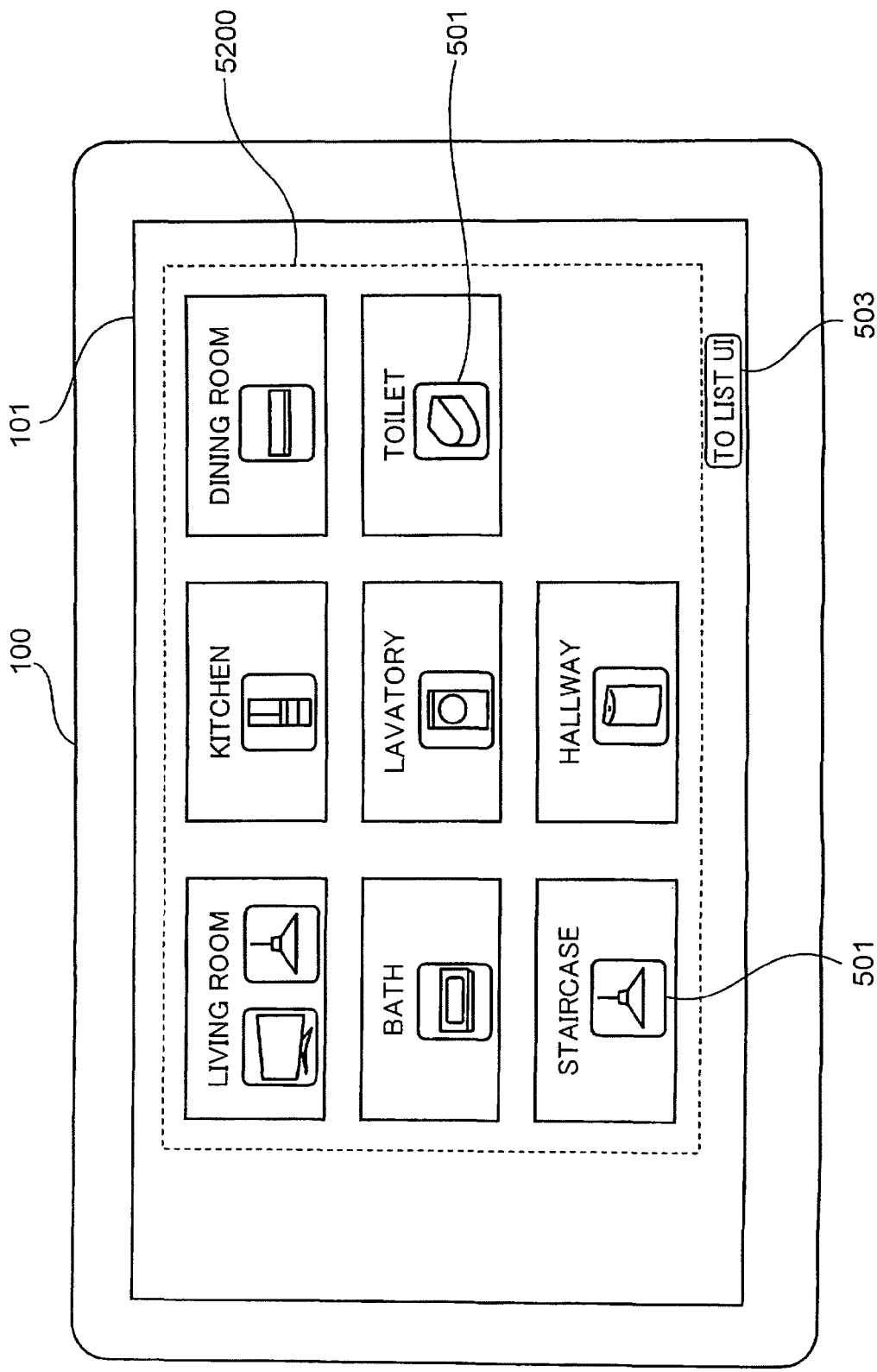
FIG. 53 is a diagram showing the configuration of a basic screen that adopts the floor plan shown in FIG. 52.

FIG. 53 is a diagram showing the configuration of a basic screen that adopts the floor plan 5200. The floor plan 5200 is displayed on the basic screen. In addition, the device icons 501 for the devices 200 actually disposed are displayed within each room.

For example, the device icons 501 for the television set and the illumination device are displayed in the living room, and therefore it is seen that the television set and the illumination device are installed in the living room.

The device list display change button 503 is a button for switching the screen display from the basic screen to the device list display screen discussed earlier (see FIG. 24).

Figure 54:
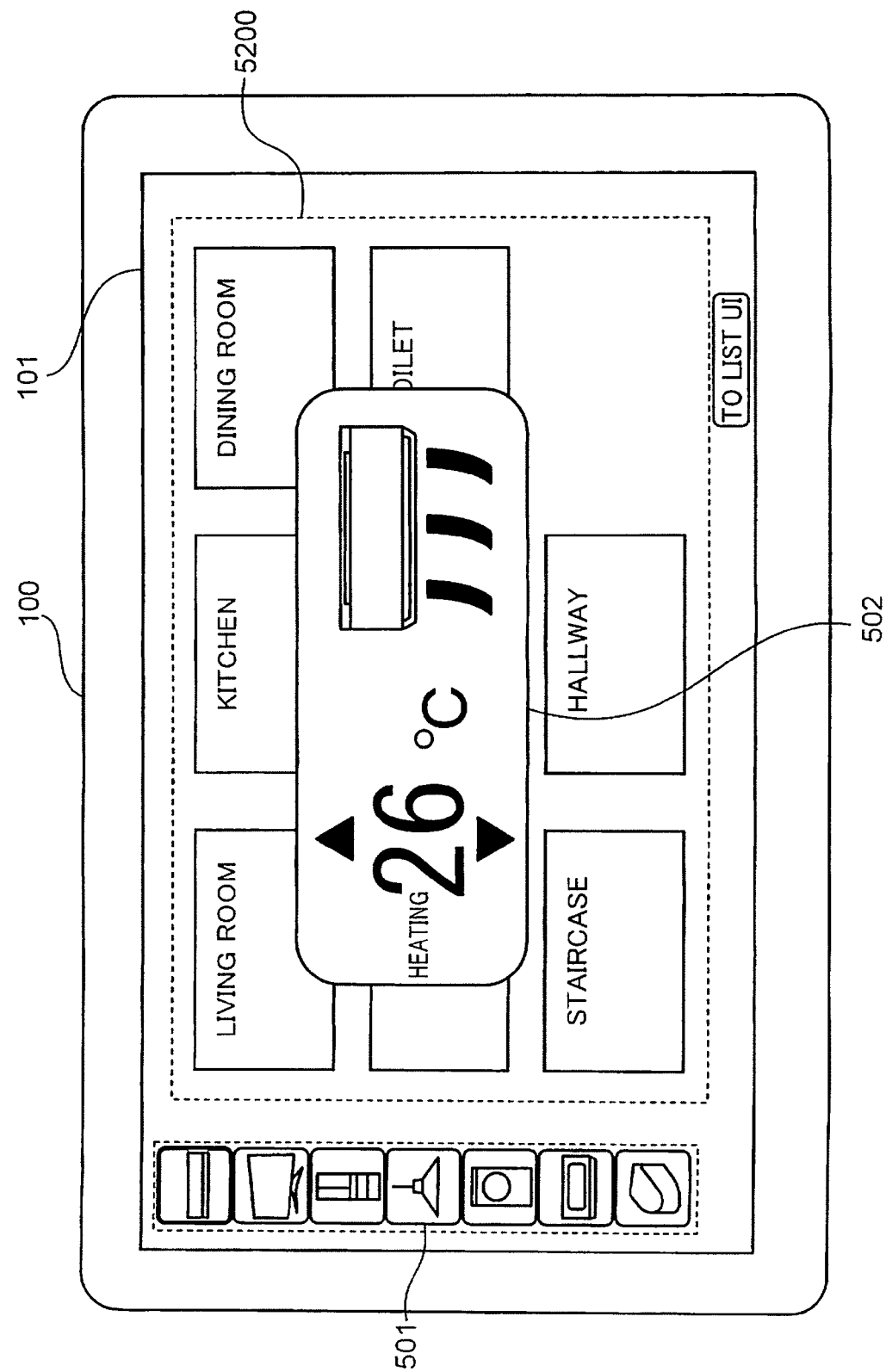
FIG. 54 is a diagram showing the display state of a device control screen for a case where the floor plan shown in FIG. 52 is adopted.

FIG. 54 is a diagram showing the display state of the device control screen 502 for a case where the floor plan 5200 shown in FIG. 52 is adopted. In the basic screen shown in FIG. 53, when the touch panel control section 102 senses that the user selects the device icon 501, the display control section 103 causes the display 101 to display the device control screen 502 corresponding to the selected device icon 501. In FIG. 54, the device icon 501 for the air conditioner is selected, and therefore the device control screen 502 for the air conditioner is displayed as overlapped on the floor plan 5200.

In displaying the device control screen 502, the display control section 103 disposes the device icons 501 displayed on the floor plan 5200 outside the display region of the device control screen 502. In the example of FIG. 54, all the device icons 501 are disposed in one vertical line on the left side of the floor plan 5200.

In disposing the device icons 501 in one vertical line on the left side of the floor plan 5200, the display control section 103 may group the device icons 501 under particular conditions. For example, the device icons 501 may be grouped in accordance with the room, may be grouped in accordance with the type of the device 200, or may be grouped in accordance with the category based on the type of the device 200.

In the example of FIG. 54, the device icons 501 are disposed on the left side of the floor plan 5200. However, the device icons 501 may be disposed in one vertical line on the right side of the floor plan 5200, or may be disposed in one horizontal line on the upper or lower side of the floor plan 5200.

In the case where all the device icons 501 cannot be displayed on the left side of the floor plan 5200, the display control section 103 may scroll the device icons 501 upward or downward in accordance with a swipe operation performed upward or downward on the device icons 501 disposed in one line on the left side to cause the device icons 501, which have been hidden, to be displayed within the display 101.

In disposing the device icons 501 in one vertical line on the left side of the floor plan 5200, the display control section 103 may display the device icon 501 selected by the user in a display mode that is different from that for the unselected device icons 501. For example, the selected device icon 501 may be displayed in a color that is different from that of the unselected device icons 501, may be displayed more brightly than the unselected device icons 501, may be displayed more densely than the unselected device icons 501, or may be flashed on and off at a constant cycle.

The display control section 103 may scroll an array of the device icons 501 such that the device icon 501 selected by the user is positioned at a conspicuous position (for example, the top, middle, or bottom position) in the line of icons.

In displaying the device control screen 502, the display control section 103 may dispose all the device icons 501 on the outer periphery of an ellipse as shown in FIG. 12.

Next, transition between the display state of the basic screen and the display state of the device control screen 502 will be described using FIG. 55.

Figure 55:
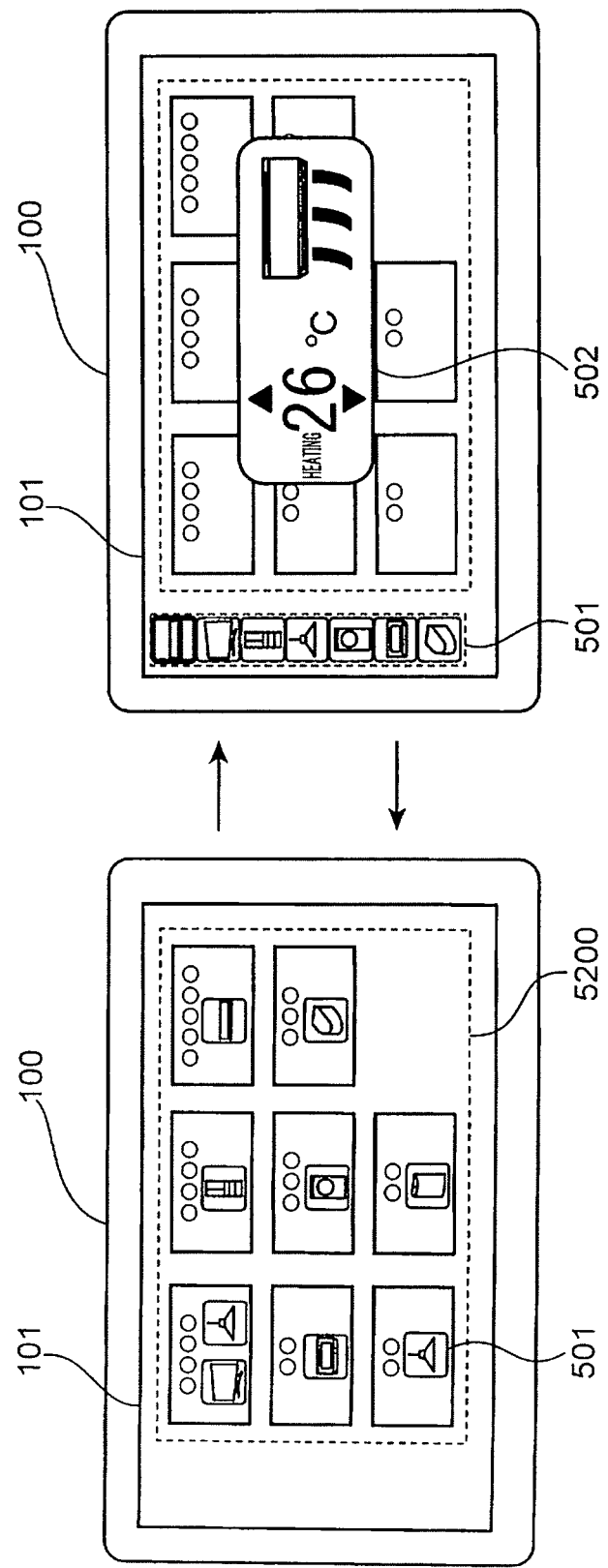
FIG. 55 is a diagram illustrating transition between the display state of the basic screen and the display state of the device control screen.

In the basic screen shown in the left diagram of FIG. 55, the user selects the device icon 501 for the device 200 (here, the air conditioner) that is desired to be controlled, and the touch panel control section 102 senses the selection. Then, as shown in the right diagram of FIG. 55, the display control section 103 displays the device control screen 502 corresponding to the selected device icon 501 as overlapped on the floor plan 5200. This results in transition from the display state of the basic screen to the display state of the device control screen 502.

On the other hand, as shown in the right diagram of FIG. 55, in the display state of the device control screen 502, the user selects the device icon 501 for the air conditioner corresponding to the device control screen 502 or a location outside the display region of the device control screen 502 (for example, the display region of the floor plan 5200 outside the display region of the device control screen 502), and the touch panel control section 102 senses the selection. Then, as shown in the left diagram of FIG. 55, the display control section 103 erases the device control screen 502, and returns from the display state of the device control screen 502 to the display state of the basic screen.

Figure 56:
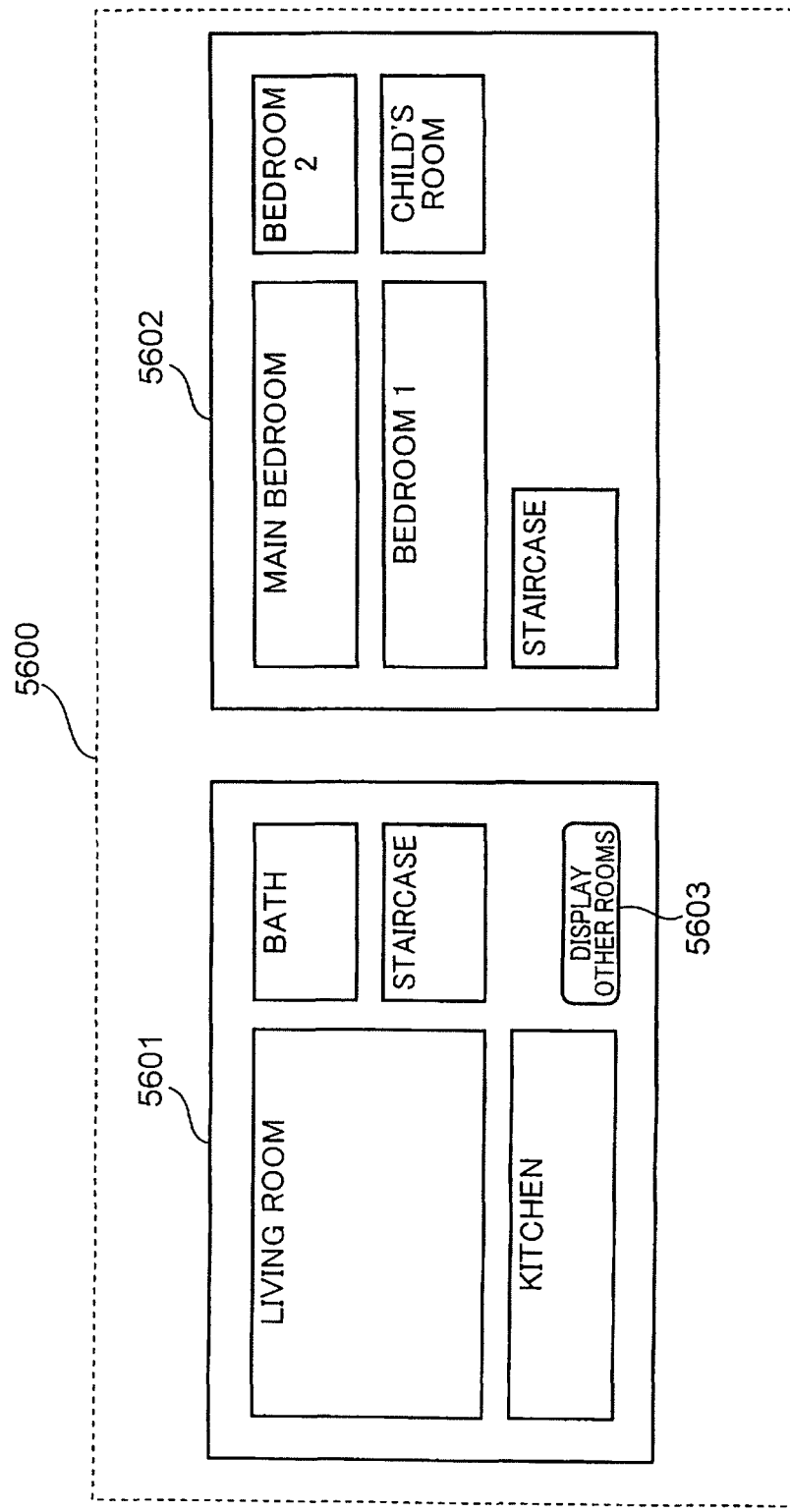
FIG. 56 is a diagram showing the configuration of a floor plan in which the size of each room is varied in accordance with the actual room size in the floor plan shown in FIG. 52.

FIG. 56 is a diagram showing the configuration of a floor plan 5600 for a case where the size of each block is varied in accordance with the actual room size in the floor plan 5200 shown in FIG. 52.

In the left diagram of FIG. 56, a floor plan 5601 for the first floor is shown. In the right diagram of FIG. 56, a floor plan 5602 for the second floor is shown.

In the floor plan 5601 for the first floor, the living room is the largest in terms of the room size, and is followed by the kitchen, the bath, and the staircase. Therefore, the sizes of the rooms are displayed in this order. Also in the floor plan 5602 for the second floor, the rooms are represented in accordance with the actual room size. In this case, information that indicates the actual room size may be registered in advance in room information 6800 to be discussed later, and the display control section 103 may decide the size of each room in accordance with the information.

Figure 57:
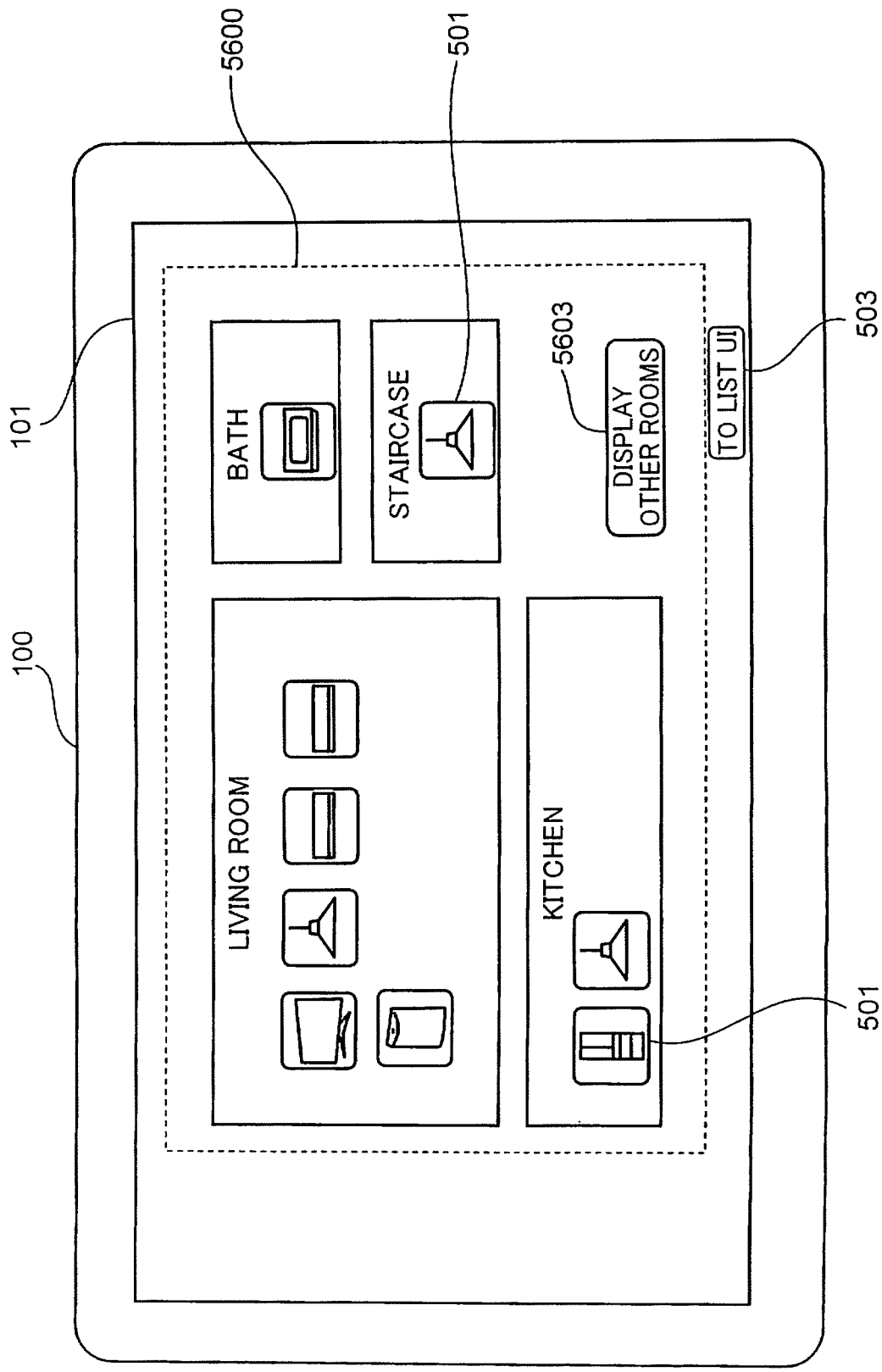
FIG. 57 is a diagram showing the configuration of a basic screen that adopts the floor plan shown in FIG. 56.

FIG. 57 is a diagram showing the configuration of a basic screen that adopts the floor plan 5600 shown in FIG. 56. In the floor plan 5600, each room is displayed with a size matching the actual size. In addition, the device icons 501 for the devices 200 actually disposed are displayed in each room.

In the case where the mode in which each room is represented with a size matching the actual room size on the floor plan 5600 is adopted, displaying all the rooms within the display 101 may result in small display of the rooms to make a user operation difficult. Thus, a room display button 5603 with a text "DISPLAY OTHER ROOMS" is provided in FIG. 57.

When the user selects the room display button and the touch panel control section 102 senses the selection, the display control section 103 switches the screen display to the floor plan 5600 which displays the remaining rooms.

In the example of FIG. 57, the floor plan 5600 is partitioned into the floor plan 5601 for the first floor and the floor plan 5602 for the second floor. Therefore, when the room display button 5603 is selected, the display control section 103 switches display on the display 101 to the floor plan 5602 for the second floor. In this case, the room display button 5603 is also provided on the floor plan 5602 for the second floor. Therefore, when the room display button 5603 is selected, the display control section 103 switches display on the display 101 to the floor plan 5601 for the first floor.

Although the floor plan is provided for each floor in the example of FIG. 57, the embodiment is not limited thereto. For example, in the case where the floor plan 5601 for the first floor cannot be displayed on the display 101 at the same time, the display control section 103 may divide the floor plan 5601 for the first floor, and display a divided portion of the floor plan 5601 on the display 101. In this case, when the room display button 5603 is selected, a hidden portion of the floor plan 5601 for the first floor may be displayed.

In the case where the floor plan 5601 for the first floor and the floor plan 5602 for the second floor can be displayed on the display 101 at the same time, the display control section 103 may display the floor plan 5601 for the first floor and the floor plan 5602 for the second floor on the display 101 at the same time. In this case, the room display button 5603 is omitted from the floor plan 5600.

In the case where the staircase is tapped on the floor plan 5600, the display control section 103 may switch between the floor plan 5601 for the first floor and the floor plan 5602 for the second floor.

Figure 58:
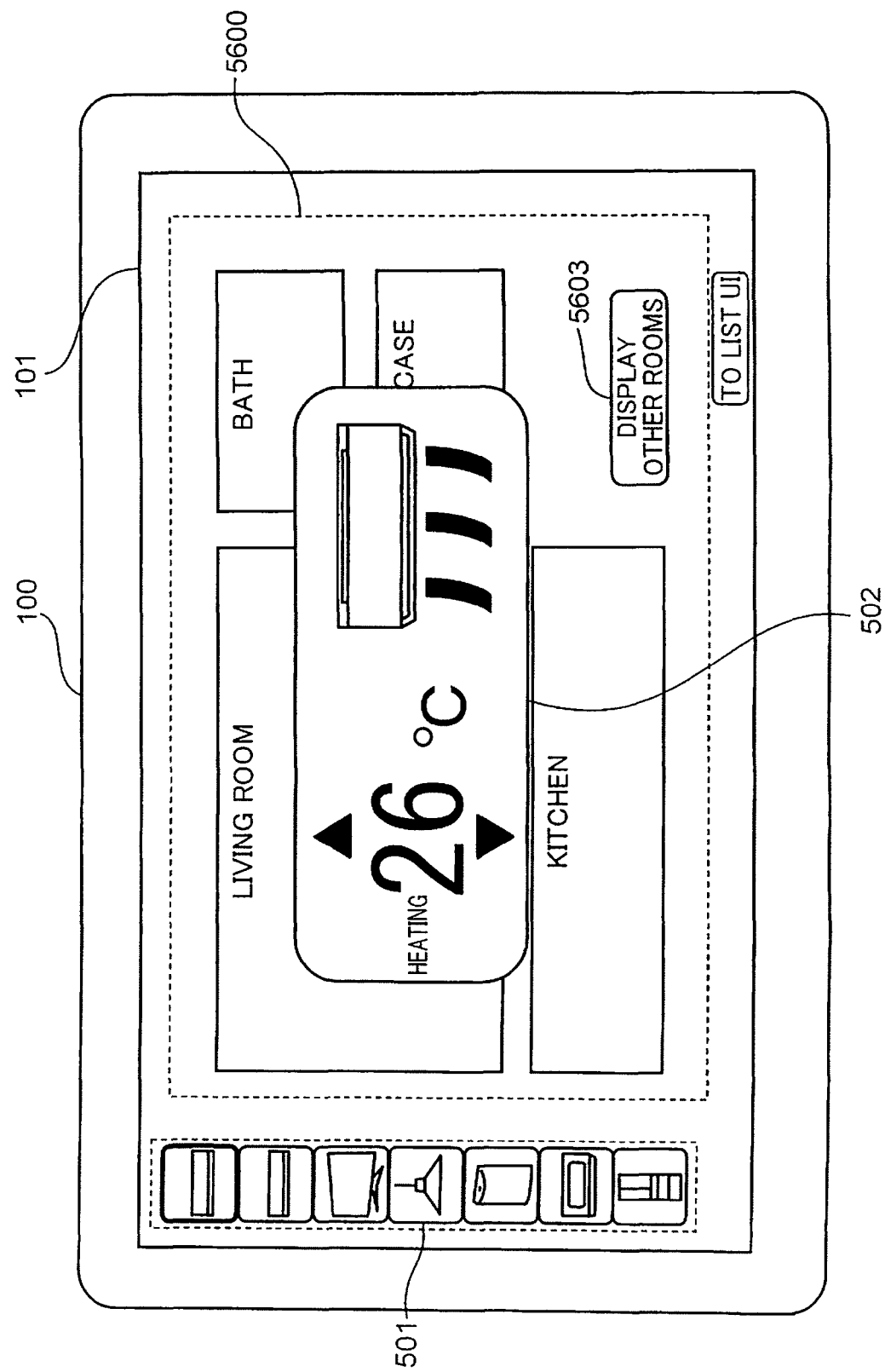
FIG. 58 is a diagram showing the display state of a device control screen for a case where the floor plan shown in FIG. 56 is adopted as the floor plan.

FIG. 58 is a diagram showing the display state of the device control screen 502 for a case where the floor plan 5600 shown in FIG. 56 is adopted as the floor plan. In FIG. 58, as in FIG. 54, the device control screen 502 for the air conditioner is displayed. FIG. 58 is otherwise the same as FIG. 54, and therefore is not described.

Figure 59:
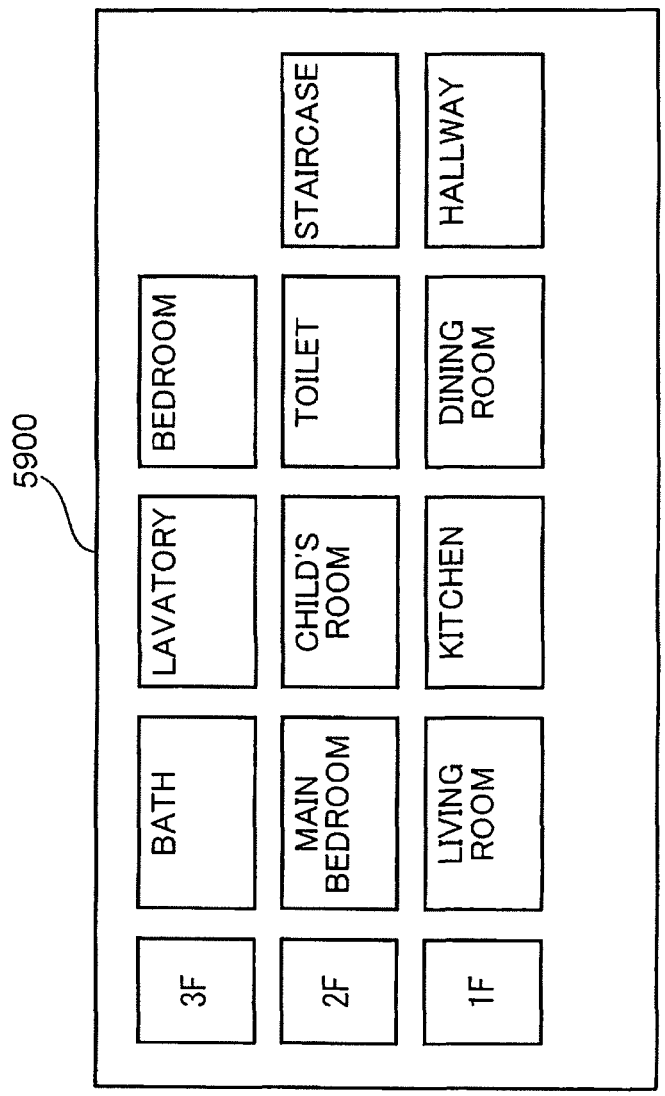
FIG. 59 is a diagram showing a floor plan in still another pattern according to the embodiment of the present disclosure.

FIG. 59 is a diagram showing a floor plan 5900 in still another pattern according to the embodiment of the disclosure. The floor plan 5900 of FIG. 59 is the same as the floor plan 5200 in that rooms are represented by blocks of the same size, but is different from the floor plan 5200 in arrangement of the rooms. Specifically, in the floor plan 5900, the floor numbers are displayed in the vertical direction, and the rooms forming the same floor are arranged in one horizontal line. In the example of FIG. 59, the house has three floors, namely the first floor to the third floor, and therefore the rooms forming the third floor are disposed in the first line, the rooms forming the second floor are disposed in the second line, and the rooms forming the first floor are disposed in the third line. The floor number such as 1F, 2F, and 3F is indicated at the left end of each line. It is seen at a glance from the floor plan 5900 on which floor each room is disposed.

Also in the floor plan 5900, the size of each room may be varied in accordance with the actual room size. In the floor plan 5900, in addition, in the case where all the rooms cannot be displayed within the display region of the display 101, the floor plan 5900 may be scrolled in the horizontal direction so that a desired room can be displayed on the display 101.

For example, in the case where there are further rooms on the second floor, when the touch panel control section 102 senses that the user performs a swipe operation from the left to the right, the display control section 103 may scroll the rooms forming the second floor, or the rooms forming the first floor to the third floor, from the left to the right in accordance with the amount of the swipe operation.

Figure 60:
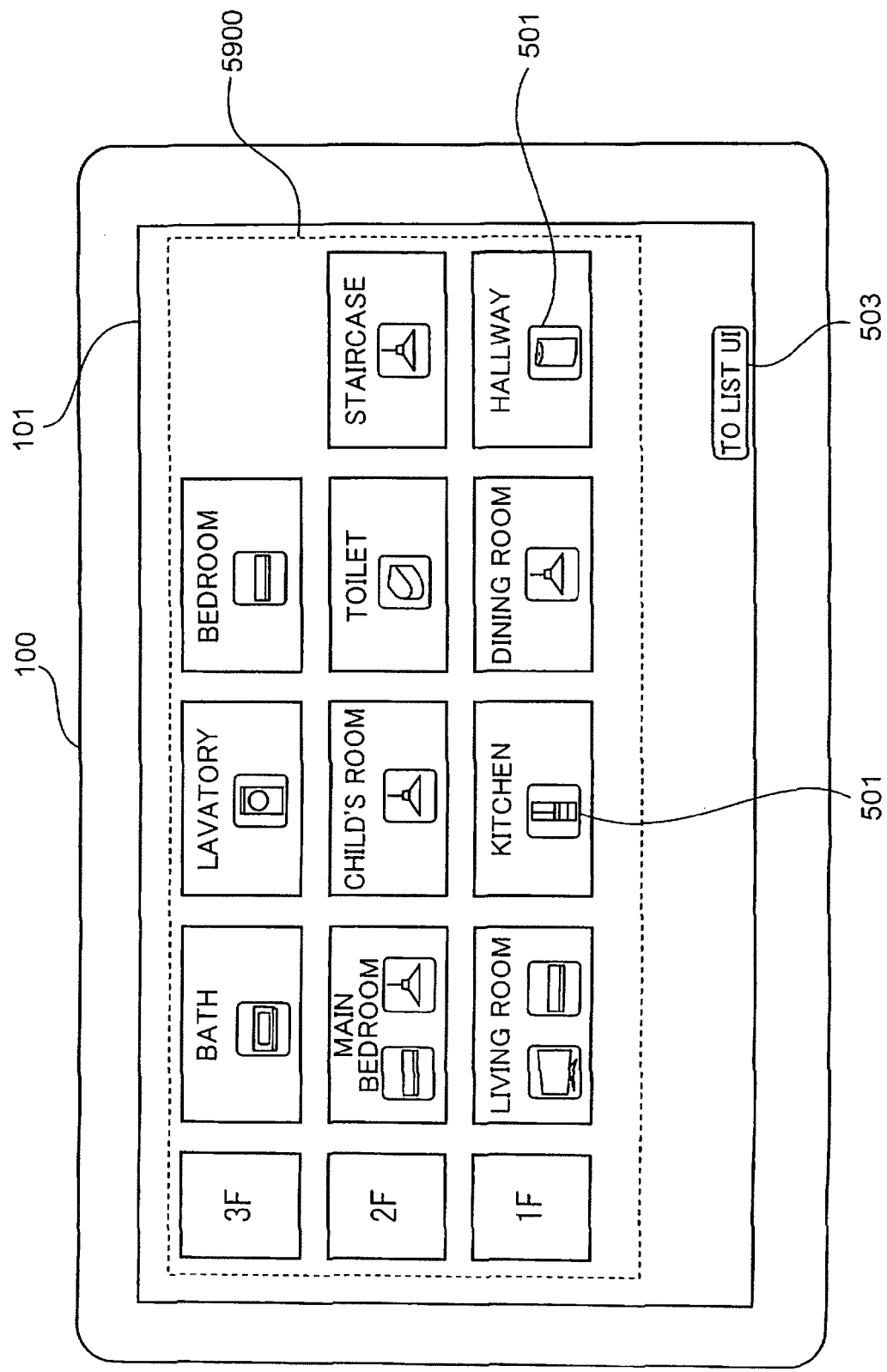
FIG. 60 is a diagram showing the configuration of a basic screen that adopts the floor plan shown in FIG. 59.

FIG. 60 is a diagram showing the configuration of a basic screen that adopts the floor plan 5900 shown in FIG. 59. The floor plan 5900 is displayed on the basic screen. In addition, the device icons 501 for the devices 200 actually disposed are displayed within each room. The device list display change button 503 is a button for switching the screen display from the basic screen to the device list display screen discussed earlier (see FIG. 24).

Figure 61:
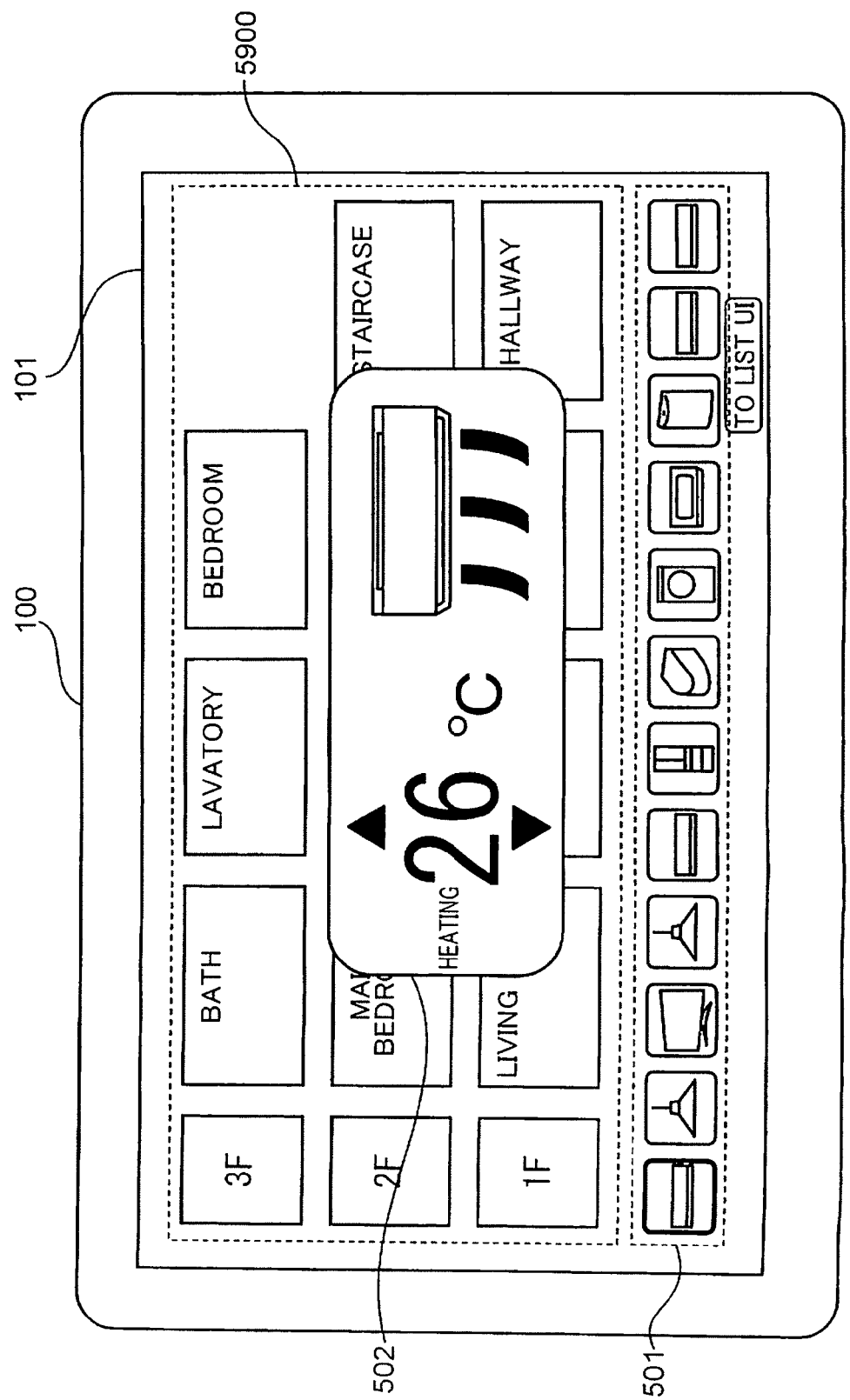
FIG. 61 is a diagram showing the display state of a device control screen for a case where the floor plan shown in FIG. 59 is adopted.

FIG. 61 is a diagram showing the display state of the device control screen 502 for a case where the floor plan 5900 shown in FIG. 59 is adopted. In the basic screen shown in FIG. 60, when the touch panel control section 102 senses that the user selects the device icon 501, the display control section 103 causes the display 101 to display the device control screen 502 corresponding to the selected device icon 501. In FIG. 61, the device icon 501 for the air conditioner is selected, and therefore the device control screen 502 for the air conditioner is displayed as overlapped on the floor plan 5900. In displaying the device control screen 502, the display control section 103 disposes the device icons 501 displayed on the floor plan 5900 outside the display region of the device control screen 502. In the example of FIG. 61, all the device icons 501 are disposed in one horizontal line on the lower side of the floor plan 5900.

In disposing the device icons 501 in one vertical line on the lower side of the floor plan 5900, the display control section 103 may group the device icons 501 under particular conditions. For example, the device icons 501 may be grouped in accordance with the room, may be grouped in accordance with the type of the device 200, or may be grouped in accordance with the category based on the type of the device 200.

In the example of FIG. 61, the device icons 501 are disposed on the lower side of the floor plan 5900. However, the device icons 501 may be disposed in one horizontal line on the upper side of the floor plan 5900, or may be disposed in one vertical line on the left or right side of the floor plan 5900.

In the case where all the device icons 501 cannot be disposed on the lower side of the floor plan 500, the display control section 103 may scroll the device icons 501 leftward or rightward in accordance with a swipe operation performed leftward or rightward on the device icons 501 disposed in one horizontal line on the lower side to cause the device icons 501, which have been hidden, to be displayed within the display 101.

In disposing the device icons 501 in one horizontal line on the lower side of the floor plan 5900, the display control section 103 may display the device icon 501 selected by the user in a display mode that is different from that for the unselected device icons 501. For example, the selected device icon 501 may be displayed in a color that is different from that of the unselected device icons 501, may be displayed more brightly than the unselected device icons 501, may be displayed more densely than the unselected device icons 501, or may be flashed on and off at a constant cycle.

The display control section 103 may scroll an array of the device icons 501 such that the device icon 501 selected by the user is positioned at a conspicuous position (for example, the leftmost, middle, or rightmost position) in the line of icons.

In displaying the device control screen 502, the display control section 103 may dispose all the device icons 501 on the outer periphery of an ellipse as shown in FIG. 12.

In the floor plan 5900, the rooms on all the floors are displayed on the display 101 at the same time, which may result in small display of the rooms to make a user operation difficult. Thus, the display control section 103 may display the floor plan 5900 as enlarged in accordance with the user operation. Specifically, when the user performs an operation of pinching out on a certain room in the floor plan 5900 and the touch panel control section 102 senses the operation, the display control section 103 may display the room on the display 101 as enlarged at an enlargement scale matching the amount of the pinch out.

Figure 62:
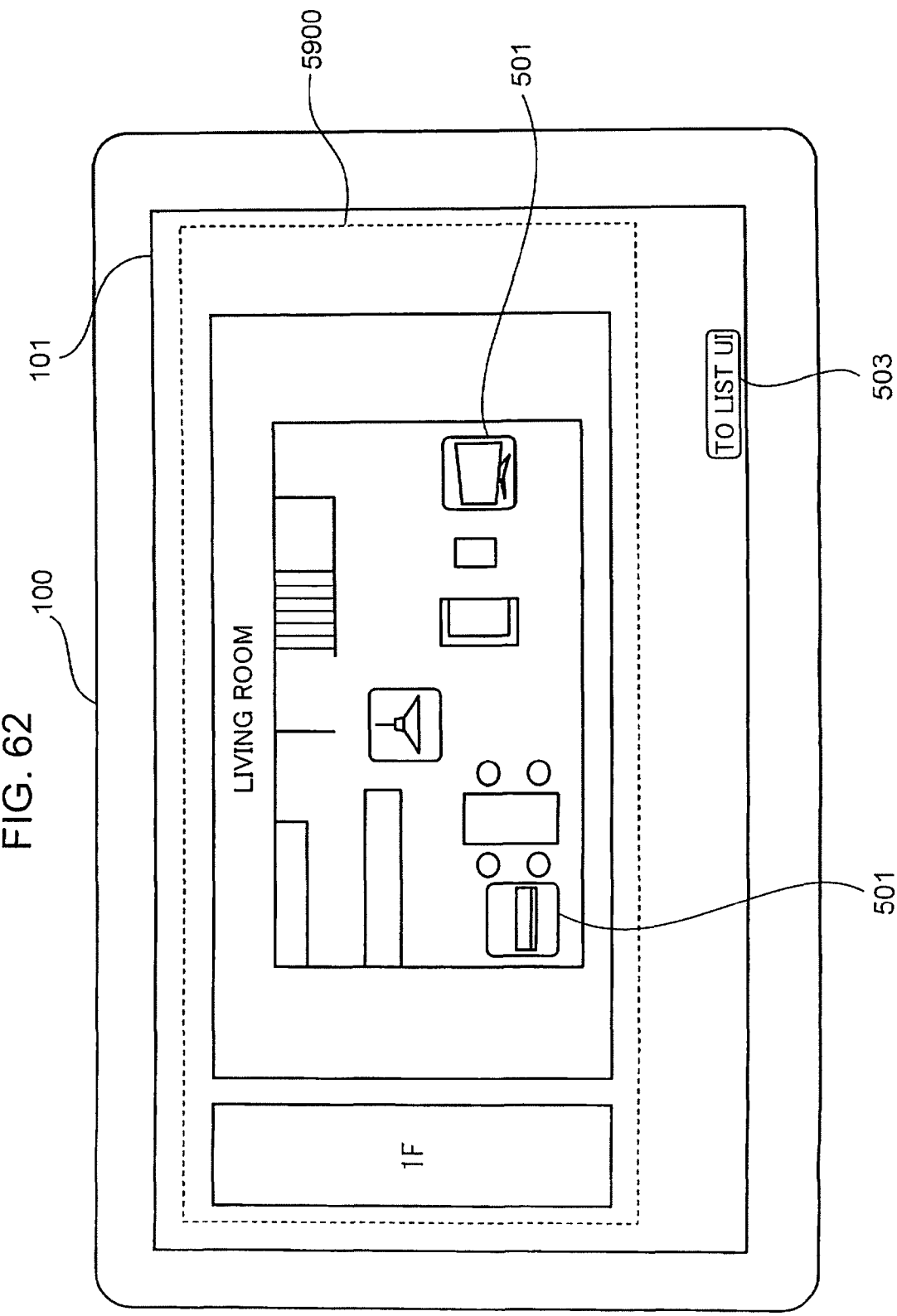
FIG. 62 is a diagram showing a floor plan displayed on a display in the case where a user performs a pinch-out operation on a room in the floor plan shown in FIG. 59.

FIG. 62 is a diagram showing a floor plan that displays a certain room in the floor plan 5900 as enlarged. As shown in FIG. 62, the display control section 103 may display a plan view that planarly represents the shape of the relevant room as overlapped on the floor plan 5900. Alternatively, the display control section 103 may switch to displaying the plan view. This allows the user to grasp the configuration of the rooms in the house and the devices 200 disposed in each room on the floor plan 5900 shown in FIG. 60, and to grasp the actual arrangement position of the devices 200 in the enlarged room on the floor plan 5900 shown in FIG. 62.

In the floor plan 5900 not displayed as enlarged shown in FIG. 60, it is not necessary for the display control section 103 to display the device icons 501 for all the devices 200 disposed within the rooms, and the display control section 103 may display only some of the device icons 501.

In this case, the display control section 103 may display one or a plurality of (for example, two) device icons 501 frequently used by the user on the floor plan 5900. Alternatively, the display control section 103 may not display the device icons 501 on the floor plan 5900 not displayed as enlarged. This prevents the viewability of the floor plan 5900 from being lowered because of an increased number of the device icons 501 displayed on the floor plan 5900 not displayed as enlarged.

Figure 63:
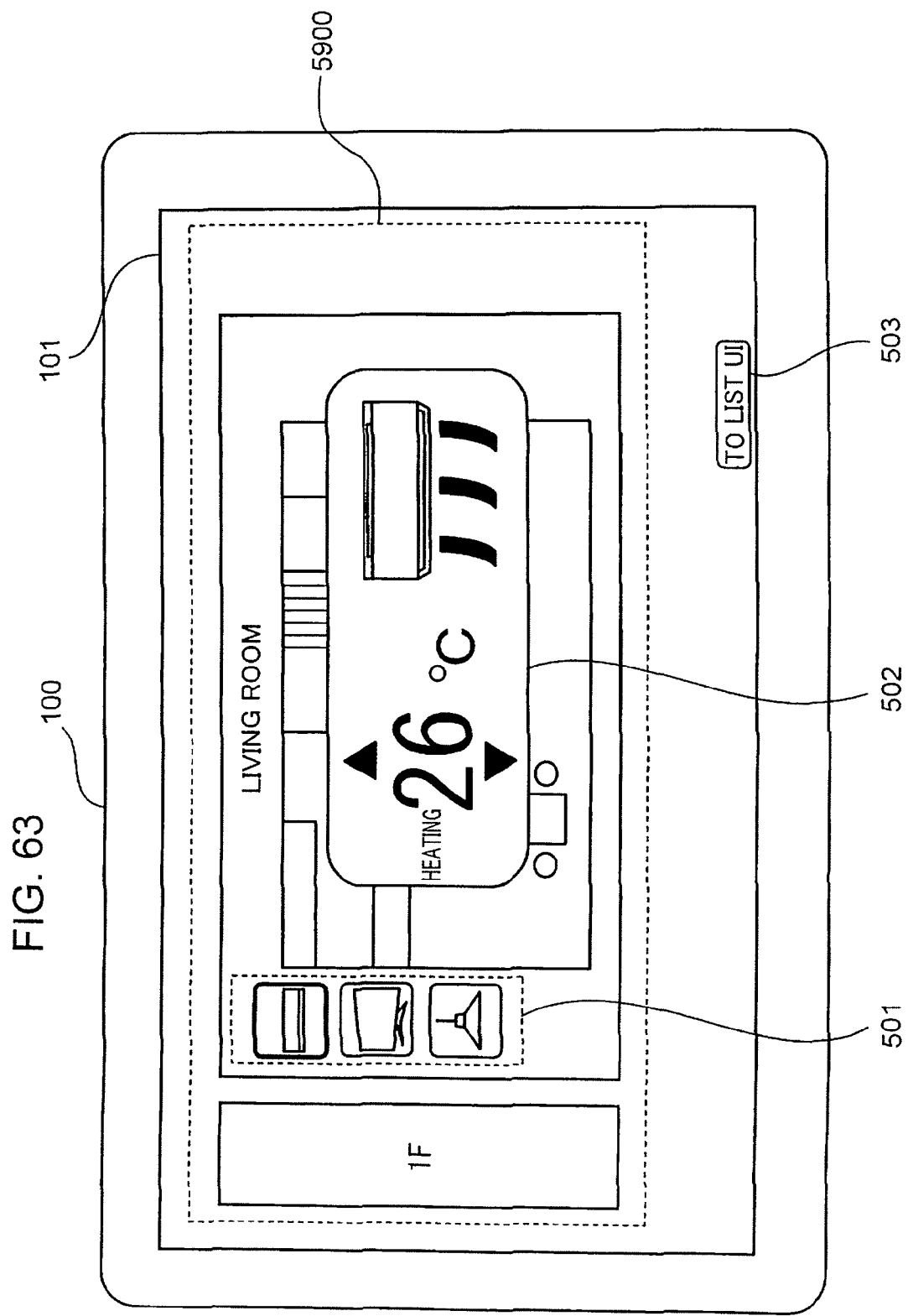
FIG. 63 is a diagram showing the display state of a device control screen in the floor plan displayed as enlarged shown in FIG. 62.

FIG. 63 is a diagram showing the display state of the device control screen 502 in the floor plan 5900 displayed as enlarged shown in FIG. 62. In FIG. 63, as in FIG. 54, the device control screen 502 for the air conditioner is displayed. In FIG. 63, only the device icons 501 disposed in the room (living room) displayed as enlarged are displayed on the left side of the plan view and in the block of the living room. In the example of FIG. 62, the device icons 501 for the air conditioner, the illumination device, and the television set are displayed in the living room within the plan view, and the device icon 501 for the air conditioner selected by the user. Therefore, the device icons 501 are displayed in one vertical line on the left side of the plan view.

In the case where a certain room is displayed as enlarged, it is highly likely that the user operates the device 200 disposed within the room. In the case where a certain room is displayed as enlarged, in addition, the device icons 501 for devices in the other rooms are not displayed on the display 101. Therefore, if the device icons 501 for devices disposed in the other rooms are displayed on the left side of the plan view when the user selects a certain device icon 501, the user may be given a sense of wrongness.

Figure 64:
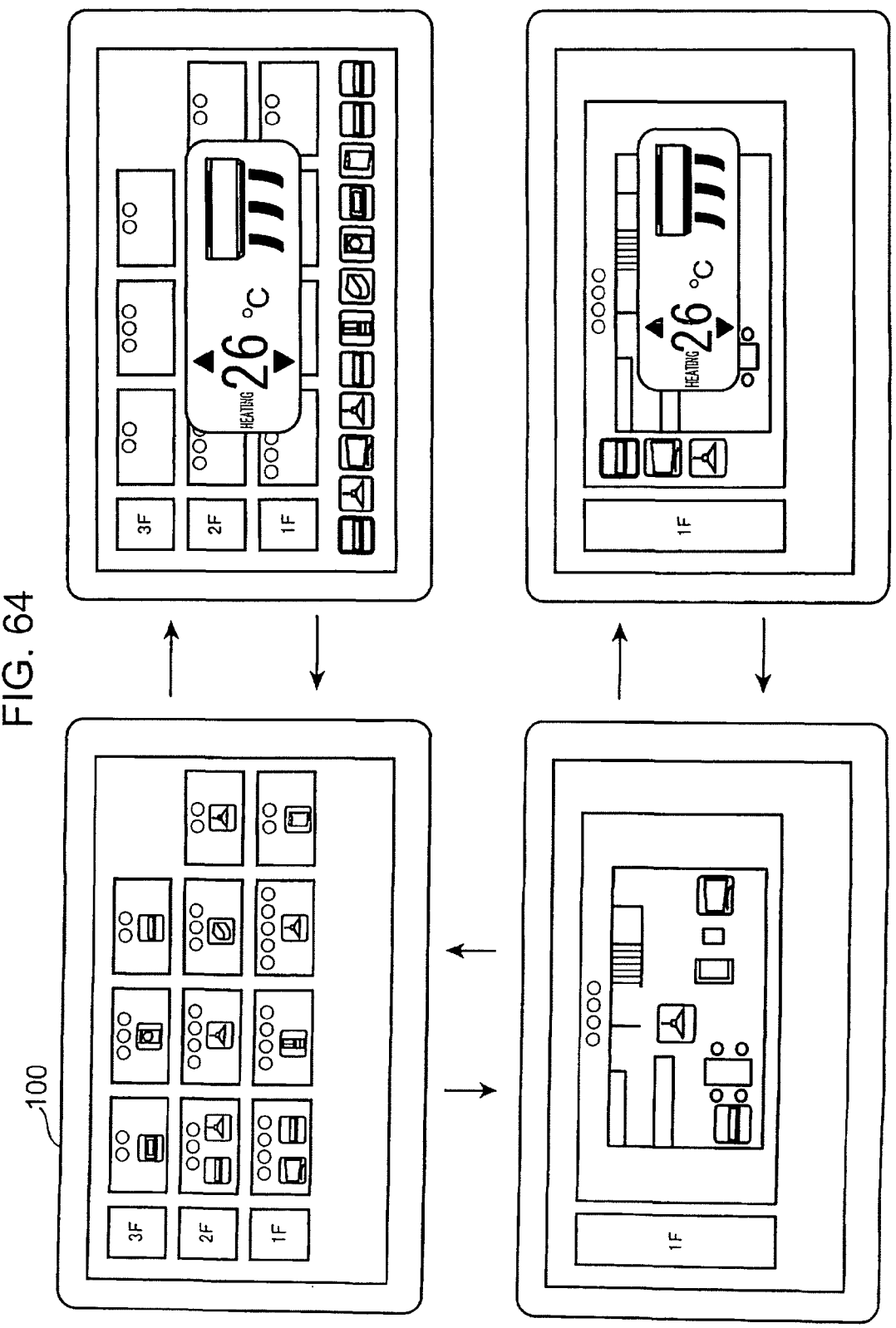
FIG. 64 is a diagram showing screen transition from the display state of the basic screen to the display state of the device control screen.

Thus, in the case where a certain room is displayed as enlarged, the display control section 103 causes only the device icons 501 for the devices 200 disposed in the room to be displayed in one vertical line on the left side of the plan view. In the example of FIG. 64, the device icons 501 are displayed on the left side of the plan view. However, the device icons 501 may be displayed in one vertical line on the right side of the plan view, or may be displayed in one horizontal line on the upper or lower side of the plan view.

FIG. 64 is a diagram showing screen transition from the display state of the basic screen to the display state of the device control screen 502. It is assumed that the user taps on the device icon 501 for the air conditioner, for example, in the basic screen which displays the floor plan 5900 not displayed as enlarged as shown in the upper left diagram of FIG. 64. Then, as shown in the upper right diagram of FIG. 64, the display control section 103 displays the device control screen 502 for the air conditioner as overlapped on the basic screen. In the screen shown in the upper right diagram of FIG. 64, on the other hand, when the user taps on a region on the floor plan 5900 other than the device control screen 502 or taps on the device icon 501 for the air conditioner, the display control section 103 returns the screen display to the basic screen shown in the upper left diagram of FIG. 64.

It is assumed that the user pinches out on the living room in the basic screen shown in the upper left diagram of FIG. 64. Then, as shown in the lower left diagram of FIG. 64, the display control section 103 enlarges the block of the living room, and at the same time displays the plan view of the living room having a size matching the size of the enlarged block as overlapped on the enlarged block. It is assumed that the user pinches in on the living room in the lower left diagram of FIG. 64. Then, the display control section 103 returns the screen display to the basic screen shown in the upper left diagram of FIG. 64.

When the device icon 501 for the air conditioner, for example, is selected in the basic screen shown in the lower left diagram of FIG. 64, the display control section 103 displays the device control screen 502 for the air conditioner as overlapped on the plan view as shown in the lower right diagram of FIG. 64. In the lower right diagram of FIG. 64, when the user taps on a region on the floor plan 5900 other than the device control screen 502 or on the device icon 501 for the air conditioner, the display control section 103 returns the screen display to the screen shown in the lower left diagram of FIG. 64.

Figure 65:
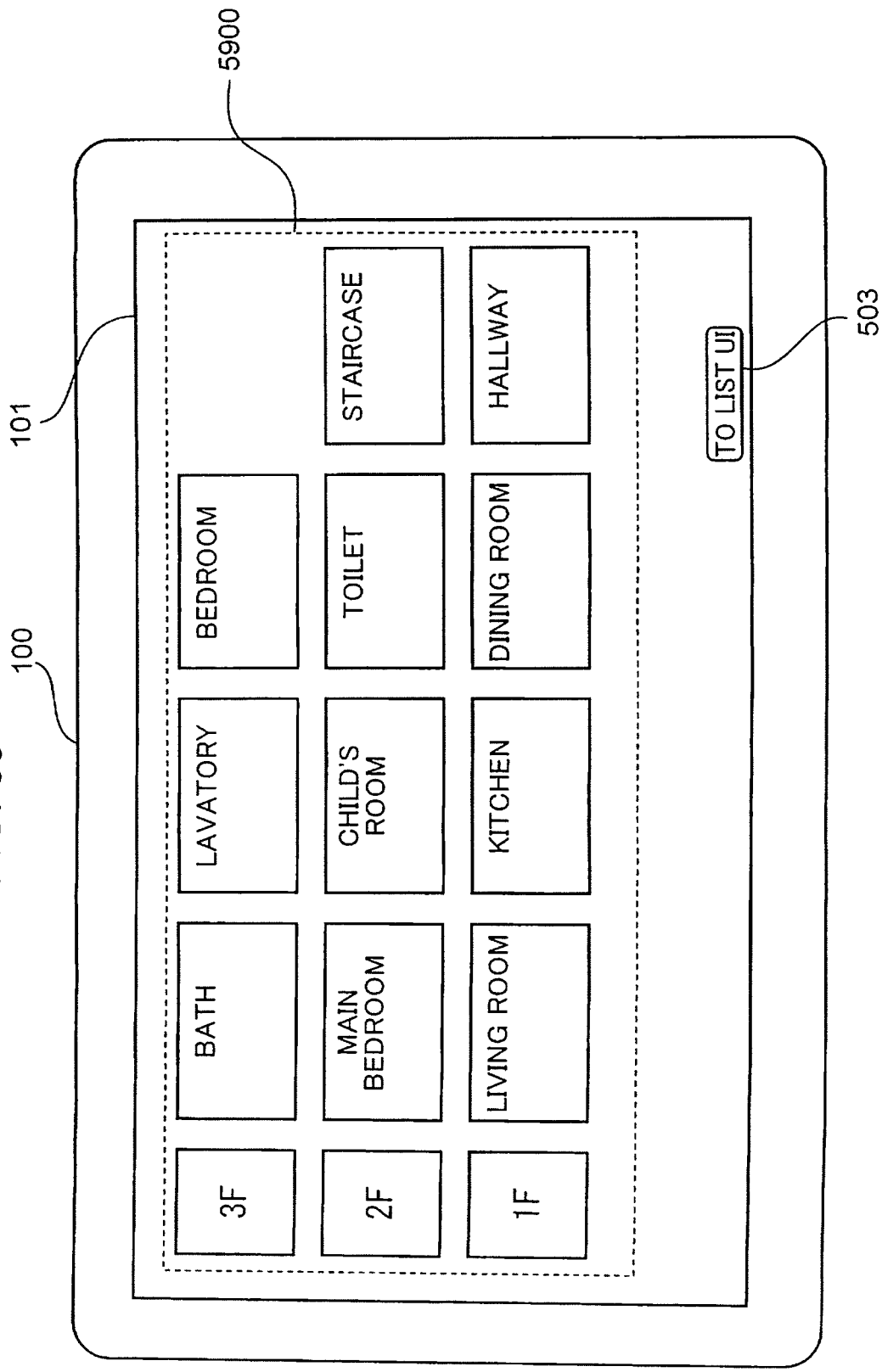
FIG. 65 is a diagram showing the configuration of a basic screen which adopts the floor plan shown in FIG. 59 and in which device icons are not displayed.

FIG. 65 is a diagram showing the configuration of a basic screen 5900 which adopts the floor plan shown in FIG. 59 and in which device icons 501 are not displayed. In the mode shown in FIG. 65, only rooms forming each floor are displayed, and the device icons 501 are not displayed.

Figure 66:
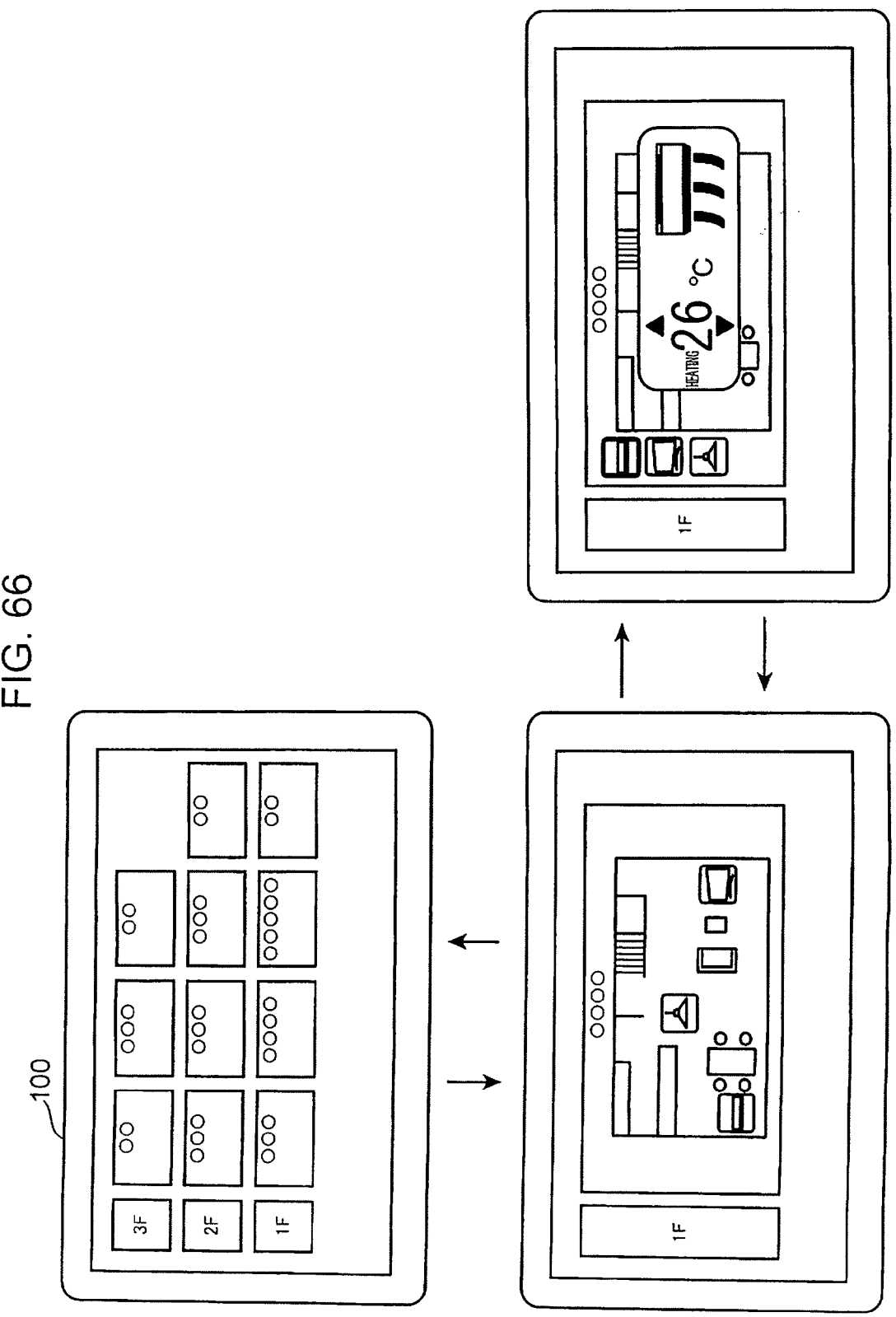
FIG. 66 is a diagram showing screen transition from the display state of the basic screen to the display state of the device control screen for a case where the basic screen in which device icons are not displayed is adopted.

FIG. 66 is a diagram showing screen transition from the display state of the basic screen to the display state of the device control screen 502 for a case where the basic screen in which device icons 501 are not displayed is adopted. It is assumed that the user pinches out on the living room, for example, in the basic screen shown in the upper left diagram of FIG. 66. Then, as shown in the lower left diagram of FIG. 66, the display control section 103 displays the block of the living room as enlarged, and displays the plan view of the living room as overlapped on the block displayed as enlarged. It is assumed that the user taps on the device icon 501 for the air conditioner, for example, in the screen shown in the lower left diagram of FIG. 66. Then, as shown in the lower right diagram of FIG. 66, the display control section 103 displays the device control screen 502 for the air conditioner as overlapped on the plan view of the living room, and disposes the device icons 501 for the living room in one vertical line on the left side of the plan view of the living room. In the lower right diagram of FIG. 66, when the user taps on a region on the floor plan 5900 and outside the display region of the device control screen 502, the display control section 103 returns the display screen to the screen shown in the lower left diagram of FIG. 66.

Figure 67:
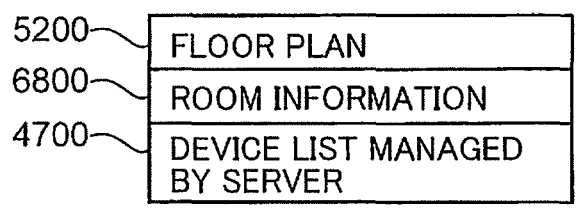
FIG. 67 is a diagram showing the configuration of the home information for a case where the floor plan shown in FIG. 52 is adopted.

FIG. 67 is a diagram showing the configuration of the home information 2700 for a case where the floor plan 5200 shown in FIG. 52 is adopted. As shown in FIG. 67, the home information 6400 includes the floor plan 5200, the room information 6800, and the device list 4700 managed by the server. In the floor plan 5200, the display positions of the rooms are determined in advance. Therefore, the vertex information 2800 included in the home information 2700 is omitted from the home information 6400.

The floor plan 5200 is image data obtained by representing the floor plan 5200 shown in FIG. 52 in a bitmap format, for example. Alternatively, the floor plan 5200 may be information that prescribes the color, the shape, the size, and so forth for displaying the floor plan 5200. The room information 6800 is information for deciding the regions of rooms from the floor plan 5200.

FIG. 68 is a diagram showing the configuration of room information 6800 shown in FIG. 67. As shown in FIG. 68, the room information 6800 includes a room ID 6801, a room type 6802, a floor level 6803, and a display position 6804. The room ID 6801 is an identifier that identifies a room on the floor plan 5200. The room type 6802 indicates the type of the room. The floor level 6803 indicates the floor level (floor) on which the room is disposed. The display position 6804 indicates the arrangement position of the room on the floor plan 5200.

Figure 69:
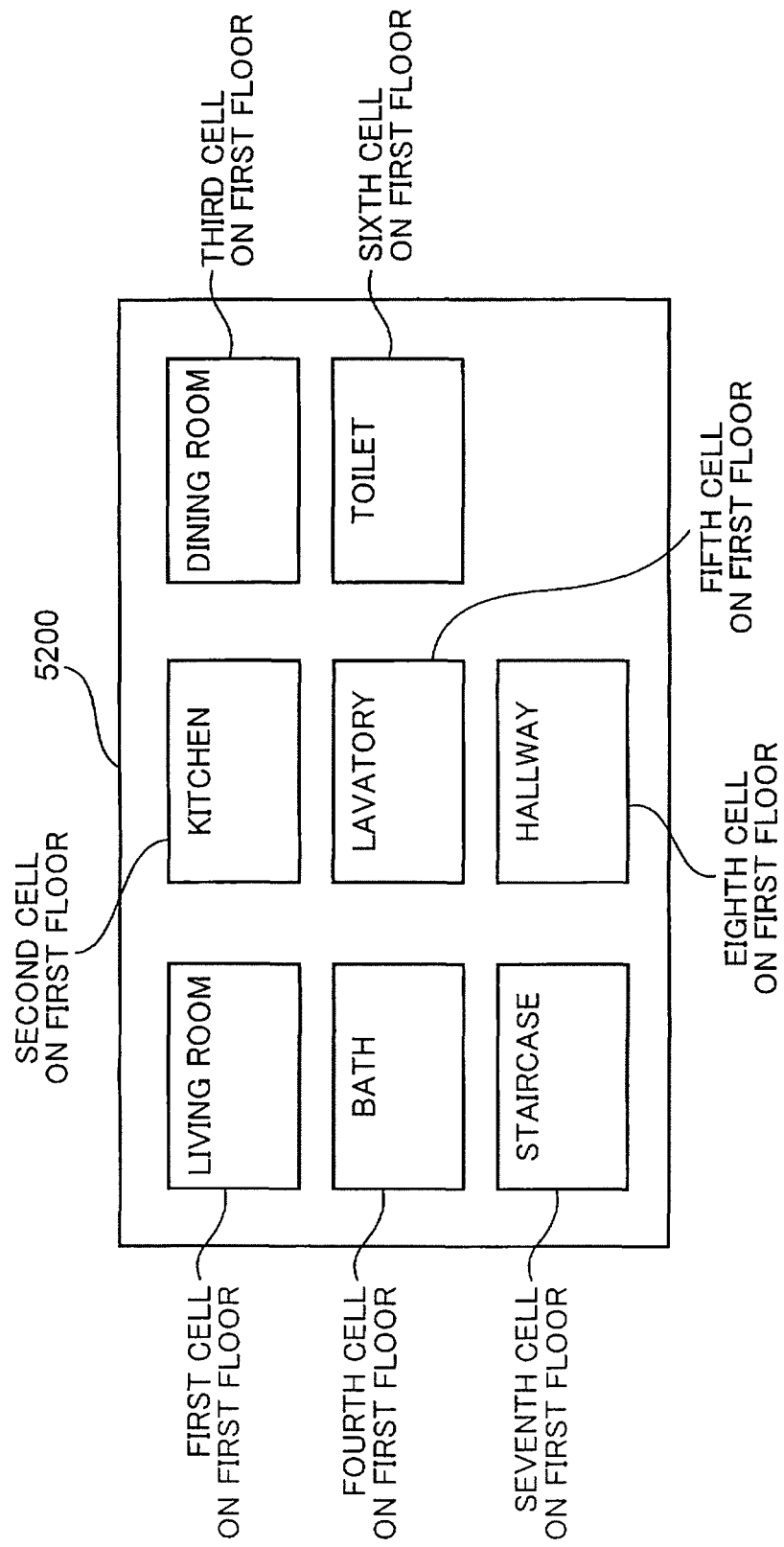
FIG. 69 is a diagram showing an example of the correspondence between the display position in the room information shown in FIG. 67 and the floor plan.

FIG. 69 is a diagram showing an example of the correspondence between the display position 6804 in the room information 6800 and the floor plan 5200. As shown in FIG. 69, the order of the blocks on the floor plan 5200 is prescribed such that the block in the first row and the first column corresponds to the first cell, the block in the first row and the second column corresponds to the second cell, the block in the first row and the third column corresponds to the third cell, the block in the second row and the first column corresponds to the fourth cell, and so forth.

For example, the room with a room ID 6801 of A has a display position 6804 of "FIRST CELL ON FIRST FLOOR". Therefore, as shown in FIG. 69, the display control section 103 interprets the block in the first cell (in the first row and the first column) on the floor plan 5201 for the first floor as the living room.

In the example of FIG. 69, the blocks are disposed in three horizontal lines, and therefore the cell in the second row and the first column corresponds to the fourth cell, and the cell in the third row and the first column corresponds to the seventh cell. It should be noted, however, that this is merely exemplary. For example, in the case where the cells are arranged in four columns in the horizontal direction, the correlation between the order of the cells and the arrangement positions of the blocks is changed as appropriate in accordance with the number of blocks in the horizontal direction, and the cell in the second row and the first column corresponds to the fifth cell, and the cell in the third row and the first column corresponds to the ninth cell.

FIG. 70 is a diagram showing the configuration of a device list 4700 managed by the server 300 for a case where the floor plan 5200 shown in FIG. 52 is adopted. It is not necessary for the floor plan 5200 to indicate the arrangement position of the device 200 in the room. Therefore, in the device list 4700 shown in FIG. 70, unlike FIG. 34, the room type 6802 is registered in the arrangement 4704. The device list 4700 shown in FIG. 70 is otherwise the same as the device list 4700 shown in FIG. 34. For example, the air conditioner with a device ID 4701 of A is disposed in the living room, and therefore "LIVING ROOM" is registered in the arrangement 4704. In the example of FIG. 70, the room type 6802 is adopted as the arrangement 4704. However, any other information that specifies a room may be registered. For example, the room ID 6801 may be adopted as the arrangement 4704.

FIG. 71 is a diagram showing the configuration of a device list 3100 managed by the home controller 100 for a case where the floor plan 5200 shown in FIG. 52 is adopted. Also in the device list 3100 of FIG. 71, for the same reason as that for the device list 4700 of FIG. 70, the room type 6802 is registered in the arrangement 3104. The device list 3100 of FIG. 71 is otherwise the same as the device list 3100 shown in FIG. 35. Also in FIG. 71, the room ID 6801 may be adopted as the arrangement 3104.

Next, the device list 3100 for a case where the plan view of a certain room is displayed in the case where a pinch-out operation is performed on the room on the basic screen of the floor plan 5900 as shown in FIG. 62 will be described. In this case, the room information 6800 shown in FIG. 68 may include an item of the plan view of the room. Then, image data for the plan view of the relevant room may be registered in the item of the plan view of the room. For the plan view of the room, as shown in FIG. 33, the origin may be set at the left end of the room, for example, the X axis and the Y axis may be set in the horizontal direction and the vertical direction, respectively, and the position of the room may be represented by the X and Y coordinates.

Meanwhile, not only the room type 6802 but also the coordinate in the room is registered in the arrangement 3104 of the device list 3100 shown in FIG. 71. This allows the display control section 103 to discriminate from the content of the arrangement 3104 at what position on the plan view representing the room the device icon 501 is to be disposed.

In the embodiment, the server 300 is not an essential constituent element, and various types of information managed by the server 300 (such as the home information 2700 and the state of the devices 200) may be managed by the home controller 100. This allows the embodiment described above to be embodied without the server 300. In this case, it is not necessary for the home controller 100 to manage information on the entire house, and it is only necessary to manage information related to the devices 200 controlled by the home controller 100 and the house in which the devices 200 are disposed.

(Display of State Confirmation Screen)

An embodiment in which, when the device icon 501 is selected, the device control screen 502 for the device 200 corresponding to the selected device icon 501 is displayed on the display 101 of the home controller 100 has been described above. An embodiment in which the state confirmation screen for the second target device is displayed on the display of the first target device or the display 101 of the home controller 100 will be described below.

As described with reference to FIG. 2, the air conditioner 201 and the television set 209 are each an example of the device 200. The control device for the air conditioner 201 includes, as an example of the device 200 shown in FIG. 3, a control execution section 211, a state management section 212, a storage section 214, and a communication control section 217. In addition, the control device for the television set 209 also includes, as an example of the device 200 shown in FIG. 3, a control execution section 211, a state management section 212, a storage section 214, and a communication control section 217.

FIG. 72 is a diagram showing an example of the basic screen displayed on the display 101 of the home controller 100.

As described with reference to FIG. 5, the basic screen of the home controller 100 displayed on the display 101 includes a floor plan 500 and device icons 501. In FIG. 72, the device list display change button 503 shown in FIG. 5 is not shown. The device icons 501 are displayed so as to be draggable on the floor plan 500.

In FIG. 72, a television set icon 60101 that represents the television set 209, an air conditioner icon 60102 that represents the air conditioner 201, a refrigerator icon 60103 that represents the refrigerator 205, an illumination device icon 60104 that represents the illumination devices 202 and 203, and a washing machine icon 60105 that represents the washing machine are shown as examples of the device icon 501. In the following description, such icons are referred to as the device icons 501 when the individual device icons are not distinguished from each other.

Figure 73:
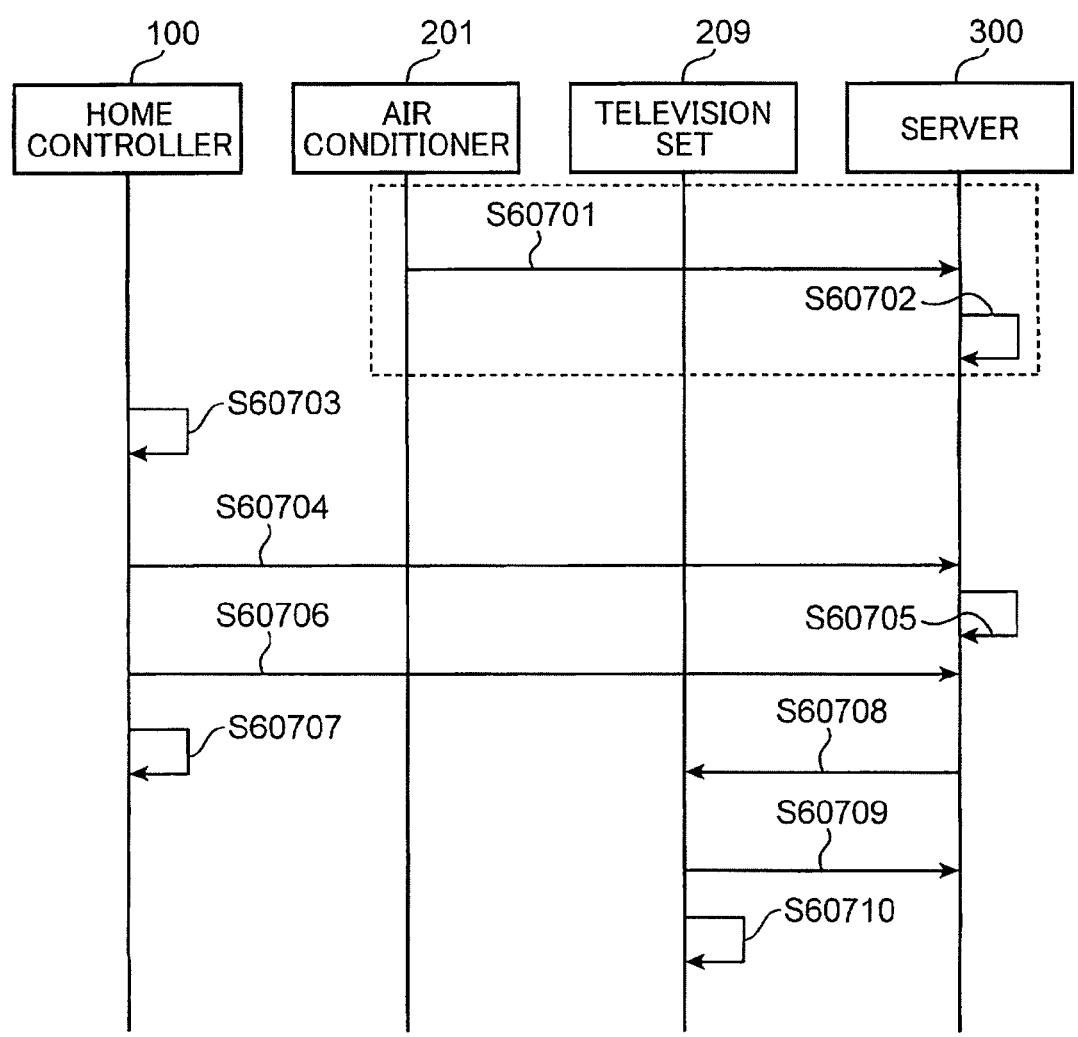
FIG. 73 is a diagram showing the sequence of operation for displaying the state confirmation screen.
Figure 74:
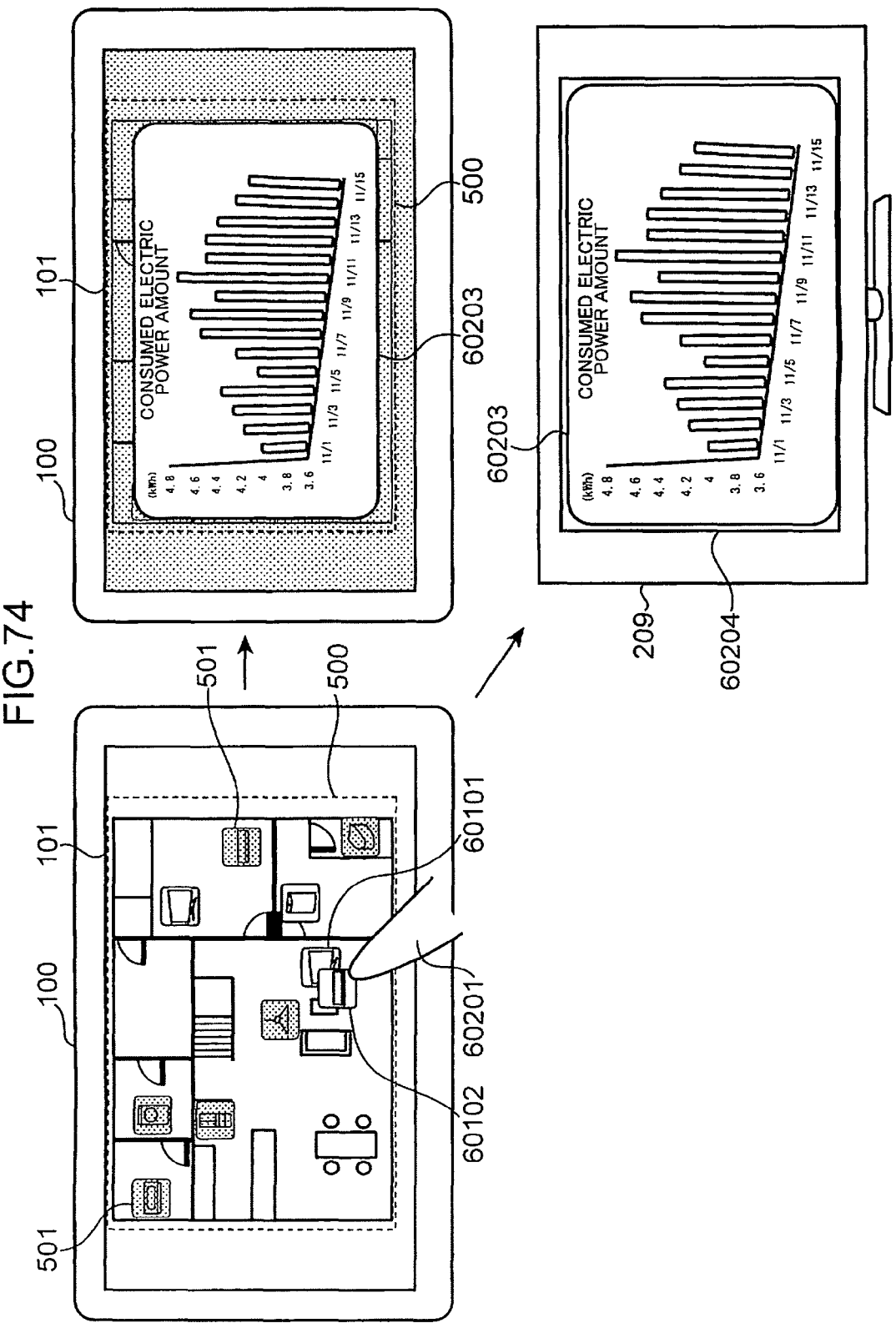
FIG. 74 is a diagram showing an operation example for displaying the state confirmation screen on the display of the home controller and the display of the television set.

FIG. 73 is a diagram showing the sequence of operation for displaying the state confirmation screen 60203. FIG. 74 is a diagram showing an operation example for displaying the state confirmation screen 60203 on the display 101 of the home controller 100 and the display 60204 of the television set 209.

In S60701 of FIG. 73, the device state (for example, the consumed electric power amount) of the air conditioner 201 managed by the state management section 212 of the air conditioner 201 is transmitted by the communication control section 217 of the air conditioner 201, and received by the communication control section 307 of the server 300. In S60702, the home information management section 301 of the server 300 stores the received device state of the air conditioner 201 in the storage section 304. S60701 and S60702 are executed asynchronously with the other steps, and regularly for example.

In S60703, with the basic screen displayed on the display 101 of the home controller 100 as shown in FIG. 72, the air conditioner icon 60102 is dragged by the contacting object 60201, and, the touch panel control section 102 of the home controller 100 senses that the air conditioner icon 60102 is dropped on the television set icon 60101 as shown in the left diagram of FIG. 74.

Here, when the touch panel control section 102 senses that the air conditioner icon 60102 is dragged (long-pressed) by the contacting object 60201, the display control section 103 of the home controller 100 lowers the brightness of the device icons 501 other than the air conditioner icon 60102 and the television set icon 60101 compared to the brightness of the air conditioner icon 60102 and the television set icon 60101 as shown in the left diagram of FIG. 74.

In subsequent S60704 of FIG. 73, the device control section 106 of the home controller 100 generates a display control command for displaying, on the display 60204 of the television set 209, information that indicates the state of the air conditioner 201, the communication control section 107 transmits the generated display control command, and the communication control section 307 of the server 300 receives the transmitted display control command. The display control command generated by the device control section 106 may include a command for turning on the television set 209 when the television set 209 is not turned on.

In S60705, the home information management section 301 of the server 300 prepares display information for displaying the state confirmation screen 60203 on the basis of information that indicates the device state of the air conditioner 201 stored in the storage section 304 of the server 300. In S60706, the communication control section 107 of the home controller 100 requests acquisition of the prepared display information from the server 300, and acquires the requested display information.

In S60707, the display control section 103 of the home controller 100 causes the display 101 to display the state confirmation screen 60203 on the basis of the display information acquired by the communication control section 107 as shown in the upper right diagram of FIG. 74. Here, the display control section 103 causes the display 101 to display the state confirmation screen 60203 as overlapped on the basic screen which represents the floor plan 500. In addition, the display control section 103 lowers the brightness of the basic screen which represents the floor plan 500 compared to the brightness of the state confirmation screen 60203. The display control section 103 may cause the display 101 to simply display the state confirmation screen 60203 as overlapped on the basic screen which represents the floor plan 500 without lowering the brightness of the basic screen which represents the floor plan 500.

In S60708, the device control section 302 of the server 300 generates a display command on the basis of the display control command transmitted in S60704, and the communication control section 307 transmits the generated display command toward the communication control section 217 of the television set 209. The display command generated by the device control section 302 may include a command for turning on the television set 209 when the television set 209 is not turned on.

In S60709, the communication control section 217 of the television set 209 requests acquisition of the prepared display information from the server 300, and acquires the requested display information. In S60710, the control execution section 211 of the television set 209 displays the state confirmation screen 60203 on the display 60204 on the basis of the acquired display information as shown in the lower right diagram of FIG. 74.

As shown in FIG. 74, the display screen at the time when the state confirmation screen 60203 is displayed on the display 101 of the home controller 100 and the display screen at the time when the state confirmation screen 60203 is displayed on the display 60204 of the television set 209 may be the same display screen. Alternatively, the display screen on the display 101 of the home controller 100 may be different from the display screen on the display 60204 of the television set 209, and may be the state confirmation screen 60203 plus a device control screen for controlling the air conditioner 201 displayed by the display control section 103.

In the embodiment, the display control command generated by the device control section 106 corresponds to an example of the first control command, the command for turning on the television set 209 when the television set 209 is not turned on corresponds to an example of the second control command, and the state confirmation screen 60203 of FIG. 74 corresponds to an example of the confirmation screen for confirmation of the state of the second target device.

As described using FIG. 73 and FIG. 74, the state confirmation screen 60203 for the air conditioner 201 can be confirmed not only on the display 101 of the home controller 100 but also on the display 60204 of the television set 209. Therefore, even in the case where the display area of the display 101 of the home controller 100 is small, for example, the display 60204 of the television set 209 with a larger display area can be utilized.

In addition, only an operation of dropping the air conditioner icon 60102 on the television set icon 60101 is required, and an operation screen for utilizing the display 60204 of the television set 209 with a larger display area is not separately provided. Therefore, it is possible to omit a plurality of steps to be taken to display an operation screen separately from the floor plan 500 in order to display information that indicates the state of the second target device on the display 60204 of the television set 209 with a larger display area, and to reduce the number of process steps to be performed within the home controller 100 or the number of operations to be performed by the user.

In addition, when the touch panel control section 102 senses that the air conditioner icon 60102 is long-pressed by the contacting object 60201, the display control section 103 of the home controller 100 lowers the brightness of the device icons 501 other than the air conditioner icon 60102 and the television set icon 60101 compared to the brightness of the air conditioner icon 60102 and the television set icon 60101. Consequently, it is possible to preliminarily prevent an erroneous operation by the user in which the air conditioner icon 60102 is erroneously dropped on the device icon 501 other than the television set icon 60101.

In addition, in the case where the device control section 106 generates a display control command including a command for turning on the television set 209 when the television set 209 is not turned on, an operation of dropping the air conditioner icon 60102 on the television set icon 60101 also serves as an operation for turning on the television set 209. Thus, there is no need to separately perform an operation for turning on the television set 209.

This reduces the number of process steps to be performed within the home controller 100 or the number of operations to be performed by the user. As a result, it is possible to reduce the time before the state confirmation screen 60203 for a desired second device is displayed.

In addition, when the display control section 103 displays the state confirmation screen 60203 on the display 101 as overlapped on the basic screen which represents the floor plan 500, the display control section 103 lowers the brightness of the basic screen which represents the floor plan 500 compared to the brightness of the state confirmation screen 60203. Consequently, it is possible to prevent the floor plan 500 from obstructing the user viewing the state confirmation screen 60203.

Figure 75:
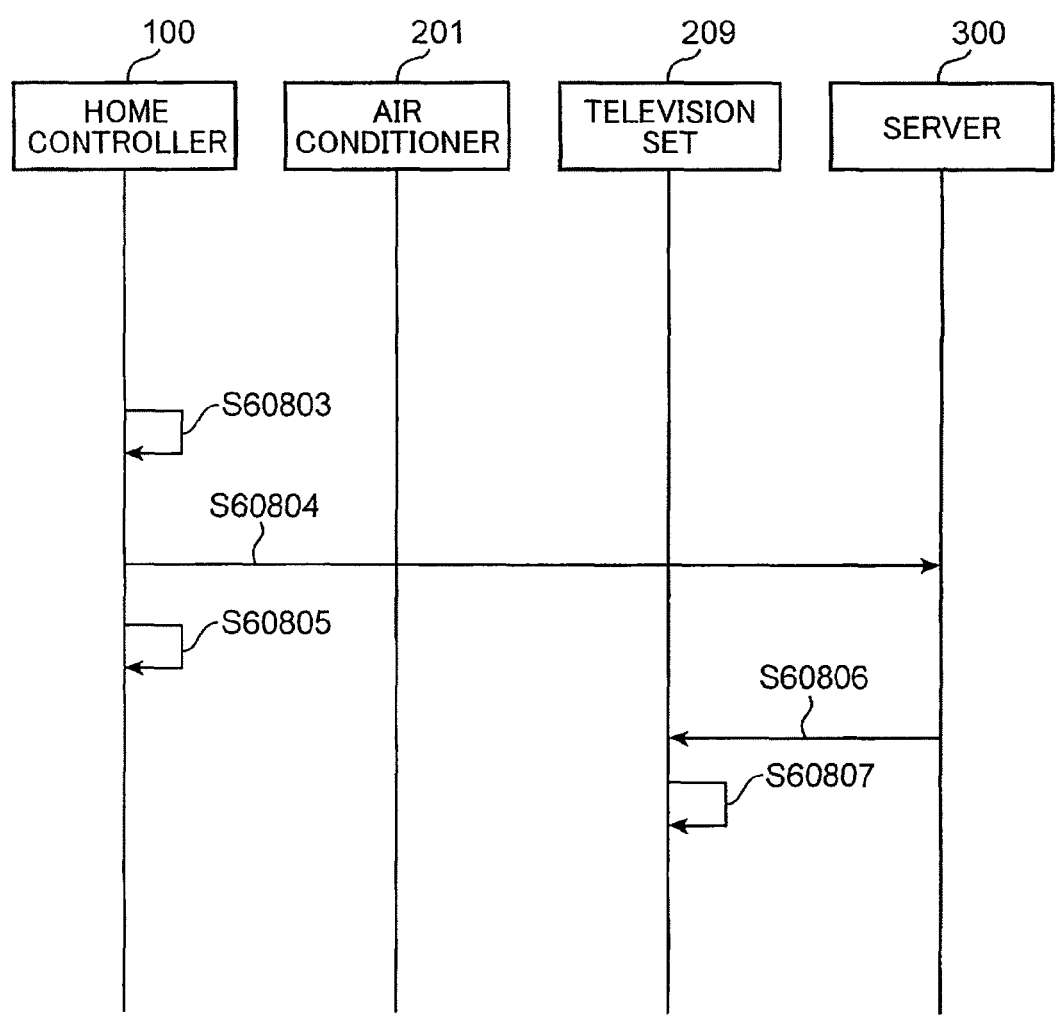
FIG. 75 is a diagram showing the sequence of operation for terminating display of the state confirmation screen.
Figure 76:
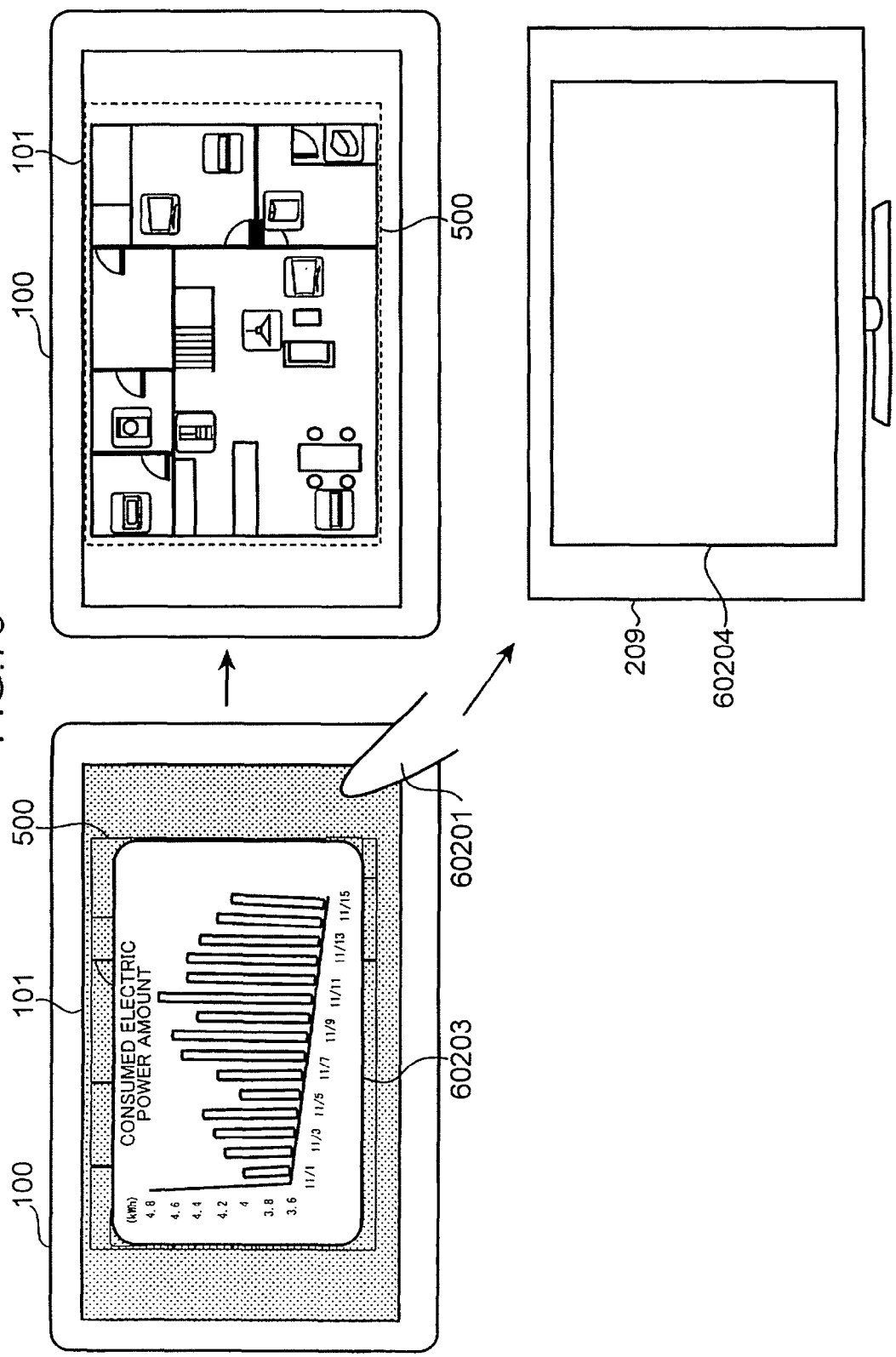
FIG. 76 is a diagram showing an operation example for terminating display of the state confirmation screen.

FIG. 75 is a diagram showing the sequence of operation for terminating display of the state confirmation screen 60203. FIG. 76 is a diagram showing an operation example for terminating display of the state confirmation screen 60203.

In S60803 of FIG. 75, the touch panel control section 102 of the home controller 100 senses that a portion of the display 101 outside the display region of the state confirmation screen 60203 is selected (tapped on) by the contacting object 60201 as shown in the upper left diagram of FIG. 76.

In S60804, the device control section 106 of the home controller 100 generates a termination control command for terminating display of the state confirmation screen 60203, the communication control section 107 transmits the generated termination control command, and the communication control section 307 of the server 300 receives the transmitted termination control command.

In S60805, as shown in the upper right diagram of FIG. 76, the display control section 103 of the home controller 100 terminates display of the state confirmation screen 60203, and restores the original brightness of the basic screen which represents the floor plan 500. In S60806, the device control section 302 of the server 300 generates a termination command on the basis of the received termination control command, and the communication control section 307 transmits the generated termination command to the communication control section 217 of the television set 209. In S60807, upon receiving the termination command, the control execution section 211 of the television set 209 terminates display of the state confirmation screen 60203 on the display 60204 as shown in the lower right diagram of FIG. 76.

As described using FIG. 75 and FIG. 76, when the touch panel control section 102 of the home controller 100 senses selection of a location outside the region of the state confirmation screen 60203, the display control section 103 erases display of the state confirmation screen 60203 on the display 101, and restores the original brightness of the basic screen which represents the floor plan 500. Consequently, display of the original basic screen can be restored by exploiting the existing display resource.

In FIG. 75 and FIG. 76, display of the state confirmation screen is terminated when a portion of the display 101 of the home controller 100 outside the display region of the state confirmation screen 60203 is tapped on by the contacting object 60201. Alternatively, display of the state confirmation screen may be terminated when the state confirmation screen 60203 is tapped on by the contacting object 60201. Still alternatively, a "back" button may be displayed on the display 101, and display of the state confirmation screen may be terminated when the "back" button is tapped on by the contacting object 60201.

In FIG. 75 and FIG. 76, in addition, display of the state confirmation screen 60203 on the display 60204 of the television set 209 is terminated on the basis of an operation on the home controller 100. Alternatively, display of the state confirmation screen 60203 may be terminated on the basis of a signal from a remote controller for operating the television set 209.

Figure 77:
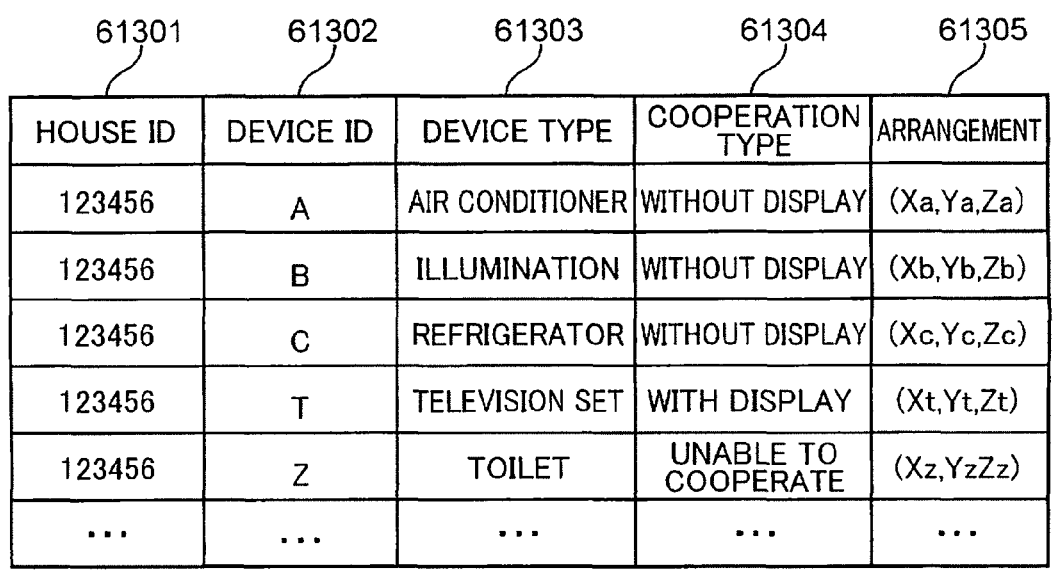
FIG. 77 is a diagram showing information stored in the storage section of the home controller.
Figure 78:
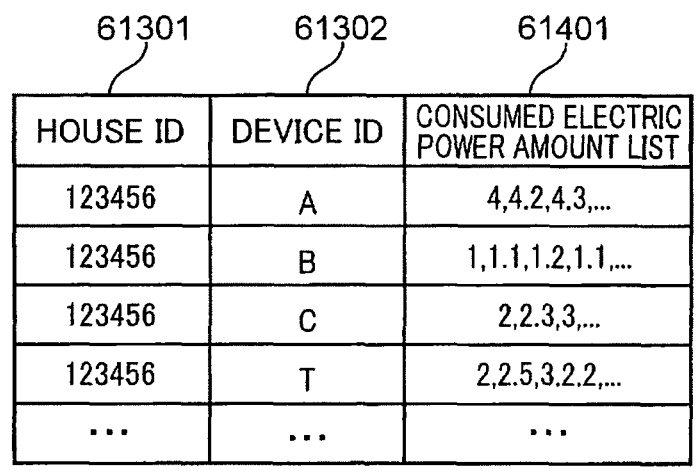
FIG. 78 is a diagram showing information stored in the storage section of the server.

FIG. 77 is a diagram showing information stored in the storage section 104 of the home controller 100. FIG. 78 is a diagram showing information stored in the storage section 304 of the server 300.

In FIG. 77, house identification information (house ID) 61301 is information for identification of each house. Device identification information (device ID) 61302 is information for identification of each device 200. A device type 61303 is information that indicates the type of the device 200. A cooperation type 61304 is information that indicates whether or not the device has a display and if the device is unable to cooperate. An arrangement 61305 is information that indicates the arrangement position of the device 200 on the floor plan 500. In FIG. 78, a consumed electric power amount list 61401 is information that indicates the consumed electric power amount (in units of kWh) of the device 200 for every predetermined period.

It is necessary that only the house ID 61301 and the device ID 61302 should be stored in both the home controller 100 and the server 300. It is only necessary that either one of the home controller 100 and the server 300 may store the other information, namely the device type 61303, the cooperation type 61304, the arrangement 61305, and the consumed electric power amount list 61401.

In the cooperation type 61304 of FIG. 77, "WITHOUT DISPLAY" includes a case where the device 200 does not have a display, and a case where the device 200 has a display but the display area of the display is smaller than the display area of the display of a device indicated by "WITH DISPLAY" (in FIG. 77, the display 60204 of the television set 209).

In the cooperation type 61304 of FIG. 77, in addition, "UNABLE TO COOPERATE" indicates that the device 200 indicated by "UNABLE TO COOPERATE" (in FIG. 77, the toilet 207) and the device 200 indicated by "WITH DISPLAY" (in the embodiment, the television set 209) do not cooperate with each other, and that information that indicates the state of the device 200 indicated by "UNABLE TO COOPERATE" cannot be displayed on the display (in the embodiment, the display 60204 of the television set 209) of the device 200 indicated by "WITH DISPLAY". "UNABLE TO COOPERATE" is based on the assumption of "WITHOUT DISPLAY". In other words, the devices 200 indicated by "UNABLE TO COOPERATE" are included in the devices 200 indicated by "WITHOUT DISPLAY".

As shown in FIG. 77, the "toilet" in the device type 61303 includes information "UNABLE TO COOPERATE" in the cooperation type 61304. Therefore, as shown in FIG. 78, the server 300 does not store information related to the "toilet".

In the embodiment, the device 200 with information in the cooperation type 61304 of FIG. 77 being "WITH DISPLAY" (in FIG. 77, the television set 209) corresponds to an example of the first target device, the devices 200 with information in the cooperation type 61304 of FIG. 77 being "WITHOUT DISPLAY" (in FIG. 77, the air conditioner 201, the illumination devices 202 and 203, and the refrigerator 205) and the device 200 indicated by "UNABLE TO COOPERATE" (in FIG. 77, the toilet 207) correspond to an example of the second target device, and the information in the consumed electric power amount list 61401 of FIG. 78 corresponds to an example of the information that indicates the state of the second target device and an example of the log information related to the use history of the second target device.

In the following description, the device 200 with information in the cooperation type 61304 of FIG. 77 being "WITH DISPLAY" (in FIG. 77, the television set 209) is also referred to as a "first device", and the devices 200 with information in the cooperation type 61304 of FIG. 77 being "WITHOUT DISPLAY" (in FIG. 77, the air conditioner 201, the illumination devices 202 and 203, and the refrigerator 205) and the device 200 indicated by "UNABLE TO COOPERATE" (in FIG. 77, the toilet 207) are also referred to as "second devices".

Based on the information in the cooperation type 61304 of FIG. 77, the device management section 105 of the home controller 100 or the home information management section 301 of the server 300 manages the first device and the second devices, and further manages devices that are unable to cooperate among the second devices.

In the embodiment, as shown in FIG. 78, the server 300 does not store information related to the "toilet". Alternatively, the server 300 may store information related to the "toilet".

As described with reference to FIG. 2, the toilet 207 is an example of the device 200. The control device for the toilet 207 includes, as an example of the device 200 shown in FIG. 3, a control execution section 211, a state management section 212, a storage section 214, and a communication control section 217. In the embodiment, the toilet 207 includes a heater that heats a toilet seat, a heater that heats water, a pump that jets the heated water, and so forth. The state management section 212 of the toilet 207 manages the consumed electric power amount of the heaters, the pump, and so forth, and stores the consumed electric power amount in the storage section 214.

Thus, the server 300 may further include information that indicates the consumed electric power amount of the toilet 207 for every predetermined period in the consumed electric power amount list 61401 shown in FIG. 78.

Figure 79:
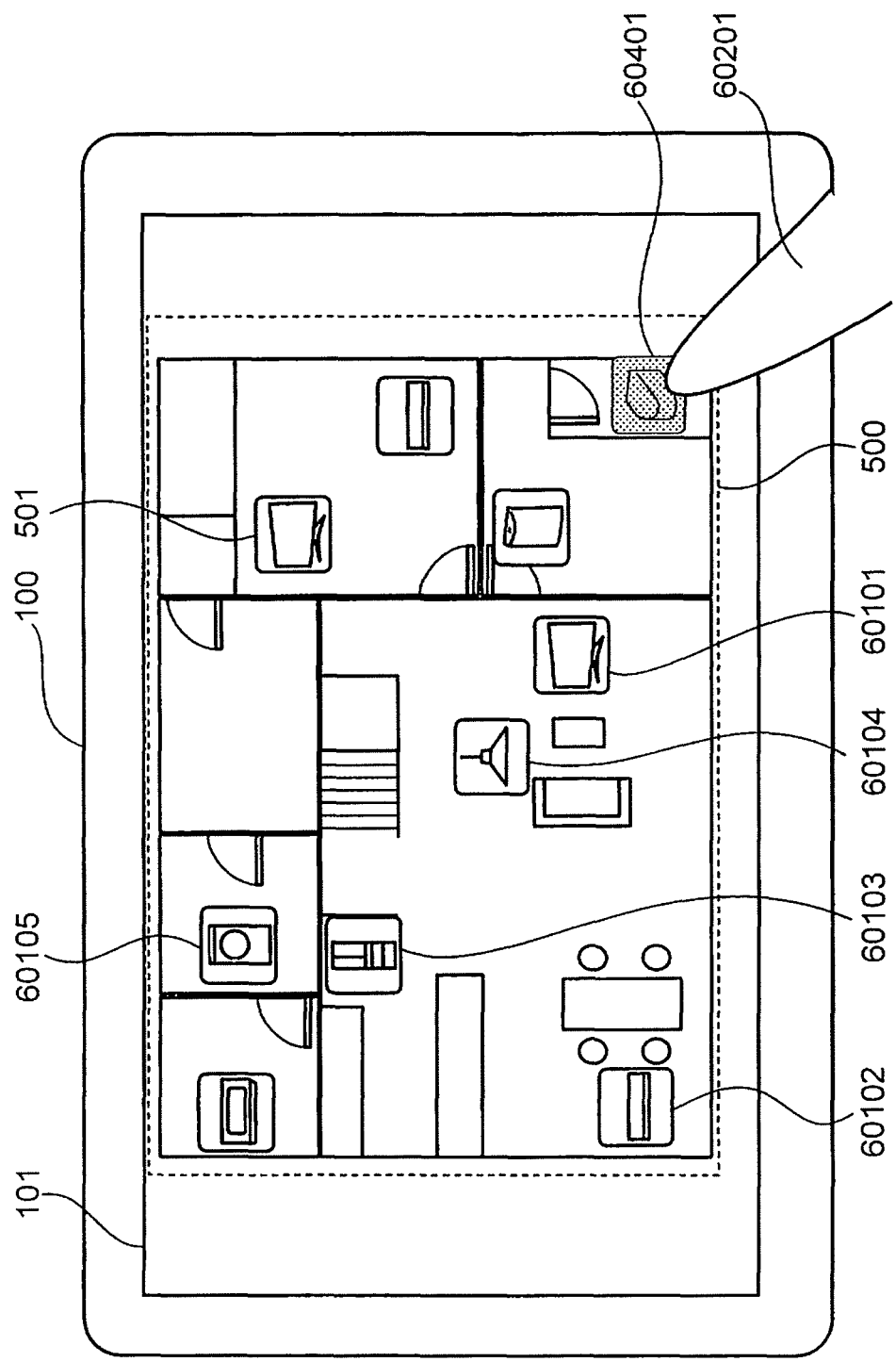
FIG. 79 is a diagram showing a display example of a device icon for the device, for which the cooperation type is "unable to cooperate".

FIG. 79 is a diagram showing a display example of a device icon for the device 200, for which the cooperation type 61304 is "UNABLE TO COOPERATE". In the display 101 of FIG. 79, the basic screen which includes the floor plan 500 is displayed. In this display state, the touch panel control section 102 of the home controller 100 senses that contact between the contacting object 60201 and the toilet icon 60401 which represents the toilet 207 continues for a predetermined time or more. That is, the touch panel control section 102 senses that the contacting object 60201 is, what is called, long-pressing the toilet icon 60401.

Then, since the cooperation type 61304 of the toilet 207 includes information "UNABLE TO COOPERATE", the display control section 103 of the home controller 100 lowers the brightness of the toilet icon 60401 compared to the brightness of the toilet icon 60401 on the basic screen.

In this way, in the case where the cooperation type 61304 of the device 200 is "UNABLE TO COOPERATE" and the device 200 does not cooperate with the television set 209, the brightness of the device icon 501 is lowered if the contacting object 60201 long-presses the device icon 501 (in the embodiment, the toilet icon 60401). As a result, the user can be informed, by exploiting the existing display resource, that information indicating the state of the device 200 is not displayed before the device icon 501 is dragged to the television set icon 60101.

Therefore, a plurality of steps can be omitted since it is not necessary to prepare a separate display screen for showing that information indicating the state of the toilet 207 is not displayed on the display 60204 of the television set 209, and to reduce the number of process steps to be performed within the home controller 100 or the number of operations to be performed by the user. In addition, it is possible to preliminarily prevent an erroneous operation by the user in which the toilet icon 60401 is dropped on the television set icon 60101 in the case where information indicating the state of the toilet 207 is not displayed on the display 60204 of the television set 209.

Figure 80:
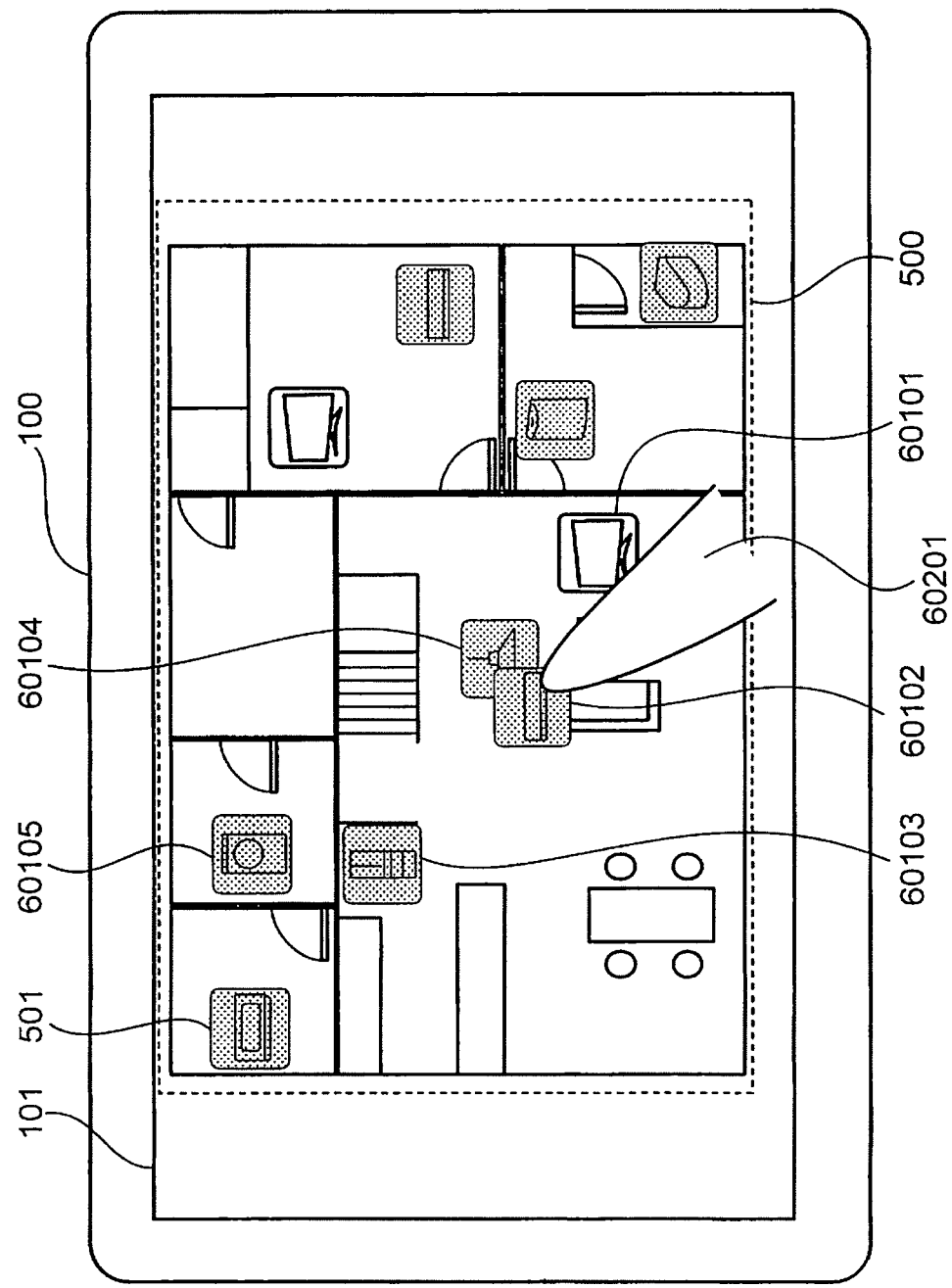
FIG. 80 is a diagram showing a display example for a case where the device icon to be dragged passes through the device icon for the device other than the first device.

FIG. 80 is a diagram showing a display example for a case where the device icon 501 to be dragged passes through the device icon 501 for the device 200 other than the first device (with the cooperation type 61304 being "WITH DISPLAY").

In the display state of the basic screen shown in FIG. 72, the touch panel control section 102 of the home controller 100 senses that the air conditioner icon 60102 is dragged by the contacting object 60201. Then, as described with reference to the upper left diagram of FIG. 74, the display control section 103 of the home controller 100 lowers the brightness of the device icons 501 other than the television set icon 60101 and the air conditioner icon 60102 compared to the brightness of the television set icon 60101 and the air conditioner icon 60102.

Then, the touch panel control section 102 of the home controller 100 senses that the air conditioner icon 60102 overlaps on the illumination device icon 60104 as shown in FIG. 80 while the contacting object 60201 is dragging the air conditioner icon 60102. Then, the display control section 103 of the home controller 100 lowers the brightness of the air conditioner icon 60102.

As shown in FIG. 77, the cooperation type 61304 of the illumination device 202 corresponding to the illumination device icon 60104 is "WITHOUT DISPLAY" and not "WITH DISPLAY". That is, the illumination device 202 is the second device and not the first device. Therefore, the state confirmation screen 60203 cannot be displayed even if the air conditioner icon 60102 is dropped on the illumination device icon 60104.

Thus, it can be judged that display cannot be made at the time point when the air conditioner icon 60102 overlaps on the illumination device icon 60104. Therefore, the display control section 103 of the home controller 100 lowers the brightness of the air conditioner icon 60102 at the time point when the touch panel control section 102 of the home controller 100 senses that the air conditioner icon 60102 overlaps on the illumination device icon 60104.

That is, the display control section 103 of the home controller 100 lowers the brightness of the air conditioner icon 60102 while the air conditioner icon 60102 overlaps on the illumination device icon 60104 even if the air conditioner icon 60102 is dragged and passing over the illumination device icon 60104 without being dropped on the illumination device icon 60104. Consequently, it is possible to immediately inform the user that the state confirmation screen 60203 cannot be displayed even if the air conditioner icon 60102 is dropped on the illumination device icon 60104. As a result, it is possible to prevent an erroneous operation by the user in which the air conditioner icon 60102 is dropped on the illumination device icon 60104.

In FIG. 80, the display control section 103 of the home controller 100 lowers the brightness of the air conditioner icon 60102 while the air conditioner icon 60102 overlaps on the illumination device icon 60104. However, the present disclosure is not limited thereto. The display control section 103 may lower the brightness of the air conditioner icon 60102 in the same manner as the brightness of the device icons 501 other than the television set icon 60101 and the air conditioner icon 60102 if the touch panel control section 102 of the home controller 100 senses that the air conditioner icon 60102 is dropped on the illumination device icon 60104, for example. In this case, it is possible to conveniently inform the user that the air conditioner icon 60102 is erroneously dropped on the device icon 501 other than the television set icon 60101.

Figure 81:
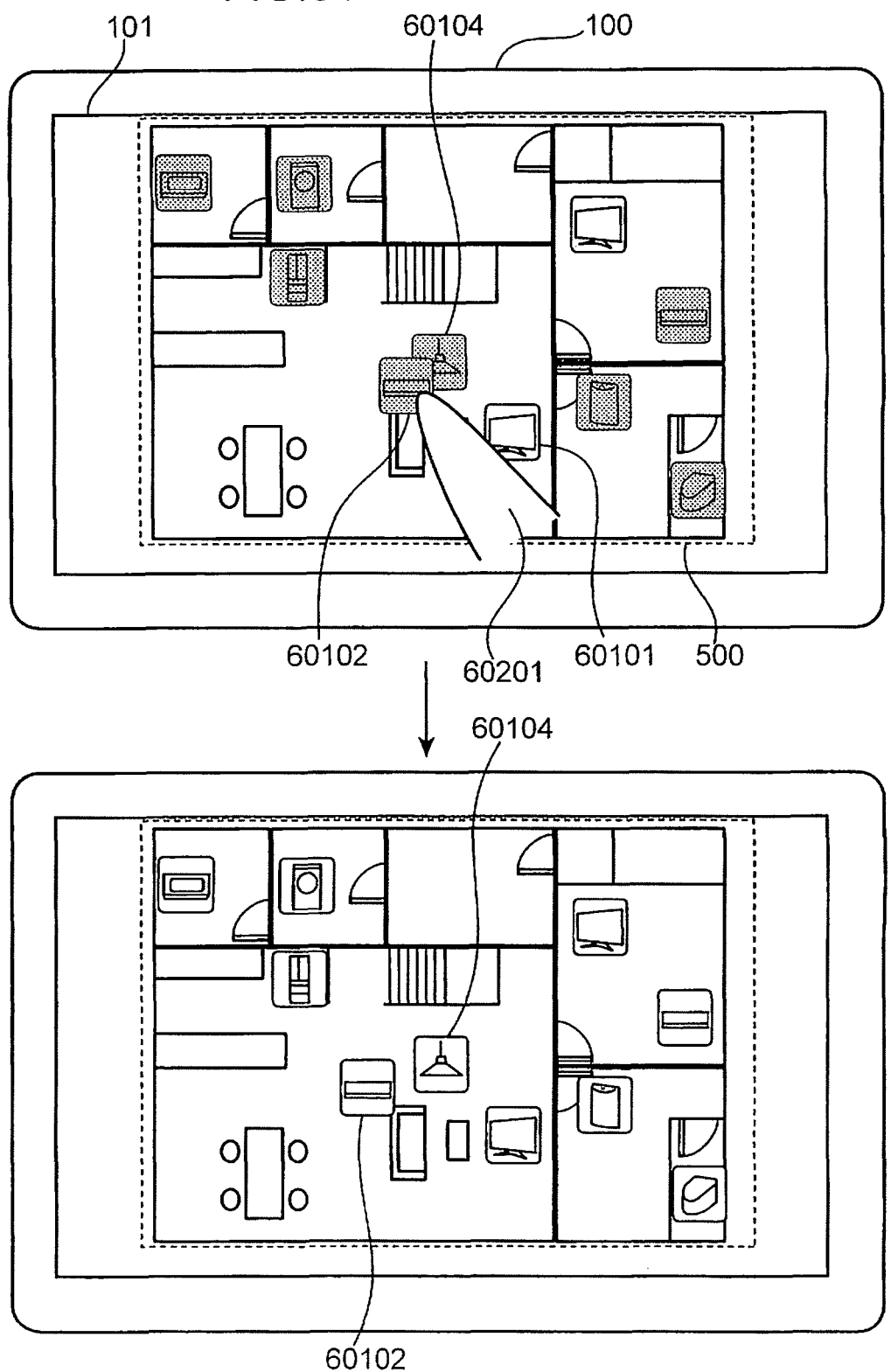
FIG. 81 is a diagram showing a display example for a case where the device corresponding to the device icon on which the device icon is dropped is not the first device.

FIG. 81 is a diagram showing a display example for a case where the device 200 corresponding to the device icon 501 on which the device icon 501 is dropped is not the first device (with the cooperation type 61304 being "WITH DISPLAY").

The touch panel control section 102 of the home controller 100 senses that the contacting object 60201 is moved away with the air conditioner icon 60102 dragged by the contacting object 60201 overlapping on the illumination device icon 60104 (that is, the air conditioner icon 60102 is dropped on the illumination device icon 60104) as shown in the upper diagram of FIG. 81. Then, the display control section 103 of the home controller 100 retracts the air conditioner icon 60102 to a location outside the display region of the illumination device icon 60104 as shown in the lower diagram of FIG. 81.

Consequently, the user can be informed, by exploiting the existing display resource, that the state confirmation screen 60203 is not displayed on the display 60204 of the television set 209 even if the air conditioner icon 60102 is dropped on the illumination device icon 60104.

Therefore, a plurality of steps can be omitted since it is not necessary to prepare a separate display screen for showing that information indicating the state of the air conditioner 201 is not displayed on the display 60204 of the television set 209, and to reduce the number of process steps to be performed within the home controller 100 or the number of operations to be performed by the user. In addition, it is possible to prevent the user from repeatedly performing an erroneous operation in which the air conditioner icon 60102 is dropped on the device icon 501 other than the television set icon 60101.

FIG. 82 is a diagram showing another display example for a case where the device 200 corresponding to the device icon 501 on which the device icon 501 is dropped is not the first device (with the cooperation type 61304 being "WITH DISPLAY").

The touch panel control section 102 of the home controller 100 senses that the contacting object 60201 is moved away with the air conditioner icon 60102 dragged by the contacting object 60201 overlapping on the illumination device icon 60104 (that is, the air conditioner icon 60102 is dropped on the illumination device icon 60104) as shown in the upper diagram of FIG. 82. Then, the display control section 103 of the home controller 100 retracts the air conditioner icon 60102 to the original display position as shown in the lower diagram of FIG. 82.

Consequently, the user can be informed, by exploiting the existing display resource, that the state confirmation screen 60203 is not displayed on the display 60204 of the television set 209 even if the air conditioner icon 60102 is dropped on the illumination device icon 60104.

Therefore, a plurality of steps can be omitted since it is not necessary to prepare a separate display screen for showing that information indicating the state of the air conditioner 201 is not displayed on the display 60204 of the television set 209, and to reduce the number of process steps to be performed within the home controller 100 or the number of operations to be performed by the user. In addition, it is possible to prevent the user from repeatedly performing an erroneous operation in which the air conditioner icon 60102 is dropped on the device icon 501 other than the television set icon 60101.

Figure 83:
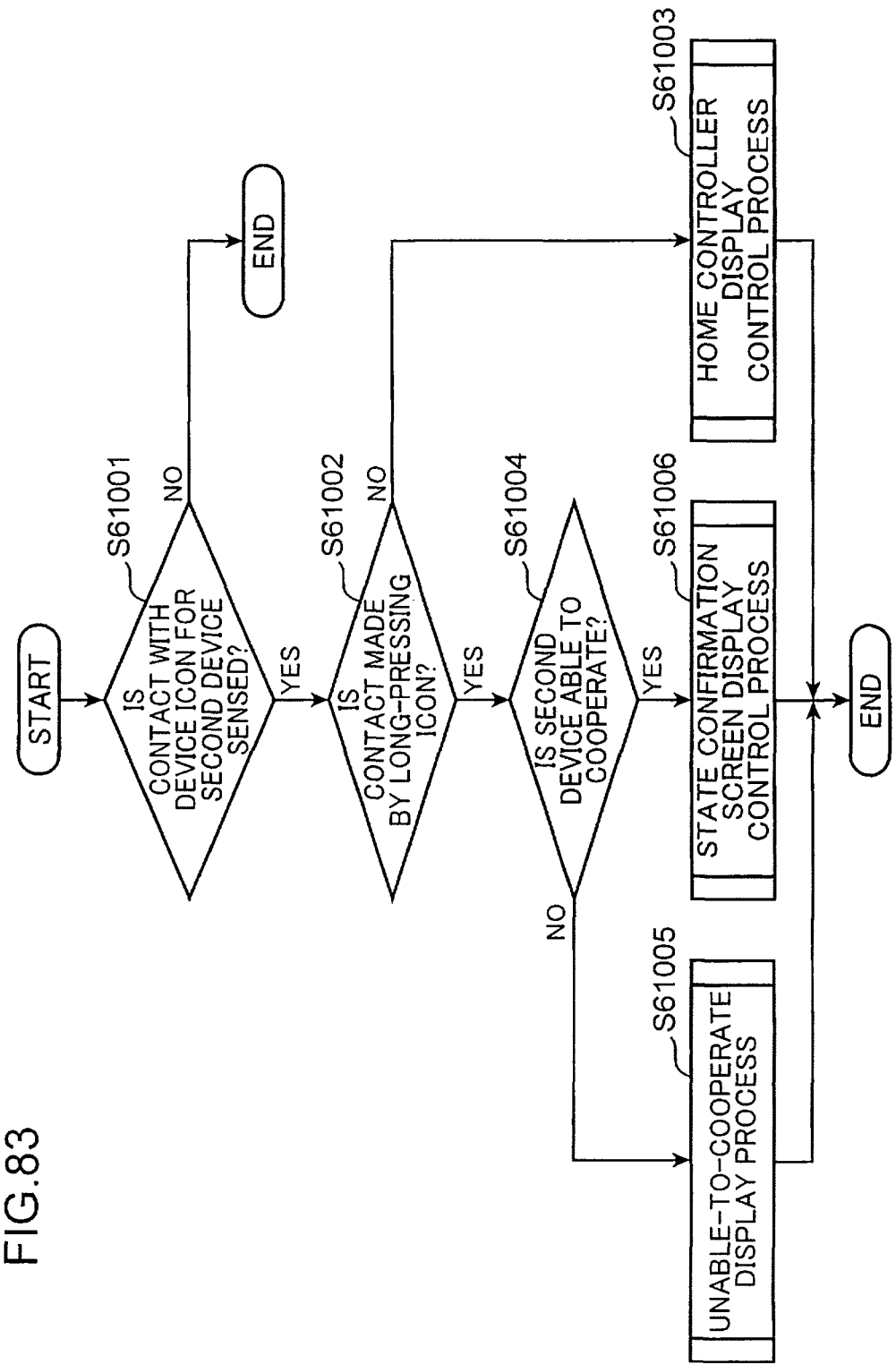
FIG. 83 is a flowchart showing the flow of a process for the home controller to control display of the state confirmation screen.

FIG. 83 is a flowchart showing the flow of a process for the home controller 100 to control display of the state confirmation screen 60203.

First, the touch panel control section 102 of the home controller 100 determines whether or not the contacting object 60201 contacts the device icon 501 for the second device (S61001). If a contact of the contacting object 60201 with the device icon 501 for the second device is not sensed (NO in S61001), the flow is terminated.

If the touch panel control section 102 of the home controller 100 senses a contact of the contacting object 60201 with the device icon 501 for the second device (YES in S61001), the touch panel control section 102 determines whether or not the contact between the contacting object 60201 and the device icon 501 for the second device is made by long-pressing an icon (S61002).

If the touch panel control section 102 determines that the contact between the contacting object 60201 and the device icon 501 for the second device is not made by long-pressing an icon, that is, the contact is made by tapping on an icon (NO in S61002), the process proceeds to a home controller display control process sub routine (S61003). After that, the flow is terminated. That is, if the toilet icon 60401 is tapped on by the contacting object 60201, for example, the process is advanced to S61003.

If the touch panel control section 102 determines that the contact between the contacting object 60201 and the device icon 501 for the second device is made by long-pressing an icon (YES in S61002). on the other hand, the display control section 103 of the home controller 100 determines whether or not the device 200 corresponding to the device icon 501 for the second device involved in the contact is a second device that is able to cooperate (S61004). That is, if the air conditioner icon 60102 or the toilet icon 60401 is dragged by the contacting object 60201, for example, the process is advanced to S61004.

If the display control section 103 of the home controller 100 determines in S61004 that the device 200 corresponding to the device icon 501 for the second device involved in the contact is not a second device that is able to cooperate (NO in S61004), the process proceeds to an unable-to-cooperate display process sub routine (S61005). After that, the flow is terminated.

If the display control section 103 of the home controller 100 determines in S61004 that the device 200 corresponding to the device icon 501 for the second device involved in the contact is a second device that is able to cooperate (YES in S61004), the process proceeds to a state confirmation screen display control process sub routine (S61006). After that, the flow is terminated.

That is, in the case where the air conditioner icon 60102 is dragged by the contacting object 60201, for example, the process is advanced to S61005. Meanwhile, in the case where the toilet icon 60401 is dragged by the contacting object 60201, for example, the process is advanced to S61006.

Figure 84:
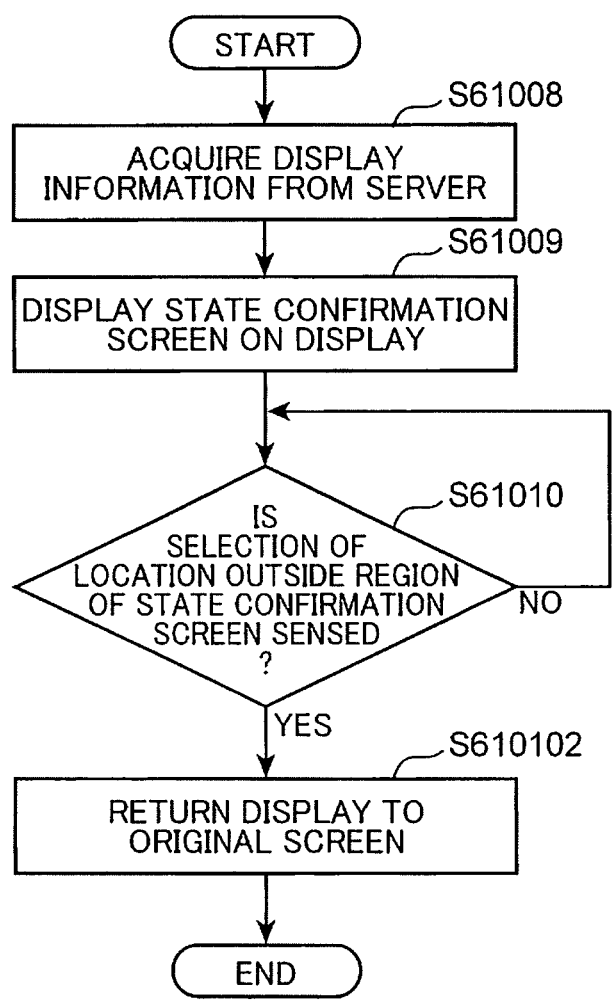
FIG. 84 is a flowchart showing the flow of a process of the home controller display control process sub routine of FIG. 83.

FIG. 84 is a flowchart showing the flow of a process of the home controller display control process sub routine in S61003 of FIG. 83.

First, the display control section 103 of the home controller 100 acquires display information from the server 300 (S61008). S61008 may be executed in the following procedure. That is, the communication control section 107 of the home controller 100 requests acquisition of display information from the server 300. Based on the request, the home information management section 301 of the server 300 prepares display information from device state information stored in the storage section 304. The communication control section 307 of the server 300 transmits the prepared display information to the home controller 100. The communication control section 107 of the home controller 100 receives the transmitted display information. The display control section 103 of the home controller 100 may acquire display information in such a procedure.

Subsequently, the display control section 103 of the home controller 100 causes the display 101 to display the state confirmation screen 60203 as overlapped on the floor plan 500 on the basis of the display information acquired from the server 300 (S61009).

Next, the touch panel control section 102 of the home controller 100 determines whether or not selection of a location outside the region of the state confirmation screen 60203 is sensed (S61010). That is, in S61010, the touch panel control section 102 determines whether or not a location outside the region of the state confirmation screen 60203 is tapped on by the contacting object 60201. If the touch panel control section 102 does not sense selection of a location outside the region of the state confirmation screen 60203 (NO in S61010), the process stands by.

If the touch panel control section 102 senses selection of a location outside the region of the state confirmation screen 60203 (YES in S61010), on the other hand, the display control section 103 of the home controller 100 returns the display screen on the display 101 to the original screen (S610102), and the flow is terminated.

Figure 85:
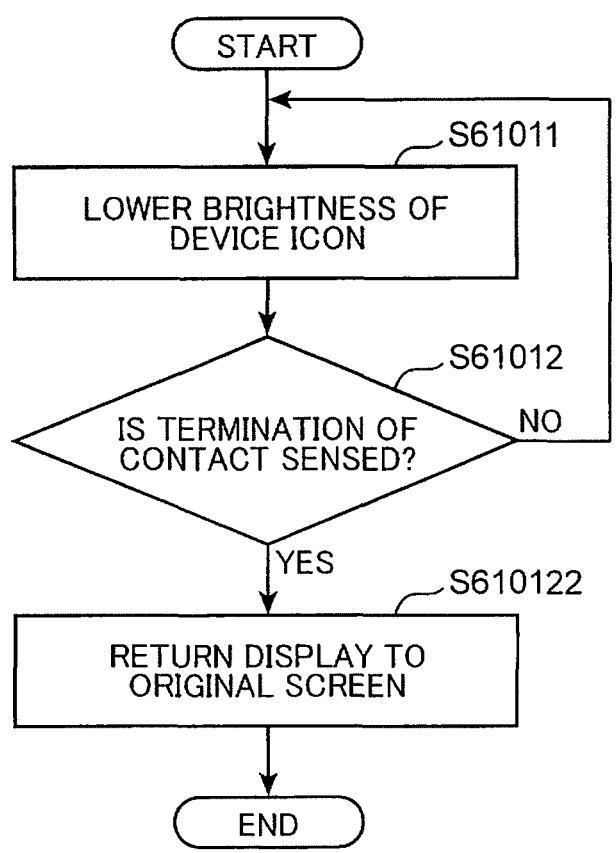
FIG. 85 is a flowchart showing the flow of a process of the unable-to-cooperate display process sub routine of FIG. 83.

FIG. 85 is a flowchart showing the flow of a process of the unable-to-cooperate display process sub routine in S61005 of FIG. 83.

First, the display control section 103 of the home controller 100 lowers the brightness of the device icon 501 for the second device contacted by the contacting object 60201 (S61011). Subsequently, the touch panel control section 102 of the home controller 100 determines whether or not termination of the contact between the contacting object 60201 and the device icon 501 is sensed (S61012).

If the touch panel control section 102 does not sense termination of the contact between the contacting object 60201 and the device icon 501 (NO in S61012), the process returns to S61011. If the touch panel control section 102 senses termination of the contact between the contacting object 60201 and the device icon 501 (YES in S61012), on the other hand, the display control section 103 of the home controller 100 returns the display screen on the display 101 to the original screen (S610122), and the flow is terminated.

Figure 86A:
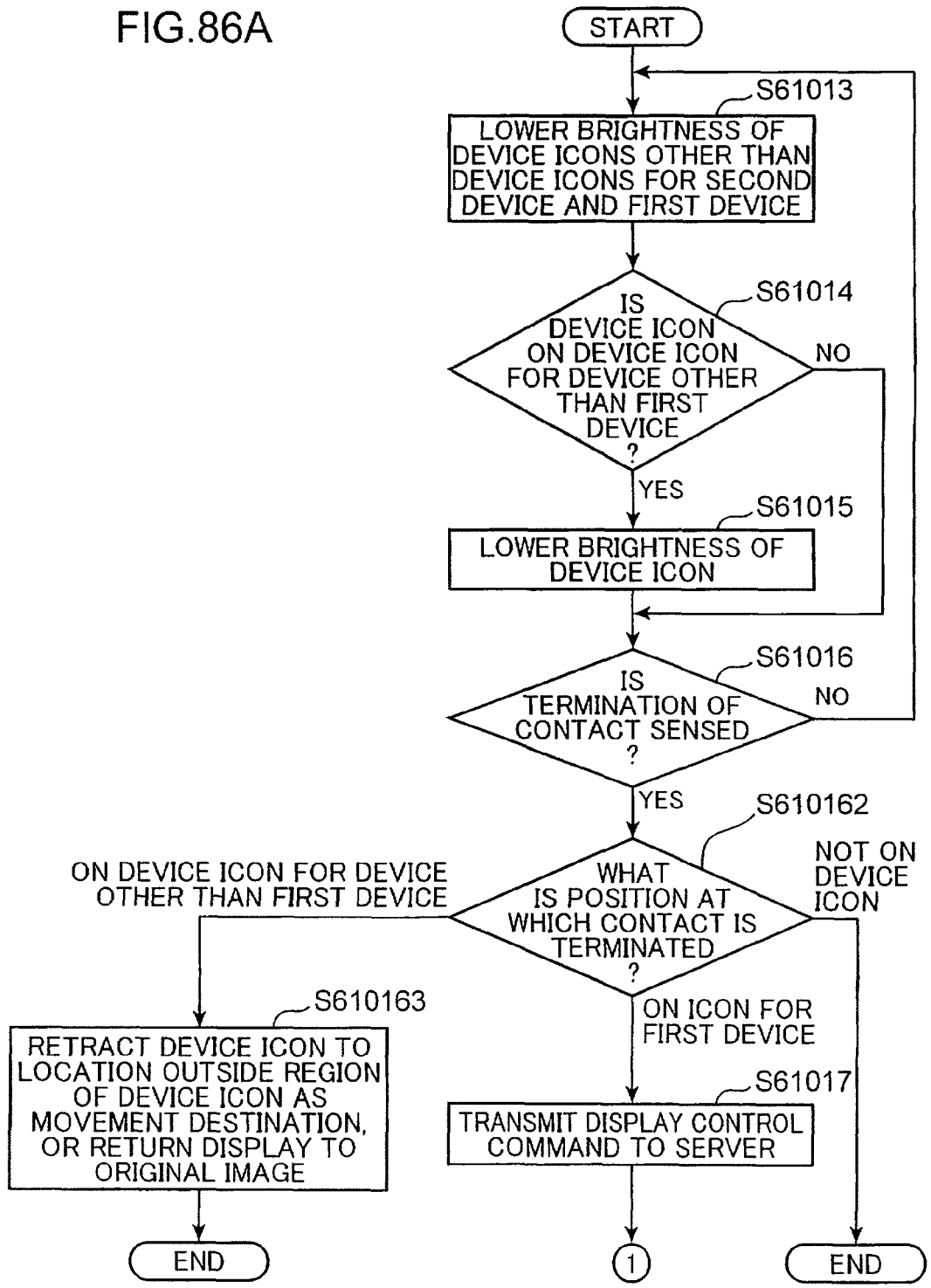

FIG. 86A and FIG. 86B are flowcharts showing the flow of a process of the state confirmation screen display control process sub routine in S61006 of FIG. 83.

First, the display control section 103 of the home controller 100 lowers the brightness of the device icons 501 other than the device icon 501 for the second device (in FIG. 74, the air conditioner icon 60102) contacted by the contacting object 60201 and the device icon 501 for the first device (in FIG. 74, the television set icon 60101) (S61013) as shown in the left diagram of FIG. 74, for example.

Next, the touch panel control section 102 of the home controller 100 determines whether or not the device icon 501 for the second device contacted by the contacting object 60201 is positioned on the device icon 501 for a device other than the first device (S61014).

If the device icon 501 for the second device contacted by the contacting object 60201 is positioned on the device icon 501 for a device other than the first device (YES in S61014), the display control section 103 of the home controller 100 lowers the brightness of the device icon 501 for the second device contacted by the contacting object 60201 (S61015) as described using FIG. 80, and the process proceeds to S61016.

If the device icon 501 for the second device contacted by the contacting object 60201 is not positioned on the device icon 501 for devices other than the first device (NO in S61014), on the other hand, the process directly proceeds to S61016.

In S61016, the touch panel control section 102 of the home controller 100 determines whether or not termination of the contact between the contacting object 60201 and the device icon 501 for the second device is sensed. If termination of the contact between the contacting object 60201 and the device icon 501 for the second device is not sensed (NO in S61016), the process returns to S61013, and the steps described above are repeatedly performed.

If the touch panel control section 102 of the home controller 100 senses termination of the contact between the contacting object 60201 and the device icon 501 for the second device (YES in S61016), on the other hand, the touch panel control section 102 of the home controller 100 determines the position at which the contact between the contacting object 60201 and the device icon 501 for the second device is terminated (the position at which the device icon 501 for the second device is dropped) (S610162).

If the position at which the contact between the contacting object 60201 and the device icon 501 for the second device is terminated is on the device icon 501 for the first device (in the embodiment, the television set icon 60101) in S610162, the process proceeds to S61017. If the position at which the contact between the contacting object 60201 and the device icon 501 for the second device is terminated is on the device icon 501 for a device other than the first device in S610162, that is, if the device icon 501 for the second device is dragged to the device icon 501 for a device other than the first device and dropped on the device icon 501 for a device other than the first device, the process proceeds to S610163. If the position at which the contact between the contacting object 60201 and the device icon 501 for the second device is terminated is not on the device icon 501 in S610162, the flow is terminated.

In S610163, the display control section 103 of the home controller 100 retracts the device icon 501 for the second device to a location outside the display region of the device icon 501 as the movement destination as shown in FIG. 81, or returns the display screen on the display 101 to the original screen as shown in FIG. 82, and the flow is terminated.

In S61017, the communication control section 107 of the home controller 100 transmits a display control command for displaying the state confirmation screen 60203 to the server 300. The display control command includes information that specifies the second device corresponding to the device icon 501 contacted by the contacting object 60201.

Next, the display control section 103 of the home controller 100 acquires display information from the server 300 (S61018). Subsequently, the display control section 103 of the home controller 100 displays the state confirmation screen 60203 on the display 101 on the basis of the display information acquired from the server 300 (S61019).

Next, the touch panel control section 102 of the home controller 100 determines whether or not selection of a location outside the region of the state confirmation screen 60203 is sensed (S61021). That is, in S61021, the touch panel control section 102 determines whether or not a location outside the region of the state confirmation screen 60203 is tapped on by the contacting object 60201. If the touch panel control section 102 does not sense selection of a location outside the region of the state confirmation screen 60203 (NO in S61021), the process stands by.

If the touch panel control section 102 senses selection of a location outside the region of the state confirmation screen 60203 (YES in S61021), on the other hand, the communication control section 107 of the home controller 100 transmits a termination control command for terminating display of the state confirmation screen 60203 to the server 300 (S61022). Subsequently, the display control section 103 of the home controller 100 returns the display screen on the display 101 to the original screen (S610222), and the flow is terminated.

Figure 87:
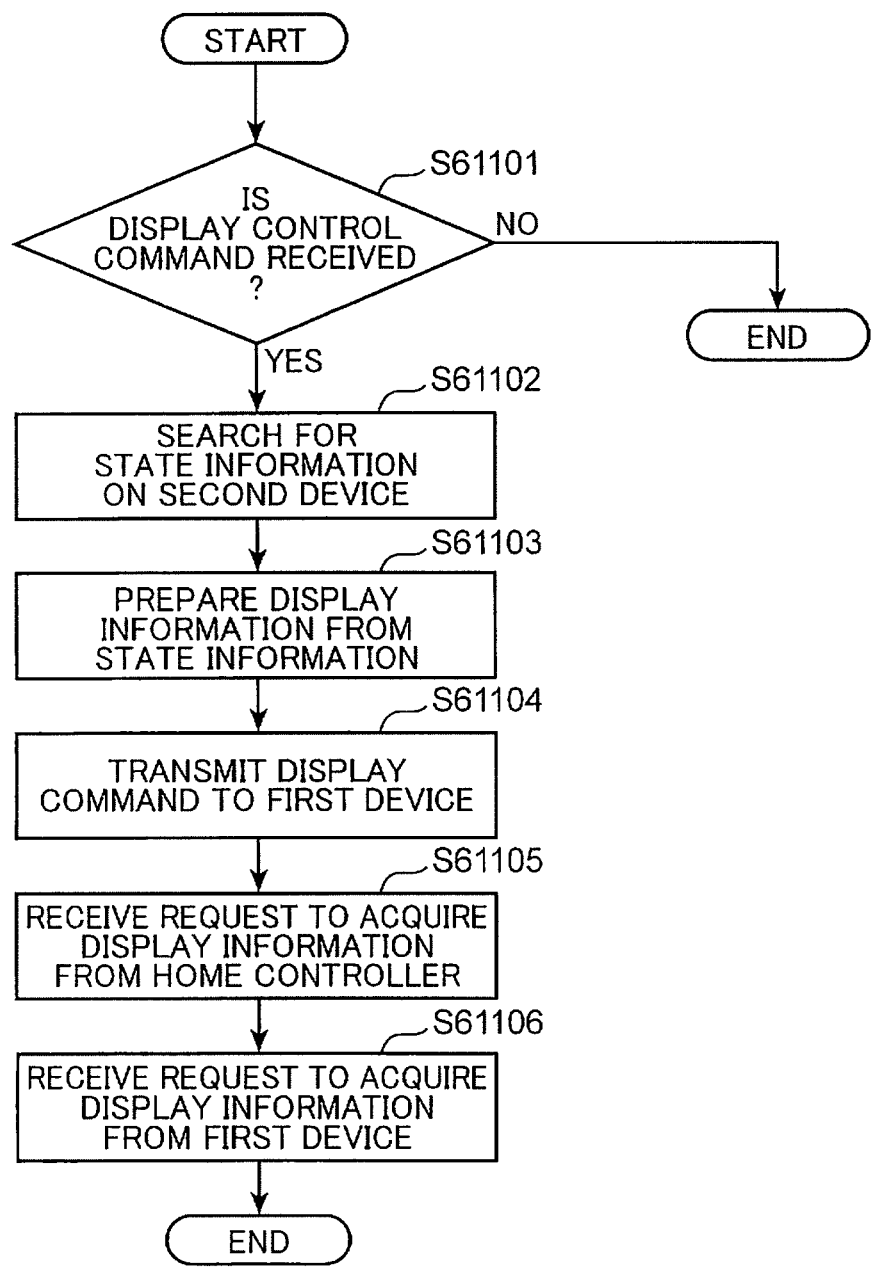
FIG. 87 is a flowchart showing the flow of a process for the server to control display of the state confirmation screen.

FIG. 87 is a flowchart showing the flow of a process for the server 300 to control display of the state confirmation screen 60203.

First, the communication control section 307 of the server 300 determines whether or not a display control command is received from the home controller 100 (S61101). If a display control command is not received from the home controller 100 (NO in S61101), the flow is terminated.

If a display control command is received from the home controller 100 (YES in S61101), on the other hand, the home information management section 301 of the server 300 searches the storage section 304 to obtain state information on the second device on the basis of the information that specifies the second device included in the display control command (S61102). Next, the home information management section 301 of the server 300 prepares display information for displaying the state confirmation screen 60203 on the basis of the found state information on the second device (S61103).

Subsequently, the communication control section 307 of the server 300 transmits a display command for displaying the state confirmation screen 60203 to the first device (in the embodiment, the television set 209) (S61104). Subsequently, the communication control section 307 of the server 300 receives a request to acquire display information from the communication control section 107 of the home controller 100 (S61105). Through S61105, the home controller 100 acquires display information. Next, the communication control section 307 of the server 300 receives a request to acquire display information from the communication control section of the first device (in the embodiment, the communication control section 217 of the television set 209) (S61106). Through S61106, the television set 209 acquires display information. Then, the flow is terminated.

Figure 88:
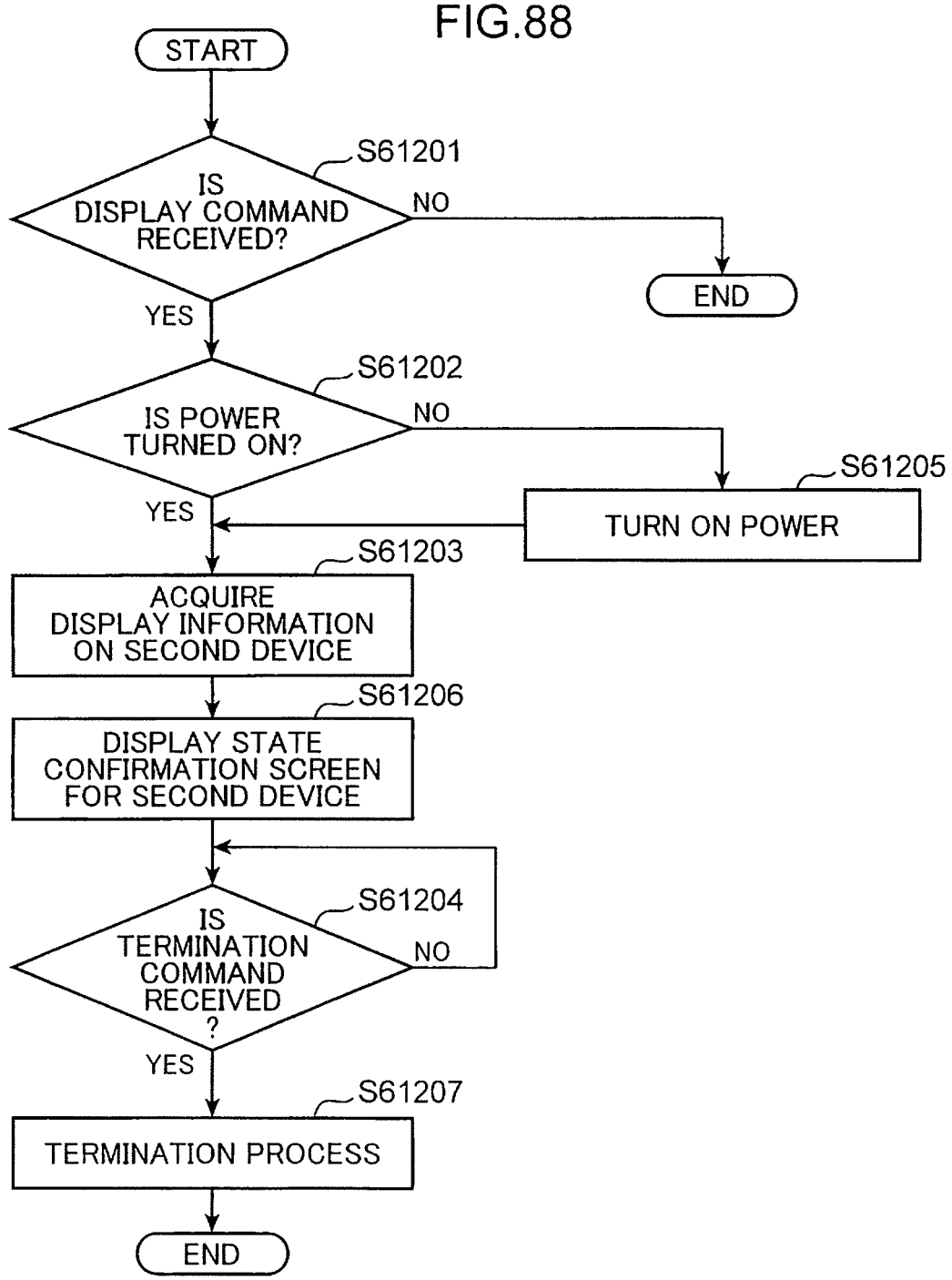
FIG. 88 is a flowchart showing the flow of a process for the television set to display the state confirmation screen.

FIG. 88 is a flowchart showing the flow of a process for the television set 209 to display the state confirmation screen 60203.

First, the communication control section 217 of the television set 209 determines whether or not a display command is received from the server 300 (S61201). If a display command is not received (NO in S61201), the flow is terminated. If the communication control section 217 receives a display command from the server 300 (YES in S61201), on the other hand, the control execution section 211 of the television set 209 determines whether or not the television set 209 is turned on (S61202).

If the television set 209 is not turned on (NO in S61202), the control execution section 211 of the television set 209 turns on the television set 209 (S61205), and the process proceeds to S61203. The control execution section 211 of the television set 209 may turn on the television set 209 on the basis of a command included in the display control command transmitted from the home controller 100 to the server 300 or a command included in the display command transmitted from the server 300 to the television set 209.

If the television set 209 is turned on (YES in S61202), the communication control section 217 of the television set 209 acquires display information on the second device from the server 300 (S61203). Next, the control execution section 211 of the television set 209 displays the state confirmation screen 60203 for the second device on the display 60204 on the basis of the acquired display information (S61206).

Subsequently, the communication control section 217 of the television set 209 determines whether or not a termination command is received from the server 300 (S61204). If a termination command is not received (NO in S61204), the process stands by. If the communication control section 217 receives a termination command from the server 300 (YES in S61204), on the other hand, the control execution section 211 of the television set 209 performs a predetermined termination process such as restoring the original display screen on the display 60204 or turning off the display 60204 (S61207). The flow is thus terminated.

In FIG. 73 and FIG. 83 to FIG. 88, the server 300 prepares display information from the state information on the device 200 (for example, the consumed electric power amount list 61401 shown in FIG. 78). The display information prepared by the server 300 may be the state confirmation screen 60203 itself. Alternatively, the display information prepared by the server 300 may be interim information obtained by processing the state information on the device 200, and the home controller 100 and the television set 209 may prepare the state confirmation screen 60203 on the basis of the interim information. Still alternatively, the server 300 may simply transmit the state information on the device 200, and the home controller 100 and the television set 209 may prepare the state confirmation screen 60203 on the basis of the state information.

In the embodiment, in addition, the state confirmation screen 60203 displayed on the home controller 100 and the television set 209 (for example, the upper right diagram and the lower right diagram of FIG. 74) is a screen obtained by processing the state information on the device 200 (for example, the consumed electric power amount list 61401 shown in FIG. 78). Alternatively, the state confirmation screen displayed on the home controller 100 and the television set 209 may be the state information on the device 200 (the consumed electric power amount list 61401 shown in FIG. 78). That is, the server 300 may transmit the state information on the device 200 to the home controller 100 and the television set 209 as the display information. Then, the home controller 100 and the television set 209 may display the state information on the device 200 transmitted from the server 300 as the state confirmation screen.

As described using FIG. 83 and FIG. 84, when the touch panel control section 102 of the home controller 100 senses that selection of the device icon 501 for the second device by the contacting object 60201 is not performed by, what is called, long-pressing the device icon 501, the display control section 103 of the home controller 100 causes the display 101 to display the state confirmation screen 60203 as overlapped on the floor plan 500.

Thus, in the case where it is desired to conveniently confirm the state confirmation screen 60203 on the display 101 of the home controller 100, rather than on the display 60204 of the television set 209, the device icon 501 for the second device may be tapped on, rather than being long-pressed, by the contacting object 60201.

In addition, the touch panel control section 102 of the home controller 100 senses that selection of the toilet icon 60401 which represents the toilet 207 which does not cooperate with the television set 209, for example, is performed by tapping on, rather than by long-pressing, the toilet icon 60401. Then, the display control section 103 of the home controller 100 displays the state confirmation screen 60203 for the toilet 207 on the display 101 of the home controller 100.

Thus, the state confirmation screen 60203 for the toilet 207, which cannot be displayed on the display 60204 of the television set 209 since the toilet 207 does not cooperate with the television set 209, can be displayed on the display 101 of the home controller 100.

It should be noted, however, that the server 300 does not store the consumed electric power amount list 61401 for the toilet 207 as described with reference to FIG. 78. Thus, in the case where the toilet icon 60401 is tapped on by the contacting object 60201, the display control section 103 of the home controller 100 acquires information that indicates the state of the toilet 207 stored in the storage section 214 of the toilet 207, for example the consumed electric power amount, from the toilet 207. Further, the display control section 103 prepares display information for display on the display 101, that is, the state confirmation screen 60203, from the acquired information, and displays the prepared state confirmation screen 60203 on the display 101.

As described above, the server 300 may store the consumed electric power amount list 61401 for the toilet 207. In such a case, the display control section 103 can display the state confirmation screen 60203 for the toilet 207 on the display 101 in the procedure shown in FIG. 84.

FIG. 89 is a diagram showing an operation example for a device icon for a case where the floor plan 5200 described with reference to FIG. 52 is used.

As shown in the upper diagram of FIG. 89, the display control section 103 displays the basic screen including the floor plan 5200, the device icons 501, and so forth on the display 101 of the home controller 100. In this display state, the contacting object 60201 is caused to contact the air conditioner icon 60102 as shown in the upper diagram of FIG. 89, the air conditioner icon 60102 is dragged, and the touch panel control section 102 senses that the air conditioner icon 60102 is dropped on the television set icon 60101 as shown in the lower diagram of FIG. 89.

Also in this case, similarly, the state confirmation screen 60203 can be displayed on the display 101 of the home controller 100 as shown in the upper right diagram of FIG. 74, and the state confirmation screen 60203 can be displayed on the display 60204 of the television set 209 as shown in the lower right diagram of FIG. 74.

Figure 90:
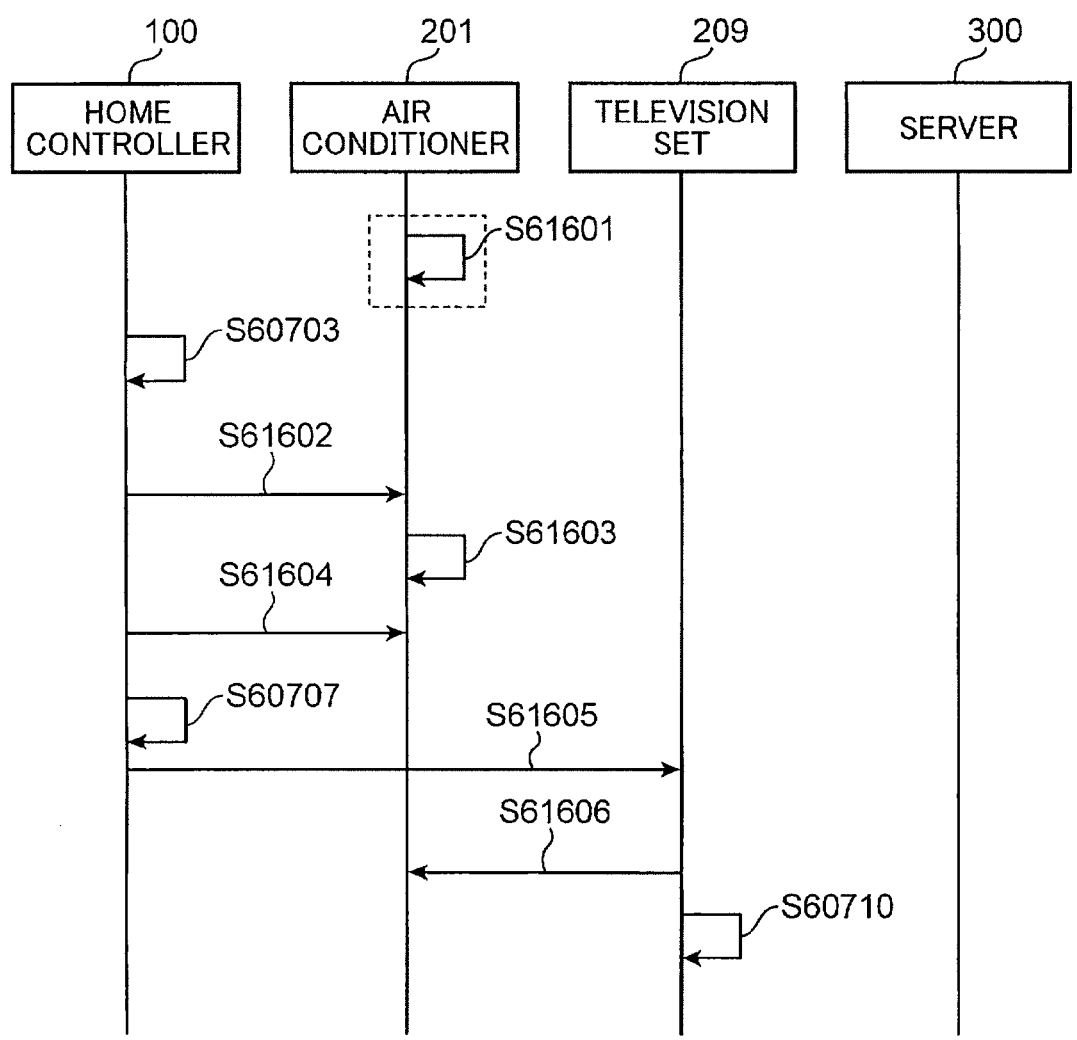
FIG. 90 is a diagram showing another example of the sequence of operation for displaying the state confirmation screen.

FIG. 90 is a diagram showing another example of the sequence of operation for displaying the state confirmation screen 60203. In the example of FIG. 90, the server 300 is not used to display the state confirmation screen 60203.

First, in S61601, the device state (for example, the consumed electric power amount) of the air conditioner 201 managed by the state management section 212 of the air conditioner 201 is stored in the storage section 214. S61601 is executed asynchronously with the other steps. S60703 is the same as S60703 of FIG. 73.

In S61602, the device control section 106 of the home controller 100 generates a display control command for displaying the state confirmation screen 60203 for the air conditioner 201 on the television set 209, the communication control section 107 transmits the generated display control command, and the communication control section 217 of the air conditioner 201 receives the transmitted display control command. The display control command generated by the device control section 106 may include a command for turning on the television set 209 when the television set 209 is not turned on.

In S61603, the state management section 212 of the air conditioner 201 prepares display information on the basis of information that indicates the device state of the air conditioner 201 stored in the storage section 214 of the air conditioner 201. In S61604, the communication control section 107 of the home controller 100 requests acquisition of the display information from the air conditioner 201, and acquires the requested display information. S60707 is the same as S60707 of FIG. 73.

In S61605, the device control section 106 of the home controller 100 generates a display command on the basis of the display control command generated in S61602, the communication control section 107 transmits the generated display command, and the communication control section 217 of the television set 209 receives the transmitted display command. The display command generated by the device control section 106 may include a command for turning on the television set 209 when the television set 209 is not turned on.

In S61606, the communication control section 217 of the television set 209 requests acquisition of the prepared display information from the air conditioner 201, and acquires the requested display information. S60710 is the same as S60710 of FIG. 73.

In this way, also in the case where the server 300 is not used, as in the case where the server 300 is used, the state confirmation screen 60203 can be displayed on the display 101 of the home controller 100, and the state confirmation screen 60203 can be displayed on the display 60204 of the television set 209.

INDUSTRIAL APPLICABILITY

The present disclosure provides a useful method for controlling an information apparatus connected to a network, a first target device and a second target device being controlled over the network, the information apparatus being provided in an information management system that manages information indicating the state of the second target device, in which the information indicating the state of the second target device can be displayed on a first display of the first target device, and also provides a program for such a control method.

The invention claimed is:

1. A method for controlling an information apparatus connected to a network, a first target device and a second target device being controlled over the network, the first target device having a first display, the second target device having no display or having a second display which is smaller in display area than the first display, the information apparatus having a third display and being used in an information management system which manages information indicating a state of the second target device, the method causing a computer of the information apparatus to:

display a display screen representing at least one floor plan of a building on the third display;

display device icons representing target devices including the first target device and the second target device on the display screen representing the at least one floor plan, the device icons being movable by dragging the device icons; and when it is sensed that a device icon representing the second target device is dropped on a device icon representing the first target device, output to the information management system a first control command for displaying a confirmation screen on the first display of the first target device, the confirmation screen being for confirmation of the state of the second target device.

2. The method according to claim 1, wherein when it is not sensed that the device icon representing the second target device is dropped on the device icon representing the first target device, and when it is sensed that the device icon representing the second target device is selected, the information indicating the state of the second target device is received from the information management system, and the confirmation screen is displayed on the third display as overlapped on the display screen representing the at least one floor plan.

3. The method according to claim 2, wherein in displaying the confirmation screen on the third display as overlapped on the display screen, display of the display screen is changed to display which is darker than display of the confirmation screen.

4. The method according to claim 3, wherein when it is sensed that a location outside a region of the confirmation screen is selected, display of the confirmation screen is erased, and the display screen is changed to display with original brightness.

5. The method according to claim 1, wherein in a case where the second target device and the first target device cooperate with each other and the confirmation screen can be displayed on the first display of the first target device, when it is sensed that the device icon representing the second target device is selected, display of an other device icon which is other than the device icon representing the first target device and the device icon representing the second target device is changed to display which is darker than display of the device icon representing the first target device and the device icon representing the second target device.

6. The method according to claim 5, wherein when it is sensed that the device icon representing the second target device is dropped on the other device icon, display of the device icon representing the second target device is changed to darker display as with the display of the other device icon.

7. The method according to claim 1, wherein in a case where the second target device and the first target device do not cooperate with each other and the confirmation screen cannot be displayed on the first display of the first target device, when it is sensed that selection of the device icon representing the second target device is continued for not less than a predetermined time, display of the device icon representing the second target device is changed to display which is darker than display of an other device icon which is other than the device icon representing the second target device.

8. The method according to claim 7, wherein in a case where the second target device and the first target device do not cooperate with each other and the confirmation screen cannot be displayed on the first display of the first target device, when it is judged that a time of sensing selection of the device icon representing the second target device is less than the predetermined time, the information indicating the state of the second target device is received from the information management system, and the confirmation screen is displayed on the third display as overlapped on the display screen representing the at least one floor plan.

9. The method according to claim 1, wherein when it is sensed that the device icon representing the second target device is dropped on a device icon, which is other than the device icon representing the first target device, the device icon representing the second target device is retracted to a location outside a display region of the device icon representing the first target device on which the device icon representing the second target device is dropped.

10. The method according to claim 1, wherein
when it is sensed that the device icon representing the second target device is dropped on the device icon which is other than the device icon representing the first target device, the device icon representing the second target device is retracted to an original display position of the device icon representing the second target device.

11. The method according to claim 1, wherein
in a case where the second target device and the first target device cooperate with each other and the confirmation screen can be displayed on the first display of the first target device, when it is sensed that selection of the device icon representing the second target device is continued for not less than a predetermined time, display of an other device icon other than the device icon representing the first target device and the device icon representing the second target device is changed to display which is darker than display of the device icon representing the first target device and the device icon representing the second target device.

12. The method according to claim 11, wherein
in a case where the second target device and the first target device cooperate with each other and the confirmation screen can be displayed on the first display of the first target device, when it is judged that a time of sensing selection of the device icon representing the second target device is less than the predetermined time,
the information indicating the state of the second target device is received from the information management system, and
the confirmation screen is displayed on the third display as overlapped on the display screen representing the at least one floor plan.

13. The method according to claim 1, wherein
in a case where the first target device is not turned on when the first control command is output to the information management system, a second control command for turning on the first target device is output to the information management system.

14. The method according to claim 1, wherein
the information indicating the state of the second target device includes log information related to a use history of the second target device.

15. The method according to claim 1, wherein
the information indicating the state of the second target device includes information indicating a consumed electric power amount of the second target device.

16. The method according to claim 1, wherein
the first target device is a television set.

17. The method according to claim 1, wherein
the second target device includes one of a refrigerator, an illumination device, an air conditioner, and a washing machine.

18. The method according to claim 1, wherein
the third display is a touch panel display, and
the device icon is dragged when contact on the touch panel display is sensed.

19. The method according to claim 1, wherein
the device icon is dragged by clicking a mouse pointer.

20. A method for controlling an information apparatus connected to a network, a first target device and a second target device being controlled over the network, the first target device having a first display, the second target device having no display or having a second display which is smaller in display area than the first display, the information apparatus having a third display and being used in an information management system which manages information indicating a state of the second target device,
the method causing a computer of the information apparatus to:
display a display screen representing at least one floor plan of a building on the third display;
display device icons representing target devices including the first target device and the second target device on the display screen representing the at least one floor plan, the device icons being movable by dragging the device icons;
judge whether a device icon representing the second target device is dropped on a device icon representing the first target device, or whether it is sensed that the device icon representing the second target device is selected;
in a case where it is judged that the device icon representing the second target device is dropped on the device icon representing the first target device, output to the information management system a first control command for displaying a confirmation screen for confirmation of the state of the second target device on the first display of the first target device; and
in a case where it is not judged that the device icon representing the second target device is dropped on the device icon representing the first target device, and where it is sensed that the device icon representing the second target device is selected, receive the information indicating the state of the second target device from the information management system, and display the confirmation screen on the third display as overlapped on the display screen representing the at least one floor plan.

21. A non-transitory computer-readable recording medium which stores a program to be executed by an information apparatus connected to a network, a first target device and a second target device being controlled over the network, the first target device having a first display, the second target device having no display or having a second display which is smaller in display area than the first display, the information apparatus having a display and being used in an information management system which manages information indicating a state of the second target device,
the program causing a computer of the information apparatus to:
display a display screen representing at least one floor plan of a building on the third display;
display device icons representing target devices including the first target device and the second target device on the display screen representing the at least one floor plan, the device icons being movable by dragging the device icons; and
when it is sensed that a device icon representing the second target device is dropped on a device icon representing the first target device, output to the information management system a first control command for displaying a confirmation screen on the first display of the first target device, the confirmation screen being for confirmation of the state of the second target device.

* * * * *